US012616191B2

(12) United States Patent
Comerford et al.

(10) Patent No.: US 12,616,191 B2
(45) Date of Patent: May 5, 2026

(54) SYSTEMS AND METHODS FOR REVERSIBLE CRYOPRESERVATION

(71) Applicant: Until Labs Inc., South San Francisco, CA (US)

(72) Inventors: Fynn S.V.F. Comerford, San Francisco, CA (US); Hunter Cole Davis Ozawa, San Francisco, CA (US); Hannah Z. Slabodkin, Mountain View, CA (US); Justin M. Olshavsky, Wexford, PA (US); Dhruv K. Sumathi, San Francisco, CA (US); Inga Zhuravleva, San Francisco, CA (US); Isla D.B. Weber, San Francisco, CA (US); John E. Bailey, III, San Francisco, CA (US); Chen Tian, San Francisco, CA (US); Noah I. Daniel, San Francisco, CA (US); Katherine L.M. Baney, San Francisco, CA (US); Benjamin D. Fellows, Walnut Creek, CA (US); Andrew P. Ulvestad, Oakland, CA (US); Itziar Ríos Ruiz, Foster City, CA (US); Vassilis A. Alexopoulos, Moreland Hills, OH (US); Anna N. Pushkin, San Francisco, CA (US)

(73) Assignee: Until Labs, Inc., South San Francisco, CA (US)

( * ) Notice: Subject to any disclaimer, the term of this patent is extended or adjusted under 35 U.S.C. 154(b) by 0 days.

(21) Appl. No.: 19/228,566

(22) Filed: Jun. 4, 2025

(65) Prior Publication Data

US 2025/0366466 A1      Dec. 4, 2025

Related U.S. Application Data

(63) Continuation of application No. PCT/US2025/031949, filed on Jun. 2, 2025.

(60) Provisional application No. 63/654,824, filed on May 31, 2024.

(51) Int. Cl.
| | |
|---|---|
| *A01N 1/125* | (2025.01) |
| *A01N 1/143* | (2025.01) |
| *A01N 1/162* | (2025.01) |
| *A01N 1/168* | (2025.01) |

(52) U.S. Cl.
CPC ............. *A01N 1/125* (2025.01); *A01N 1/143* (2025.01); *A01N 1/162* (2025.01); *A01N 1/168* (2025.01)

(58) Field of Classification Search
None
See application file for complete search history.

(56) References Cited

U.S. PATENT DOCUMENTS

| | | | |
|---|---|---|---|
| 5,952,168 | A | 9/1999 | Wowk et al. |
| 6,274,303 | B1 | 8/2001 | Wowk et al. |
| 6,951,712 | B2 | 10/2005 | Soane et al. |
| 7,344,530 | B2 | 3/2008 | Bischof et al. |
| 7,344,531 | B2 | 3/2008 | Bischof et al. |
| 7,469,838 | B2 | 12/2008 | Brooks et al. |
| 8,679,735 | B2 | 3/2014 | Fahy et al. |
| 9,651,508 | B2 | 5/2017 | Bischof et al. |
| 9,851,316 | B2 | 12/2017 | Lubner et al. |
| 10,091,986 | B2 | 10/2018 | Gil et al. |
| 10,493,098 | B2 | 12/2019 | Haynes et al. |
| 10,575,515 | B2 | 3/2020 | Yarmush et al. |
| 10,725,033 | B2 | 7/2020 | Bischof et al. |
| 10,816,492 | B2 | 10/2020 | Bischof et al. |
| 10,918,102 | B2 | 2/2021 | Uygun et al. |
| 11,083,191 | B2 | 8/2021 | Freed |

(Continued)

FOREIGN PATENT DOCUMENTS

| | | |
|---|---|---|
| CN | 110892890 | 9/2021 |
| CN | 115777684 | 3/2023 |

(Continued)

OTHER PUBLICATIONS

Khaydukova et al. "Current state and challenges of tissue organ cryopreservation in biobanking" International Journal of Molecular Sciences (Year: 2024).*

(Continued)

*Primary Examiner* — Robert M Kelly
*Assistant Examiner* — John David Moore
(74) *Attorney, Agent, or Firm* — Levine Bagade Han LLP

(57)      ABSTRACT

Provided herein are systems, methods, and cryoprotective solutions for reversible cryopreservation of biological specimens, whole organs, and whole organisms. Exemplary methods include loading a cryoprotective agent into the biological specimen, cooling the biological specimen to a cryogenic temperature for preservation, storing the biological specimen at a preservation temperature state to preserve the biological specimen, rewarming the biological specimen by increasing a temperature of the biological specimen above the preservation temperature state, and unloading the cryoprotective agent from the biological specimen. The cooling is performed at a first rate to reduce ice formation, substantially homogeneously to reduce propensity for cracking of the preserved biological specimen, and at a first pressure to prevent or reduce ice expansion within the preserved biological specimen. The rewarming is performed at a second rate to reduce ice formation, substantially homogeneously to reduce propensity for cracking, and at a second pressure to prevent or reduce ice expansion.

20 Claims, 57 Drawing Sheets

(56)                  References Cited

U.S. PATENT DOCUMENTS

| | | |
|---|---|---|
| 11,122,796 B1 | 9/2021 | Manuchehrabadi et al. |
| 11,246,308 B2 | 2/2022 | Brockbank et al. |
| 11,311,008 B2 | 4/2022 | Bischof et al. |
| 11,570,982 B2 | 2/2023 | Herickhoff et al. |
| 11,576,373 B2 | 2/2023 | Kilbride et al. |
| 11,612,162 B2 | 3/2023 | Kilbride et al. |
| 11,849,719 B2 | 12/2023 | Fahy |
| 11,917,992 B2 | 3/2024 | Uygun et al. |
| 12,058,996 B2 | 8/2024 | Toner et al. |
| 12,167,729 B2 | 12/2024 | Uygun et al. |
| 12,207,647 B2 | 1/2025 | Wei |
| 2012/0244067 A1 | 9/2012 | Roth et al. |
| 2014/0260346 A1 | 9/2014 | Fuhr et al. |
| 2016/0015025 A1 | 1/2016 | Bischof et al. |
| 2019/0105094 A1 | 4/2019 | Azarin et al. |
| 2020/0154697 A1 | 5/2020 | Toner et al. |
| 2020/0337296 A1 | 10/2020 | Shore et al. |
| 2021/0137099 A1 | 5/2021 | Brockbank et al. |
| 2021/0293674 A1 | 9/2021 | Zhan et al. |
| 2021/0392874 A1 | 12/2021 | Silvestre Duarte et al. |
| 2022/0071196 A1 | 3/2022 | Lee et al. |
| 2022/0087250 A1 | 3/2022 | Schmidlin et al. |
| 2022/0095607 A1 | 3/2022 | Uygun et al. |
| 2022/0132835 A1 | 5/2022 | Bischof et al. |
| 2022/0132837 A1 | 5/2022 | Zuchowicz et al. |
| 2022/0211923 A1 | 7/2022 | Schmidlin et al. |
| 2022/0217972 A1 | 7/2022 | Zhan et al. |
| 2022/0240500 A1 | 8/2022 | Bischof et al. |
| 2022/0330543 A1 | 10/2022 | Toner et al. |
| 2023/0025400 A1 | 1/2023 | McAlpine et al. |
| 2023/0079454 A1 | 3/2023 | Tessier et al. |
| 2023/0125964 A1 | 4/2023 | Zhan et al. |
| 2023/0355811 A1 | 11/2023 | Rinaldi et al. |
| 2024/0260568 A1 | 8/2024 | Gao et al. |
| 2024/0268372 A1 | 8/2024 | Uygun et al. |

FOREIGN PATENT DOCUMENTS

| | | |
|---|---|---|
| WO | WO 1998/019529 | 5/1998 |
| WO | WO 2007/077560 | 7/2007 |
| WO | WO 2013/116333 | 8/2013 |
| WO | WO 2019/073051 | 4/2019 |
| WO | WO 2020/163500 | 8/2020 |
| WO | WO 2021/025719 | 2/2021 |
| WO | WO 2021/140726 | 7/2021 |
| WO | WO 2021/163472 | 8/2021 |
| WO | WO 2022/067042 | 3/2022 |
| WO | WO 2022/067351 | 3/2022 |
| WO | WO 2022/241417 | 11/2022 |
| WO | WO 2022/251555 | 12/2022 |
| WO | WO 2023/235770 | 12/2023 |
| WO | WO 2024/010730 | 1/2024 |
| WO | WO 2024/107310 | 5/2024 |
| WO | WO 2024/123869 | 6/2024 |

OTHER PUBLICATIONS

Arav, A., "Cryopreservation by Directional Freezing and Vitrification Focusing on Large Tissues and Organs", *Cells 11*, No. 7: 1072, pp. 1-9, Mar. 2022. https://doi.org/10.3390/cells11071072.

Han, Z. et al., "Vitrification and nanowarming enable long-term organ cryopreservation and life-sustaining kidney transplantation in a rat model", *Nature Communication*, 14(1):3407, Jun. 2023. doi:10.1038/s41467-023-38824-8.

Manuchehrabadi, N. et al., "Improved tissue cryopreservation using inductive heating of magnetic nanoparticles", *Science Translational Medicine*, vol. 9, No. 379, pp. 1-10, Mar. 2017.

Sharma, A. et al., "Vitrification and Nanowarming of Kidneys", *Advanced Science*, 8(19):e2101691, Oct. 2021. doi:10.1002/advs.202101691.

Wang, J. et al., "Magnetic induction heating of superparamagnetic nanoparticles during rewarming augments the recovery of hUCM-MSCs cryopreserved by vitrification", *Acta Biomater*, vol. 33, pp. 264-274, Mar. 2016.

Cradle. "Milestone White Paper I" 1-25. Retrieved on Jul. 21, 2025 From the Web:https://www.cradle.xyz/milestone-white-paper-i. Jun. 3, 2024.

\* cited by examiner

200

Temperature Curve

Pressure Curve

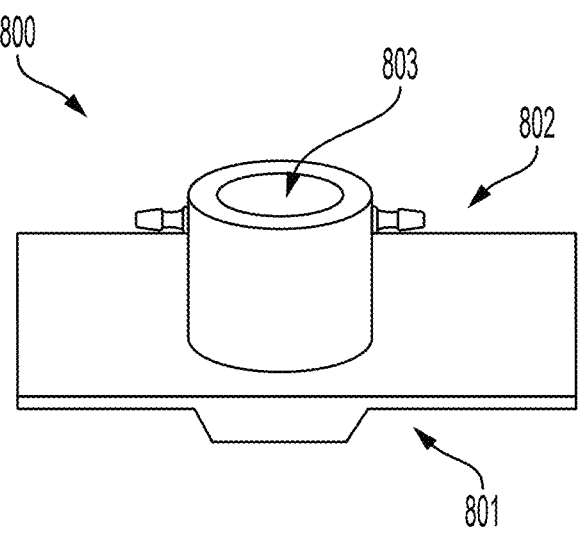
FIG. 8A
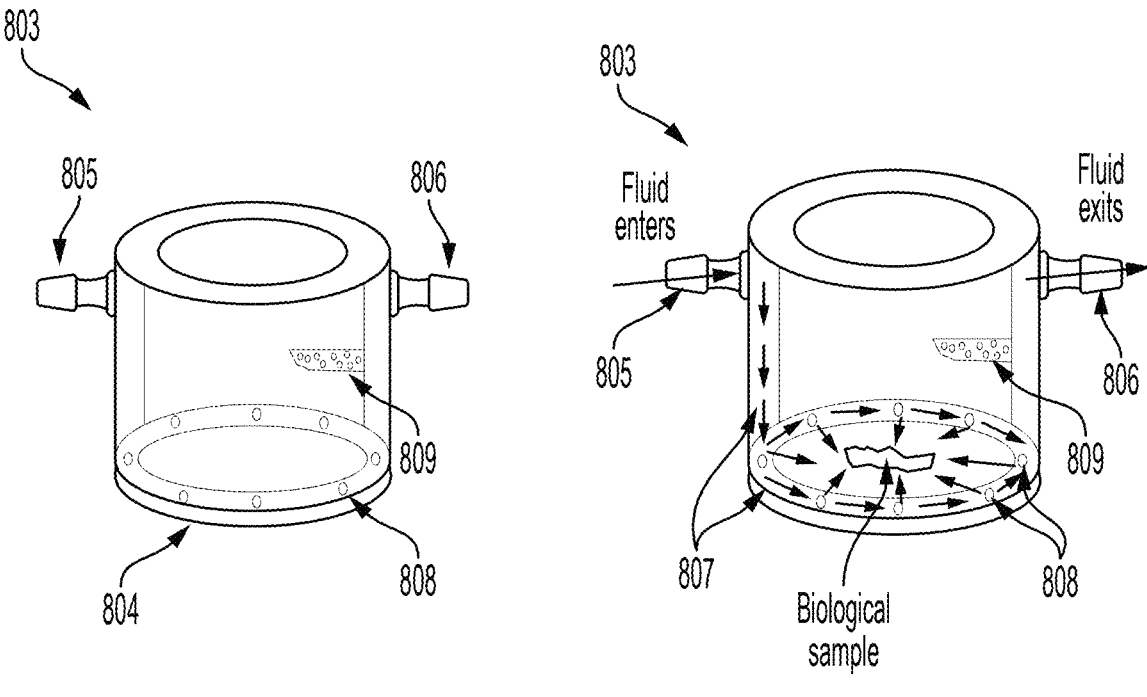
FIG. 8B                    FIG. 8C

1000

1001

1004

1005

1003

1002

Electrode positive
pressure

Rigid membrane
No cell wall dumping

Electrode positive
pressure

Fluid membrane
Cell wall dumping

Post-vitrified synaptic short-term potentiation
following TBS (theta-burst stimulation)

Vitrified fEPSP representative traces

Dendritic Spines of Pyramidal Neurons in Rat Hippocampal Slices after Load-Vitrification-Unload in Tissue Holding Assembly

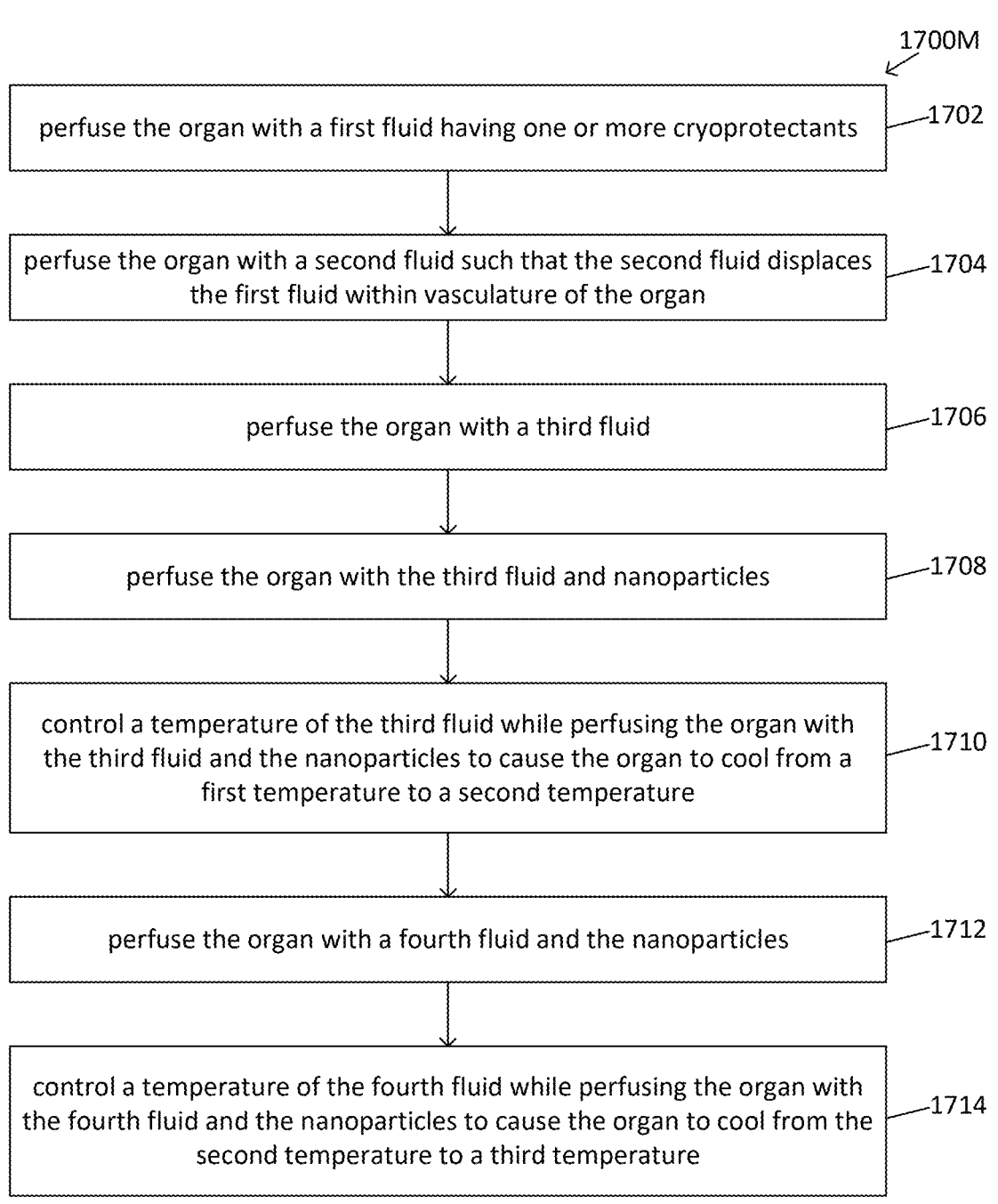

1700M

| perfuse the organ with a first fluid having one or more cryoprotectants | —1702 |

| perfuse the organ with a second fluid such that the second fluid displaces the first fluid within vasculature of the organ | —1704 |

| perfuse the organ with a third fluid | —1706 |

| perfuse the organ with the third fluid and nanoparticles | —1708 |

| control a temperature of the third fluid while perfusing the organ with the third fluid and the nanoparticles to cause the organ to cool from a first temperature to a second temperature | —1710 |

| perfuse the organ with a fourth fluid and the nanoparticles | —1712 |

| control a temperature of the fourth fluid while perfusing the organ with the fourth fluid and the nanoparticles to cause the organ to cool from the second temperature to a third temperature | —1714 |

FIG. 17A

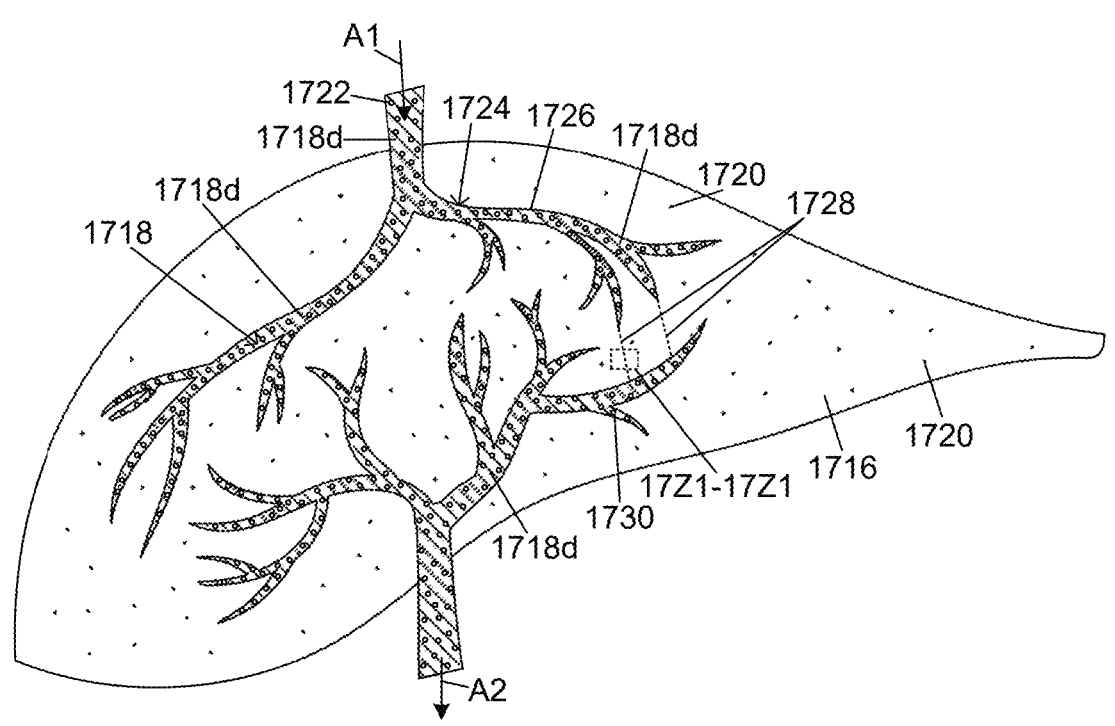
FIG. 17Z1
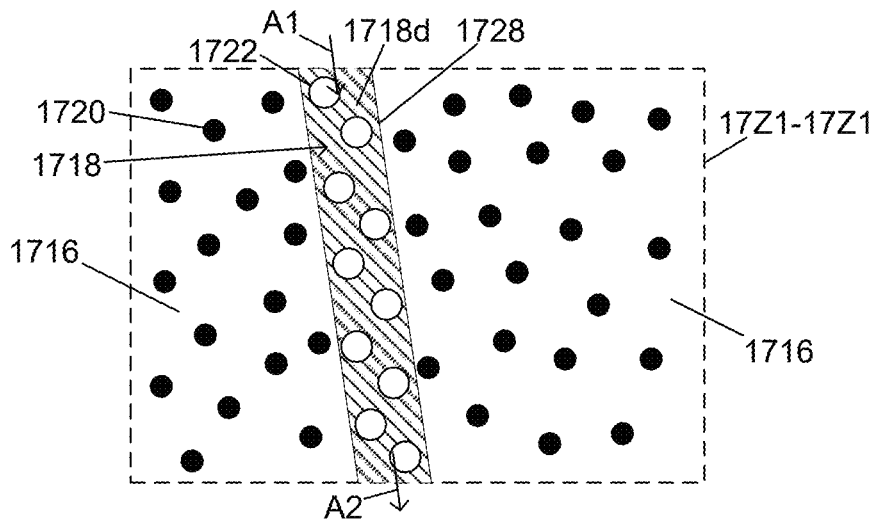
FIG. 17Z2

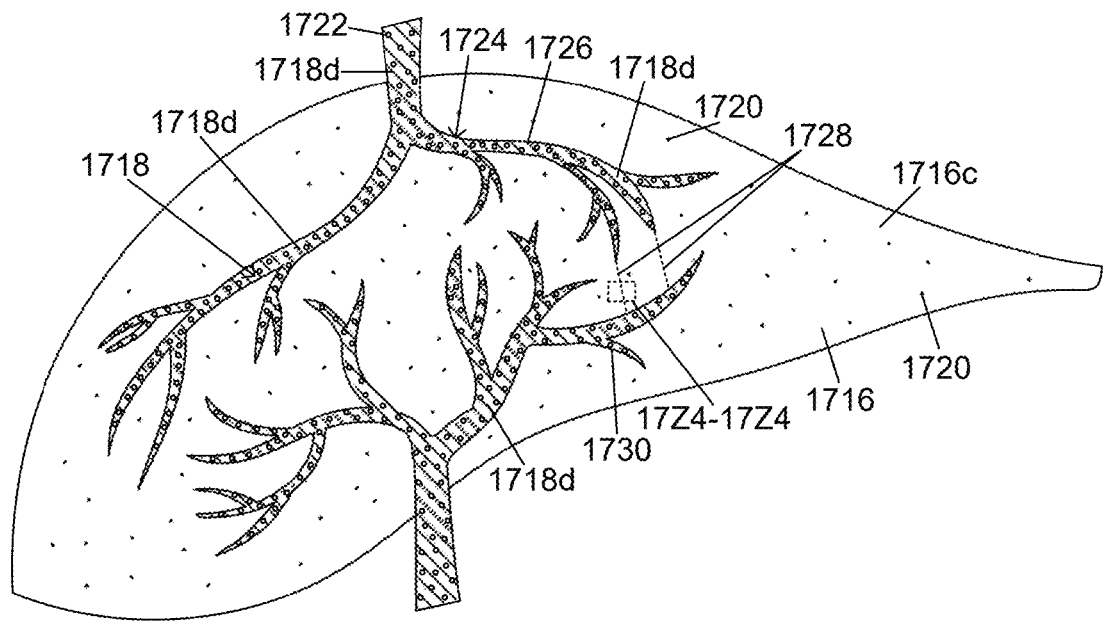
FIG. 17Z3
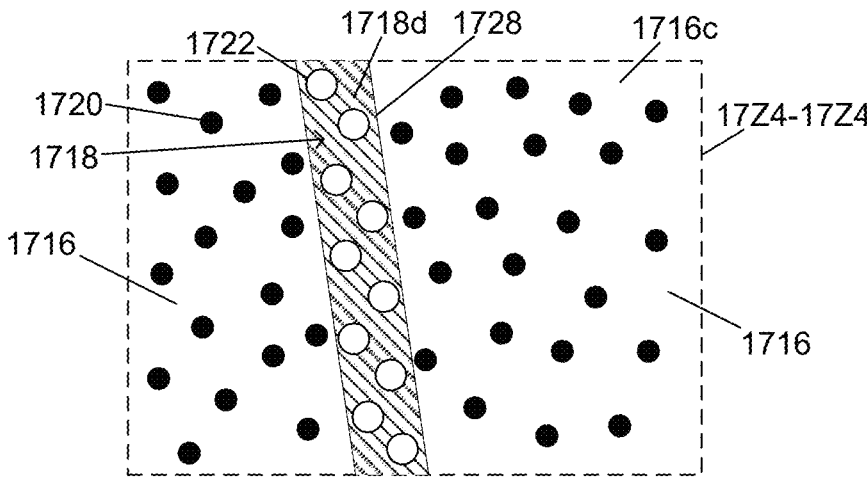
FIG. 17Z4

1716        1716c        1742
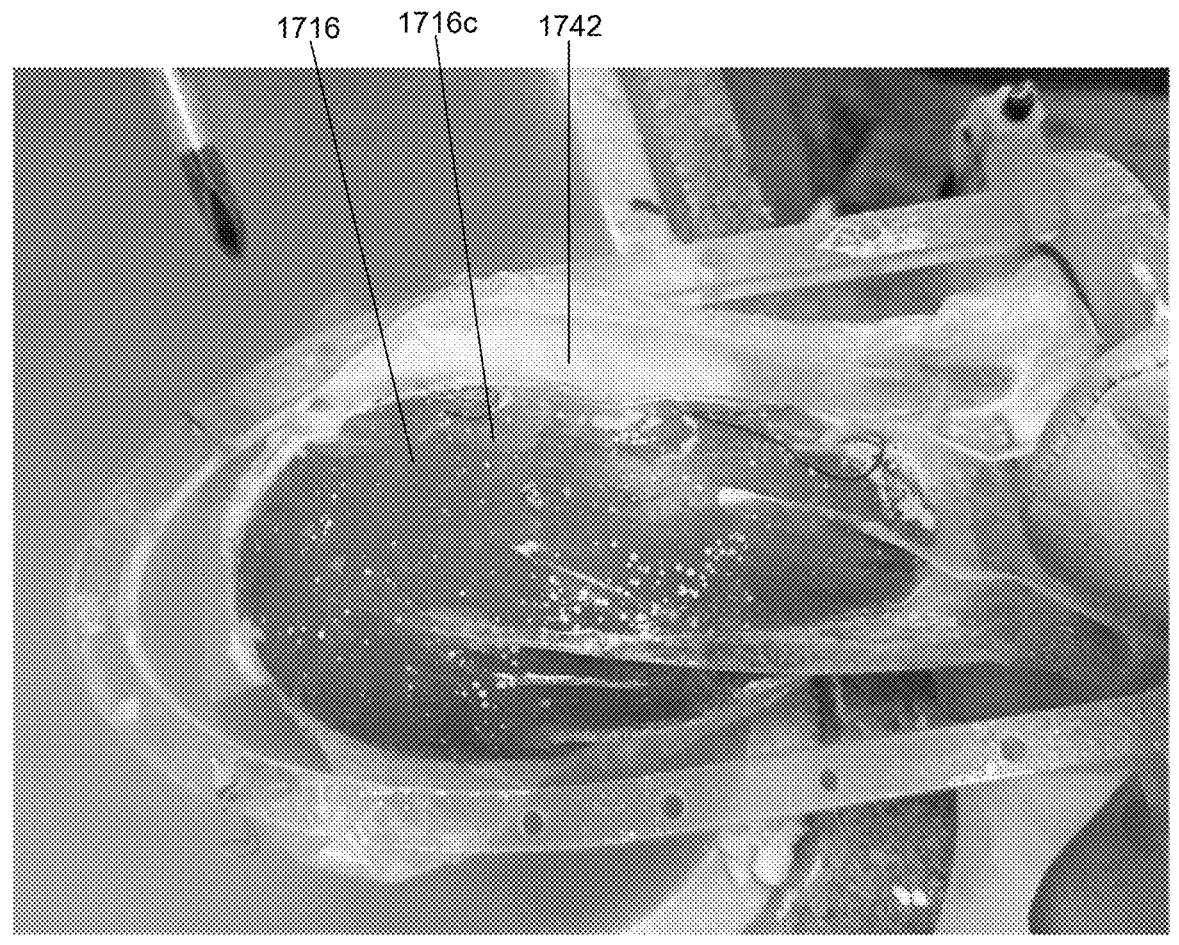
FIG. 17Z5

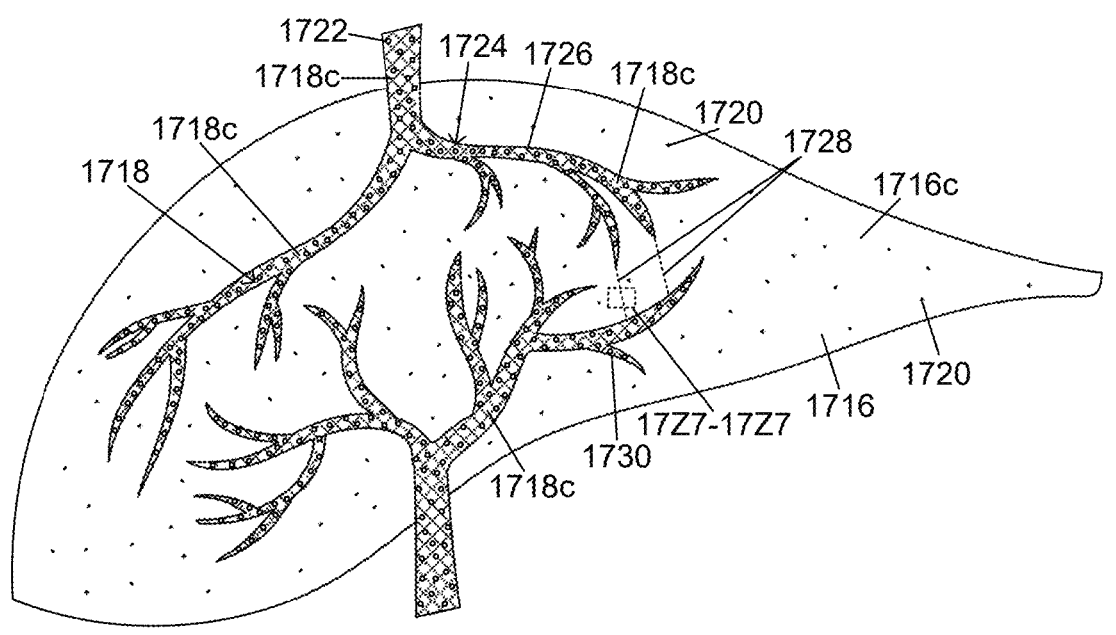
FIG. 17Z6
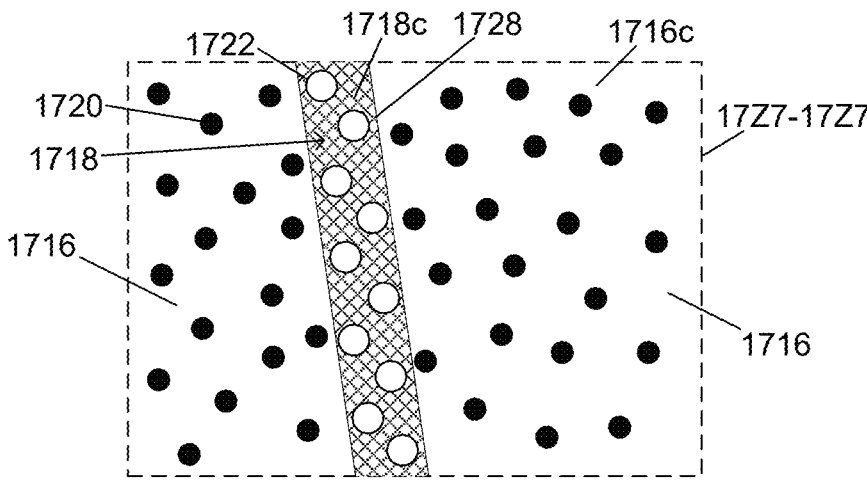
FIG. 17Z7

1716     1716c     1742
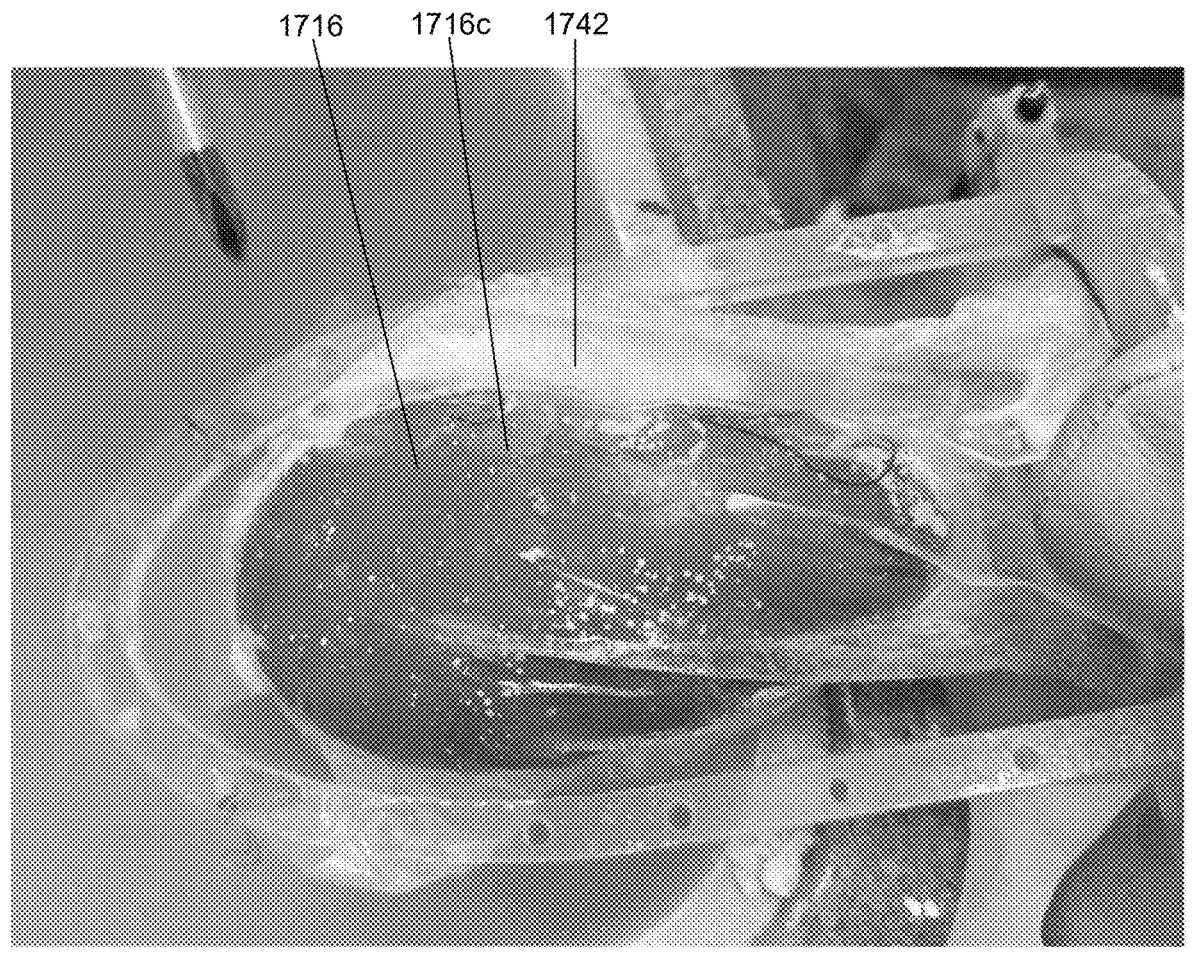
FIG. 17Z8

Ligand Exchange

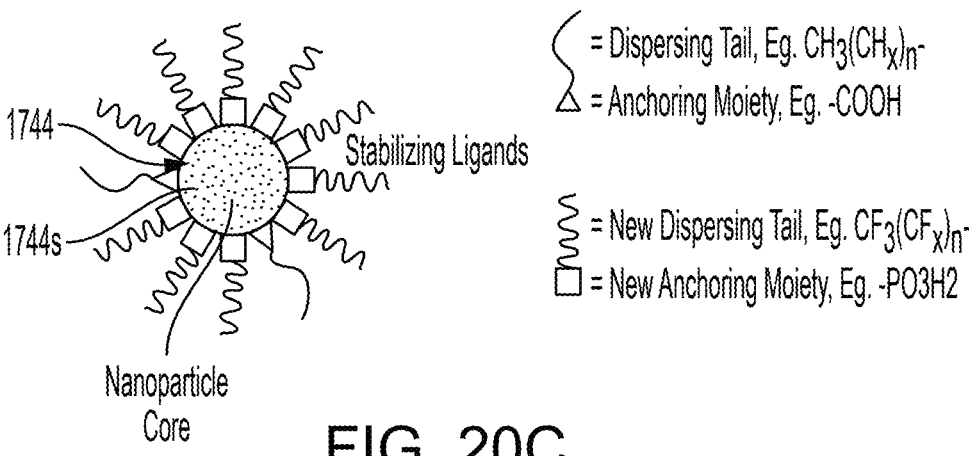

1744

Stabilizing Ligands

1744s

Nanoparticle Core

⎰ = Dispersing Tail, Eg. $CH_3(CH_x)_n$-

△ = Anchoring Moiety, Eg. -COOH

⧘ = New Dispersing Tail, Eg. $CF_3(CF_x)_n$-

☐ = New Anchoring Moiety, Eg. -PO3H2

FIG. 20C

Silica Coating

Silica shell may have perfluoralkyl chains or other chemically modifiable groups on the surface.

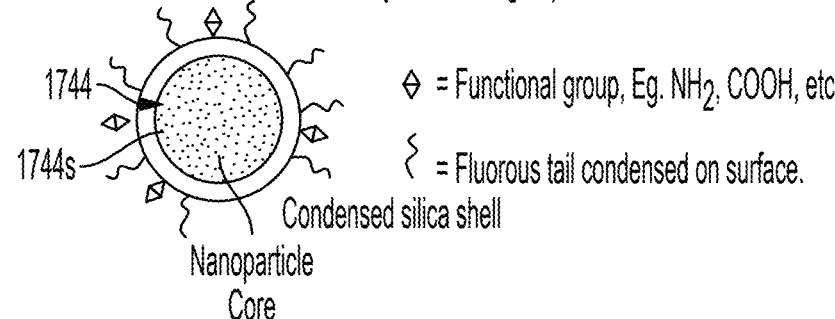

1744

1744s

Condensed silica shell

Nanoparticle Core

◇ = Functional group, Eg. $NH_2$, COOH, etc.

⎰ = Fluorous tail condensed on surface.

FIG. 20D

Intercalation

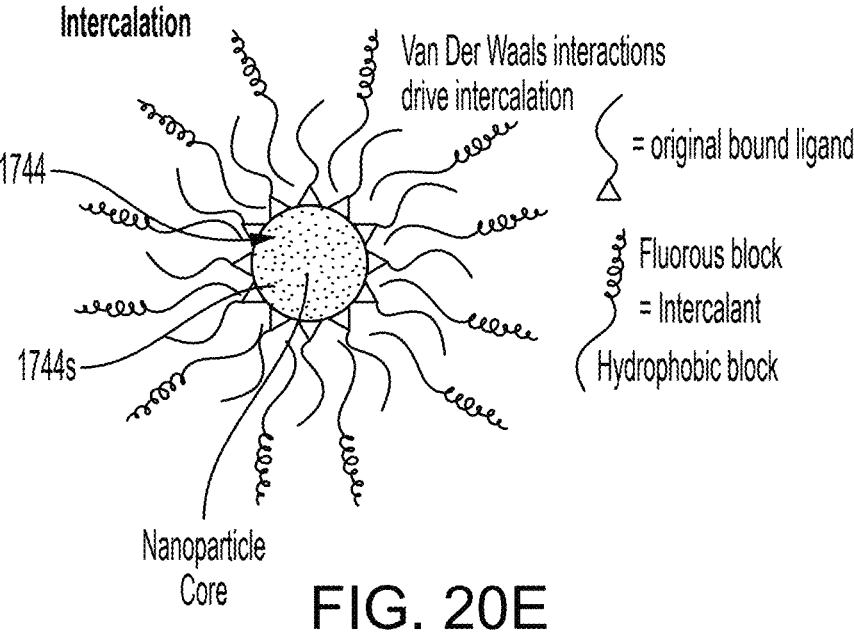

Van Der Waals interactions drive intercalation

1744

1744s

Nanoparticle Core

⎰ = original bound ligand
△

⧘ Fluorous block

⧘ = Intercalant

⎰ Hydrophobic block

FIG. 20E

Direct Modification of Existing Capping Agent/Ligand

Example dynamic light scattering (DLS) plot of ligand exchanged nanoclusters suspended in a fluorous fluid showing the measured intensity weighted average diameter of the sample to be ~170nm.

SYSTEMS AND METHODS FOR REVERSIBLE CRYOPRESERVATION

CROSS-REFERENCE TO RELATED APPLICATIONS

This application is a continuation of International Application No. PCT/US2025/031949 filed Jun. 2, 2025, which claims the benefit of priority to U.S. Provisional Application No. 63/654,824 filed May 31, 2024, the contents of which are incorporated herein by reference in their entireties for all purposes.

BACKGROUND

Cryopreservation involves cooling biological constructs to very low temperatures for long term preservation. One approach to cryopreservation is vitrification, where biological constructs are cooled to cryogenic temperatures without the formation of ice. Ice can damage biological constructs, especially multi-cellular biological constructs, therefore it is advantageous to avoid ice formation during cryopreservation.

Cryopreservation is a critical technology for the long-term storage and preservation of biological materials. However, current methods often result in suboptimal outcomes.

Accordingly, new approaches are needed to preserve multicellular tissue constructs to high levels of viability. High-viability reversible cryopreservation of tissue, especially human tissue, could unlock progress in many areas of biology research. Neuroscience research, for example, may primarily rely on animal models as it is extremely difficult to experiment on fresh, functional human brain tissue, which could be more representative than animal models. The use of human brain tissue for research, enabled by higher viability preservation of that tissue, could significantly accelerate the translation of new findings to clinical applications.

Ovarian tissue can be cryopreserved clinically for prepubescent female patients facing a malignant disease (for example, cancer) whose treatment may compromise the fertility of the tissue. Higher viability of preservation of this tissue could improve clinical outcomes and restore fertility to more patients undergoing this therapy. The same may be done for prepubescent male patients facing a malignant disease, with testicular tissue being cryopreserved for later implantation.

Viable cryopreservation of transplantable organs, difficult or impossible using existing preservation techniques, would allow for better donor organ matching to recipients, stockpiling of organs for patients who need them in the future, and a less expensive organ transplantation process.

Reversible cryopreservation of whole mammals and whole organisms would allow for preservation of sick patients with no current treatment options, but with a cure or treatment for their disease reasonably expected to be available in the future. It may also enable long distance human space flight, with astronauts preserved during long transit times and restored when they have reached their destination.

SUMMARY

A method for performing reversible cryopreservation on a biological specimen is disclosed. The method can include loading a cryoprotective agent into the biological specimen. The method can include (a) loading one or more cryoprotective agents into the biological specimen. The method can include (b) cooling the biological specimen to a cryogenic temperature for preservation. The method can include (c) storing the biological specimen at a preservation temperature state to preserve the biological specimen. The method can include (d) rewarming the biological specimen by increasing a temperature of the biological specimen above the preservation temperature state. The method can include (e) unloading the one or more cryoprotective agents from the biological specimen. The cooling in (b) can be performed (i) at a first rate to reduce ice formation, (ii) substantially homogeneously to reduce propensity for cracking of the preserved biological specimen, and/or (iii) at a first pressure to prevent or reduce ice expansion within the preserved biological specimen. The rewarming in (d) can be performed (i) at a second rate to reduce ice formation, (ii) substantially homogeneously to reduce propensity for cracking, and/or (iii) at a second pressure to prevent or reduce ice expansion.

A method for reversible cryopreservation of a biological specimen is disclosed. The method can include (a) perfusing the a biological specimen with a cryoprotective agent and nanoparticles. The method can include (b) cooling the a biological specimen perfused in (a) using rapid volumetric cooling. The method can include (c) storing the cooled perfused a biological specimen in (b). The method can include (d) rewarming the cooled perfused a biological specimen in (b) or (c) using volumetric warming configured to excite the nanoparticles. The method can include (e) unloading the cryoprotective agent from the rewarmed a biological specimen in (d).

A system for cooling and rewarming a biological specimen is disclosed. The system can have a container. The container can have a port in communication with a reservoir for holding a cryoprotective agent. The container can house a biological specimen. The system can have a pressurization system configured to cool and/or heat the biological specimen under a pressure within the container and to flow the cryoprotective agent into the container to enhance a rate of diffusion or uptake of the cryoprotective agent into the biological specimen. The system can have a thermally conductive holder configured to contact the biological specimen and to induce uniformity of the cooling and/or heating of the biological specimen.

A method of creating a cryoprotective solution is disclosed. The method can include injecting a cryoprotective agent into a carrying fluid, wherein the injection is configured to create a cryoprotective solution.

A method of producing intracellular production of antifreeze proteins is disclosed. The method can include providing an agent configured to produce an antifreeze protein intracellularly.

A method of creating a cryoprotective agent is disclosed. The method can include combining an amount of Ethylene glycol, DMSO, Formamide, Z-1000 (polyglycerol), and LM5. A concentration of polyvinyl alcohol can be less than 0.5% w/v.

A cryoprotective agent is disclosed. The cryoprotective agent can include Ethylene glycol, DMSO, Formamide, Z-1000 (polyglycerol), and LM5. The cryoprotective agent can be devoid of polyvinyl alcohol, or the concentration of polyvinyl alcohol can be less than 0.5% w/v.

A method for performing reversible cryopreservation on a biological specimen is disclosed. The method can include rewarming a biological specimen loaded with a cryoprotective agent by increasing a temperature of the biological specimen above a preservation temperature state at a pressure to prevent or reduce ice expansion. The method can include unloading the cryoprotective agent from the biological specimen.

A method for reversible cryopreservation of a biological specimen is disclosed. The method can include rewarming a cooled and perfused biological specimen comprising a cryoprotective agent and nanoparticles using volumetric warming under a pressure to prevent or reduce ice expansion.

A method for reversible cryopreservation of a biological specimen is disclosed. The method can include (a) perfusing the biological specimen with a solution having cryoprotective agents and nanoparticles. The method can include (b) cooling the biological specimen perfused in (a) using rapid volumetric cooling. The method can include (c) rewarming the cooled perfused biological specimen in (b) or (c) using volumetric warming configured to excite the nanoparticles. The method can include (d) unloading the cryoprotective agent from the rewarmed biological specimen in (c).

A method for performing reversible cryopreservation on a biological specimen is disclosed. The method can include (a) loading a cryoprotective agent into the biological specimen. The method can include (b) cooling the biological specimen to a cryogenic temperature for preservation. The cooling in (b) can be performed (i) at a first rate to reduce ice formation, (ii) substantially homogeneously to reduce propensity for cracking of the preserved biological specimen, and/or (iii) at a pressure to prevent or reduce ice expansion within the preserved biological specimen.

A system for cryopreserving a biological specimen is disclosed. The system can have a perfusive cooling chamber for holding the organ. The system can have one or more pumps configured to perfuse a plurality of fluids and a plurality of magnetic nanoparticles into the perfusive cooling chamber and into the biological specimen. The plurality of fluids can include a cryoprotective fluid having one or more cryoprotective agents. The plurality of fluids can include a first inert fluid. The first inert fluid can have a higher viscosity than the cryoprotective fluid. The plurality of fluids can include a second inert fluid. In a first configuration, the one or more pumps can perfuse the cryoprotective fluid into the perfusive cooling chamber and into the organ. In a second configuration, the one or more pumps can perfuse the first inert fluid into the perfusive cooling chamber and into the organ. In a third configuration, the one or more pumps can perfuse the second inert fluid into the perfusive cooling chamber and into the organ. In a fourth configuration, the one or more pumps can perfuse the second inert fluid and the plurality of magnetic nanoparticles into the perfusive cooling chamber and into the organ.

A method of cryopreserving a biological specimen is disclosed. The method can include perfusing the biological specimen with a cryoprotective fluid having one or more cryoprotective agents. The method can include perfusing the biological specimen with a first inert fluid such that the first inert fluid displaces the cryoprotective fluid within vasculature of the biological specimen. The method can include perfusing the biological specimen with a second inert fluid. The method can include perfusing the biological specimen with the second inert fluid and a plurality of magnetic nanoparticles. The method can include controlling a temperature of the second inert fluid while perfusing the biological specimen with the second inert fluid and the plurality of magnetic nanoparticles to cause the biological specimen to cool from a first temperature to a second temperature.

A system for reheating a cryopreserved biological specimen is disclosed. The system can have a perfusive cooling chamber for holding the biological specimen. The system can have one or more pumps configured to perfuse a plurality of fluids. The plurality of fluids can include a cryoprotective fluid having one or more cryoprotective agents. The plurality of fluids can include an inert fluid. The pumps can perfuse the biological specimen with inert fluid at a rapidly increasing temperature from a first storage temperature to a second temperature.

A method for reheating a cryopreserved biological specimen is disclosed. The method can include perfusing the biological specimen with one or more inert fluids. The method can include controlling a temperature of the inert fluid while perfusing the biological specimen with the inert fluid to cause the biological specimen to warm from a first temperature to a second temperature.

A system for reheating a cryopreserved biological specimen is disclosed. The system can have a plurality of magnetic nanoparticles within the cryopreserved biological specimen. The system can have an alternating magnetic field coil. The alternating magnetic field coil can be configured to apply an alternating magnetic field to the plurality of magnetic nanoparticles to heat the cryopreserved biological specimen from a first temperature to a second temperature.

A method for reheating a cryopreserved biological specimen is disclosed. The method can include positioning the cryopreserved biological specimen within an alternating magnetic field coil. The cryopreserved biological specimen can have a cryoprotective agent and a plurality of magnetic nanoparticles. The method can include applying an alternating magnetic field to the plurality of magnetic nanoparticles using the alternating magnetic field coil to heat the cryopreserved biological specimen from a first temperature to a second temperature.

A method of cryopreserving an biological specimen is disclosed. A system for cryopreserving a biological specimen is disclosed. A method of warming a cryopreserved biological specimen is disclosed. A system for warming a cryopreserved biological specimen is disclosed. The present disclosure further provides a method of using any device or system disclosed herein. The present disclosure further provides a system for performing any method disclosed herein.

In one aspect, the present disclosure provides a method for performing reversible cryopreservation on a biological specimen, the method comprising (a) loading a cryoprotective agent into the biological specimen; (b) cooling the biological specimen to a cryogenic temperature for preservation; (c) storing the biological specimen at a preservation temperature state to preserve the biological specimen; (d) rewarming the biological specimen by increasing a temperature of the biological specimen above the preservation temperature state; and (e) unloading the cryoprotective agent from the biological specimen; wherein the cooling in (b) is performed (i) at a first rate to reduce ice formation, (ii) substantially homogeneously to reduce propensity for cracking of the preserved biological specimen, and/or (iii) at a first pressure to prevent or reduce ice expansion within the preserved biological specimen; wherein the rewarming in (d) is performed (i) at a second rate to reduce ice formation, (ii) substantially homogeneously to reduce propensity for cracking, and/or (iii) at a second pressure to prevent or reduce ice expansion.

In some embodiments, the first pressure is an applied pressure controlled in a range from 0 MPa to 200 MPa. In some embodiments, the second pressure is an applied pressure controlled in a range from 0 MPa to 200 MPa. In some embodiments, the cryogenic temperature is in a range from $-196°$ C. to $-42°$ C. In some embodiments, the cryogenic temperature is less than $-100°$ C. In some embodiments, the first rate is controlled in a range from $1°$ C./min to 1,000, 000° C./min. In some embodiments, the second rate is controlled in a range from 1° C./min to 1,000,000° C./min.

In some embodiments, cooling the biological specimen includes flowing liquid nitrogen or nitrogen gas over the biological specimen. In some embodiments, the cooling includes liquid nitrogen submersion. In some embodiments, the cooling includes perfusive cooling. In some embodiments, the cooling includes cooling the biological specimen from within itself. In some embodiments, the cooling includes exposure to liquid nitrogen vapor.

In some embodiments, the rewarming is done using magnetic fields delivered from an induction heater coil. In some embodiments, the biological specimen is positioned within a coil of an induction heater.

In some embodiments, the cryoprotective agent is substantially devoid of Polyvinyl alcohol. In some embodiments, the cryoprotective agent has an ice-inhibiting mechanism of action. In some embodiments, the cryoprotective agent has a biochemical mechanism of action. In some embodiments, the cryoprotective agent is baroprotective. In some embodiments, loading a cryoprotective agent into the biological specimen includes loading an inert fluid configured to fill biological cavities of the biological specimen during high-pressure cryopreservation. In some embodiments, the cryoprotective agent is VPM. In some embodiments, the cryoprotective agent includes antifreeze proteins. In some embodiments, the antifreeze proteins are produced intracellularly by the biological specimen to be cryopreserved. In some embodiments, the antifreeze proteins are produced intracellularly via viral infection, transient transfection, or common gene editing techniques. In some embodiments, the cryoprotective agent includes baroprotectant molecules to mitigate the effects of high-pressure on the biological system.

In some embodiments, the method further comprises, during rewarming, applying a high-pressure to suppress ice formation. In some embodiments, the method further comprises, after unloading of cryoprotective agents from the biological specimen is complete, incubating the biological specimen in a recovery solution at 32-36° C. for 15 or more minutes and incubating in a recovery solution around room temperature for 10 or more minutes. In some embodiments, the recovery solution is artificial cerebrospinal fluid.

In some embodiments, the biological specimen is held within a pressure chamber, and wherein cooling the biological specimen includes flowing liquid nitrogen or liquid nitrogen vapor over the pressure chamber or inside the pressure chamber. In some embodiments, at least one of the first rate or the second rate is linear. In some embodiments, at least one of the first rate or the second rate is nonlinear. In some embodiments, at least one of the first pressure or second pressure is linear. In some embodiments, at least one of the first pressure or second pressure is nonlinear.

In another aspect, the present disclosure provides a method for reversible cryopreservation of a whole organ or organism, the method comprising: (a) perfusing the whole organ or organism with a cryoprotective agent and nanoparticles; (b) cooling the whole organ or organism perfused in (a) using rapid volumetric cooling; (c) storing the cooled perfused whole organ in (b); (d) rewarming the cooled perfused whole organ in (b) or (c) using volumetric warming configured to excite the nanoparticles; and (e) unloading the cryoprotective agent from the rewarmed whole organ in (d).

In some embodiments, the volumetric warming is at least one of an alternating magnetic field, a perfusive warming, microwave warming, or ultrasonic warming. In some embodiments, the cryoprotective agent includes magnetic nanoparticles. In some embodiments, the whole organ includes a whole isolated organ, a system of several organs, or a whole organism, such as a human. In some embodiments, the volumetric cooling includes perfusing a cooled inert fluid. In some embodiments, the volumetric warming includes perfusing inert fluid at a temperature greater than a temperature of the whole organ.

In another aspect, the present disclosure provide, a system for cooling and rewarming a biological specimen, the system comprising: a container including a port in communication with a reservoir for holding a cryoprotective agent, the container configured to house a biological specimen; a pressurization system configured to cool and/or heat the biological specimen under a pressure within the container and to flow the cryoprotective agent into the container to enhance a rate of diffusion or uptake of the cryoprotective agent into the biological specimen; and a thermally conductive holder configured to contact the biological specimen and to induce uniformity of the cooling and/or heating of the biological specimen.

In some embodiments, the pressurization system promotes diffusive superfusion to uptake the cryoprotective agent into the biological specimen. In some embodiments, the pressure is controlled in the range of 0 to 200 MPa. In some embodiments, the pressure regulation is controlled using a screw and valve based pressure regulation system. In some embodiments, the pressure regulation is controlled using a hydraulic pump system. In some embodiments, the pressure regulation is configured to maintain arterial pressure within biological limits to avoid damaging vascular paths of the biological specimen.

In some embodiments, the thermally conductive holder is made from a smooth, thermally conductive material. In some embodiments, the thermally conductive holder is made from at least one of sapphire, boron nitride, aluminum nitride, or diamond. In some embodiments, the thermally conductive holder includes a thermally conductive wafer configured to induce uniform cooling and heating of the biological specimen. In some embodiments, the thermally conductive holder is made from an electrically insulative material. In some embodiments, the thermally conductive holder includes a removable top to facilitate transition of the biological specimen between at least one of loading, unloading, vitrification, storage, or rewarming. In some embodiments, the thermally conductive holder is ferromagnetic and is excitable when exposed to an alternating magnetic field.

In some embodiments, the container is configured to self-seal or includes attachments to allow for a seal, so that the biological specimen can be pressurized when cooling and rewarming at high pressures. In some embodiments, the container has a portion of its shape like the biological specimen. In some embodiments, the container is configured to be housed within a magnetic field coil.

In some embodiments, the system further comprises a ferromagnetic shim bound to the holder. In some embodiments, the holder and the ferromagnetic shim are bound by an adhesive resistant to thermal shock.

In some embodiments, the system further comprises a transport assembly configured to move the thermally conductive holder into and out of the container to facilitate transition of the biological specimen between at least one of loading, unloading, vitrification, storage, or rewarming.

In some embodiments, the pressurization system is configured to receive pressure information from one or more sensors and to adjust at least one of a pressure or temperature according to a preservation profile. In some embodiments, the preservation profile includes a targeted temperature and a targeted pressure over a period of time. In some embodiments, the preservation profile synchronizes the targeted temperature and the targeted pressure to minimize ice formation within the biological specimen.

In another aspect, the present disclosure provides a method of creating a cryoprotective solution, the method comprising: injecting a cryoprotective agent into a carrying fluid, wherein the injection is configured to create a cryoprotective solution. In some embodiments, the carrying fluid is an inert compound. In some embodiments, the carrying fluid is a perfluorocycloether. In some embodiments, the perfluorocycloether is a Fluorinert Electronic Liquid. In some embodiments, the cryoprotective solution is configured to vitrify at temperatures approaching glass transition points of tissue and at temperatures lower than the cryoprotective agent's melting point. In some embodiments, the cryoprotective agent is at least one of VMP or VM3. In some embodiments, the cryoprotective agent has a melting point of −110 C. In some embodiments, the cryoprotective solution includes emulsions of the cryoprotective agent. In some embodiments, the cryoprotective solution includes a mixing of the cryoprotective agent and carrying fluid.

In another aspect, the present disclosure provides a method of producing intracellular production of antifreeze proteins, the method comprising: providing an agent configured to produce an antifreeze protein intracellularly. In some embodiments, the antifreeze proteins are produced intracellularly via transient transfection. In some embodiments, the antifreeze proteins are produced intracellularly via gene editing. In some embodiments, the antifreeze proteins are produced intracellularly via a viral infection.

In another aspect, the present disclosure provides a method comprising: combining an amount of Ethylene glycol, DMSO, Formamide, Z-1000 (polyglycerol) and LM5; and wherein a concentration of polyvinyl alcohol is less than 0.5% w/v.

In another aspect, the present disclosure provides a cryoprotective agent, the agent comprising: Ethylene glycol, DMSO, Formamide, Z-1000 (polyglycerol) and LM5; and wherein the cryoprotective agent is devoid of polyvinyl alcohol or wherein the concentration of polyvinyl alcohol is less than 0.5% w/v.

In another aspect, the present disclosure provides a method for performing reversible cryopreservation on a biological specimen, the method comprising: rewarming a biological specimen loaded with a cryoprotective agent by increasing a temperature of the biological specimen above a preservation temperature state at a pressure to prevent or reduce ice expansion; and unloading the cryoprotective agent from the biological specimen. In some embodiments, rewarming the biological specimen includes exposing the biological specimen to a warmed inert fluid. In some embodiments, increasing a temperature of the biological specimen includes volumetric heating.

In another aspect, the present disclosure provides a method for reversible cryopreservation of a whole organ or organism, the method comprising: rewarming a cooled and perfused whole organ including a cryoprotective agent and nanoparticles using volumetric warming under a pressure to prevent or reduce ice expansion.

In another aspect, the present disclosure provides a method for reversible cryopreservation of a whole organ or organism, the method comprising: (a) perfusing the whole organ or organism with a solution comprising cryoprotective agents and nanoparticles; (b) cooling the whole organ or organism perfused in (a) using rapid volumetric cooling; (c) rewarming the cooled perfused whole organ in (b) or (c)

using volumetric warming configured to excite the nanoparticles; and (d) unloading the cryoprotective agent from the rewarmed whole organ in (c). In some embodiments, the nanoparticles are configured to enhance heat transfer into the whole organ. In some embodiments, the method further comprises steering the nanoparticles into dense tissue.

In another aspect, the present disclosure provides a method for performing reversible cryopreservation on a biological specimen, the method comprising: (a) loading a cryoprotective agent into the biological specimen; (b) cooling the biological specimen to a cryogenic temperature for preservation; wherein the cooling in (b) is performed (i) at a first rate to reduce ice formation, (ii) substantially homogeneously to reduce propensity for cracking of the preserved biological specimen, and/or (iii) at a pressure to prevent or reduce ice expansion within the preserved biological specimen. In some embodiments, loading a cryoprotective agent into the biological specimen includes loading an inert fluid configured to fill biological cavities of the biological specimen during high-pressure cryopreservation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The drawings shown and described are exemplary variations and non-limiting. Like reference numerals indicate identical or functionally equivalent features throughout.

FIGS. 8A-8C illustrate tissue holding assemblies in accordance with some embodiments described herein.

FIG. 17A illustrates a variation of a method for cryopreserving an organ.

FIG. 17Z1 illustrates a variation of perfusing a second fluid and magnetic nanoparticles in the vasculature of the organ of FIG. 17B.

FIG. 17Z2 illustrates a close-up view of the section 17Z2-17Z2 of FIG. 17Z1.

FIG. 17Z3 illustrates a variation of perfusing a second fluid and magnetic nanoparticles in the vasculature of the organ of FIG. 17B.

FIG. 17Z4 illustrates a close-up view of the section 17Z4-17Z4 of FIG. 17Z3.

FIG. 17Z5 illustrates a variation of an organ in a vitrified state.

FIG. 17Z6 illustrates a variation of perfusing a second fluid and magnetic nanoparticles in the vasculature of the organ of FIG. 17B.

FIG. 17Z7 illustrates a close-up view of the section 17Z7-17Z7 of FIG. 17Z6.

FIG. 17Z8 illustrates a variation of an organ in a vitrified state.

FIG. 20C illustrates a variation of ligand exchange.

FIG. 20D illustrates a variation of silica coating.

FIG. 20E illustrates a variation of intercalation.

DETAILED DESCRIPTION

Figure 1:
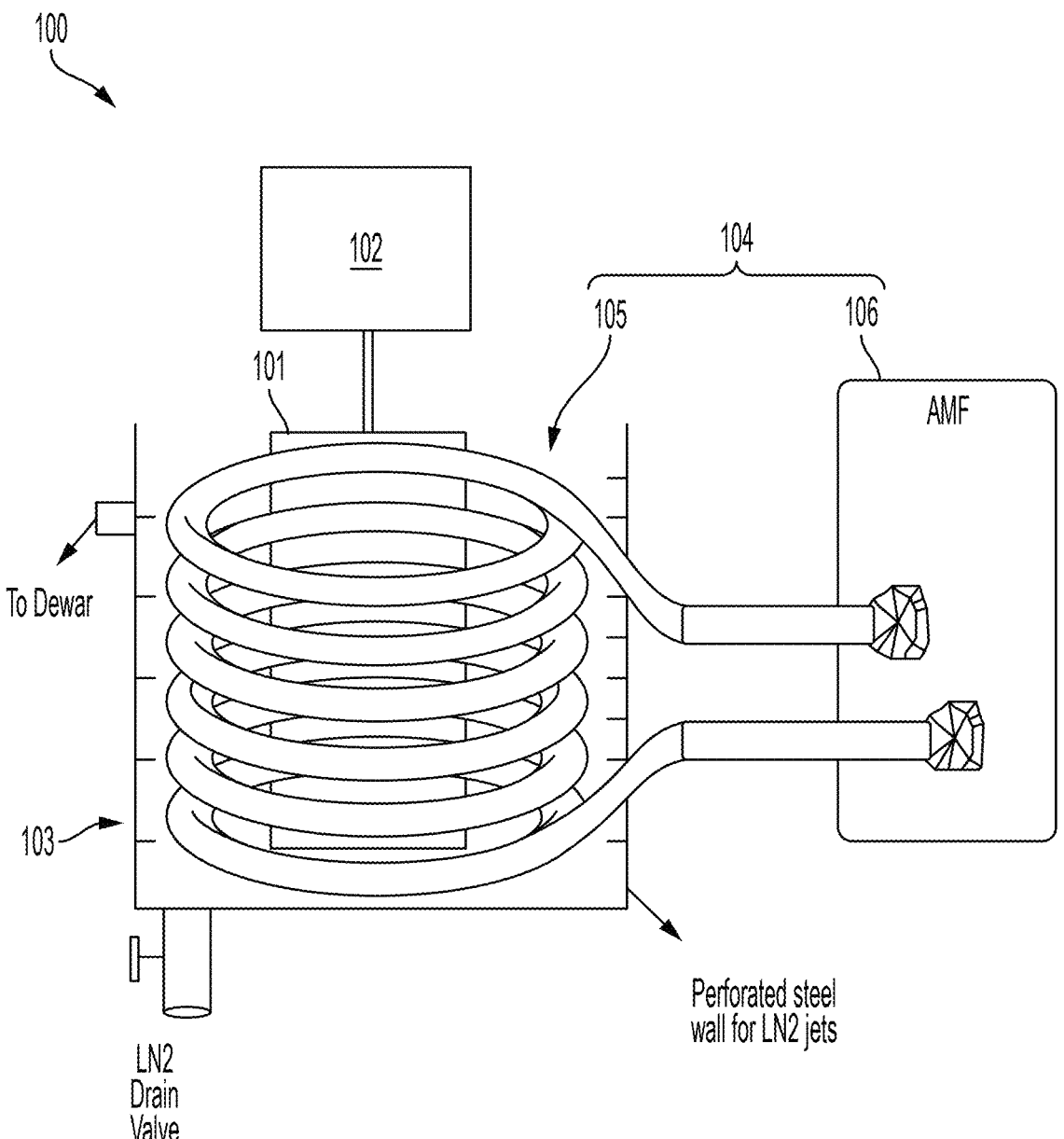
FIG. 1 illustrates a system for reversible cryopreservation in accordance with some embodiments described herein.

The features in FIGS. 1-26 and/or the features described herein can be combined with each other in any combination.

While various embodiments have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments described herein may be employed.

Whenever the term "at least," "greater than," or "greater than or equal to" precedes the first numerical value in a series of two or more numerical values, the term "at least" or "greater than" applies to each one of the numerical values in that series of numerical values.

Whenever the term "no more than," "less than," or "less than or equal to" precedes the first numerical value in a series of two or more numerical values, the term "no more than" or "less than" applies to each one of the numerical values in that series of numerical values.

The term "about" or "nearly" as used herein generally refers to within (plus or minus) 15%, 10%, 9%, 8%, 7%, 6%, 5%, 4%, 3%, 2%, or 1% of a designated value.

As used herein, the singular forms "a", "an", and "the" include plural references unless the context clearly dictates otherwise.

Definitions

The term "biological specimen," as used herein, may refer to a cell, a group of cells, a tissue, an organ, a portion of an organ, a system of organs, or an organism. In some instances, a biological specimen may be a tissue, such as an intact piece of tissue or a dissociated tissue. In some instances, a biological specimen may be a whole organ or part of an organ. For example, the biological specimen may be a whole or part any organ, such as, for example, brain, liver, lung, kidney, intestine, heart, pancreas, ovaries, testes, umbilical cord, placenta, thymus, eyes, adrenal gland, arteries, veins, lymph nodes, bone or skeletal muscle, or a similar organ or tissue. The biological specimen may be any tissue type comprising any kind of cell type such as from one of the above-mentioned organs and combinations thereof, including, for example, brain tissue, ovarian tissue, testicular tissue, umbilical cord tissue, placental tissue, connective tissue, cardiac tissue, tissues from muscle, cartilage and bone, endocrine tissue, adipose tissue, dental pulp tissue, and neural tissue. In some instances, the biological specimen is sperm or egg cells. In some instances, the biological specimen is an embryo. In some instances, the biological specimen is human. In some instances, the biological specimen is non-human.

Reversible Cryopreservation

The cryopreservation can be reversible cryopreservation. The cryoprotective agent(s) can be loaded into a biological specimen. The method can comprise cooling the biological specimen to low temperatures. the biological specimen can be cooled to a temperature of less than or equal to about −210° C., about −200° C., about −190° C., about −180° C., about −170° C., about −160° C., about −150° C., about −140° C., about −130° C., about −120° C., about −110° C., or about −100° C. The biological specimen can be cooled to a temperature of about −196° C. The biological specimen can be cooled to a temperature of about −130° C. The biological specimen can be cooled to a temperature of about −210° C. to about −100° C. The biological specimen can be cooled to a temperature of about −196° C. to about −130° C. The method can include storing the biological specimen in a low temperature state of preservation. The method can include rewarming the biological specimen to return the specimen from a state of preservation. The method can include unloading the cryoprotective agent from the biological specimen.

In some variations, the method of cooling the biological specimen solidifies the biological specimen for long term preservation. The method can comprise cooling the biological specimen rapidly. A cooling rate can be greater than or equal to about 1° C./min, about 2° C./min, about 3° C./min, about 4° C./min, about 5° C./min, about 6° C./min, about 8° C./min, about 10° C./min, about 12° C./min, about 15° C./min, about 18° C./min, about 20° C./min, about 30° C./min, about 40° C./min, about 50° C./min, about 60° C./min, about 70° C./min, about 80° C./min, about 100° C./min, about 120° C./min, about 140° C./min, about 160° C./min, about 180° C./min, about 200° C./min, about 250° C./min, about 300° C./min, about 350° C./min, about 400° C./min, about 500° C./min, about 600° C./min, about 800° C./min, about 1000° C./min, or more. The cooling rate can be between about 1° C./min to about 10° C./min, about 10° C./min to about 50° C./min, about 50° C./min to about 100° C./min, about 100° C./min to about 200° C./min, about 200° C./min to about 500° C./min, about 500° C./min to about 1000° C./min, or about 10° C./min to about 1000° C./min. The rapid cooling may reduce ice formation. The method can comprise cooling the biological specimen substantially homogeneously. The substantially homogeneous cooling may reduce propensity for cracking.

In some variations, a cooling profile is used. The cooling profile may be a linear profile including one cooling rate throughout the cooling process. The cooling profile can comprise two or more sections with different cooling rates. The two or more sections may be linear or nonlinear. For example, a first section may have a fast cooling rate down to about +/−10° C. from a CPA glass transition temperature according to the above rates, which may thereby prevent ice formation. A second section may cool the biological specimen at a slower rate (e.g., about 5° C./min to about 100° C./min) until reaching the endpoint preservation temperature. Additionally, the cooling profile may comprise a section where the temperature is maintained for a duration of time. The temperature that is maintained may be about +/−10° C. from the CPA glass transition temperature. The duration of time that the temperature is maintained may be about 30 seconds to 30 minutes, may depend on the volume of the biological specimen, and may be further specified by thermal diffusion modeling. It may be advantageous to hold the biological specimen at approximately the glass transition temperature and/or to cool the biological specimen slowly after surpassing the glass transition temperature to minimize the thermal gradients imposed on the biological specimen in the glass state.

In some variations, the method can comprise rewarming the biological specimen rapidly. The rewarming rate can be greater than or equal to about 1° C./min, about 2° C./min, about 3° C./min, about 4° C./min, about 5° C./min, about 6° C./min, about 8° C./min, about 10° C./min, about 12° C./min, about 15° C./min, about 18° C./min, about 20° C./min, about 30° C./min, about 40° C./min, about 50° C./min, about 60° C./min, about 80° C./min, about 100° C./min, about 120° C./min, about 150° C./min, about 200° C./min, about 500° C./min, or more. The rewarming rate can be about 1° C./min to about 20° C./min, about 20° C./min to about 50° C./min, about 50° C./min to about 100° C./min, about 100° C./min to about 150° C./min, about 150° C./min to about 200° C./min, or about 20° C./min to about 500° C./min. The rewarming rate can be about 100° C./min. The rapid rewarming may reduce ice formation. The method can comprise rewarming the biological specimen substantially homogeneously. The substantially homogeneous rewarming may reduce propensity for cracking.

Ice nuclei may form during cooling and warming; however, ice extension may be fastest during warming. In some variations, the rewarming rate may be based on the cooling rate when the biological specimen was cooled. For example, the rewarming rate may be faster than the cooling rate. In some variations, a faster warming rate may be favorable to avoid ice expansion at higher temperatures (e.g., ice that may have been nucleated during cooling).

In some variations, a warming profile is used. The warming profile may be a linear profile that uses one warming rate throughout the warming process. The warming profile may comprise two or more sections with different warming rates. The two or more sections may be linear or nonlinear. For example, a first section may have a slow warming rate up to about +/−10° C. from the CPA glass transition temperature (e.g., about 5° C./min to about 100° C./min), which may prevent ice formation and/or expansion. A second section may warm the biological specimen at a faster rate until reaching the endpoint temperature. Additionally, the warming profile may comprise a section where the temperature is maintained for a duration of time. The temperature that is maintained may be about +/−10° C. from the CPA glass transition temperature. The duration of time that the temperature is maintained may be about 30 seconds to 30 minutes, may depend on the volume of the biological specimen, and may be further specified by thermal diffusion modeling. It may be advantageous to hold the biological specimen at approximately the glass transition temperature and/or to warm the biological specimen slowly before surpassing the glass transition temperature to minimize the thermal gradients imposed on the biological specimen in the glass state.

In some variations, the biological specimen can be restored to a state of viability after undergoing cryopreservation. The state of viability after undergoing cryopreservation may be similar to the initial state before preservation. The state of viability after undergoing cryopreservation may be the same as the initial state before preservation. The biological specimen may be used for clinical, research, or similar applications after undergoing cryopreservation.

The various methods disclosed herein may be modified, adapted, or used in different combinations depending on the type of biological specimen being preserved. In one aspect, the present disclosure provides systems configured to perform the methods as disclosed herein.

Reversible Cryopreservation Using Elevated Pressure

In one aspect, the present disclosure provides reversible cryopreservation methods using elevated pressure. The method can include cooling and/or rewarming the biological specimen at elevated pressure. Subjecting a sample to high pressure may suppress the rate of ice formation and may also depress freezing point, enabling a vitrification process where water in biological specimens may transition to a glass-like state with little to no crystallization, significantly mitigating damage to the biological specimen. Pressure may be used to reduce crystallization across biological specimens of varying length-scales including cells, groups of cells, tissue, organs, and organisms. In an example, high-pressure can be any applied (e.g., any pressure greater than 0.1 MPa) to the biological specimen.

In some variation, the method includes cooling the biological specimen at elevated pressure. The elevated pressure may reduce ice expansion. the elevated pressure may be greater than or equal to about 1 MPa, about 2 MPa, about 3 MPa, about 4 MPa, about 5 MPa, about 6 MPa, about 8 MPa, about 10 MPa, about 12 MPa, about 15 MPa, about 20 MPa, about 25 MPa, about 30 MPa, about 40 MPa, about 50 MPa, about 60 MPa, about 80 MPa, about 100 MPa, or more. the elevated pressure may be about 1 MPa to about 10 MPa, about 10 MPa to about 20 MPa, about 20 MPa to about 40 MPa, about 40 MPa to about 60 MPa, about 60 MPa to about 80 MPa, about 80 MPa to about 100 MPa, or about 1 MPa to about 100 MPa.

In some variations, a pressure profile is used during the cooling process. The pressure profile may be a linear profile that uses one pressure throughout the cooling process. The pressure profile may include two or more sections with different pressures. For example, a first section may have one pressure to about +/−10° C. from the CPA glass transition temperature. A second section may have a lower pressure than the first section. Alternatively, a second section may have a higher pressure than the first section. It may be beneficial to vary the pressure through the cooling process to prevent ice formation and/or expansion. The changes in pressure may correspond to changes in cooling rate. The changes in pressure may be sudden or may be a linear or nonlinear ramp between pressures.

In some variations, the method includes rewarming the biological specimen at elevated pressure. The elevated pressure may reduce ice expansion. The elevated pressure may be greater than or equal to about 1 MPa, about 2 MPa, about 3 MPa, about 4 MPa, about 5 MPa, about 6 MPa, about 8 MPa, about 10 MPa, about 12 MPa, about 15 MPa, about 20 MPa, about 25 MPa, about 30 MPa, about 40 MPa, about 50 MPa, about 60 MPa, about 80 MPa, about 100 MPa, or more. The elevated pressure may be about 1 MPa to about 10 MPa, about 10 MPa to about 20 MPa, about 20 MPa to about 40 MPa, about 40 MPa to about 60 MPa, about 60 MPa to about 80 MPa, about 80 MPa to about 100 MPa, or about 1 MPa to about 60 MPa.

In some variations, a pressure profile is used during the warming process. The pressure profile may be a linear profile that uses one pressure throughout the warming process. The pressure profile may comprise two or more sections with different pressures. For example, a first section may have one pressure until the temperature reaches about +/−10° C. from the CPA glass transition temperature. A second section may have a lower pressure than the first section. Alternatively, a second section may have a higher pressure than the first section. It may be beneficial to vary the pressure through the warming process to prevent ice formation and/or expansion. The changes in pressure may correspond to changes in warming rate. The changes in pressure may be sudden or may be a linear or nonlinear ramp between temperatures.

High pressure can be used in isolation or in combination with the other approaches described herein, including CPAs and thermal systems. Cooling and warming may be done at elevated or modulated pressure to prevent ice formation in biological specimens. Control of pressure, especially controlling pressures to be higher than atmospheric pressure, may enable viable vitrification at lower cooling rates and lower concentrations of cryoprotectants, reducing cracking risk and the toxicity associated with CPAs. Phase transition temperatures, like freezing points, may also be modified based on higher pressure levels, which may be advantageous in allowing less ice to form during the preservation process. Pressure may be applied during either the cooling and warming phases of cryopreservation, during both, or during neither.

Molecular baroprotectants may be used to protect biological specimens from exposure to high pressure. For example, sugars, polyols, glycerol, Trimethylamine-N-oxide, nitric oxide and other compounds shown to confer baroprotection may be used. Some cryoprotective agents may also function as baroprotectants. Baroprotectants may be loaded and unloaded from a biological specimen in the same or similar ways as cryoprotective agents are loaded into biological specimens and may make use of the same or similar loading and unloading systems. Different protocols specific to baroprotectants may also be employed for loading these into biological specimens. Baroprotectants may be used in isolation or may be mixed with the cryoprotective agents during loading and unloading.

For biological specimens that have cavities, like some organs and whole organisms, these biological cavities may be filled with fluids. The fluids may be inert fluids that are largely bioinert and incompressible. In an aspect, inert fluids may be used to fill air cavities in organs or organisms to protect these cavities when bringing these biological specimens to elevated pressure. Additionally or alternatively, inert fluids may be perfused through the vasculature. In an aspect, flowing an inert fluid through the biological specimen allows for volumetric cooling or warming of the specimen. Further, biological specimens may be immersed in inert fluids where surface and osmotic pressures allow for enhanced cooling and heating. Examples of inert fluids include perfluorocarbons, perfluoroethers, partially fluorinated ethers, perfluoropolyethers, partially fluorinated polyethers, and engineered fluids (e.g. ethyl perfluorobutyl ether).

For example, perfluorocarbons are one class of fluids that are largely bioinert and incompressible and may be used during high-pressure cryopreservation. Perfluorocarbons also have the ability to dissolve significant quantities of gas, including oxygen and carbon dioxide. Perfluorocarbons with dissolved gas may be used to supply oxygen to the biological specimen in the filled cavities. This cavity filling may serve to reduce damage that would otherwise have occurred if the cavities would have collapsed at the elevated pressure level. Examples of perfluorocarbons include perfluoropentane and perfluoropropane.

Figure 2:
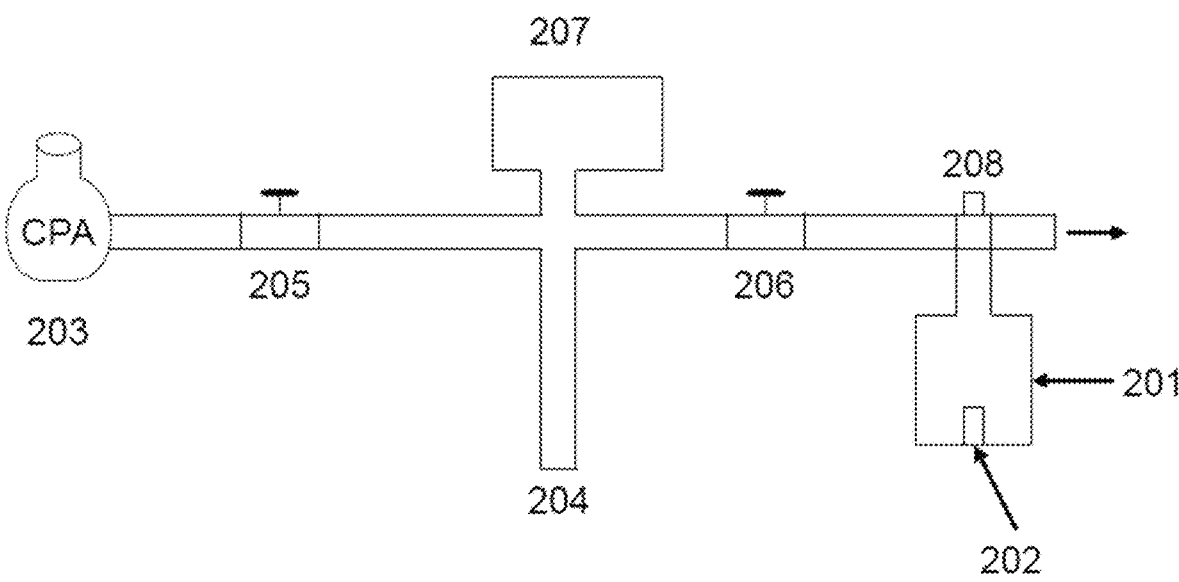
FIG. 2 illustrates a pressurization component of a system for reversible cryopreservation in accordance with some embodiments described herein.

The present disclosure provides systems configured to perform the cryopreservation methods disclosed herein. The system can be configured to perform the cryopreservation methods or a portion of the cryopreservation methods at elevated pressure (e.g., as shown in FIGS. 1 and 2). The system can comprise components for loading the biological specimen, cooling the biological specimen, maintaining the biological specimen in a preserved state, rewarming the biological specimen, and unloading the biological specimen. The components of the system may be designed to work at elevated pressure in order to facilitate high-pressure cryopreservation. The system can include a pressurization component for creating pressure within a pressure chamber.

The system may work at normothermic or cryogenic temperatures, and pressure may be maintained or modulated during the cooling, maintaining, or heating of biological specimens. The biological specimen can be loaded into a pressure chamber for cryopreservation. Cooling may comprise flowing liquid nitrogen (LN2) or nitrogen gas over a pressure chamber or inside a pressure chamber or pressure chamber. Cooling may be done internally, externally, or both externally and internally via liquid nitrogen submersion, exposure to liquid nitrogen vapor, perfusive cooling, or by any other cooling method. Warming may be done internally, externally, or both externally and internally. The chamber may be warmed by nanowarming, magnetic induction heating, perfusive warming, resistive heating, placing the pressure chamber in a warm bath, or by any other warming method. In some variations, cryoprotectants may be introduced inside of the pressure chamber when conducting high-pressure cryopreservation.

Figure 3:
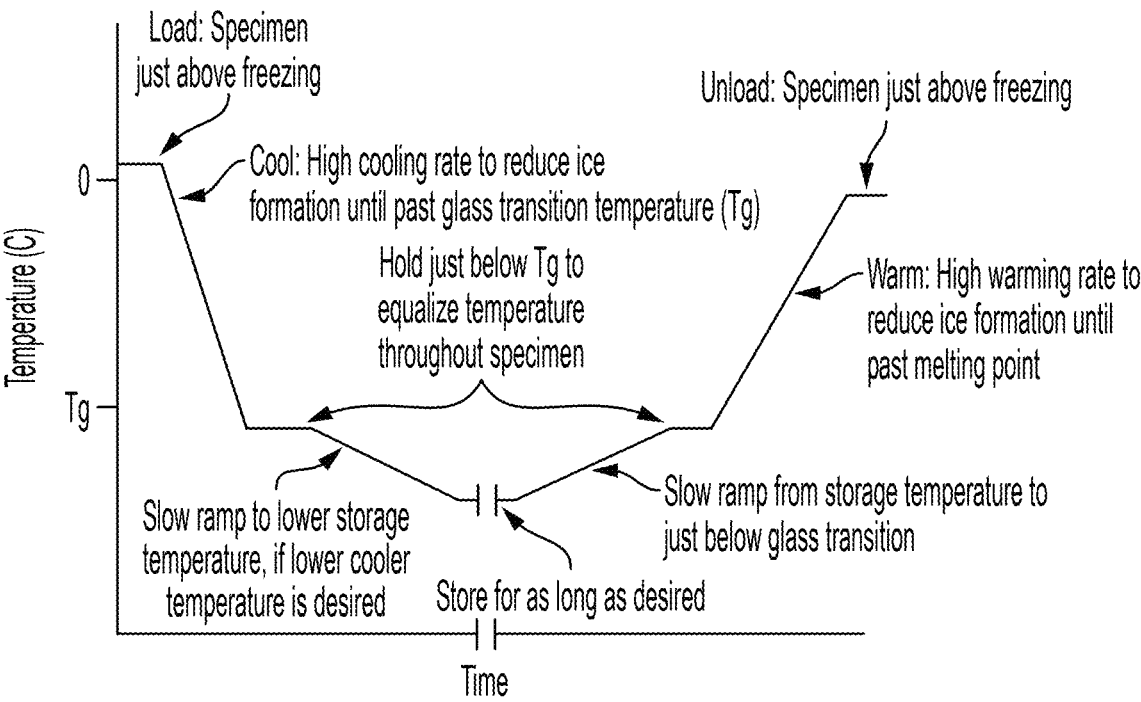
FIG. 3 illustrates a representative temperature and pressure curve during a high-pressure vitrification as described herein.
Figure 3:
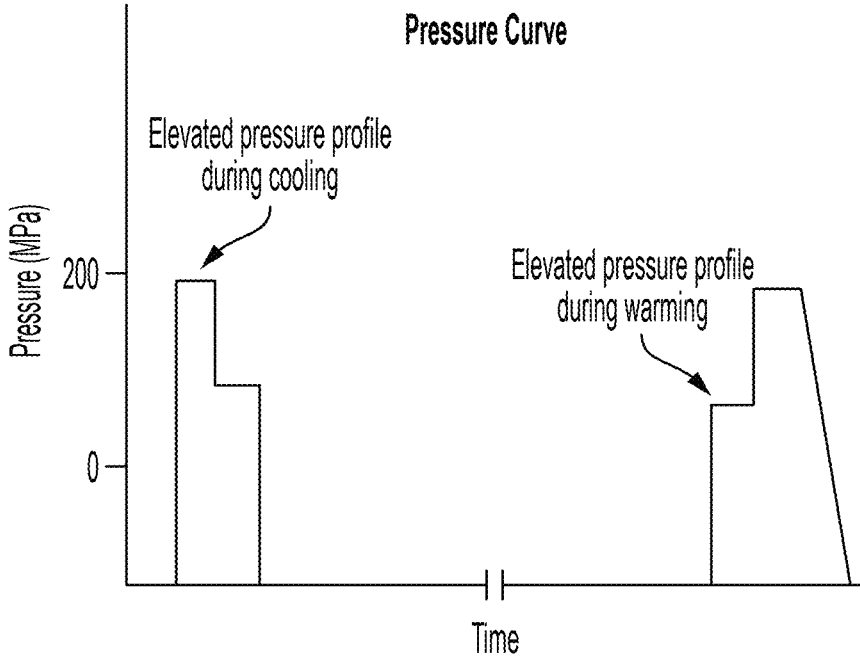

Control of pressure (e.g., ramp speed and holding pressures) may be integrated into the system (e.g., as shown in FIG. 3). The system may have pressure sensors to allow a human or computer-based feedback control system to monitor the pressure and make adjustments in line with the desired pressure profile. Pressure profiles may be different for different specimen types and sizes, but may include up-ramping pressure regions, sustaining pressure regions, and down-ramping pressure regions. The pressure may be monitored using a pressure sensor to ensure the biological specimen is at the desired pressure level during the preservation procedure. Temperature may also be monitored using a temperature sensor (e.g., thermocouple, thermistor, optical probe) in order to ensure the biological specimen is at the desired temperature during the preservation procedure. Temperature and pressure profiles may be input by a user and carried out by a computer-based feedback control system to vitrify a biological specimen. Pressure may be stepped to avoid different phases of ice. In an aspect, temperature may be a piecewise ramp with a slower rate below the glass transition Tg.

Pressure can be generated using a valve and screw-based pressure generator. The screw may be rotated to raise pressure in a pressure chamber while a valve is open. After the pressure is raised, the valve may be closed to maintain the pressure of the chamber. The pressure may be generated using a hydraulic pump. The benefits of a hydraulic pump may include dynamic control of pressure, which may be beneficial given that high pressure phases of ice may form below −90° C. at high pressure. The pressure chamber can be simultaneously pressurized and cooled using a high-pressure inlet of liquid nitrogen into the chamber. The pressure chamber may be pressurized using a hydraulic intensifier.

Reversible Cryopreservation of Tissue Samples

The present disclosure provides systems and methods for reversible cryopreservation of biological specimen, such as tissue samples. Tissue samples may be thin pieces of brain tissue, thin pieces of ovarian tissue, or thin pieces of gonadal tissue. However, the systems and methods disclosed herein may apply to any biological specimen described herein, including other types of tissue and many different sizes and thicknesses of biological specimen. In some instances, tissue samples may be prepared in accordance with standard clinical or research protocols for animal or human tissues. For example, an organ may be excised, dissected, and sliced on a vibratome in cutting solution in 100-500 micrometer thick tissue slices. The tissue slices may be incubated in a biocompatible incubation solution, such as a cutting solution or an artificial cerebrospinal fluid (aCSF) solution, optionally at a temperature of 32° C.-36° C. The tissue slices may be incubated in the solution for at least 15 minutes prior to cryopreservation process. In some variations, the tissue slices may be incubated for multiple hours in the solution. Cutting solution is any solution used in standard protocols for slicing tissue segments, whose composition may differ depending on tissue type. For example, cutting solution may be a modified artificial cerebrospinal fluid (aCSF) formulation that enhances neuronal viability and tissue integrity during brain slice preparation, wherein the magnesium ion concentration is elevated relative to conventional aCSF to inhibit excitotoxicity.

The specific temperature, time period, and other parameters may vary based on the tissue type. The tissue slices may then be transferred to another incubation solution, for example cutting solution or aCSF solution around room temperature for at least 15 minutes prior to cryopreservation. To potentially reduce metabolic rate and therefore toxicity of the cryopreservation protocol and to potentially minimize exposure to cold shock, this pre-cryopreservation warm incubation period may be removed, and the tissue slices may be transferred directly from cold cutting solution to a cryoprotectant loading step. Prior to beginning the cryoprotectant loading protocol, tissue slices may be carefully cut with a blade along the midline or in any other conformation to isolate a region of interest in the tissue.

Tissue Holding Assembly

Figure 4:
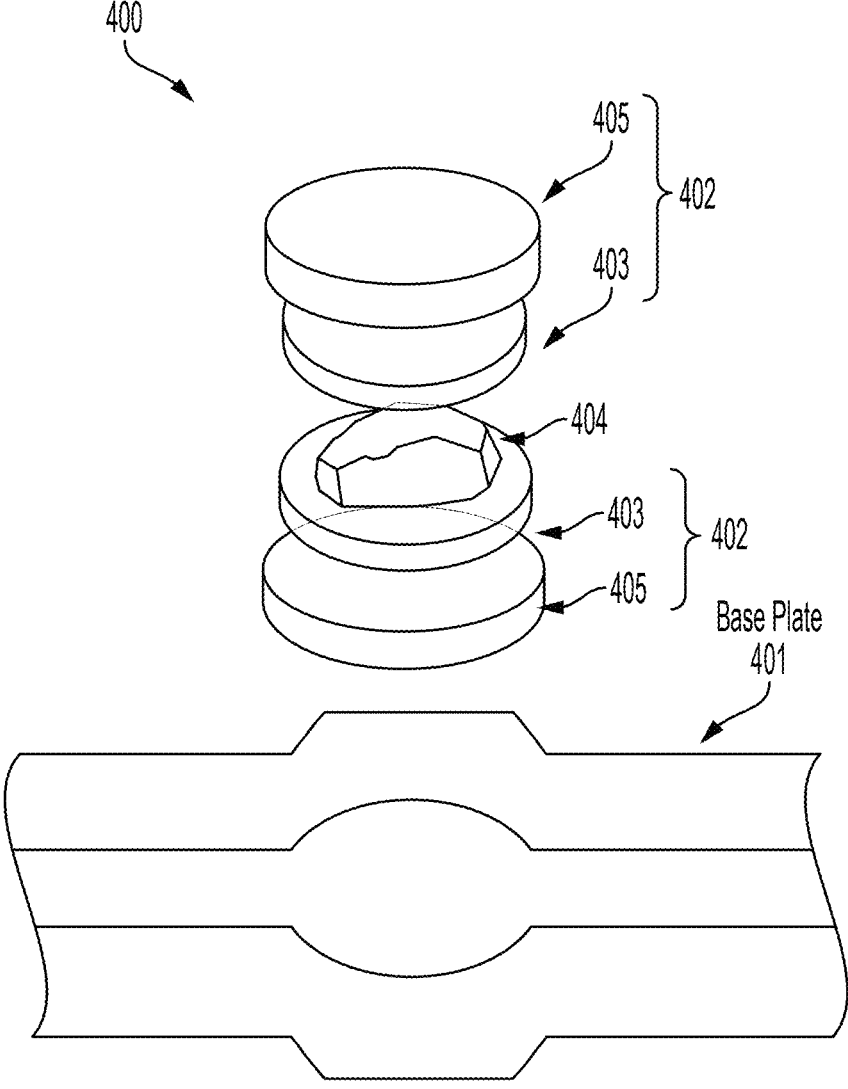
FIG. 4 illustrates a tissue holding assembly in accordance with some embodiments described herein.

In some variations, the system comprises a tissue holding assembly. The tissue holding assembly may allow for ease of transition between steps of a cryopreservation method as described herein. For example, the tissue holding assembly may allow for loading and/or cooling without damage being sustained by the tissue during motion. The tissue holding assembly may aid in maintaining the sample in desired temperature ranges and/or pressure ranges or may be used to implement a desired temperature profile or pressure profile. These aspects may enable high viability cryopreservation. The tissue holding assembly may also facilitate rapid throughput of multiple samples and allow for automated handling of samples, enabling higher throughput of tissue samples for cryopreservation. Example tissue holding assemblies are illustrated in FIGS. 4 and 5 among others.

The tissue holding assembly can comprise a thermally conductive wafer. The thermally conductive wafer may be made of sapphire, boron, nitride, aluminum nitride, diamond, or a material with similar properties. In an aspect, the thermally conductive wafer may serve to separate the tissue slice from the cooling source and/or heating source. In an aspect, the thermally conductive wafer may be smooth and/or treated to reduce the probability of ice formation and tissue adhesion. For example, the conductive wafer may be coated with an anti-adhesion coating, such as Prevelex. In other variations, the wafer may be left uncoated. The thermally conductive wafer may also be an electrically insulative material. It may be beneficial that the thermally conductive wafer is thin so heat conduction through the wafer is rapid and minimally impeded. The thermally conductive wafer may be thin (e.g., <500 μm).

The tissue holding assembly may comprise a metal shim. The metal shim may be a thin piece of ferromagnetic material (e.g., aluminum, carbon steel, or stainless steel) such that the metal shim may be heated when exposed to an alternating magnetic field.

Figures 7A, 7B:
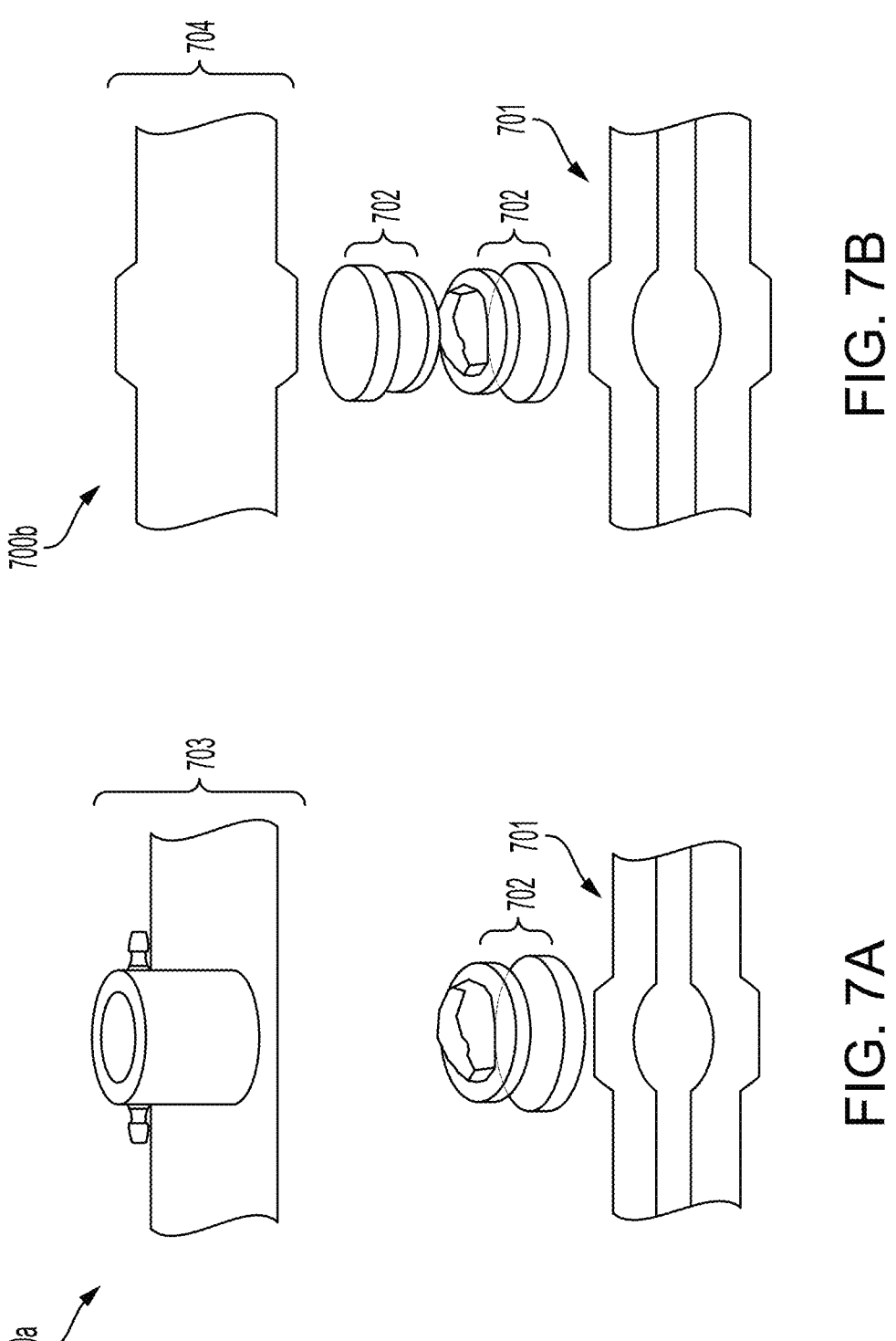
FIGS. 7A and 7B illustrate a tissue holding assembly in accordance with some embodiments described herein.
Figure 7C:
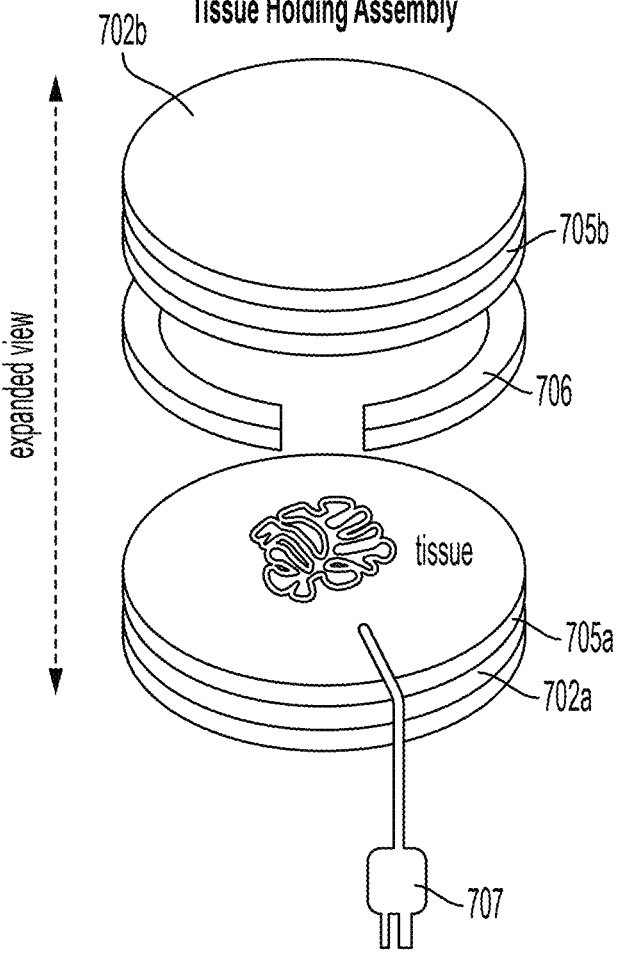
FIG. 7C illustrates an expanded view of an assembly of the base plate, first shim, first disk, spacer, second disk, second shim, and vitrification hat according to some embodiments.

The tissue holding assembly may comprise modular components. The tissue holding assembly may have features and attachments which may facilitate loading of the tissue with CPA, cooling the tissue, storing the tissue, warming the tissue, and unloading the CPA (e.g., as shown in FIGS. 7A-7C). The modularity may protect the tissue slice from mechanical perturbations over the course of the preservation process which could otherwise occur if the tissue slice was moved between several different components over the course of preservation. The tissue holding assemblies 700a and 700b shown in FIGS. 7A-7B may be a modular system and may comprise a base plate 701, a thermal container 702, and variable top pieces that can be added or removed to facilitate specific functions like loading or unloading, vitrification, storage, and rewarming. Two such top pieces may be a top piece for loading and/or unloading the tissue slice with CPA, which may be called the perfusion hat 703 (as shown in FIG. 7A), and a top piece for cooling, storing, and/or rewarming the tissue slice, which may be called the vitrification hat 704 (as shown in FIG. 7B). The modular configuration may be advantageous in eliminating the need to move the tissue around from one place to another during preservation and warming, exposing the tissue to less mechanical perturbation. Other modular components may make higher-throughput, more scalable tissue preservation possible.

Turning to FIG. 7C, an expanded view of a variation of an assembly between a base plate and a vitrification hat including a first shim 702a, first disk 705a, spacer 706, second disk 705b, second shim 702a, and vitrification hat. One or more of the first shim 702a and the second shim 702b can be a stainless steel shim. The spacer may have a thickness of at least 100 μm, at least 200 μm, at least 300 μm, at least 400 μm, at least 500 μm, at least 600 μm, at least 700 μm, at least 800 μm, at least 900 μm, or at least 1 mm. For example, the spacer 706 can have a thickness of about 100 μm, about 200 μm, about 300 μm, about 400 μm, about 500 μm, about 600 μm, about 700 μm, about 800 μm, about 900 μm, or about 1 mm (or any 1 μm increment between). In an example, at least one of the spacers 706, the shims 702a, 702b, and the disk 705a, 705b may include an opening for a thermocouple 707 lead to contact the disk.

The various pieces of the holding assembly may be made of plastic, such as acrylonitrile butadiene styrene (ABS), polycarbonate (PC), polyethylene (PE), polypropylene (PP) or the like, or may be made of metal, such as aluminum, steel, stainless steel, or the like. The pieces may be made by injection molding, 3D printing, machining, or similar manufacturing processes. It may be beneficial to make all or a part of the tissue holding assembly out of metal, so that the whole assembly heats when exposed to an alternating magnetic field. This may allow for more homogeneous heating of the tissue slice, and may prevent plastic pieces from warming more slowly, which could lead to unwanted temperature drops of the tissue slice after the initial heating.

The tissue holding assembly or some part of the tissue holding assembly may also seal itself or have attachments to allow for a seal, so that the sample can be pressurized when cooling and rewarming at high pressures. The seal may be achieved using a gasket, such as an o-ring, or a similar sealing mechanism. A pressure monitor may be embedded into the tissue holder to monitor the pressure of the pressure chamber.

A temperature probe may be fixed at or near the edge of a thermally conductive wafer, or elsewhere in the assembly, for continuous temperature readings throughout the preservation and protocol. The temperature probe may be a Type T thermocouple, such as a 40-gauge T Type thermocouple. The temperature probe may be a thermocouple, thermistor, fiber-optic probe, or other temperature sensor. The probe may be secured from movement, such as by a flexible plastic tube slotted into the fluid outlet groove on the base plate. Other temperature probes may record temperatures at various points throughout the system. Temperature sensors may be used to record the temperature in or near the tissue slice, at various locations throughout the assembly, or external to the assembly. These temperature readings may be used to assess the temperature of the tissue slice, either directly in the tissue slice or close to the tissue slice with tissue slice temperature inferred from the reading close to the tissue slice. Temperature measurements may also be taken in the ambient environment around the tissue holding assembly.

The tissue holding assembly is designed to fit in a magnetic field coil. The magnetic field coil can be a solenoid. The magnetic field coil can be closely matched in diameter to the tissue in order to concentrate the magnetic field/heat delivery of induction heating to the metal piece that is heating the tissue slice.

Figure 6A:
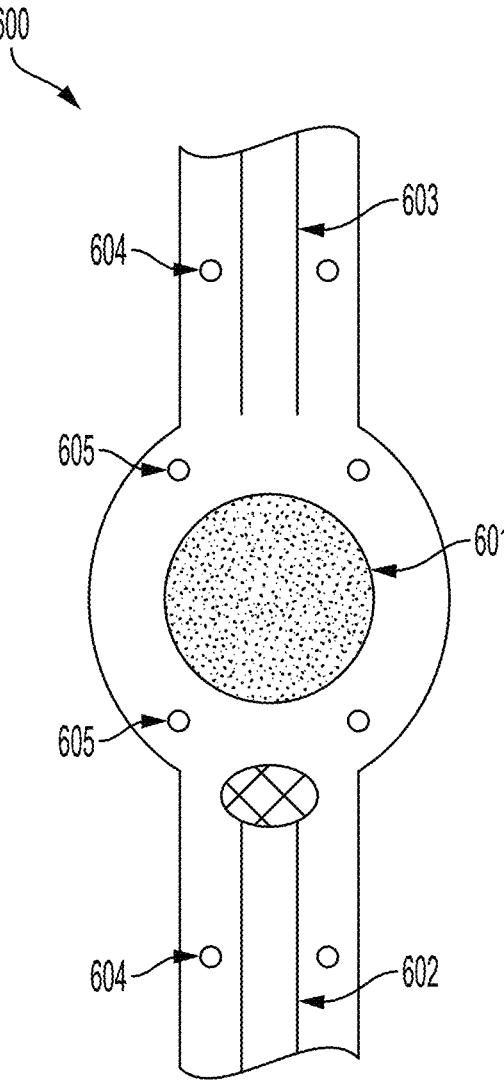
FIGS. 6A and 6B illustrate a base plate of a tissue holding assembly in accordance with some embodiments described herein.
Figure 6B:
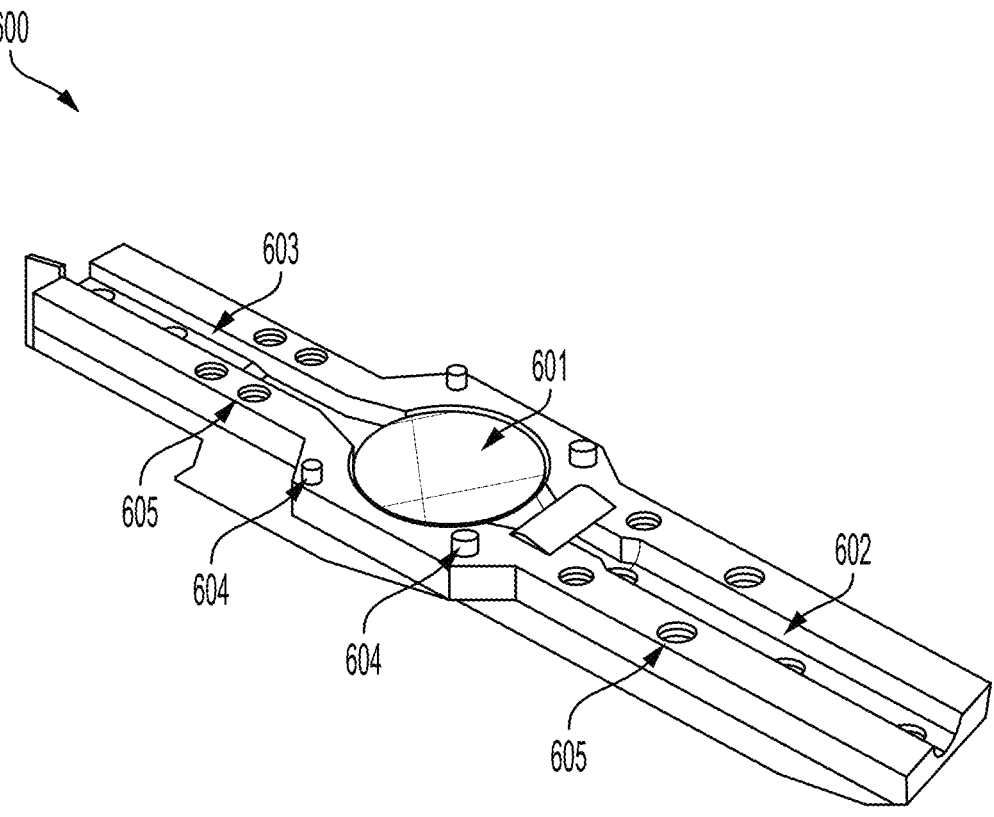

In some variations, the tissue holding assembly includes a base plate (e.g., as shown in FIGS. 6A-6B). The base plate can include a channel. The tissue holding assembly can further include a vitrification hat, which may comprise a channel. The channels may be used to facilitate cryogen flow (like liquid nitrogen) under and above the thermal container for well-distributed cooling, and this channel may have a small volume for maximum cooling efficiency and reduction of thermal loss.

The tissue holding assembly may also be designed to facilitate high-throughput operation to allow many samples to be preserved in a short period of time. A system for moving the assembly may include, for example, dove rails for linear motion. The dove rails can be operable to quickly slide tissue holding assemblies into and out of areas where they can be loaded or unloaded with CPA, cooled, warmed, and/or stored. The movement of tissue holding assemblies may be done either by human operators or by robotic systems to automate the preservation process. Other standard motion and automation components may be combined to allow for higher-throughput and scalable tissue preservation.

Tissue Loading

A biological specimen can loaded with one or more cryoprotective agents (CPAs). The CPAs can be included in a cryoprotective solution (CPA solution). For whole organs or organisms, the CPA solution may be perfused through the vasculature for delivery of the CPAs into the tissue. For tissue slices where intact vasculature is not preserved, diffusive uptake of the CPA solution may be used to deliver the CPAs. For example, a CPA solution may flow over the tissue so that the contents of the solution (e.g., the CPAs) may be taken up by the tissue.

To achieve this diffusive superfusion, the tissue slice may be placed in a well to allow fluid to pool around the tissue. Pumps and/or pneumatic systems may flow the desired solutions (e.g., CPA solutions and carrier solutions) into the well to increase solution turnover and improve rates of diffusion. Different concentrations of CPA solutions may be flowed at different temperatures. For example, higher CPA concentration may be flowed at lower temperature to minimize CPA toxicity. A perfusion hat configuration of the tissue holding assembly may be used to create this well and facilitate loading and/or unloading of a tissue slice with CPA. The well may be pressurized to further enhance rates of diffusion To prepare the tissue slice for vitrification, a loading protocol (see FIG. 9A) may be used to slowly increase the amount of CPA the tissue is exposed to. The tissue may first be bathed in a pure carrier solution (e.g., LM5). Bath time may vary. In some cases, one or more CPAs may be gradually introduced via a ramp or step in concentration until a final concentration. For example, the concentration of a CPA solution (and/or one or more CPAs in the CPA solution) may be linearly increased or increased in a step-wise manner during the loading protocol. A ramp, a step, or another protocol may be used in order to prevent osmotic damage from sudden changes in extracellular solute concentration. The slope of the ramp or step and the final concentration may vary based on the procedure, tissue, or CPAs used. Other protocols may include changes in concentration, specific curves like exponential curves, or other similar loading protocols may be used.

A tissue holding assembly may comprise a mesh bottom and a mesh perfusion hat. The perfusion hat may have a well to facilitate loading with CPA as shown in FIGS. 8A-8C.

A loading circuit is used for loading a biological specimen. Transfer of the fluid can be achieved by one or more pumps (e.g., peristaltic pumps or pneumatic systems). Other pumps, like pulsatile pumps, syringe pumps and centrifugal pumps, may also be used. Pumping may also be accomplished by hanging a bag of fluid and allowing flow of the fluid driven by gravity. One or more pumps may be used or multiple channels on a single pump may be used. The number of pumps may correspond to the number of fluids being transferred to the tissue. One pump may flow a carrier solution and a second pump may flow a cryoprotectant mix (e.g., one or more CPAs). One pump may also be used to flow two or more solutions (e.g., a carrier solution and a CPA solution which are mixed prior to loading a biological specimen. These two or more solutions may join via a fluidic Y-connector and/or via mixing tips. It may be advantageous to have the Y-connector in close proximity to the inlet of the perfusion well to ensure the precise concentration of fluid is being delivered to the well. Another pump channel may suck fluid from the outlet of the well. While the entire process can occur within a temperature-controlled chamber, a heat exchanger may also be used to further modulate the temperature of the fluid, such as cooling one or more of the fluids to −10° C. to 20° C. before entry into the perfusion well.

In some variations, the loading circuit can include tubing to transfer fluid. The tubing may be plastic tubing (e.g., PVC tubing or silicone tubing). The tubing may be made of biocompatible materials such that the biological specimen is not adversely affected. The loading circuit may comprise a filter, which may serve to screen out debris from the line before the fluid is perfused into the tissue.

A bubble trap may be added to the loading circuit. The bubble trap may serve to remove gas from the fluid in the system, particularly air bubbles. The bubble trap may be a passive bubble trap where bubbles migrate to the top of a chamber as they flow through the circuit. The bubble trap may be an active bubble trap where a suction pump is used to pull air out of a fluidic circuit as the fluid passes through the bubble trap component. The bubble trap may also act as a heat exchanger. Cold or warm coolant fluid may be circulated through the bubble trap to modulate the temperature of the fluid flowing through the bubble trap. This may serve to control the temperature of the fluid in the range of −10° C. to −20° C. Alternatively or in addition, the fluidic circuit may be primed before use to ensure no air bubbles remain in the circuit before loading flow is started.

The fluidic circuit may include heat exchangers to modulate the temperature of the fluid in the circuit (e.g., cooling one or more of the fluids in the circuit to a range of −10° C. to 20° C.). In an example, shell-and-tube, shell-and-coil, flat plate, or other similar heat exchanger architectures may be used to modulate the temperature of the fluid in the heat exchanger. The thermal interface in the heat exchanger may be a thin piece of material to allow for high rates of thermal transfer, and the material may be metal (e.g., aluminum, steel, or stainless steel) or glass. A large heat sinking source, such as a circulating coolant, may be run through the heat exchanger thermally interface with the CPA solution and carrier solution running through the circuit. The circulating coolant may be cooled or warmed to achieve a certain target temperature of the fluid in the loading circuit or in the circulating coolant.

A temperature sensor may monitor the temperature of the circulating coolant, the CPA solution/carrier solution in the circuit, or both. A reading of this temperature sensor may be used to modulate the cooling or heating of the circulating coolant in order to achieve a certain target temperature (e.g., a certain temperature of the CPA solution and/or carrier solution). In an example, the modulation may be delayed to account for a change in reading across the tissue or organ. The circulating coolant may comprise a fluidic circuit with a pump (e.g., a centrifugal pump) used to circulate the coolant through one or more heat exchangers, a cooling component (e.g., a compression cooling system or thermo-electric cooling system) to cool the coolant, and a heating element (e.g., a resistive heating element, to heat the coolant).

Various sensors, like temperature, pressure, concentration sensors, or similar physical sensors, may be used throughout the circuit to monitor performance and control the loading process. Temperature sensors may include thermocouples, especially type T or type K thermocouples, thermistors, RTD, and optical temperature sensors. Temperature sensors may be placed in the fluidic circuit line either near the inlet, the outlet, or both to monitor the temperature of the fluid going into or out of the biological specimen. Other temperature sensors may be placed at various points throughout the system to monitor the temperature of the fluid chamber, the environment, the biological specimen, the heat exchanger (s), or any other number of thermally relevant points, some of which are discussed at other points in this document. The temperature sensors may directly measure the temperature of the tissue or any of the other various points of thermal interest or may be placed in close proximity to these points of thermal interest to infer the measurement of the points of thermal interest. The temperature sensor can be placed between the base plate and perfusion hat so that the temperature sensor may infer the temperature of the tissue being in close proximity to the tissue inside the perfusion well. Pressure may be monitored in the fluidic line using a pressure sensor. In high-pressure configurations, a pressure sensor may be used to monitor the pressure of the entire system, particularly the pressure the biological specimen is subjected to during the preservation procedure. The pressure sensor may be a gauge pressure sensor, a differential pressure sensor, an absolute pressure sensor, or similar, and may use a displacement membrane to measure pressure. Concentration sensors may be used to measure concentration at various points in the system to ensure the tissue is being exposed to the correct concentration of CPA at various points in the loading process. Concentration sensors may be used at the inlet and/or the outlet of the system, and the differential between these sensors may be monitored to determine the amount of CPA being absorbed by the tissue. Concentration sensors may include refractometers, various types of chemical sensors, ultrasonic sensors, or other similar physical sensing mechanisms capable of detecting concentration changes in the fluid in the system. Other types of sensors may be used, such as flow sensors to measure the flow rate in the line, which may be ultrasonic flow sensors.

Many of the components described herein, such as the pump and the sensors, may have electronic components that allow for programmatic interfacing with these components so that these components can be sent signals by a controlling computer or send signals to a controlling computer. The computer may be capable of receiving the sensor values and storing these in memory and controlling the various controllable components, like the pump, and coordinating their function via software.

Software-based controllers may be used to monitor the performance of the system and control various components. The computer hardware may be a computer processing chip and associated peripheral accessories or a similar processing architecture. These controllers may monitor and control temperature levels throughout the system, pressure levels throughout the system, concentration levels throughout the system, or some combination thereof. Data may be stored by the system on the computer hardware, such as timing data, temperature data, pressure data, or the like. A user interface may be displayed by the computer hardware on a screen and may show live readings of the temperature, pressure, concentration, time, and other system parameters. Graphing of these parameters may also be shown on this user interface, such as plotting temperature over time since the beginning of the loading. Specific software protocols, which may be specific to the tissue type or some other defining characteristic of the system, may be used by the computer hardware to set the values of various parameters over the course of a loading protocol. Various control architectures like Proportional, Integral, Derivative (PID) controllers, bang-bang control, conditionals, conditional PIDs, and machine learning architectures may be used to control the various parameters of the system. These controllers may be implemented in the software running on the computer hardware.

Cooling

Figure 10:
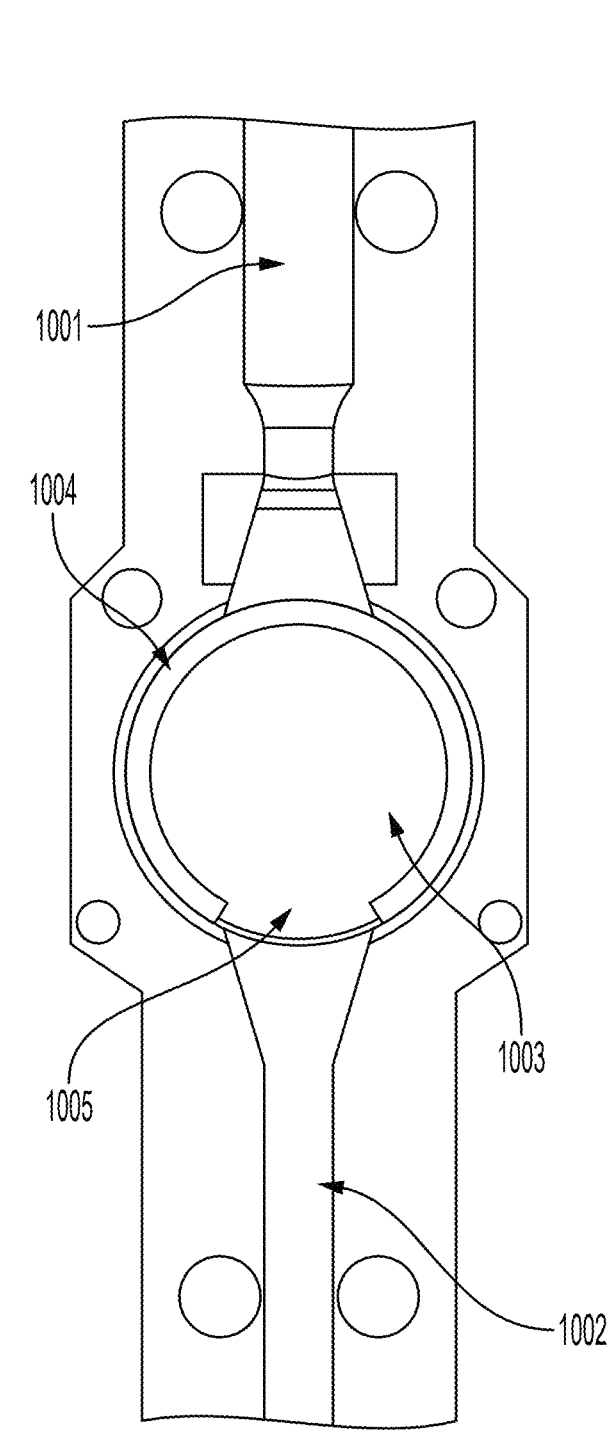
FIG. 10 illustrates a vitrification hat in accordance with some embodiments described herein.

A biological specimen is cooled or vitrified. The cooling may occur after the tissue is loaded with CPA. The tissue holding assembly may be modified before vitrification (e.g., as shown in FIG. 10). For example, the solution may be carefully removed from the well (e.g., with a pipette) and the perfusion hat may be removed from the base plate. The tissue slice may remain flat on the thermally conductive wafer. A different attachment (e.g., a vitrification hat) may then be placed on the base plate and secured by fasteners, such as non-magnetic screws. The base plate and the vitrification hat may house in their center a thermal container previously described. The tissue slice and tissue holding assembly, including the vitrification hat, may be positioned such that the tissue slice is ready to be cooled, such as placed in front of a liquid nitrogen spray nozzle to facilitate cooling.

A spacer may be added to prevent the tissue slice from being crushed between two thermally conductive wafers. Attached to the thermally conductive wafer on the vitrification hat may be a spacer with a thickness slightly greater than the thickness of the tissue. The spacer may be made of a compressible plastic sticker, a rigid plastic, a non-magnetic metal, or a similar spacer material. This may ensure that the spacer does not heat in the alternating magnetic fields (AMF) during later rewarming, which may cause inhomogeneous heating in the tissue slice. The spacer may be shaped like a disc with a cutout in the middle and may comprise a gap for a temperature probe. The spacer may be adhered to the thermally conductive wafer. The edges of the thermally conductive wafer may be roughed with sandpaper and glued or otherwise adhered to the spacer. The glass that lies under the spacer may be roughed, while the glass that lies inside the spacer may not be roughed. This may prevent exposed rough glass within the tissue holder from nucleating ice or causing the tissue to adhere to the top glass. Before the vitrification hat is attached to the baseplate, the tissue may be positioned in the center of the thermally conductive wafer on the baseplate such that the spacer sits around the tissue and not directly on the tissue. Similar constructs may be used for the same purpose of preventing tissue sample compression or crushing during cooling.

The tissue sample can be cooled via the controlled flow of cryogenic fluid (e.g., liquid nitrogen, liquid nitrogen vapor, or another cryogenic fluid) over, under, and/or around the tissue sample. Liquid nitrogen or another substance that remains in a liquid or gas phase at cryogenic temperatures, such as liquid helium or other cryogens, may be used to cool the tissue slice. The cryogenic fluid may be dispensed from a pressurized tank or dewar. The hose assembly coming from the pressurized tank or dewar may comprise an insulated hose connecting to a control mechanism, such as an inlet port of a three-way, normally closed solenoid valve. A priming setup, such as a hose from one of the outlet ports of the solenoid valve to a waste dewar, may be part of the assembly. A nozzle, such as a metal tube connecting the other outlet port of the solenoid valve, may connect the cryogen hose assembly to the tissue slice chamber. The inlet line may be first filled with the cryogen by opening the dewar and allowing time for any air or vapor-phase cryogenic fluid to be purged from the hose assembly. This step may pre-chill and prime the hose, so that the system may be ready to cool the tissue. Most of the entire flow path of the cryogen may be pre-chilled before the cryogen is flowed over the tissue slice. Other similar priming methods may be used, and these methods may serve to maximize the rate of tissue slice cooling.

After pre-chilling the line, the system may be ready to flow the cryogen over, under, and/or around the tissue, and a valve may be utilized to allow flow over, under, and/or around the tissue. The rate of cooling may be controlled by the flow rate of liquid nitrogen or other cryogens over, under, or otherwise around the tissue slice and tissue slice holding assembly. Control mechanisms may be used to control the cooling rate of vitrification.

A solenoid valve may be used to control the flow of liquid nitrogen onto the tissue. Power may be delivered to the solenoid valve via an electronically controllable relay to open the valve and begin cooling. The tissue may be cooled to cryogenic temperature when the solenoid valve is opened as the valve has opened the flow path to the tissue for liquid nitrogen vapor, liquid nitrogen, or another similar cryogen.

Temperature may be measured at various points in the system using a temperature sensor, such as a type T thermocouple or optical temperature probe. In particular, the temperature near or in the tissue may be measured to monitor the rate of cooling for the tissue. It may also be desirable to measure the temperature of the priming hose at various places to determine when this pre-chilling has been sufficiently completed.

A software-based controller, running on computer hardware, such as a microprocessor or other chip, may be used to open and close the solenoid valve. The software-based controller may also read the temperature values of the one or several temperature sensors disposed throughout this cooling system. The one or more temperature reading may feed into a control system that modulates the flow rate of the cryogen to achieve a desired cooling profile for the tissue. Various control architectures like PID controllers, bang-bang control, conditionals, conditional PIDs, and machine learning architectures may be used to control the various parameters of the system. These controllers may be implemented in the software running on the computer hardware.

In some variations, the tissue may be directly positioned onto a pre-chilled metal block. A mesh spacer may be positioned between the tissue and the metal block to minimize tissue damage. Multiple metal blocks of varying temperatures may be used in combination to facilitate rapid cooling of tissue samples as CPA concentrations are increased or decreased.

In some variations, high pressure may be used in combination with this cooling step. High pressure may suppress ice formation during cryopreservation, enabling a vitrification process where water in tissues transitions to a glass-like state, which may significantly mitigate damage. High pressures may be delivered by placing the tissue slice in a pressure chamber, and the pressure of the chamber may be elevated up to 200 MPa. One or more pressure sensors may be used to monitor the pressure of this high-pressure system, and these sensors may be used for controlling the pressure of the tissue to pre-specified levels or to levels input by a user. Cooling of the pressure chamber may be completed by blowing cryogens over the pressure chamber or inside the pressure chamber with a pressurized flow line into the pressure chamber. Cooling may also be done by submerging the pressure chamber in a cryogen, like liquid nitrogen or liquid helium. A pressure generating mechanism (e.g., a screw-based system or hydraulic system) may be used to generate, hold, and release pressure on the tissue. The flow of cryogen may also be used to create high pressure, which may be able to both cool and pressurize the tissue. A pressurizable fluid, such as a bioinert incompressible fluid, may be placed in the pressure chamber to transmit pressure inside the pressure chamber. Both temperature and pressure sensors, in addition to other sensors, may be used to monitor this system, and both temperature and pressure may be controllable by a computer running control software.

Other similar methods of cooling may be used to bring the tissue being held at high pressure down to preservative temperatures. The pressure may either remain elevated while the tissue is stored or may be released to allow the tissue to return to near atmospheric pressure.

Other mechanisms may be utilized for flowing cryogens. A cryogen tank set to a preset pressure may have a cryogen dispensing device mounted to the cryogen tank with a finely tunable pressure or flow rate. This may enable an adjustable cooling rate, which may be programmatically controlled. Adjustments in pressure may be made via a heater built into the storage tank or the flow of vapor-phase cryogenic fluid into the tank. Adjustments in flow may also be made via controllable valves described elsewhere.

To achieve normalization of flow, such as even flow of the cryogenic fluid above and below the tissue slice, a flow guide (e.g., an aerodynamically shaped flow splitter) may be placed before the tissue holder. This may allow for direct lateral contact with the tissue holder to be avoided and all cryogenic fluid flow to be directed above, below, or around the tissue. This flow may cool the tissue as evenly as possible so as to prevent large thermal gradients. Other flow normalization mechanisms which guide the flow of cryogens may be used.

The tissue slice may be vitrified in as soon as a few seconds or less with cooling rates as high as 1,000° C./min to 10,000° C./min. Experimentally, rates up to 4,000° C./min have been recorded. The cooling rate may be greater than or equal to about 1° C./min, about 2° C./min, about 3° C./min, about 4° C./min, about 5° C./min, about 6° C./min, about 8° C./min, about 10° C./min, about 12° C./min, about 15° C./min, about 18° C./min, about 20° C./min, about 30° C./min, about 40° C./min, about 50° C./min, about 60° C./min, about 70° C./min, about 80° C./min, about 90° C./min, about 100° C./min, about 120° C./min, about 150° C./min, about 180° C./min, about 200° C./min, about 300° C./min, about 400° C./min, about 500° C./min, about 700° C./min, about 1,000° C./min, about 2,000° C./min, about 3,000° C./min, about 5,000° C./min, about 8,000° C./min, about 10,000° C./min or more. The cooling rate may be about 1° C./min to about 10° C./min, about 10° C./min to about 50° C./min, about 50° C./min to about 100° C./min, about 100° C./min to about 200° C./min, about 200° C./min to about 500° C./min, about 500° C./min to about 1,000° C./min, about 1,000° C./min to about 2,000° C./min, about 2,000° C./min to about 5,000° C./min, about 5,000° C./min to about 10,000° C./min, or about 50° C./min to about 10,000° C./min.

After the tissue is cool to the desired preservation temperature, the flow of cryogen may be turned off, using a control mechanism. The tissue may then be moved to storage, where the tissue can be preserved for long periods of time at a stable temperature.

In some variations, ice crystals may be detected by a high-resolution computed tomography scan while the tissue is held at the preservation temperature. For example, high resolution photon counting x-ray CT (PC-CT) or micro-CT (μCT) may be used to detect ice crystals while the tissue is held at the preservation temperature. High resolution photon counting PC-CT or μCT may be used to detect ice crystals at one or more periods during the cooling and warming profile to adjust at least one of the pressure or temperature profiles. Rotating the sample relative to the detector may allow for high resolution visualization of ice in 3D across an entire tissue specimen. Ice within a tissue specimen held at storage temperature may be detected in situ by X-ray diffraction (XRD), in which a collimated X-ray beam (e.g., 0.5-1.5 Å wavelength) is directed through the sample and diffracted rays are collected on a two-dimensional area detector; the appearance of characteristic Bragg peaks confirms ice formation, while peak intensities, widths, and shapes yield quantitative measures of ice fraction, crystal size, and strain. Beam exposure and dose can be controlled to avoid warming above the glass transition.

In some variations, a heating system may be used to counterbalance the cryogen cooling, allowing for greater control over temperature profiles of tissue preservation. For example, heating may be done via the AMF interacting with nanoparticles within the tissue. Heating may alternatively be done by flowing a warm fluid, such as warm air or warm perfluorocarbon solution, over the tissue. A controller may be used to rapidly cool tissue in a controlled way. Simultaneous heating and cooling may be done to offset any differences throughout the tissue during cooling and/or warming.

This system may be fully automated, operating without human intervention, or human-out-of-loop. Rather than using a different hat for perfusion and vitrification, the perfusion well may simply remain on the chamber during vitrification. Prior to vitrification, the fluid in the well may be drained via a valve-controlled outlet port near the bottom of the well. Vitrification may then proceed as described previously.

Other cooling methods for vitrifying tissue may also be used. For example, the tissue may be dunked directly in a cryogen (e.g., liquid nitrogen) for cooling. It may be advantageous to ensure level tissue during this dunking so that the tissue cools as uniformly as possible to prevent cracking. Alternatively, to increase cooling rates, tissue may be dunked vertically to avoid trapping of liquid nitrogen and/or nitrogen gas underneath the tissue. The tissue may be placed on a mesh surface (e.g., a nylon mesh) before the tissue is dunked in cryogen. This mesh may allow for excess CPA to be removed before dunking. Paper towels may be used to wick away CPA from the tissue.

Storing

In some variations, a tissue sample is stored. The storing may occur after the tissue is cooled. Once the tissue has been cooled down to liquid nitrogen temperature, the tissue may be transferred to a controlled temperature chamber (e.g., a dewar or freezer) for long-term storage. The tissue may be stored in a dewar filled with liquid nitrogen. The tissue may be placed in a bag or other protective container before being placed in the liquid nitrogen to ensure the liquid nitrogen does not adversely affect the tissue. The bag may be suctioned to reduce the space between the surface of the organ and the liquid nitrogen outside the bag. The tissue may be stored in a controlled temperature freezer, the temperature of which may be held in a range of −100° C. to −196° C. The temperature may be held at or just below the glass transition temperature of the system to ensure the vitrified sample remains in a glass state.

The tissue may be monitored during cooling and/or during storage using sensors (e.g., temperature sensors, pressure sensors, or acoustic sensors). Temperature sensors may be used to ensure the temperature of the preserved tissue does not change unexpectedly and does not warm above a range of temperatures that would cause ice formation or otherwise damage the tissue. Pressure sensors may be used to detect if any anomalous changes have occurred in the system. Acoustic sensors may be used to detect cracking of tissue during preservation as cracking of the tissue may affect the viability of the tissue after the tissue has been rewarmed and unloaded.

Other ways of storing the tissue at low temperatures may be employed, and the above methods of storage may be used alone or in combination.

Rewarming

A biological specimen can be rewarmed. The rewarming may occur after the tissue is cooled. The rewarming may occur after the tissue is stored. Rewarming may be completed using an inductive heating source or some other method that delivers rapid warming, substantially homogeneous warming, or some combination. The tissue holding assembly may be taken from storage with the vitrification hat still in place and may be moved to the tissue slice warming system.

Figure 11:
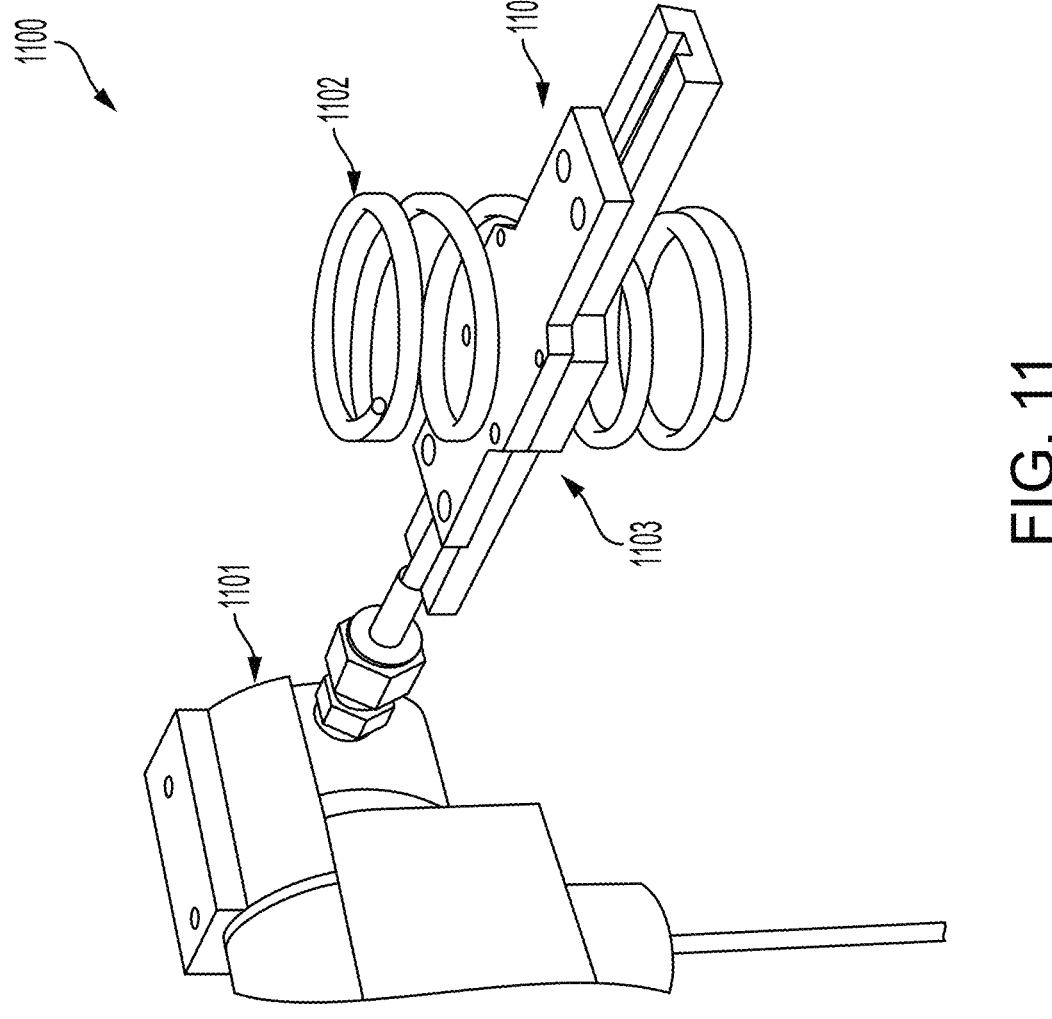
FIG. 11 illustrates a tissue slice warming system in accordance with some embodiments described herein.

The biological specimen (e.g., tissue slice) warming system may include an AMF circuit including an AMF generator and a magnetic field coil configured to generate AMF when current flows through the magnetic field coil (e.g., as shown in FIGS. 1 and 11). The magnetic field coil may be copper. The size of the magnetic field coil may depend on the tissue, and the tissue may be placed inside the magnetic field coil (e.g., at the center of the magnetic field coil). It may be advantageous to use a magnetic field coil as close in size to the tissue as possible in order to increase the strength of the magnetic field and therefore the heating. At equivalent power input to the AMF, a smaller coil may draw more current and thus produce a stronger field. The magnetic field coil may be made from thick-gauge hollow copper tubing such that water can be flowed through the tubing for cooling or litz wire. The inductive heater circuit which may drive the heating from the tissue slice warming system may comprise any or all of the following: a) a rectifier that converts mains power to DC; b) an inverter to convert this DC power back to AC, but at a chosen frequency, c) a resonant tank circuit containing a capacitor bank in parallel with an inductor, where the inductor is the magnetic field coil used to warm the tissue slice, d) a capacitor in series with the resonant tank to match the high impedance of the resonant tank to the relatively lower impedance of the inverter, or e) a ferrite transformer between the inverter and the resonant tank to match the high impedance of the tank to the relatively lower impedance of the inverter.

Warming of the biological specimen may occur via the heating of a ferromagnetic metal in direct or indirect contact with the tissue slice caused by the magnetic coupling of AMF with the metal. The AMF may be generated by a magnetic field coil. The entire biological specimen (or holding assembly) may sit within the magnetic field coil. Many different types of magnetic or ferromagnetic materials may be used for coupling with the inductive heat power source and delivering heat to the tissue. Parts of or all of the holding assembly may be made of metal such that all or a part of the holding assembly heats when coupled with the induction heating source. Thermally conductive wafers (e.g., sapphire wafers) may be used to ensure more uniform temperature distribution of thermal energy into the tissue during use of the tissue slice warming system.

The tissue holding assembly may be slid into a gap in a magnetic field coil (e.g., as shown in FIG. 11) on a dove rail or similar mechanism such that the center of the assembly is close to axially aligned with the vertical axis of the magnetic field coil and positioned in or near the center of the magnetic field coil.

The rate of warming may be controlled by the strength and frequency of the AMF, which may be controlled by the amount of current flowing through the magnetic field coil and the design of the AMF circuit. The strength of the AMF may be greater than or equal to about 5 kA/m, about 10 kA/m, about 15 kA/m, about 20 kA/m, about 30 kA/m, about 40 kA/m, about 50 kA/m, about 60 kA/m, about 80 kA/m, about 100 kA/m, or more. The strength of the AMF may be about 5 kA/m to about 10 kA/m, about 10 kA/m to about 20 kA/m, about 20 kA/m to about 50 kA/m, about 50 kA/m to about 100 kA/m, or about 5 kA/m to about 100 kA/m. The strength of the AMF may be greater than 20 kA/m. The frequency of the AMF may be greater than or equal to about 10 kHz, about 20 kHz, about 40 kHz, about 60 kHz, about 80 kHz, about 100 kHz, about 120 kHz, about 150 kHz, about 200 kHz, about 250 kHz, about 300 kHz, about 400 kHz, about 500 kHz, about 600 kHz, about 800 kHz, about 1 MHz, about 2 MHz, about 3 MHz, about 4 MHZ, about 5 MHz, about 6 MHz, about 8 MHz, about 10 MHz, about 12 MHz, about 15 MHz, about 20 MHz, about 30 MHz, about 40 MHz, about 50 MHz, about 60 MHz, about 80 MHz, about 100 MHz or more. The frequency of the AMF may be about 10 kHz to about 100 kHz, about 100 kHz to about 500 kHz, about 500 kHz to about 1 MHz, about 1 MHz to about 5 MHz, about 5 MHz to about 10 MHz, about 10 MHz to about 50 MHz, about 50 MHz to about 100 MHz, or about 10 kHz to about 100 MHz. The frequency of the AMF may be about 100 kHz to about 50 MHz.

The rate of warming may also be controlled by the geometry and size of the magnetic field coil. In an aspect, the rate of warming may be controlled by the location of the biological specimen in relation to the magnetic field coil. The magnetic field coil may be copper. The magnetic field coil may be wired as a tank resonator or a series resonator. The sizing of the magnetic field coil may be tailored to the sizing of the specimen being preserved and rewarmed in order to ensure sufficient magnetic field strengths throughout the sample. The magnetic field coil may be an air-core solenoid or a coil filled with high permeability material (e.g., a toroidal coil) with an air gap for field concentration.

In some variations, warming rate is greater than or equal to about 1° C./min, about 2° C./min, about 3° C./min, about 4° C./min, about 5° C./min, about 6° C./min, about 8° C./min, about 10° C./min, about 12° C./min, about 15° C./min, about 18° C./min, about 20° C./min, about 30° C./min, about 40° C./min, about 50° C./min, about 60° C./min, about 80° C./min, about 100° C./min, about 120° C./min, about 150° C./min, about 200° C./min, or more. The warming rate may be about 1° C./min to about 20° C./min, about 20° C./min to about 50° C./min, about 50° C./min to about 100° C./min, about 100° C./min to about 150° C./min, about 150° C./min to about 200° C./min, or about 20° C./min to about 200° C./min. The warming rate may be about 100° C./min.

A mixture of nanoparticles, such as iron oxide nanoparticles, may be flowed over the tissue and then exposed to the AMF. The nanoparticles may heat in the presence of the alternating magnetic field and may warm the tissue. This may enable warming of the tissue at fast rates (e.g., above 10° C./min) and warming of the tissue in a substantially homogeneous manner. Particles with higher specific loss power than magnetite (e.g., MnCoFe core-shell nanoparticles) may be used for tissue nanowarming to achieve enhanced warming rates. Various coatings may be applied to nanoparticles, to enhance their biocompatibility and heating efficacy.

The AMF generator may produce a field strength of >10 kA/m and may operate at a frequency of 100 kHz-10 MHz. Lower power and frequency configurations may be used if the inductive coupling produces sufficient heat to warm the tissue at rates >50° C./min. The magnetic field coil may be sized close to the tissue dimensions to maximize efficiency of heating. The heating may be controlled accurately with a PID controller or similar controller, changing the intensity of heating depending on the current temperature read from a temperature probe (e.g., a Type T thermocouple or an optic temperature probe). The control system may be run on computer hardware by a software program. The AMF generator may be cooled using a circulating water cooling system to allow the AMF generator to operate without overheating.

Temperature may be measured at various points in the system using one or more temperature sensors (e.g., T thermocouples or optical temperature probes). In particular, the temperature near or in the tissue may be measured to monitor the rate of warming for the tissue.

The warming may be implemented according to a warming protocol. The warming protocol can be an open-loop or manual control protocol. In the open-loop and manual control protocol, induction heaters or AMF generators may utilize pre-programmed heating settings in one or more of the heating phase or the retain phase. The duration and power level may be set for each. This may allow for two different heating rates during the heating process. Additionally, the protocol may have a temperature set point. A preset routine may be used to change the temperature to a value close to this setpoint. A sharp heating rate may be used up to an initial temperature, which may be followed by a shallow rate to the final temperature. Alternatively, a shallow heating rate may be used up to said initial temperature, which may be followed by a sharp rate to a final temperature. The user may press the start button to run this pre-programmed, open-loop heating protocol. Once the temperature rises to the desired final temperature (e.g., in the range +2° C. to +20° C.), the surrounding mass of the assembly may remain fairly cold and, if left undisturbed, may pull the temperature of the tissue down quickly. To counteract this effect, the user may switch the induction heater into manual control mode at minimum power and use a foot pedal to intermittently re-heat the tissue and maintain the desired temperature until the entire assembly reaches thermal equilibrium at the desired temperature.

In alternative variations, the warming protocol is a closed-loop protocol or a feedback control protocol. The protocol may have a temperature setpoint. The closed-loop control protocol may use information about the temperature and the temperature's distance from the setpoint to intelligently change the value of the power given to the magnetic field coil or duty cycle of the field coil and therefore the strength of the magnetic field. A microcontroller may be used to control the power of the induction heater, and feedback may be run to control the power using common techniques like PID (Proportional, Integral, Derivative) control or similar control systems. A benefit of closed-loop protocols may be that the closed-loop protocols may provide more control over the process than an open-loop protocol.

A software-based controller running on computer hardware, such as a microprocessor or other chip, may be used to monitor the system and control the rewarming rate. The controller may receive the temperature values of the one or several temperature sensors disposed throughout this warming system. The one or more temperature readings may feed into a control system that modulates the power or frequency of the induction heater to achieve a desired warming profile for the tissue. Various control architectures like PID controllers, bang-bang control, conditionals, conditional PIDs, and machine learning architectures may be used to control the various parameters of the system. These controllers may be implemented in software running on the computer hardware.

After the tissue is heated to the desired temperature, the heating power source may be throttled down or turned off using a control mechanism like sending a command from the software-based controller. The tissue may then be ready for unloading of the CPA.

In some variations, a cooling system may be used to counterbalance the inductive heating, allowing for greater control over temperature profiles of tissue rewarming. This cooling may be done via a cryogen, like liquid nitrogen, being blown over the tissue. A controller may combine this cooling and warming to rapidly warm tissue in a controlled way.

This system may be fully automated, operating without human intervention, or human-out-of-loop.

/the tissue slice may be rewarmed in a few seconds with warming rates as high as 1,000° C./min to 10,000° C./min. The warming rate may be greater than or equal to about 1° C./min, about 2° C./min, about 3° C./min, about 4° C./min, about 5° C./min, about 6° C./min, about 8° C./min, about 10° C./min, about 12° C./min, about 15° C./min, about 18° C./min, about 20° C./min, about 30° C./min, about 40° C./min, about 50° C./min, about 60° C./min, about 70° C./min, about 80° C./min, about 90° C./min, about 100° C./min, about 120° C./min, about 150° C./min, about 180° C./min, about 200° C./min, about 300° C./min, about 400° C./min, about 500° C./min, about 700° C./min, about 1,000° C./min, about 2,000° C./min, about 3,000° C./min, about 5,000° C./min, about 8,000° C./min, about 10,000° C./min or more. The warming rate may be about 1° C./min to about 10° C./min, about 10° C./min to about 50° C./min, about 50° C./min to about 100° C./min, about 100° C./min to about 200° C./min, about 200° C./min to about 500° C./min, about 500° C./min to about 1,000° C./min, about 1,000° C./min to about 2,000° C./min, about 2,000° C./min to about 5,000° C./min, about 5,000° C./min to about 10,000° C./min, or about 50° C./min to about 10,000° C./min.

In some variations, high pressure is used in combination with this warming step to suppress ice formation during rewarming, enabling a return from the vitrified state with less damage from ice. High pressures may be delivered by placing the tissue in a pressure chamber, and the pressure of the pressure chamber may be elevated up to 200 MPa. One or more pressure sensors may be used to monitor the pressure of this high-pressure system, and these sensors may be used for controlling the pressure of the tissue to pre-specified levels or to levels input by a user. Pressurization may be done at cryogenic temperature, before warming begins, or alongside warming of the tissue. Warming of the pressure chamber may be completed by blowing warm air over the pressure chamber or inside the pressure chamber with a pressurized flow line into the pressure chamber. Warming may be done by inductively heating the pressure chamber (e.g., if the pressure chamber is magnetic), magnetic joule heating of the non-magnetic pressure chamber (e.g., if the pressure chamber is non-magnetic), or inductively heating a magnetic metal inside the pressure chamber, which in turn heats the tissue held at high pressure. Warming can also be done by submerging the pressure chamber in a warm water bath, such as a water bath held at 37° C. A pressure generating mechanism, such as a screw-based system or hydraulic system, may be used to generate, hold, and release pressure on the tissue. The flow of hot fluid may also be used to create high pressure, which may be able to both warm and pressurize the tissue. A pressurizable fluid, such as a bioinert incompressible fluid, may be placed in the pressure chamber to transmit pressure inside the pressure chamber. Both temperature and pressure sensors, in addition to other sensors, may be used to monitor this system, and both temperature and pressure may be controllable by a computer running control software.

Other heating methods for rewarming tissue may also be employed. The tissue may be dunked directly in a warm water bath, such as a warm water bath maintained between 4-42° C., for rewarming. It may be advantageous to ensure level tissue during this dunking so that the tissue warms as uniformly as possible to prevent cracking. The tissue may be placed on a mesh surface (e.g., a nylon mesh) before the tissue is dunked in the warm water. Alternatively, the tissue could be exposed to warm air, either static warm air or warm air blown over the tissue, to rewarm the tissue.

Resistive or joule heating may also be used to rewarm the tissue. One such warming method may entail putting the tissue in contact with an electrical conductor that is fed a voltage pulse. By employing tunable voltage pulse widths from 10 us to 100 ms, this method may achieve high warming rates. Resistive heating architectures, where a current is sent through a resistor to generate heat, may also be used via exposing the tissue to this generated heat. Adaptive feedback systems that dynamically adjust the voltage and pulse widths for the joule warming approach described may be used in real-time and based on the immediate thermal response of the biological material measured by a temperature sensor (e.g., thermocouples, especially type T or type K thermocouples, thermistors, RTD, and/or optical temperature sensors). This may ensure optimal rewarming rates are maintained, minimizing thermal stress and potential damage to the biological tissue specimen. Other methods of tissue warming may also be used to rewarm the tissue from the preserved state.

Unloading

After rewarming, the CPA may be removed from the tissue in an unloading step. The unloading step may be ramped, such that the CPA is removed from the tissue in a controlled (e.g., gradual or step-wise) manner according to a desired unloading curve. CPA can be unloaded from the tissue sample. The unloading may occur after the tissue is rewarmed. After rewarming, the tissue holder chamber may be removed from the magnetic field coil, the vitrification hat may be removed, and the perfusion hat may be attached and sealed to the baseplate. The well may be filled with cryoprotectant, and the system may begin an unloading protocol to remove CPA from the tissue.

In the unloading protocol, CPA and carrier may be flowed over the tissue. The unload may start at a high CPA concentration (e.g., the maximum concentration CPA that had previously been loaded into the tissue), and the CPA concentration may be gradually ramped down to 0% (or pure carrier solution). The CPA concentration at the start of the unload may be greater than or equal to about 10% w/v, about 15% w/v, about 20% w/v, about 25% w/v, about 30% w/v, about 35% w/v, about 40% w/v, about 45% w/v, about 50% w/v, about 55% w/v, about 60% w/v, or more. The CPA concentration at the start of the unload may be about 10% w/v to about 20% w/v, about 20% w/v to about 40% w/v, about 40% w/v to about 60% w/v, or about 10% w/v to about 60% w/v. The CPA concentration at the start of the unload may be about 53% w/v. The slope of the ramp may vary based on procedure, tissue size, organ of the tissue, CPA used, carrier used, or any combination of these variables. The unloading protocol may be a ramp of concentration, several sections of ramps and holds in concentration, some other non-linear curve of concentration decrease, or some similar unloading protocol with a gradual and controlled decrease in CPA concentration over time. This may serve to maintain osmotic balance between the CPA and the tissue so that the cells in the tissue are not adversely impacted by water inflow or outflow due to osmotic gradients. Finally, the tissue slice may be held in pure carrier solution for various amounts of time.

The ramp from the max cryoprotectant concentration to pure carrier solution (unload) may be slower than the ramp up (load). This is because during the load, cells in the tissue may shrink due to higher solute concentrations outside of these cells, while during the unload, cells in the tissue may swell due higher solute concentrations within the cell. Cells may be more susceptible to mechanical damage from swelling than from shrinking, and the ramp rates during the load and unload may be tuned to minimize damage from swelling or shrinking.

Once unloading of cryoprotectants from the tissue is complete, the tissue may be removed from the perfusion well using a glass or plastic transfer pipette with the tip removed and may be incubated in a recovery solution (e.g., a cutting solution, aCSF, or a similar solution) at around room temperature or at 32° C. to 36° C. for 15 or more minutes. In an optional subsequent step, the tissue may then be transferred to another or the same recovery solution, which may be around room temperature, for 10 or more minutes. The recovery solution is formulated to encourage recovery from the cryopreservation process. The recovery solution may be a cutting solution, aCSF, or another similar solution. It may contain additional additives to slow or increase metabolism or otherwise counteract mechanisms of toxicity induced by cryoprotectant exposure and cryopreservation.

The unloaded pieces of tissue may be used to conduct research assays. Example assays include evaluating the tissue using electrical stimulation and pharmacological stimulation, patch clamp electrophysiology, calcium or voltage imaging, or other electrophysiological techniques. Other assays may include histological assays to assess cellular viability, metabolic and structural integrity, as well as other preservation of other cellular and subcellular components. Further, tissue samples may be utilized to assess enzymatic activity, mRNA expression, protein expression, or any other relevant molecular biological technique.

Tissue that has been preserved and rewarmed may be implanted into a patient. For example, ovarian tissue may be implanted to restore fertility after a patient has undergone gonadotoxic therapy.

Reversible Cryopreservation of Organs or Organisms

Figure 12:
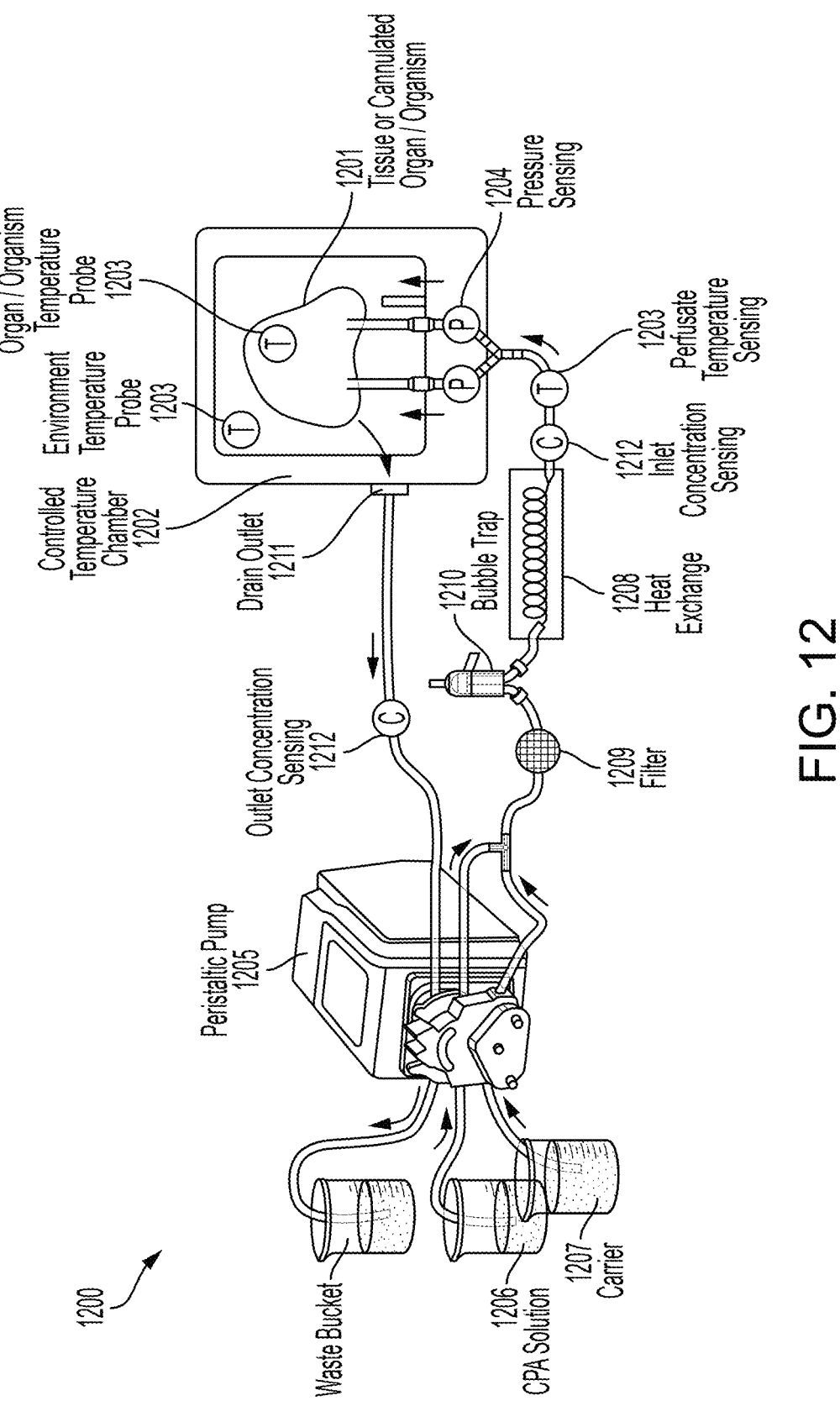
FIG. 12 illustrates a perfusion circuit in accordance with some embodiments described herein.

The present disclosure provides systems and methods for reversible cryopreservation of biological specimen, such as organs, systems of several organs, or organisms. A CPA perfusion circuit (e.g., as shown in FIG. 12) is used to load CPA. The CPA perfusion circuit may be configured to load CPA in a controlled manner before the biological specimen undergoes deep cooling. A temperature-controlled circulation of cold inert fluids through the biological specimen vasculature at a rate which may match external cooling rate may be used for deep organ cooling. The circulation may minimize thermal gradients that may cause cracking in cryopreserved organs or organisms while reducing rates of ice formation. Vitrification of the biological specimen may be achieved.

Once the biological specimen reaches a stable storage temperature (e.g., below about −125° C. or in liquid nitrogen at −196° C.), all biological processes may effectively stall. The biological specimen may remain in this state until the biological specimen is rewarmed and brought back to normothermic temperatures.

Rewarming may occur at a high rate to reduce the rate of ice formation and may bring the biological specimen back to a state of viability. Volumetric rewarming may use nanowarming techniques (e.g., heating up magnetic nanoparticles (MNPs) that were perfused into the biological specimen before vitrification). Warming methods such as perfusive warming, microwave warming, and ultrasonic warming may be employed. These approaches may be used alone or in combination with one another. The CPA perfusion circuit may be used to wash out the MNPs and CPAs from the vasculature after warming, restoring the biological specimen to a viable state.

Loading

A biological specimen can be loaded with CPA. If CPAs are introduced too quickly, osmotic damage may occur due to the water inside the cells rushing outside to balance molecular concentrations. The biological specimen can be perfused with CPA by slowly increasing CPA concentration, holding a steady CPA concentration, or some combination thereof. Slowly increasing concentration may minimize risk from osmotic shock. The temperature of the perfused biological specimen can be lowered to a range where metabolic activity decreases substantially. By lowering the temperature of the perfused biological specimen to a range where metabolic activity decreases substantially, the toxicity of the CPA may be reduced. 2-20° C. may be a range where the CPA toxicity is sufficiently low, and the biological specimen is not too close to subzero temperatures to risk forming ice crystals. This temperature may be achieved by perfusing controlled temperature CPA, such as CPA cooled to 2-20° C., through the vasculature. Additionally, cold environmental temperatures may be used to achieve uniform cooling of the biological specimen.

The CPA perfusion circuit may be configured to load the cryoprotective agent in a controlled manner before undergoing deep organ cooling. In some variations, a first cryoprotective agent may be introduced at a first temperature, and a second cryoprotective agent may be introduced at a second temperature. The first temperature and the second temperature may be temperatures where metabolic activity of the biological specimen is low, such as subzero temperatures, which may reduce toxicity of the cryoprotective agent(s). In other variations, a first cryoprotective agent may be introduced at a first time, and a second cryoprotective agent may be introduced at a second time, which may compensate for different loading times (e.g., perfusion rates) or toxicities of the various agents.

The CPA perfusion circuit can include a CPA and carrier mix waste stream. The CPA and carrier mix waste stream may be conditioned for re-use in a closed-loop flow configuration. The waste stream of the system may be filtered or otherwise cleaned to allow for re-use of these fluids. This may be particularly advantageous for large volume systems like organs and organisms, to reduce the amount of these fluids needed during the loading protocol.

Various types of containers may be used to hold the CPA and carrier during the loading protocol. The containers may be glass lab beakers or plastic lab beakers. The volume of these containers may be 1 L to 100 L for whole organ cryopreservation and 10 L to 10,000 L for whole-body cryopreservation. The containers may be chilled to temperatures around 2-20° C. in order to pre-chill the carrier and CPA solutions. The containers may be refrigerated, put on ice, or chilled by some other similar cooling method. The waste container may be a similar plastic or glass container.

The biological specimen may be housed in a container. The container may have perfusion lines running in and out of the container, to allow for easy inflow of perfusate and outflow of waste from the biological specimen.

The biological specimen may be housed in a chamber that may be temperature controlled, pressure controlled, and moisture controlled. Temperature control of the chamber may be accomplished by cold conditioning of the air inside the chamber, as is done in a refrigerator, or by circulating a cooled liquid through the walls of the chamber. This temperature-controlled chamber may serve to reduce the temperature external to the biological specimen to allow the biological specimen to remain in the range of 2-20° C. The temperature of the chamber may be monitored via a temperature sensor and may be controlled using a software-based controller. The controller may drive the temperature control by cooling or warming the circulating solution. The pressure of the chamber may be controlled by a hydraulic intensifier, a high pressure pump, or a screw mechanism. The moisture in the chamber may be monitored and controlled to ensure the biological specimen does not dry out and remains viable over the course of the loading protocol.

The CPA perfusion circuit may include one or more pumps (e.g., one or more peristaltic pumps or pneumatic systems). The pump may be used for loading both CPA and carrier as well as for draining. The pump may be a peristaltic pump. In some variations especially suited for small organs, the pump may be an Ismatec lab pump. In variations for large organs or organisms, the pump may be a centrifugal pump, such as a pump used for ECMO or a large peristaltic pump, like a heart-lung machine. PVC, Polyurethane, or similar plastic tubing may be used in the loading circuit.

The CPA perfusion circuit may comprise a filter, which may serve to screen out debris from the line before the fluid is perfused into the biological specimen. Additional filtration may be used in a closed-loop system architecture, where the waste stream is cleaned to be re-perfused through the biological specimen.

The CPA perfusion circuit may comprise a bubble trap. The bubble trap may serve to remove gas from the fluid in the system, particularly air bubbles that may cause air emboli if perfused into the biological specimen. The bubble trap may be a passive bubble trap, where bubbles migrate to the top of a chamber as they flow through the circuit. The bubble trap may be an active bubble trap, where a suction pump is used to pull air out of a fluidic circuit as the fluid passes through the bubble trap component. The bubble trap may also act as a heat exchanger; cold or warm coolant fluid may be circulated through the bubble trap to modulate the temperature of the fluid flowing through the bubble trap. This may serve to control the temperature of the fluid in the range of 2-20° C.

The CPA perfusion circuit may comprise one or more heat exchangers. The one or more heat exchangers may serve to modulate the temperature of the fluid in the circuit, particularly cooling the fluid in the circuit to a range of 2-20° C. Shell-and-tube, shell-and-coil, flat plate, or other similar heat exchanger architectures may be used. The thermal interface in the heat exchanger may be a thin piece of material to allow for high rates of thermal transfer, and the material may be metal (like aluminum, steel, or stainless steel) or glass. A large heat sinking source, such as a circulating coolant, may be run through the heat exchanger thermally interfaced with the CPA and carrier running through the circuit. The circulating coolant may be cooled or warmed to achieve a certain target temperature of the fluid in the CPA perfusion circuit or in the circulating coolant. A temperature sensor may monitor the temperature of the circulating coolant, the CPA/carrier in the circuit, or both. The reading of this temperature sensor may be used to modulate the cooling or heating of the circulating coolant in order to achieve a certain target temperature of the temperature sensor. The circulating coolant may comprise a fluidic circuit with (a) a pump (e.g., a centrifugal pump) used to circulate the coolant through one or more heat exchangers, (b) a cooling component, such as a compression cooling system or thermoelectric cooling system to cool the coolant, and (c) a heating element, such as a resistive heating element, to heat the coolant. The circulating coolant may flow through one or more bubble traps to cool the CPA and/or carrier mix passing through the bubble trap. The circulating coolant may flow through the controlled temperature chamber to control the temperature of the chamber.

Various sensors (e.g., temperature, pressure, concentration sensors, or similar physical sensors) may be used throughout the circuit to monitor performance and control the loading process. Temperature sensors may include thermocouples, especially type T or type K thermocouples, thermistors, RTD, and optical temperature sensors. Temperature sensors may be placed in the circuit line, either near the inlet, the outlet, or both, to monitor the temperature of the fluid going into or out of the biological specimen. The differential between the inlet and outlet temperature sensors may be used to determine the rate at which the biological system is cooling or warming. Other temperature sensors may be placed at various points throughout the system to monitor the temperature of the cooling chamber, the environment, the biological specimen, the heat exchanger(s), or any other number of thermally relevant points, some of which are discussed at other points in this document. Pressure may be monitored in the line using a pressure sensor to ensure the fluid is not inlet at a pressure that would damage the biological specimen. In high-pressure configurations, a pressure sensor may be used to monitor the pressure of the entire system, particularly the pressure the biological specimen is subjected to during the preservation procedure. The pressure sensor may be a gauge pressure sensor, a differential pressure sensor, an absolute pressure sensor, or similar pressure sensor and may use a displacement membrane to measure pressure. Concentration sensors may be used to measure concentration at various points in the system to ensure the biological specimen is being exposed to the correct concentration of CPA at various points in the procedure. Concentration sensors may be used at the inlet and/or the outlet of the system, and the differential between these sensors may be monitored to determine the amount of CPA being absorbed by the biological specimen. Concentration sensors may include refractometers, various types of chemical sensors, ultrasonic sensors, or other similar physical sensing mechanisms capable of detecting concentration changes in the fluid in the system. Other types of sensors may be used, such as flow sensors (e.g., ultrasonic flow sensors) to measure the flow rate in the line or bubble sensors, which may also make use of an ultrasonic sensing mechanism to detect if bubbles of gas are present in the fluid of the system. The bubble sensors, having detected a bubble, may be used to stop flow so that the bubble can be removed before the fluid reaches the biological specimen.

The circuit may be primed before use to ensure no air bubbles remain in the circuit before loading flow is started. Bubble traps may be included in the system to prevent bubbles from entering the biological specimen and blocking vascular paths.

Various valves may be used throughout the circuit to direct flow through various regions of the circuit.

Various cannulas may be used, and various cannulation strategies may be employed, which may be specific to the biological specimen being loaded. An inflow cannula may be placed in an arterial access point in the biological specimen, particularly a primary artery of an organ or organism. An outflow cannula may be placed in a venous access point in the biological specimen, particularly a primary vein of the organ or organism. Alternatively, an inflow cannula may be placed in an artery, and there may be no specific outflow cannula, but flow may exit the biological specimen from various open points in the vasculature. By cannulating the inflow artery and outflow vein, physiologic flow may be replicated through the biological specimen. The inflow and outflow may be from cannulas in arterial access points, the inflow and outflow may be from cannulas in venous access points, or some combination thereof. In some variations, particularly for organisms, multiple access inlet and outlet cannulas may be used to get well-distributed perfusion throughout the whole organism. An example variation for an organ, particularly the kidney, may involve cannulating the renal artery as the inlet and cannulating the renal vein as the outlet. An example variation for an organism may involve cannulating the femoral artery as an inlet and the femoral vein as an outlet. Another variation may involve cannulating the left or right ventricle or aorta as the inlet and the right atrium or vena cava as the outlet, allowing the perfusion circuit pump to effectively replace the heart when circulating fluid.

Many of the components described in this section, such as the pump, the circulating cooler, and the sensors, amongst others, may have electronic components that allow for programmatic interfacing with these components, so that these components can be sent signals by a controlling computer or send signals to a controlling computer. The computer may be capable of receiving the sensor values and storing these in memory. The computer may be capable of controlling the various controllable components, like the pump, and coordinating their function via software.

Figure 13:
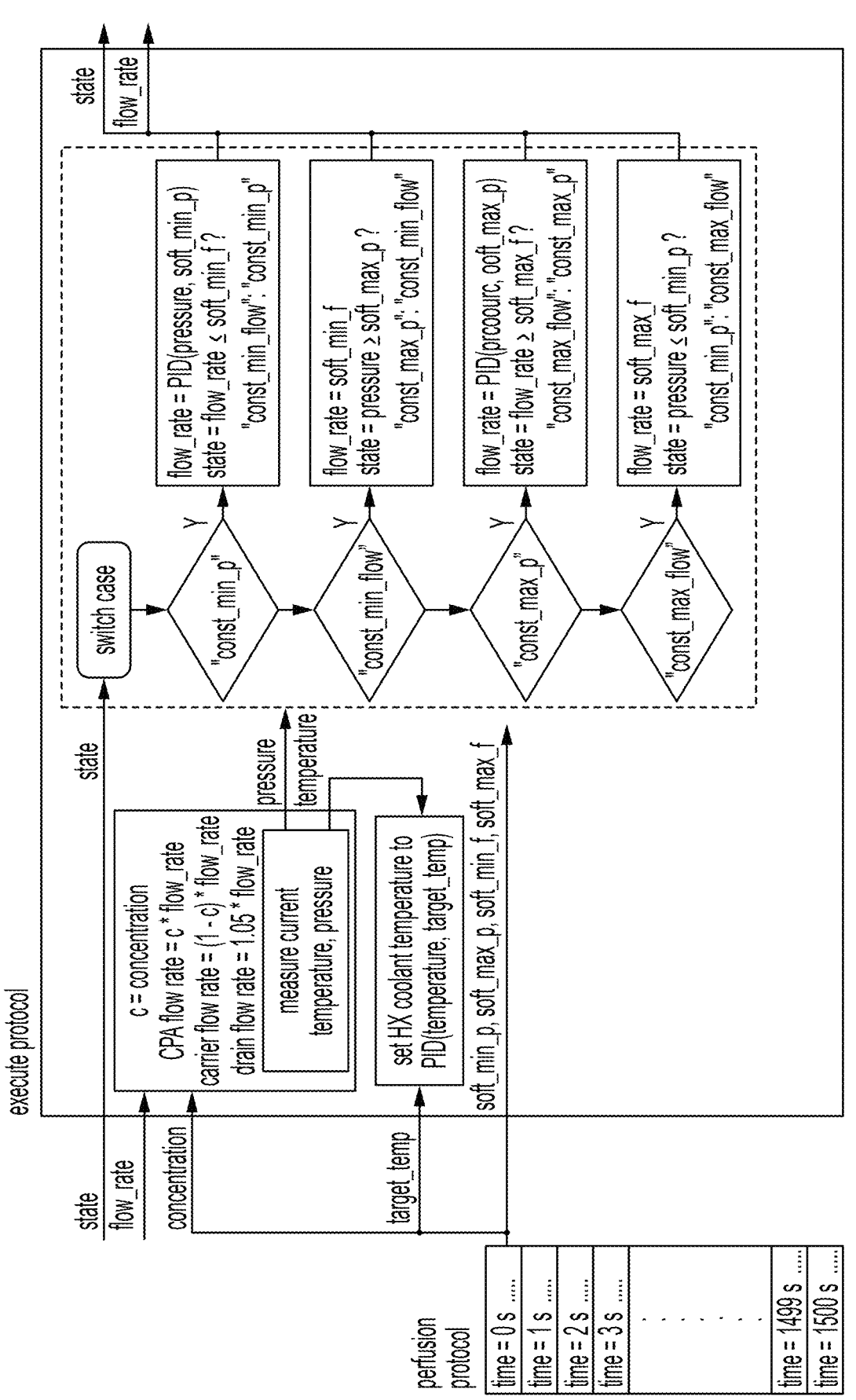
FIG. 13 illustrates a block diagram of a control system architecture for a CPA perfusion protocol in accordance with some embodiments described herein.

Software-based controllers running on computer hardware may be used to monitor the performance of the system and control various components. The computer hardware may be a computer processing chip and associated peripheral accessories or a similar processing architecture. These controllers may monitor and control temperature levels throughout the system, pressure levels throughout the system, concentration levels throughout the system, or some combination thereof. Data may be stored by the system on the computer hardware, such as timing data, temperature data, pressure data, or the like. A user interface may be displayed by the computer hardware on a screen and may show live readings of the temperature, pressure, concentration, time, and other system parameters. Graphing of these parameters may also be shown on this user interface, such as plotting temperature over time since the beginning of the loading. Specific software protocols, which may be specific to the tissue type, organ type, organism type, or some other defining characteristic of the system, may be used by the computer hardware to set the values of various parameters over the course of a loading protocol. Various control architectures like PID controllers, bang-bang control, conditionals, conditional PIDs, and machine learning architectures may be used to control the various parameters of the system. These controllers may be implemented in the software running on the computer hardware. CPA concentration ramp, pressure limits, and the target biological specimen temperature may be defined by a user in a protocol loaded into the software system controlling the perfusion circuit hardware. A control system architecture can be used (e.g., as shown in FIG. 13). Other similar controller architectures utilizing maximum and minimum limits of concentration, pressure, or temperature, may be used, and various parameters may be tuned for various biological specimen types.

Cooling

A biological specimen can be cooled. The cooling may occur after CPA loading. The cooling may cause vitrification. Vitrification may involve cooling a biological system so rapidly that the biological system turns into a glass and little to no ice crystals form and grow because the ice crystals do not have sufficient time to do so. Vitrification may require rapid and homogeneous temperature changes to preserve this biological system without ice formation or cracking. A cooling approach that is well distributed volumetrically throughout the biological specimen, a volumetric cooling approach, may allow for more homogeneous cooling throughout the biological specimen, which would serve to minimize the thermal gradients experienced by the biological specimen during cooling, greatly increasing the cooling rate possible without fear of cracking the biological specimen from temperature gradients. In comparison with existing methods of cooling organs or organisms, which often utilize just a controlled temperature chamber (e.g., a controlled rate freezer (CRF)), volumetric cooling methods may cool at much higher rates with shorter or no holding or annealing steps required to equalize temperature throughout the biological specimen (as is often done with CRF cooling methods), and therefore may prevent the formation of ice in the biological specimen better than the existing cooling methods.

Figure 14:
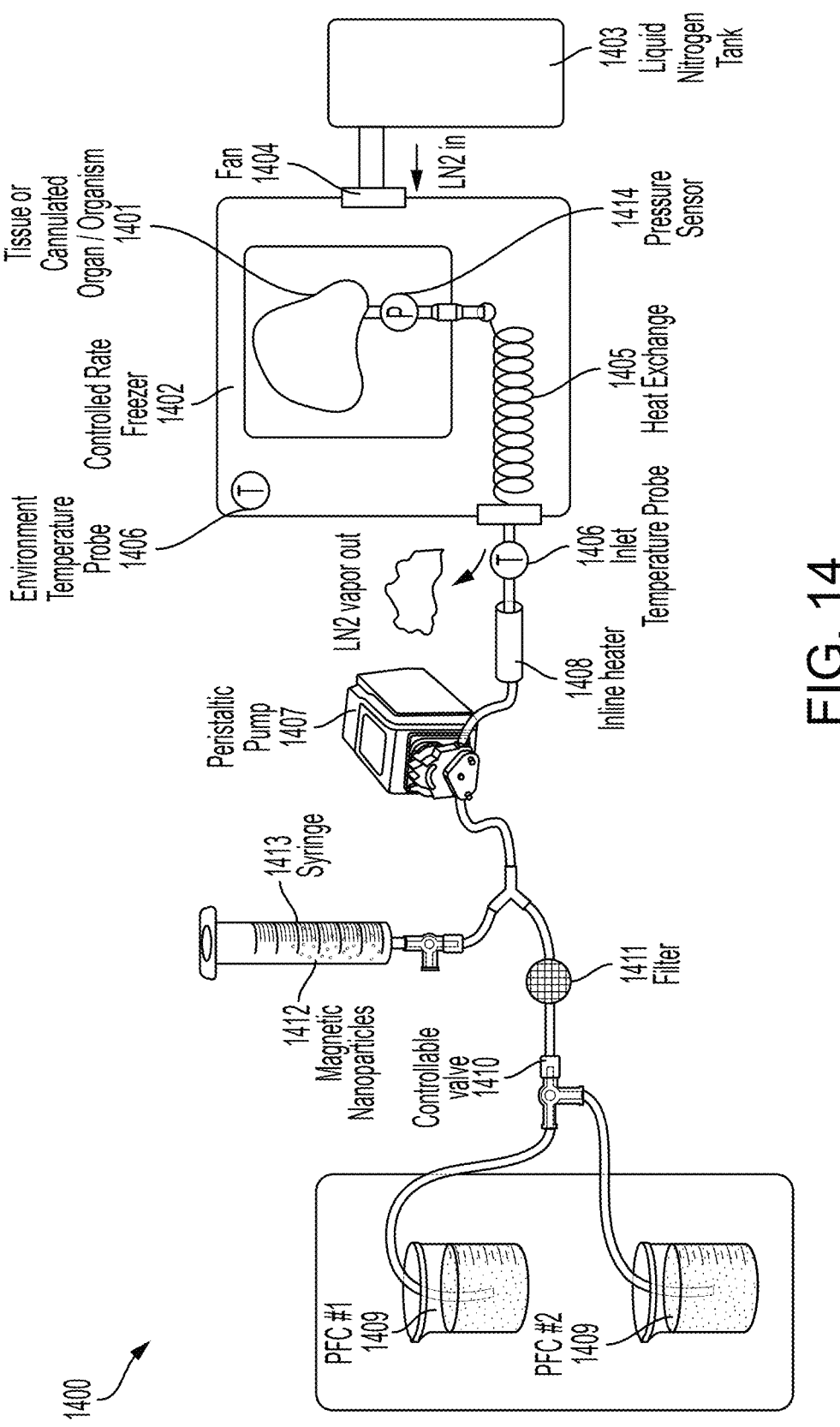
FIG. 14 illustrates a uniform volumetric cooling system in accordance with some embodiments described herein.

The cooling may occur substantially homogeneously. The cooling approach may be more volumetrically distributed when compared to conventional cooling methods. For example, perfusion of an inert fluid throughout a biological specimen may be used. The inert fluid may cool the biological specimen internally, as the inert fluid flows through the vasculature of the biological specimen, while the environment around the biological specimen may be cooled at a similar rate as the internal temperature (e.g., by a CRF) to minimize thermal gradients experienced by the biological specimen. The perfusive cooling may use the vascular network inside the biological specimen to distribute heat throughout the biological specimen as a cooled fluid (liquid or gas) is flowed through the vasculature. In some variations, a uniform volumetric cooling system (e.g., as shown in FIG. 14) is used.

In some variations, the volumetric cooling system may comprise heat exchangers. Heat exchangers may serve to modulate the temperature of the fluid in the circuit, particularly cooling the fluid in the circuit to a range of about −196° C. to 20° C. Shell-and-tube, shell-and-coil, flat plate, or other similar heat exchanger architectures may be used. The thermal interface in the heat exchanger may be a thin piece of material to allow for high rates of thermal transfer, and the material may be metal (e.g. aluminum, steel, or stainless steel), plastic, or glass. A large heat sinking source, such as a circulating cryogen or vapor phase cryogen like liquid nitrogen vapor, may be run through the heat exchanger thermally interface with the inert fluid running through the circuit. The heat sinking source, such as liquid nitrogen vapor, may be pumped through the heat exchanger to cool the inert fluid, such as by using a suction pump or by opening a valve to a pressurized container of liquid nitrogen such that the liquid nitrogen vapor flows through the heat exchanger. The rate of cooling may be modulated by changing the flow rate or temperature of cryogen being flowed through the heat exchanger. A temperature sensor may monitor the temperature of the heat exchanger, the inert fluid in the circuit, both, or some other area of thermal interest. The reading of this temperature sensor may be used to modulate the cooling or heating of the heat sinking source in order to achieve a certain target temperature of the temperature sensor. One or more heat sinking sources may be used with one or more heat exchangers to achieve the deep cooling required.

The volumetric cooling system may comprise an inline heater. The inline heater (e.g., an inline resistance heater) may be used to control the temperature of the inert fluid flowing through the line. The inline heater may be controlled via control software attached to computer hardware, and more or less current may flow through the resistive heating element of this inline heater, allowing for more or less heating of the inert fluid flowing through the line.

The inert fluids may be pre-chilled before the protocol to 4° C. or a similar starting temperature to reduce the cooling needed during the perfusive cooling step of this procedure. If more than one inert fluid is used, particularly if one will begin being perfused when the biological specimen is at sub-zero temperatures or temperatures lower than 4° C., the inert fluid may be pre-chilled to a lower starting temperature to reduce the cooling required by other heat exchange mechanisms.

The volumetric cooling circuit may comprise a filter, which may serve to screen out debris from the line before the fluid is perfused into the biological specimen. Additional filtration may be necessary in a closed-loop system architecture where the waste stream is cleaned to be re-perfused through the biological specimen.

The volumetric cooling system may comprise one or more pumps (e.g., one or more peristaltic pumps or pneumatic systems). The pump may be used for loading inert fluid, as well as draining inert fluid after use. The pump may be a syringe pump, peristaltic pump, or similar pumping architecture. A syringe pump with a large syringe loaded with inert fluid may be sufficient to pump inert fluid throughout the biological specimen during the perfusive cooling process. In some variations, particularly for large organs or organisms, the pump may be a centrifugal pump, such as a pump used for ECMO or a large peristaltic pump, like a heart-lung machine. PVC, Polyurethane, or similar plastic tubing may be used in the perfusive circuit. The tubing may be insulated, to prevent thermal loss to the environment when cooling.

Various sensors (e.g., temperature, pressure, concentration sensors, or similar physical sensors) may be used throughout the system to monitor performance and control the cooling process. Temperature sensors may include thermocouples, especially type T or type K thermocouples, thermistors, RTD, and optical temperature sensors. Temperature sensors may be placed in the system, either near the inlet, the outlet, or both, to monitor the temperature of the fluid going into or out of the biological specimen. The differential between the inlet and outlet temperature sensors may be used to determine the rate at which the biological system is cooling or warming. Other temperature sensors may be placed at various points throughout the system to monitor the temperature of the controlled temperature chamber, the environment, the biological specimen, the heat exchanger(s), or any other number of other thermally relevant points, some of which are discussed at other points in this document. Pressure (e.g., vascular pressure) may be monitored in the line using a pressure sensor to ensure the fluid is not inlet at a pressure that would damage the biological specimen. In high-pressure configurations, a pressure sensor may be used to monitor the pressure of the entire system, particularly the pressure the biological specimen is subjected to during the preservation procedure. The pressure sensor may be a gauge pressure sensor, a differential pressure sensor, an absolute pressure sensor, or similar pressure sensor and may use a displacement membrane to measure pressure. Concentration sensors may be used to measure concentration at various points in the system to ensure the biological specimen is being exposed to the correct inert fluid or mix of inert fluids at various points in the procedure. Concentration sensors may be used at the inlet and/or the outlet of the system, and the differential between these sensors may be monitored to determine if CPA is leaving the biological specimen. Concentration sensors may include refractometers, various types of chemical sensors, ultrasonic sensors, or other similar physical sensing mechanisms capable of detecting concentration changes in the fluid in the system. Other types of sensors may be used, such as flow sensors to measure the flow rate in the line which may be ultrasonic flow sensors, or bubble sensors, which may also make use of an ultrasonic sensing mechanism to detect if bubbles of gas are present in the fluid of the system. The bubble sensors, having detected a bubble, may be used to stop flow, so that the bubble can be removed before the fluid reaches the biological specimen.

A controlled pressure environment (e.g., a high-pressure environment) can be used alone or in combination with the volumetric cooling to suppress formation of ice. This high-pressure approach may enable vitrification at lower cooling rates and lower concentrations of cryoprotectants, reducing the toxicity typically associated with these substances.

Viscosity may be adjusted during cooling. Adjusting viscosity during the cooling may enhance the cryopreservation of tissue, organs and organisms. A higher viscosity inert fluid may be needed at the beginning of the volumetric cooling to flush out the high viscosity CPA in the vasculature, especially the small vasculature. The viscosity of the inert fluid may be lessened over time, such as by mixing in a lower viscosity inert fluid into the perfusate, in order to maintain sufficiently high flow rates to cool the biological specimen as high viscosity may be detrimental to maintaining high flow rates at reasonable or safe pressure levels, particularly at low and sub-zero temperatures.

Although the majority of the information provided in this present disclosure describes a liquid fluid for perfusive cooling, it should be understood that a gaseous fluid may also be used for perfusive cooling (e.g., persufflation). A gas (e.g., an inert gas like helium, argon, krypton, neon, or similar, or a gaseous cryogen like nitrogen) may be chilled and pumped through the biological specimen vasculature as the perfusive coolant. The systems as described herein may be used for persufflative cooling. A gaseous cooling agent may be advantageous in that the gaseous cooling agent does not experience increased resistance to flow to the same magnitude as a fluid cooling agent does at low and sub-zero temperatures, especially in the range of 4° C. to −180° C. This may allow for higher flow rates of gaseous cooling agents to be perfused relative to liquid cooling agents. A substance that is an inert gas under standard conditions (e.g., room temperature) may be used. The inert gas may be liquefied using a high-pressure chamber before perfusion.

The volumetric cooling system may comprise a controlled temperature environment. The controlled temperature environment (e.g., a controlled rate freezer) may be important for maintaining the external temperature of the biological specimen during perfusive cooling. The controlled temperature chamber may operate by pumping a cryogen (e.g., liquid nitrogen) from a connected cryogen source (e.g., a dewar) into the chamber. A fan may spread the cold cryogen throughout the chamber in which the biological specimen may be placed to cool the biological specimen down from temperatures around room temperature to temperatures around −180° C. externally. This external cooling may be done in conjunction with perfusive volumetric cooling. This external cooling may be done at a controlled rate in the range of −10° C./min to −10,000° C./min, which may be controlled by an external controller. The external controller may use a temperature sensor to monitor the temperature in the chamber and control the cryogen flow rate through the chamber to control the rate of cooling. The cryogen flow may be controlled by opening or closing a valve, by controlling the blower through the chamber, by controlling the pressure in the dewar, some combination thereof, or a similar cooling rate control approach.

In some variations, especially for smaller tissue samples, the controlled temperature environment may be used in isolation from the perfusive cooling system. In these variations, additionally annealing steps may be provided during cooling to allow the equalization of temperature throughout the biological specimen. Although this may produce some amount of undesirable ice formation during this anneal step, this process may work well enough for some organs or organisms' preservation.

Various cannulas may be used, and various cannulation strategies may be employed, which may be specific to the biological specimen type being cooled. The same cannulation points and cannulas previously used for the loading step may be used. An inflow cannula may be placed in an arterial access point in the biological specimen, particularly a primary artery of an organ or organism. An outflow cannula may be placed in a venous access point in the biological specimen, particularly a primary vein of an organ or organism. Alternatively, an inflow cannula may be placed in an artery, and there may be no specific outflow cannula, but flow may exit the biological specimen from various open points in the vasculature. By cannulating the inflow artery and outflow vein, physiologic flow may be replicated through the biological specimen. The inflow and outflow may be from cannulas in arterial access points, the inflow and outflow may be from cannulas in venous access points, or some combination thereof. In some variations, particularly for organisms, multiple access inlet and outlet cannulas may be used to get well-distributed perfusion throughout the whole organism. An example variation for an organ, particularly the kidney, may involve cannulating the renal artery as the inlet, and cannulating the renal vein as the outlet. An example variation for an organism may involve cannulating the femoral artery as an inlet and the femoral vein as an outlet. An alternative organism variation may involve cannulating the right heart or aorta as the inlet and the right atrium or vena cava as the outlet, allowing the perfusion circuit pump to effectively replace the heart when circulating fluid.

Many of the components described herein, such as the pump, the controlled temperature chamber, and the sensors, amongst others, may have electronic components that allow for programmatic interfacing with these components so that these components may be sent signals by a controlling computer or send signals to a controlling computer. The computer may be capable of receiving the sensor values and storing these in memory. The computer may be capable of controlling the various controllable components, like the pump, and coordinating their function via software.

Software-based controllers running on computer hardware may be used to monitor the performance of the system and control various components, often based on user input parameters. The computer hardware may be a computer processing chip, and associated peripheral accessories, or a similar processing architecture. These controllers may monitor and control temperature levels throughout the system, pressure levels throughout the system, concentration levels throughout the system, or some combination thereof. Data may be stored by the system on the computer hardware, such as timing data, temperature data, pressure data, or the like. A user interface may be displayed by the computer hardware on a screen and may show live readings of the temperature, pressure, concentration, time, and other system parameters. Graphing of these parameters may also be shown on this user interface, such as plotting temperature over time since the beginning of the cooling process. Specific software protocols, which may be specific to the tissue type, organ type, organism type, or some other defining characteristic of the system, may be used by the computer hardware to set the values of various parameters over the course of a loading protocol. Various control architectures like PID controllers, bang-bang control, conditionals, conditional PIDs, and machine learning architectures may be used to control the various parameters of the system. These controllers may be implemented in the software running on the computer hardware. Specific cooling profiles may be some of the specific software protocols used by the system and may control both the external cooling and internal cooling of the biological specimen. Annealing steps may be present in these cooling protocols if temperature equilibration is required at certain steps during the preservative cooling process.

In an example, ice crystals may be detected by a high-resolution computed tomography scan while the tissue is held at the preservation temperature. For example, high resolution photon counting x-ray CT (PC-CT) or micro-CT (µCT) may be used to detect ice crystals while the tissue is held at the preservation temperature. In another example, high resolution photon counting PC-CT or µCT may be used to detect ice crystals at one or more periods during the cooling and warming profile to adjust at least one of the pressure or temperature profiles. Rotating the sample relative to the detector may allow for high resolution visualization of ice in 3D across an entire tissue specimen. In another example, ice within a tissue specimen held at storage temperature may be detected in situ by X-ray diffraction (XRD), in which a collimated X-ray beam (e.g., 0.5-1.5 Å wavelength) is directed through the sample and diffracted rays are collected on a two-dimensional area detector; the appearance of characteristic Bragg peaks confirms ice formation, while peak intensities, widths, and shapes yield quantitative measures of ice fraction, crystal size, and strain. Beam exposure and dose are controlled to avoid warming above the glass transition.

High pressure may be used in combination with this cooling step to suppress ice formation during cryopreservation or to maintain a desired phase of the perfusate, enabling a vitrification process where water in biological specimen transitions to a glass-like state, which may significantly mitigate damage. High pressures may be delivered by placing the biological specimen in a pressure chamber, and the pressure of the pressure chamber may be elevated up to 200 MPa. One or more pressure sensors may be used to monitor the pressure of this high-pressure system, and these sensors may be used for controlling the pressure of the biological specimen to pre-specified levels or to levels input by a user. Cooling of the pressure chamber may be completed by blowing cryogens over the pressure chamber or inside the pressure chamber with a pressurized flow line into the pressure chamber. Cooling may also be done by submerging the pressure chamber in a cryogen, like liquid nitrogen or liquid helium. The perfusive cooling system may also be designed such that the perfusive cooling system is capable of operating in a high-pressure environment and performing perfusive cooling while the biological specimen is held at high pressure levels. A pressure generating mechanism (e.g., a screw-based system or hydraulic system) may be used to generate, hold, and release pressure on the biological specimen. A pressurizable fluid, such as a bioinert incompressible fluid, may be placed in the pressure chamber to transmit pressure inside the pressure chamber. Air cavities or other cavities in the biological specimen may be filled with a bioinert incompressible fluid to prevent collapse of these cavities at high pressure. Both temperature and pressure sensors, in addition to other sensors, may be used to monitor this system, and both temperature and pressure may be controllable by a computer running control software.

The systems as described herein (e.g., system for perfusive cooling, high pressure, and persufflation) may be used alone, or together, in any combination.

Storing

In some variations, a biological specimen is stored at low temperature. Once the biological specimen has been cooled down to liquid nitrogen temperature or similar cold storage temperature, the biological specimen may be transferred to a controlled temperature chamber, such as a dewar or freezer, for long-term storage.

The biological specimen may be stored in a dewar filled with liquid nitrogen. The biological specimen may be placed in a bag or other protective container before being placed in the liquid nitrogen to ensure the liquid nitrogen does not adversely affect the biological specimen. The bag may be suctioned to reduce the space between the surface of the organ and the liquid nitrogen outside the bag.

The biological specimen may alternatively be stored in a controlled temperature freezer, the temperature of which may be held in a range of −100° C. to −196° C. The temperature may be held at or just below the glass transition temperature of the system to ensure the vitrified sample remains in a glass state. It may be advantageous to hold the whole-organ or whole-organism at a temperature just below the glass transition temperature of the whole-organ or whole-organism to minimize the thermal gradients imposed on the biological specimen in the glass state.

The biological specimen may be monitored during cooling and/or during storage using sensors (e.g., temperature sensors, pressure sensors, acoustic sensors). Temperature sensors may be used to ensure the temperature of the preserved biological specimen does not change unexpectedly and does not warm above a range of temperatures that would cause ice formation or otherwise damage the biological specimen. Pressure sensors may serve a similar purpose, to detect if any anomalous changes have occurred in the system. Acoustic sensors may be used to detect cracking of the biological specimen during preservation to understand if this failure mode has occurred during cooling as cracking of the biological specimen would affect the viability of the biological specimen after the biological specimen has been rewarmed and unloaded.

Other ways of storing the biological specimen at low temperatures may be employed, and the methods of storage described herein may be used alone or in combination.

Rewarming

The biological specimen can be rewarmed. The rewarming may be homogenous. For whole organs or whole organisms, rewarming may be volumetric warming (e.g., alternating magnetic field warming via magnetic nanoparticles that were perfused into the biological system during either loading or cooling). Other methods of volumetric warming include perfusive warming, microwave warming, ultrasound warming, and other similar warming methods. The external environmental temperature around the biological specimen being rewarmed may also be controlled and warmed in sync with the warming of the biological specimen to minimize temperature gradients across the biological specimen that could lead to cracking.

High pressure can be used in combination with warming methods described here to suppress ice formation during rewarming from cryopreservation.

Figure 15A:
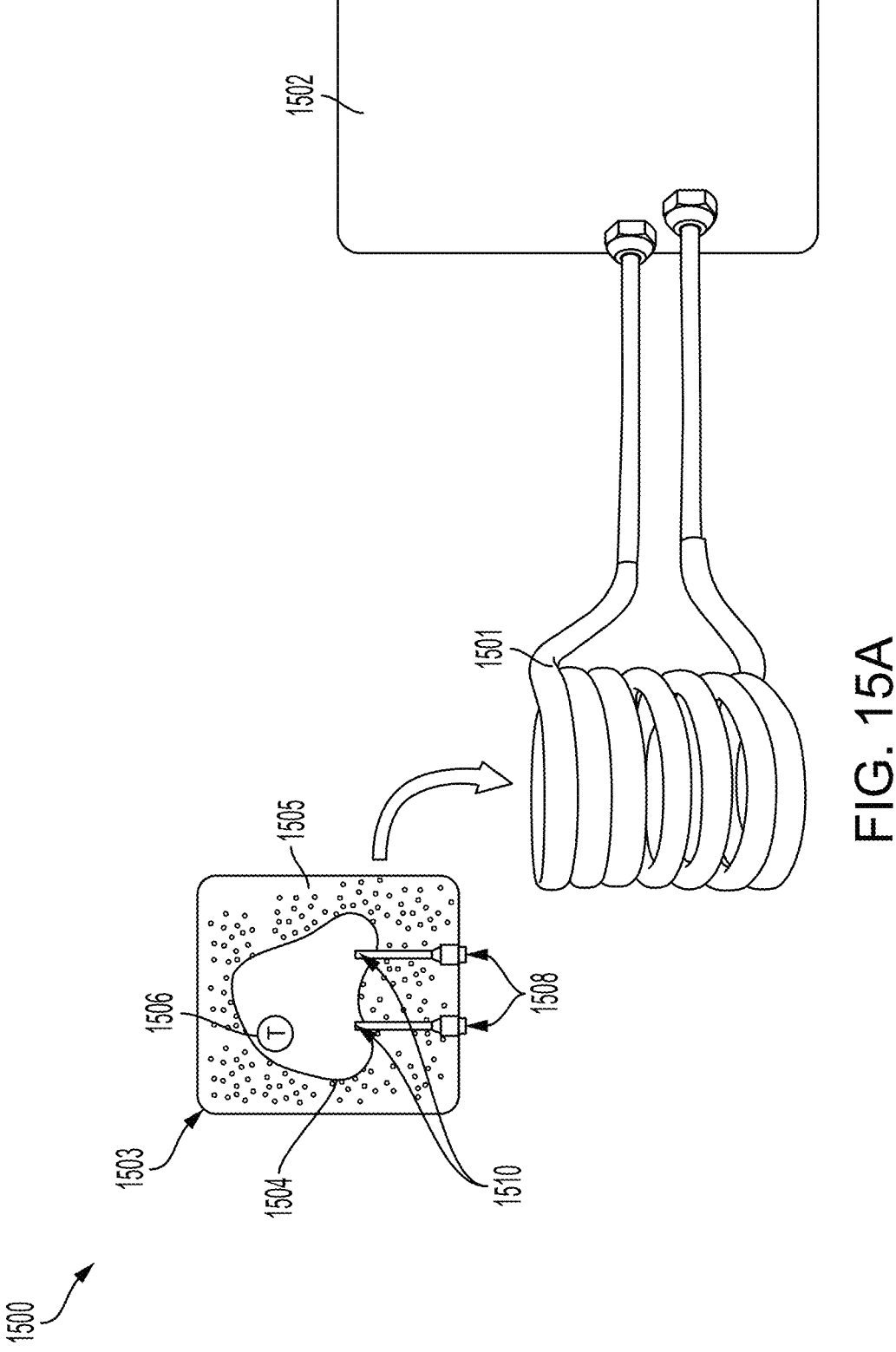
FIG. 15A illustrates a rewarming station in accordance with some embodiments described herein.

When the biological specimen is ready to be retrieved from the long-term storage, the biological specimen may be transferred to a rewarming station (e.g., as shown in FIG. 15A). The rewarming station may comprise an inductive heater with a magnetic field coil (e.g., a copper coil) that is used to generate an AMF in the magnetic field coil. The strength of the AMF may be greater than or equal to about 5 kA/m, about 10 kA/m, about 15 kA/m, about 20 kA/m, about 30 kA/m, about 40 kA/m, about 50 kA/m, about 60 kA/m, about 80 kA/m, about 100 kA/m, or more. The strength of the AMF may be about 5 kA/m to about 10 kA/m, about 10 kA/m to about 20 kA/m, about 20 kA/m to about 50 kA/m, about 50 kA/m to about 100 kA/m, or about 5 kA/m to about 100 kA/m. The strength of the AMF may be greater than 20 kA/m. The frequency of the AMF may be greater than or equal to about 10 kHz, about 20 kHz, about 40 kHz, about 60 kHz, about 80 kHz, about 100 kHz, about 120 kHz, about 150 kHz, about 200 kHz, about 250 kHz, about 300 kHz, about 400 kHz, about 500 kHz, about 600 kHz, about 800 kHz, about 1 MHZ, about 2 MHz, about 3 MHZ, about 4 MHZ, about 5 MHz, about 6 MHz, about 8 MHz, about 10 MHz, about 12 MHz, about 15 MHz, about 20 MHz, about 30 MHz, about 40 MHz, about 50 MHz, about 60 MHz, about 80 MHz, about 100 MHz or more. The frequency of the AMF may be about 10 kHz to about 100 kHz, about 100 kHz to about 500 kHz, about 500 kHz to about 1 MHz, about 1 MHz to about 5 MHz, about 5 MHz to about 10 MHz, about 10 MHz to about 50 MHz, about 50 MHz to about 100 MHz, or about 10 kHz to about 100 MHz. The frequency of the AMF may be about 100 kHz to about 50 MHz. The magnetic field coil may be sized close to the dimensions of the biological specimen to maximize efficiency of heating. When the vasculature has been filled with magnetic nanoparticles, volumetric rewarming may be achieved by turning on the inductive heater. The heater may be controlled accurately with a PID controller or similar controller architecture (e.g. bang-bang, conditional, conditional PID, machine learning) changing the intensity of heating depending on the current temperature.

The magnetic field coil may be wired as a parallel tank resonator or a series resonator. The sizing of the magnetic field coil may be tailored to the sizing of the specimen being preserved and rewarmed in order to ensure high magnetic field strengths throughout the sample. The magnetic field coil may be an air-cored solenoid or a toroidal coil with an air gap for field concentration.

Particles with higher specific loss power than magnetite (e.g., MnCoFe core-shell nanoparticles) may be used for nanowarming to achieve enhanced warming rates. Various coatings may be applied to nanoparticles to enhance their biocompatibility and heating efficacy. Nanoparticles of different sizes may be used, such as magnetic nanoparticles in the 10 nm to 200 nm diameter range.

The nanoparticles may be both loaded into the biological system and placed in the container holding the biological system, often completely submerging the biological system in the nanoparticle containing medium, such that the volume of fluid around the biological specimen is heated uniformly with the biological system. The concentration of nanoparticles in the fluid surrounding the biological system may be lower than that in the vasculature of the biological specimen to ensure more even warming as the nanoparticles are concentrated in the vasculature, not distributed evenly throughout. The container may have ports to fill the container with nanoparticle-containing media around the biological specimen before warming and drain the nanoparticle containing media from around the biological specimen after warming.

Perfusive warming may also be used to volumetrically warm the biological specimen. The perfusive warming system may be similar to the inert fluid cooling system described above. The perfusive warming system may warm from around glass transition temperature to above freezing. Inert fluids that are liquid in these temperature ranges may be used and heated using a heat exchanger. This system may be used in a controlled temperature environment to ensure the external temperature of the biological specimen remains similar to the temperature inside the biological specimen to not create thermal gradients.

Microwave heating may be used to heat the biological specimen with some volumetric homogeneity. Ultrasound heating, heating via focused ultrasonic energy, may be to heat the biological specimen with some volumetric homogeneity.

Any of the above volumetric warming methods may be used alone or in combination with other methods. Particularly, perfusive warming with a perfusate containing magnetic nanoparticles placed in an alternating magnetic field may be particularly advantageous as the perfusive warming and nanoparticle warming may together achieve a higher warming rate than either alone.

Sensors, such as temperature sensors, may be used to monitor the temperature and/or warming rate of the biological specimen during rewarming. Optical temperature probes may be ideal for this, as their measurement is not altered by magnetic fields, however it has been shown that thermocouples measurement only changes a small amount in this magnetic field. Either may be used to measure temperature during the course of rewarming. A controller implemented by a computer-based system running controller software may be used to monitor the temperature from the sensor and control the inputs to the AMF generator to control the rate of warming. A target temperature profile may be input into the software, specifying parameters like warming rate and hold times at various temperatures. The controller may be able to control the temperature during the warm in correspondence with the input temperature profile.

The biological specimen rewarming may also be carried out at high pressure to reduce the rate of ice formation. The biological specimen may be placed in a pressure chamber, and the chamber may be pressurized to a level that reduced the rate of ice extension significantly. One or more pressure sensors may be used to monitor pressure in the pressure chamber, and these sensors may serve as input to a computer-based control system that can control pressure in the pressure chamber based on some input target pressure or pressure profile. The pressure chamber may be heated internally using an AMF and nanoparticles. The pressure chamber may also be warmed externally with warm fluid heating up the outside of the pressure chamber. Air cavities in organs with air cavities, as well as air cavities in organisms, may be filled with bioinert incompressible fluid to ensure these cavities do not collapse and damage this portion of the body during high-pressure cryopreservation.

Unloading

A biological specimen may be rewarmed. Once the biological specimen has been rewarmed to hypothermic temperature (2-20° C.), unload perfusion may be used to diffuse CPA out of the organ or organism and optionally wash out the nanoparticles. The same or a similar system described in the loading section may be used to unload the CPA and MNPs from the organ or organism. In the unload case, the concentration of CPA may decrease over the course of the unload. Various cryoprotective agents and/or CPAs may be unloaded at different times and temperatures to reduce cryoprotective agent toxicity. For instance, a first cryoprotective agent may be unloaded at a first temperature, and a second cryoprotective agent may be unloaded at a second temperature. The concentration of the cryoprotective agent (s) and/or CPAs in the biological specimen may also vary over time and temperature during unloading. For instance, a concentration of one or more cryoprotective agents or CPAs may be reduced to a first concentration at a first time or at a first temperature during unloading. The concentration of the one or more cryoprotective agents or CPAs may be further reduced to a second concentration at a second time or at a second temperature during unloading.

Cryoprotective Solutions

In one aspect, the present disclosure provides cryoprotective solutions (CPA solutions). The cryoprotective solutions comprise a cryoprotective agent and/or a carrier solution. Cryoprotective solutions may comprise a single solution or may be a mixture or combination of multiple solutions. For example, cryoprotectants and/or carrier solutions may be used in any combination of existing cryoprotectants, existing carrier solutions, novel cryoprotectants, and novel carrier solutions. The cryoprotectants and/or carrier solutions used may be dependent on the type of cell, tissue, organ, or organism being cryopreserved.

A CPA and/or carrier solution as described herein may be loaded into the biological specimen before cryopreservation. A CPA and/or carrier solution may surround the biological specimen before cryopreservation. Various cryoprotectant agents in the CPA may be loaded at different times during a loading procedure. For example, an agent that is loaded into the specimen more slowly may be introduced earlier during the loading procedure. Agents that can be loaded into the specimen more quickly may be introduced at a later time during the loading procedure. Accordingly, the introduction and concentration of various cryoprotective agents in the CPA (or different CPAs) may be controlled, modified, increased, or decreased during loading of the biological specimen. In various examples, the introduction of different cryoprotective agents or CPAs may be staggered such that various agents are introduced at different times. The introduction or concentration of various cryoprotective agents or CPAs may be timed according to a predefined timing scheme and/or controlled dynamically during loading of the biological specimen.

In one aspect, the present disclosure provides a method of creating a cryoprotective emulsion. The method may include injecting a cryoprotective agent into a carrying fluid, where the injection is configured to create a cryoprotective emulsion. In an example, the carrying fluid may be an inert compound such as Perfluorocarbons. In an aspect, inert compounds may be useful for bio-compatibility and flow well at low temperatures.

Cryoprotective Agents (CPAs)

Generally, cryoprotective agents (CPAs) or cryoprotectants are substances that may be used to prevent damage to a biological sample during any aspect of cryopreservation (e.g., freezing or thawing). Example CPAs or CPA solutions include but are not limited to VMP and VS55 (as described in Han et al. 2023, "Vitrification and nanowarming enable long-term organ cryopreservation and life sustaining kidney transplantation in a rat model"), VM3 and Veg (as described in Pichugin et al. 2006, "Cryopreservation of rat hippocampal slices by vitrification"), M22 (as described in Fahy et al. 2004, "Cryopreservation of organs by vitrification: perspectives and recent advances"), MEDY (methylcellulose, ethylene glycol, DMSO, and Y27632 as described Xue, Weiwei, et al. "Effective cryopreservation of human brain tissue and neural organoids." Cell Reports Methods 4.5 (2024)) or other CPAs known by a person of skill in the art. Alternatively, CPA solutions may comprise a novel CPA disclosed herein. In some instances, the CPAs disclosed herein may be chemically modified. In some instances, both chemically modified and unmodified CPAs may be used.

A CPA and/or carrier solution may change the critical cooling rate (CCR). In an aspect, the CCR is based on a rate at which only a tolerable amount of ice forms. The CPA and/or carrier solution may increase the CCR. The CPA and/or carrier solution may decrease the CCR.

The CPA and/or carrier solution may change the critical warming rate (CWR). The CPA and/or carrier solution may increase the CWR. The CPA and/or carrier solution may decrease the CWR. In an aspect, the CWR is based on a rate at which only a tolerable amount of ice forms.

In some variations, a temperature for a maximum rate of ice nucleation may be colder than the temperature for the maximum rate of ice extension. On cooling, ice may not have nucleated as the temperature passes through a zone of maximum ice extension. However, on rewarming, as nucleation may have already occurred during cooling and more nucleation may occur as the biological specimen is warmed through the zone of maximum ice nucleation, all of this nucleated ice, from both cooling and the beginning of rewarming, may begin expanding as the temperature continues to rise and passes through the zone of maximum ice extension. For this reason, CWR may be higher than CCR.

A CPA may prevent ice formation directly or indirectly, which may therefore prevent freezing damage. Direct ice prevention mechanisms may include, e.g., interactions with ice crystals and/or inhibition of nucleation or recrystallization. Indirect ice prevention mechanisms may include, e.g., altering water properties, reducing the freezing point of a fluid, increasing the viscosity of a fluid, or producing colligative effects. Example cryoprotectants with primarily ice-inhibiting mechanisms of action may include polyols (e.g., alcohols, glycols, glycerols, tetrols, monosaccharides, polysaccharides, sugar alcohols), deep eutectic solvents (e.g., combinations of choline chloride, galactose, proline, betaine), peptoids and peptide analogues (e.g., Polyvinyl alcohol), amides (e.g., methanamide, ethanamide, butana-
mide), polyampholytes (e.g., carboxlated ε-poly-1-lysine),
betaines (e.g., trimethylglycine, stachydrine, sarcosine
betaine), surfactants (e.g., n-octyl-β-D-galactopyranoside),
methylamine osmolytes (e.g., trimethylamine N-oxide),
amino acids (e.g., cysteine, glutamine, histidine, proline,
beta-alanine, ε-aminocaproic acid, γ-aminobutyric acid), or
betaines (Trimethylglycine, stachydrine, sarcosine betaine).

The CPA may be a baroprotectant molecule. Example
baroprotectant molecules include but are not limited to
sugars, polyols and other compounds like Glycerol, Trim-
ethylamine-N-oxide, and nitric oxide. Baroprotectant mol-
ecules may be used in combination with high-pressure
approaches and may mitigate the effects of high-pressure on
the biological specimen. Baroprotectant molecules may be
used under atmospheric pressure conditions. Baroprotectant
molecules that do not confer cryoprotective effects may be
used (e.g., under elevated pressure conditions where the
baroprotectant molecule is only for baroprotective effect).

The CPA may have a biochemical mechanism of action.
Example CPA with biochemical mechanisms of action
include but are not limited to anti-inflammatories, anti-
oxidants (e.g., L-Ascorbic Acid, alpha-tocopherol, proline,
histidine, cysteine, lysine, beta-carotene, retinol, melatonin,
oestrogen, glutathione, uric acid, lipoid acid), aquaporin
blockers, aquaporin enhancers, calcium-channel blockers,
antiexcitotoxic compounds, cell-death inhibitors (e.g.,
caspase inhibitors), ROCK inhibitors (Y27632), and nitro-
sative stress inhibitors.

A CPA may be chemically modified or otherwise func-
tionalized. Chemical modification or functionalization may
modulate the direct and/or indirect ice-inhibiting activity of
the modules or alter other properties, for example to improve
structural stability, promote h-bonding strength, lifetime and
selectivity, trans-membrane permeability, raise glass-transi-
tion temperature, or depress freezing points. This may affect
stability of the CPA, improve biocompatibility, lower tox-
icity or increase CPA cryoprotection efficacy. For example,
modifying chain length, changing the position of specific
functional groups, methoxylation, methylation, and
hydroxylation (like Hydroxyurea or similar), acetylation,
polymerization (of sugars, amides, glycols, glycerols, anti-
freeze peptides, peptoids, betaines, amino acids and the
like), PEGylation, glycosylation (like antifreeze glycopro-
teins and the like), and cyclisation may improve or modulate
performance of cryoprotective agents. Several or all of these
methods may be used in tandem to improve or modulate
CPA performance.

CPAs may include ice-inhibiting and/or ice-shaping mac-
romolecules. For instance, as described below, a CPA may
include antifreeze proteins, which may produce ice-shaping
effects.

CPAs may be formulated or combined. Combined CPAs
may have synergistic effects in reducing toxicity and/or
promoting cryoprotectant efficacy.

Antifreeze Proteins

The CPA may be an antifreeze protein (AFP). AFPs are a
diverse group of proteins that may be produced by various
organisms, including fish, insects, plants, and microorgan-
isms, to protect them from freezing damage in cold envi-
ronments. AFPs may also be produced synthetically. Classes
of AFPs include type I, type II, type III, type IV, and
antifreeze glycoproteins (AFGPs) which are structurally
distinct. All AFP types may all be used in various CPA
cocktails and in combination with CPAs listed above. In
some instances, AFPs may inhibit ice formation by binding
to one or more surfaces of nucleated ice crystals and inhibiting their growth or prevent ice recrystallization on
rewarming (Oswald Ripening). This may limit damage to
cells by limiting the size of ice crystals and/or constrain the
extension of the ice crystal along one or more axes. Enhanc-
ers may be used in tandem with AFPs. Example enhancers
include but are not limited to polycarboxylates and citrate,
which have been shown to increase the antifreeze protein's
thermal hysteresis, and carboxylates, polyols, and cyclo-
hexanedione, which have been shown to enhance the effi-
cacy of AFPs.

AFPs may be expressed recombinantly and purified.
Recombinant expression may be carried out in model bac-
terial organisms (e.g., E. coli) or model eukaryotic cell lines
(N2a, Jurkat, HEK, CHO, S. cerevisiae, Y. lipolytica).
Recombinantly expressed AFPs may be designed for perfu-
sion delivery and may be optimized for transport across
biological membranes and barriers such as the blood brain
barrier to enhance penetration into the tissue. Post-transla-
tional chemical modifications may be made to recombi-
nantly expressed AFPs.

Alternatively, AFPs may be produced by the biological
specimen to be cryopreserved. This may be carried out
through transient or stable transfection, viral transduction
(e.g., with Adeno-associated virus (AAV), Lentivirus, virus-
like particles (VLP), lipid nanoparticle (LNP)) or other
genetic engineering techniques. The viral payload can be a
protein, multiple proteins, a nucleic acid, or both a protein
and a nucleic acid. Intracellular expression may be consti-
tutive or inducible.

Cryoprotective Solutions without Polyvinyl Alcohol (PVA)

The cryoprotective solution may lack PVA. The cryopro-
tective solution without PVA may enable enhanced viability
following cryopreservation when compared to cryoprotec-
tive solutions with PVA. The cryoprotective solution without
PVA may be a solution comprising VMP-noX. The VMP-
noX may comprise 16.8 wt % ethylene glycol, 22.3%
DMSO, 12.9% formamide, 1% Z-1000. T the Z-1000 may
be replaced with 1% polyglycerol. In an example, the
cryoprotective solution may be substantially free from PVA
to reduce VMP. In an example, a cryoprotective solution free
from PVA may be a fluid with an amount of PVA below 0.5%
w/v below.

CPA Enhancers

The cryoprotective solution may include a compound that
enhances the effects of the CPA. CPA enhancers may be
classes of compounds which, on their own, do not confer
cryoprotection but do so in combination with a cryopro-
tectant.

Carrier Solutions

Generally, a carrier solution is a solution which may be
used to carry other substances. The carrier solution may
keep the biological specimen healthy and viable. The carrier
solution comprises salts, sugars, or other components
designed to counteract the toxicity of the CPA, promote CPA
efficacy, and/or encourage healthy cell function. The carrier
solution is used in conjunction with a CPA.

Some examples of these carrier solutions include but are
not limited to existing carrier solutions, like RSP-2 and LM5
(as described in Fahy et al 2004, "Improved vitrification
solutions based on the predictability of vitrification solution
toxicity"), and new novel carrier solutions disclosed in this
document, like aCSF.

Gas (e.g., carbogen or oxygen) may be dissolved into the
carrier solutions. The dissolved gas may supply oxygen and
other gas to the biological specimen as the biological
specimen is being exposed to the carrier solution. The dissolved gas may be added to the carrier solutions by bubbling the gas into the carrier solution.

In some variations, the CPA and/or carrier solution may contain metabolic suppressants, such as adenosine, melatonin, hydrogen sulfide, carbon monoxide, 2-deoxy-D-glucose, cyanide, AICAR, or metformin, which may reduce cellular ATP consumption by inhibiting mitochondrial respiration, mimicking energy stress, or directly suppressing cellular activity. In some variations, the CPA and/or carrier solution may contain ion transport modulators, such as ouabain, amiloride, calcium channel blockers, or FK506, which may limit ATP expenditure by reducing ion flux across membranes and preventing calcium overload during hypothermic or cryogenic stress. The CPA and/or carrier solution may contain hypoxia mimetics or ischemic preconditioning agents, such as cobalt chloride, prolyl hydroxylase inhibitors, or erythropoietin, which may activate cytoprotective pathways and reduce oxygen demand through stabilization of hypoxia-inducible factors and related metabolic adaptation mechanisms. The CPA and/or carrier solution may contain mitochondrial modulators or uncouplers, such as FCCP, DNP, MitoQ, SkQ1, cyclosporin A, or SS-31 peptide, which may preserve mitochondrial integrity by reducing reactive oxygen species, stabilizing mitochondrial membranes, or inhibiting mitochondrial permeability transition. The CPA and/or carrier solution may contain natural metabolic suppressants or cryoprotective biomimetics, such as taurocyamine, $\beta$-hydroxybutyrate, trehalose, or resveratrol, which may shift metabolic fuel usage, protect cellular structures, or activate stress tolerance pathways observed in hibernating or anhydrobiotic organisms. In some variations, the CPA solution and/or carrier solution may contain opioid receptor agonists, such as morphine, fentanyl, DADLE (D-Ala$^2$, D-Leu$^5$-enkephalin), or remifentanil, which may reduce cellular metabolic demand, inhibit excitotoxicity, and promote cytoprotective signaling via activation of $\mu$-, $\delta$-, or $\kappa$-opioid receptors. These agents may suppress neuronal and cardiac activity, reduce oxygen consumption, and enhance tolerance to hypothermic or ischemic stress.

In some variations, the CPA solution and/or carrier solution may include mTOR inhibitors (e.g., rapamycin, everolimus) which may suppress anabolic metabolism and promote autophagy; histone deacetylase inhibitors (e.g., valproic acid, trichostatin A) which may enhance stress tolerance and viability through epigenetic modulation; S1P receptor modulators (e.g., fingolimod) which may stabilize membranes and suppress apoptosis; NAD$^+$ precursors (e.g., nicotinamide riboside, NMN) which may support mitochondrial function and energy homeostasis; iron chelators or ferroptosis inhibitors (e.g., deferoxamine, liproxstatin-1) which may prevent oxidative damage associated with lipid peroxidation; RNA methylation modulators (e.g., meclofenamic acid derivatives) which may stabilize stress-responsive transcripts through inhibition of m6A demethylation; lipid raft stabilizers (e.g., 25-hydroxycholesterol, ursodeoxycholic acid) which may preserve membrane fluidity and structural integrity; aquaporin modulators (e.g., tetraethylammonium, AqB013) which may control transmembrane water flux to reduce osmotic injury; synthetic extremolytes (e.g., ectoine analogs, archaeal-compatible solutes) which may mimic extremophile adaptations and stabilize proteins and membranes; and transient ROS enhancers (e.g., low-dose menadione, rotenone) which may induce protective preconditioning through mild oxidative signaling. These agents may be included alone or in any combination within the CPA solution and/or carrier solution to enhance post-thaw viability, reduce structural and metabolic injury, and improve recovery following cryopreservation.

Inert Fluids

Inert fluids may be used for the cryopreservation methods described herein. Certain inert fluids have demonstrated utility in heat exchange applications (e.g., immersion cooling for power-hungry electronics). In addition to having low freezing points and viscosities, perfluorocarbons, hydrofluoroethers, fluorinated fluids, and other engineered fluids are chemically and biologically inert, sometimes due to the presence of strong carbon-fluorine bonds. This may make them suitable for controlled-temperature perfusion through a biological specimen (e.g., though vasculature of a biological specimen) for perfusive volumetric cooling or perfusive volumetric warming, potentially achieving more volumetrically uniform cooling than previous approaches.

Inert fluids may be perfused through a vasculature of a biological specimen, such as an organ or organism. The inert fluids are added to a biological cavity of the biological specimen. The inert fluids may be cold or colder than the biological specimen. The perfused a biological specimen may be located in a controlled temperature chamber, such as a controlled rate freezer, wherein the chamber is cooled at a rate that may match the cooling rate of the specimen, or may decrease in temperature at a rapid rate (e.g. −40 C/min, −100 C/min, or as fast as the controlled rate freezer can cool) down to the desired vitrification temperature. The inert fluids may be warm or warmer than the biological specimen. The perfused a biological specimen may be located in a controlled temperature chamber, such as a controlled rate freezer, wherein the chamber is warmed at a rate matching the warming rate of the a biological specimen. Surfactants can be used to facilitate the mixing of one or more of the fluids used for perfusion. In some variations, one inert fluid may be used throughout the entire temperature transition from room temperature to liquid nitrogen temperature. Alternatively, different fluids may be switched throughout the perfusion process.

In some variations, the inert fluid may comprise a mixture of multiple inert fluids.

Perfluorocarbons

In some variations, the inert fluid is a perfluorocarbon. Perfluorocarbons are non-toxic synthetic compounds that are known for their biocompatibility and their ability to dissolve gas (e.g., oxygen). Consisting purely of carbon and fluorine atoms connected with one of the strongest carbon-fluorine bonds, perfluorocarbons are extremely stable and largely chemically and biologically inert. With such unique properties perfluorocarbons have been studied for many applications, including perfluorodecalin as a synthetic blood substitute and perfluorohexane as liquid ventilation medium. Perfluorocarbons are also electrically insulative. Varieties with low pour points have been used as heat exchangers in immersion cooling systems.

Perfluorocarbons may be particularly well suited to the volumetric cooling and warming applications because of their low pour and freezing points and low viscosity even at low and sub-zero temperatures, particularly temperatures well below the freezing point of water in the range 0 to −180° C.

A few examples of perfluorocarbons that may be used for the methods as described herein include perfluoropentane, perfluoropropane, perfluorohexane, perfluoroethane, perfluorobutane, perfluorooctane, perfluorodecalin, and other similar compounds.

Perfluorocycloethers

In some variations, the inert fluid is a perfluorocycloether. Perfluorocycloethers, like FC-77 (Fluorinert Electronic Liquid, manufactured by 3M), are known to vitrify instead of freezing, and may also be used for the methods as described herein alone or in combination with other fluids. Inert fluids that are liquid at room temperature and that vitrify around −140° C. may be beneficial because −140° C. is around the glass transition temperature of many CPAs.

In some implementations, a cryoprotective solution includes emulsions of the cryoprotective agent. In some implementations, the cryoprotective solution includes a mixing of the cryoprotective agent and carrying fluid.

In an example, creating an emulsion including FC-77 and another inert compound may be done using a surfactant. In an example, the cryoprotective solution may create liquids configured to vitrify at temperatures approaching glass transition points of the biological specimen that are even lower than the FC-77's melting point of −110° C.

Hydrofluoroethers

The inert fluid may be a hydrofluoroether and may have a low pour point. For example, 3M Novec 7200 (or BestSolv 7200, an alternative) are liquid at room temperature and freeze at −138° C. This freezing point is close to the vitrification point of a biological specimen loaded with CPA (e.g. VMP or VM3), or Tg. The hydrofluoroether may be mixed with an agent such as a perfluorocycloether (e.g. FC-77) to promote vitrification of the inert fluid in the vasculature as the biological specimen is cooled beyond the freezing point of the inert fluid.

Engineered Inert Fluids

The inert fluid may be an engineered inert fluid such as 3M Novec 7200 (ethoxy-nonafluorobutane), 3M Novec 7100 (methoxy-nonafluorobutane), or other inert fluids that vitrify below CPA glass transition temperature (e.g., a Novec replacement like BestSolv). In some variations, 3M Novec 700 (freezing point of −122° C.), 3M Novec 649 (freezing point of −108° C.), 3M Novec 7500 (freezing point of −100° C.), or 3M Novec 7300 (freezing point of −38° C.) may be used.

Liquified Noble Gases

The inert fluid may be a liquified noble gas held at a sufficiently high pressure to keep it in a liquid state. Examples include Helium, Neon, Argon, Krypton, and Xenon.

Surfactants

Surfactants may be combined with inert fluids. Surfactants are compounds that lower the surface tension between two liquids, between a gas and a liquid, or between a liquid and a solid. They play a critical role in various applications, including detergents, emulsions, and medical therapies, due to their ability to increase the wetting properties of liquids and stabilize interfaces.

Surfactants may be useful when combined with inert fluids for perfusive cooling or other applications, particularly in scenarios where two or more fluids are used together. The addition of a surfactant may serve to allow for mixing of the two or more fluids together for use in this perfusive cooling application.

One such surfactant which may be used for the methods described herein is Pluronic F-68, and similar surfactants may also be used.

The chemical agents for cooling as described herein may be used singularly or in combination to achieve volumetrically distributed cooling. Mixes of these, or other, compounds may be desirable to achieve ideal properties of the combined fluid, such as a specific glass transition temperature, a certain heat capacity, or other desirable properties. These chemicals may be used in either the liquid or gas phase for the purposes of volumetric cooling. The perfused chemical may be switched once or several times over the course of cooling, and switching may allow chemicals with desirable properties in certain temperature ranges to be used only in those ranges, when other chemicals with desirable properties in other ranges are used in those other ranges. Other, equivalent, or similar compounds may be used for this application.

Examples

The following examples are illustrative and non-limiting to the scope of the compositions, systems, and methods disclosed herein.

FIG. 1 illustrates a system for reversible cryopreservation in accordance with some variations described herein. The cryopreservation system 100 in FIG. 1 comprises a pressure chamber 101. The pressure chamber 101 may be operably connected to a pressurization component 102 as described herein. The cryopreservation system 100 may comprise a cooling component 103 for cooling the biological specimen. The cooling component 103 may comprise a chamber which allows for control flow of liquid nitrogen and may surround the pressure chamber, as shown. The cryopreservation system 100 may comprise a rewarming component 104 for rewarming the biological specimen. The rewarming component 104 may comprise a magnetic field coil 105 of an induction heater and may surround the pressure chamber 101, as shown. The rewarming component 104 may also comprise an AMF generator 106. Accordingly, liquid nitrogen flow into the chamber may be used to rapidly cool the biological specimen, and magnetic fields from the magnetic field coil may be used to rewarm the biological specimen.

FIG. 2 illustrates a pressurization component of a system for reversible cryopreservation in accordance with some variations described herein. The pressurization component 200 of FIG. 2 comprises a pressure chamber 201. The pressure chamber may contain a biological specimen. The pressure chamber 201 may comprise a thermocouple 202. The pressurization component may be operably connected to a CPA holding reservoir 203. The pressurization component may comprise a pressure generator 204. The pressure generator 204 may be manually operated. The CPA holding reservoir 203 and the pressure generator 204 may be separated by a CPA valve 205. The pressure generator 204 and the pressure chamber 201 may be separated by a pressure valve 206. The pressure valve 206 may be used to maintain pressure in the pressure chamber 201. The pressurization component may further comprise a pressure regulator 205. The pressurization component may also comprise a relief valve 207 and/or a transducer 208.

As an operational example of the reversible cryopreservation system as described in FIGS. 1 and 2, the valves 205 and 206 are opened and the pressure generator is operated in reverse to draw CPA into the chamber. Next, the CPA valve 205 is closed, the pressure valve 206 is opened, and the pressure generator 204 pressurizes the pressure chamber 201 with the biological specimen. The pressure chamber is inside of a cooling component 102. After the sample has been pressurized, the cooling component 102 immediately starts cooling the sample down to a target of <−150° C. The cooling protocol is tuned to reduce ice formation and mechanical damage from high thermal gradients. After the biological specimen has been cooled, the pressure can be released, and the biological specimen can be moved to long term cold storage. For rewarming, the sample is mounted inside of a rewarming component 103 (e.g., a magnetic field coil), and is repressurized before warming with the rewarming component 103. A thermocouple 202 (e.g., a type-T thermocouple) inside of the pressure chamber 201 provides the input to a closed-loop controller that controls the temperature in both the cooling and heating steps. The closed loop controller can simultaneously control the pressure using a pressure transducer that monitors the pressure of the pressure chamber. This ensures that the pressure and temperature are at optimal levels throughout the protocol to minimize the formation of ice nuclei. Given the strong temperature/pressure dependence of the phase diagram of water, this process may be critical to maximizing the formation of amorphous glassy water instead of crystalline ice.

FIG. 3 illustrates a representative temperature and pressure curve during a high-pressure vitrification as described herein. The temperature and/or pressure may be controlled by a controller. Pressure may be controlled in the range of about 0 to about 210 MPa. Temperature may be controlled in the range of about −200° C. to about 42° C. Cooling and warming rates may be controlled in the range from about 1° C./min to about 1,000,000° C./min. The pressure may be applied during cooling, rewarming, or both, as shown. The pressure may be modulated during the cooling and/or rewarming processes. Pressure modulations may occur suddenly or may occur as a ramp (both shown). Alternatively, the pressure may be held constant during the cooling and/or rewarming processes. Additionally, the pressure and temperature profiles may be synchronized to minimize ice formation. Synchronizing the temperature and pressure controls may ensure that the system is constantly at an optimal pressure to stabilize the liquid phase of water or reduce the rate of ice nucleation. In an aspect, an optimum profile of pressure and temperature may change at different phases of cooling or warming. For example, at a temperature below −90° C., a denser phase of ice (ice III) may form at >2 kbar.

FIG. 4 illustrates a tissue holding assembly in accordance with some variations described herein. The tissue holding assembly 400 of FIG. 4 comprises a base plate 401 and a thermal container 402. The thermal container 402 may comprise thermally conductive wafers 403 which surround a tissue slice 404. The thermal container 402 may further comprise a metal shim 405 which surrounds the tissue slice 404. The thermal container may further comprise additional components to ensure protection of the tissue slice 404 and efficient heat transfer to the tissue slice 404.

Thermally conductive wafers 403 and metal shims 405 may be on only one side of the tissue slice 404 or on both sides of the tissue slice 404 so that the slice is sandwiched between them. Having these components on both sides of the tissue slice 404 may be advantageous for heat transfer as having the components on both sides allows for more uniform cooling and heating of the tissue slice 404 with heat transfer on both sides. In the two-sided configuration, a spacer (not shown), which may be made of plastic or metal and may be around the same thickness as the tissue slice 404, may be used to ensure the tissue slice 404 is not mechanically crushed or otherwise perturbed by the components above and below the tissue slice 404.

The thermal container 402 may be circular or more closely resemble the shape of the tissue slice that the thermal container 402 houses. The thermal container 402 may protect the tissue slice 404 during the preservation process and may facilitate tissue heating and cooling, particularly substantially homogeneous heating and cooling. Similar containers that serve the same purposes may be used, and different containers may be used for different tissue types and purposes.

Figure 5A:
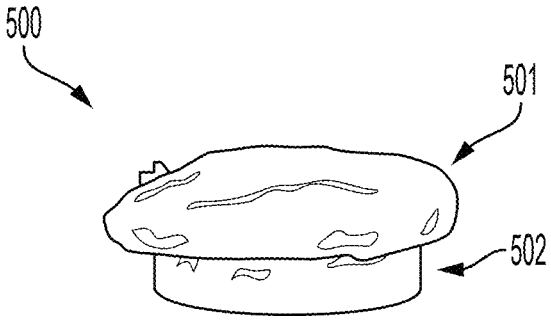
FIGS. 5A and 5B illustrate tissue holding assemblies in accordance with some embodiments described herein.
Figure 5B:
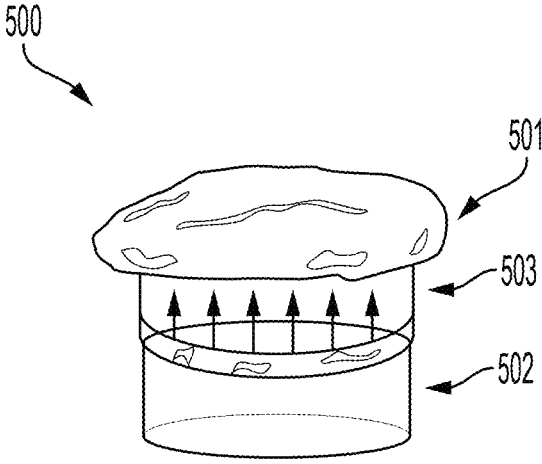

FIGS. 5A and 5B illustrate tissue holding assemblies in accordance with some variations described herein. The tissue holding assembly 500 of FIG. 5A comprises a tissue sample 501 and a metal shim 502. The tissue holding assembly 500 of FIG. 5B comprises a tissue sample 501, a metal shim 502, and a thermally conductive wafer 503. The thermally conductive wafer 503 may be 20 mm in diameter and 500 μm thick. The metal shim 502 may be 19 mm in diameter and 250 μm thick. The thermally conductive wafer 503 may serve to increase the uniformity of cooling and heating by smoothing out any thermal irregularities and thus eliminate the effects of local thermal gradients during cooling and rewarming. Additionally, the thermally conductive wafer 503 and metal shim 502 may be bound by a strong, thermally conductive epoxy resistant to thermal shock (rapid, large fluctuations in temperature). For example, Masterbond EP29LPSPAO-1 Black epoxy may be used for its high thermal conductivity and resistance to cryogenic shock. Any substance capable of binding a smooth surface, like sapphire to a metal, and resistant to thermal shock would suit this application. The surface of the metal wafer 502 and thermally conductive shim 503 may be roughed to improve the strength of the bond between the two parts. This wafer and shim bond may ensure the thermal container does not degrade or fall apart during operation.

Figure 6C:
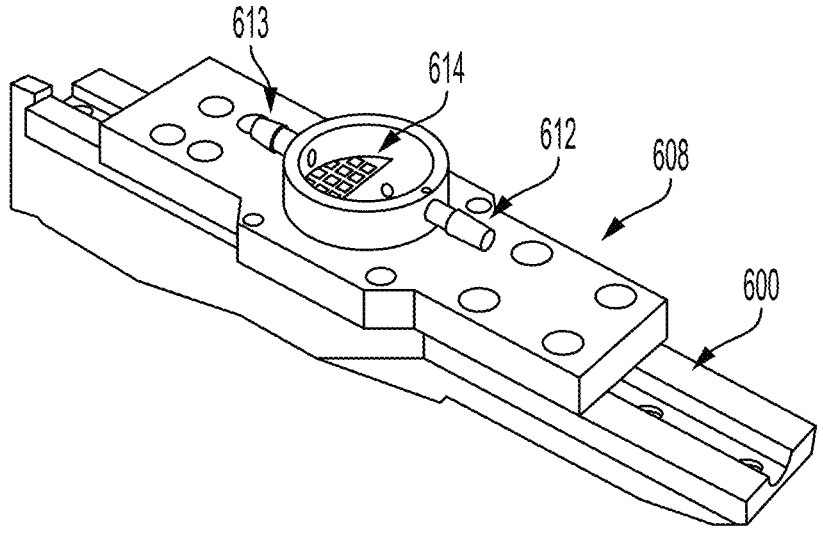
FIG. 6C illustrates a base plate of a tissue holding assembly with a perfusion hat in accordance with some embodiments described herein.
Figure 6D:
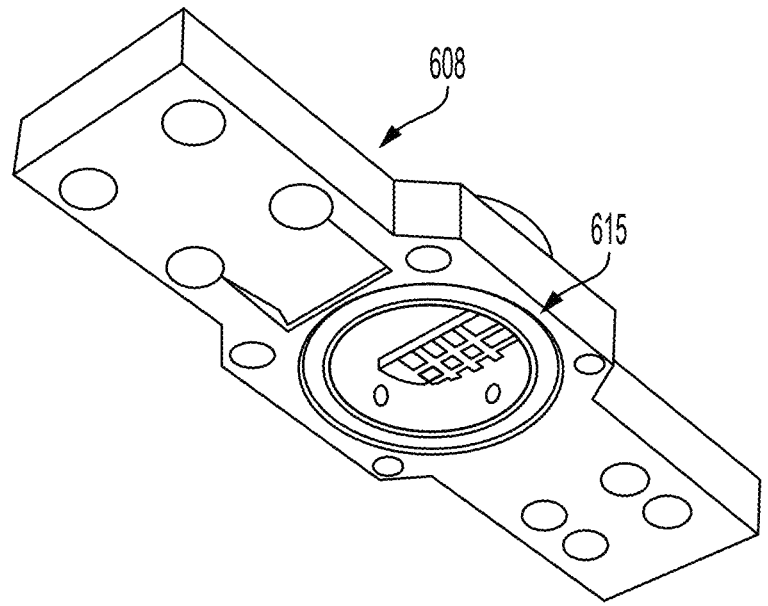
FIG. 6D illustrates a bottom side view of a perfusion hat including an o-ring in accordance with some embodiments described herein.
Figure 6E:
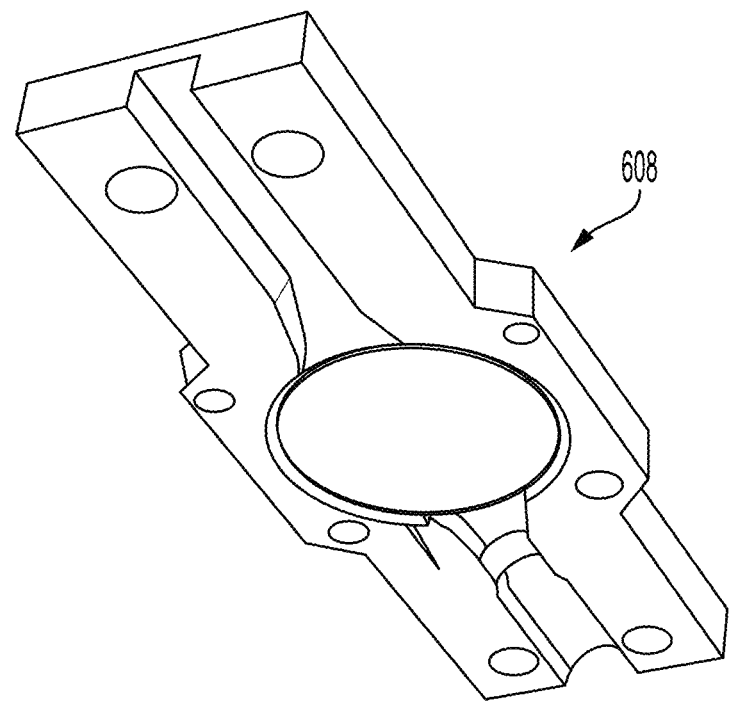
FIG. 6E illustrates a vitrification hat and rewarming hat in accordance with some embodiments described herein.
Figure 6F:
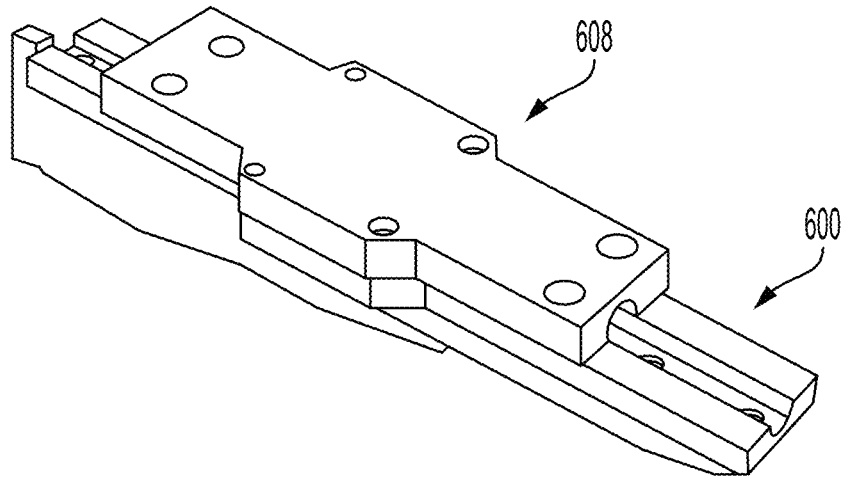
FIG. 6F illustrates a base plate mated with a vitrification hat in accordance with some embodiments described herein.

FIGS. 6A-6C illustrate a base plate of a tissue holding assembly in accordance with some variations described herein. The base plate 600 of FIGS. 6A-6B comprises a location for thermal container placement 601, a fluid inlet tube groove 602, a fluid outlet tube groove 603, screw holes 604, and dowel pins 605. The fluid inlet tube groove 602 and the fluid outlet tube groove 603 may be used to transfer liquid nitrogen or CPA. FIG. 6C illustrates a base plate 600 of a tissue holding assembly with a perfusion hat 608 in accordance with some variations described herein. The tissue holding assembly includes a base plate 600, a fluid inlet 612, a fluid outlet 613, and a mesh 614. FIG. 6D illustrates a bottom side view of a perfusion hat 608 of a holder assembly including an o-ring 615 in accordance with some variations described herein. FIG. 6E illustrates a vitrification hat 608 and rewarming hat of a holder assembly in accordance with some variations described herein. FIG. 6F illustrates a base plate 600 mated with a vitrification hat 608 in accordance with some variations described herein.

FIGS. 8A-8C illustrate tissue holding assemblies in accordance with some variations described herein. The tissue holding assembly 800 of FIG. 8A comprises a base plate 801 and a perfusion hat 802. The perfusion hat 802 may comprise a perfusion well 803 which can hold the tissue slice. The well may sit directly above a thermally conductive wafer (not shown), and a seal may be created around the perimeter of the thermally conductive wafer so that the inner chamber of the perfusion well can hold a fluid. FIGS. 8B and 8C shows cutaway views of the perfusion well 803 of FIG. 8A. The perfusion well 803 may comprise a gasket 804 (e.g., a rubber o-ring). The o-ring may have an inner diameter of 18 mm and a thickness of 2 mm. The gasket may interface between the perfusion well 803 and a base plate to create a seal. A thin thermocouple (not shown) may sit under or near the gasket 804 such that the thermocouple does not disrupt the seal. The perfusion hat may be secured to the base plate by fasteners, such as non-magnetic screws, or by other fastening mechanisms to ensure a seal of the well, especially if an o-ring or similar gasket is used. The non-magnetic screws may avoid unwanted heating from the AMF when the AMF is later applied during rewarming.

The perfusion well 803 may be open to allow placement of the tissue slice into the well through the top of the well. Alternatively, the tissue sample may be placed on thermally conductive wafer (not shown) on the base plate before the perfusion hat 802 is attached to the base plate. This may allow the perfusion well 803 to alternatively have a closed top, which thereby may allow pressurization during tissue loading. The closed top perfusion well may be constructed as a permanent fixture of the perfusion hat 802 or may be a removable portion (e.g., glass covering).

The perfusion well 803 may further comprise an inlet 805 and an outlet 806 for fluid to enter and exit. The perfusion well 803 may further comprise an inner tube 807 and diffuser holes 808. The inner tube 807 may connect the inlet 805 to the diffuser holes 808, allowing fluid flow from the inlet 805 to the diffuser holes 808. Fluid may then flow through the diffuser holes 808 and diffuse into the center chamber from all directions. In some implementations, the diffuser holes 808 may be positioned at locations configured to produce a downward flow towards the tissue slice. In an aspect, the diffuser holes 808 may be configured to promote turbulent flow and enhance perfusion into the tissue slice.

The perfusion well 803 may further comprise a mesh 809 to prevent tissue slices from being suctioned into the outlet. The perfusion well 803 may be designed such that the flow of fluid through the perfusion well 803 passes directly over the tissue specimen in the perfusion well 803. The mesh 809 may be located slightly below the bottom of the outlet hole so that in the case that tissue slices float up and are braced below the mesh, the tissue slices continue to be exposed to solution on both sides. The inlet and outlet ports may be hose barbs, luer locks, or other similar fluidic connectors. The diffuser holes close to the inlet may have a small diameter while the ones closer to the outlet may have a larger diameter with a smooth gradient in diameter in between. This may encourage more equal flow out of each hole, and therefore even mixing of solutions inside the well.

Figure 9A:
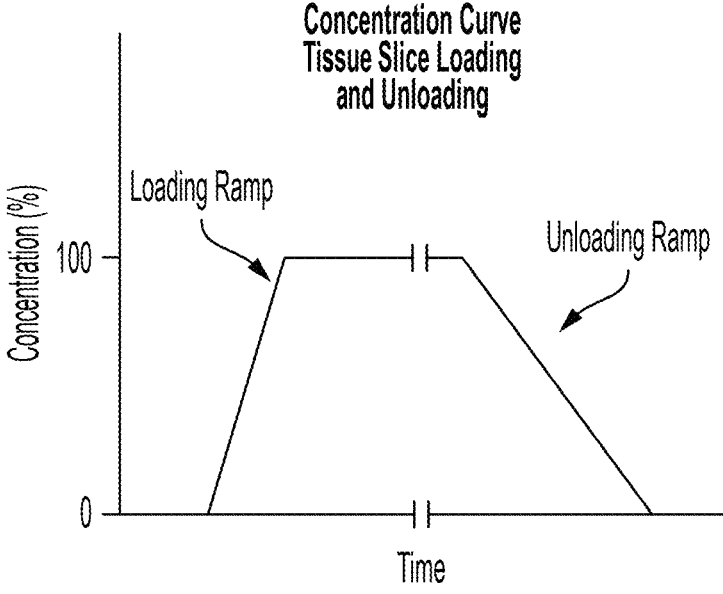
FIGS. 9A and 9B illustrate a representative concentration curve during a cryoprotection method as described herein.
Figure 9B:
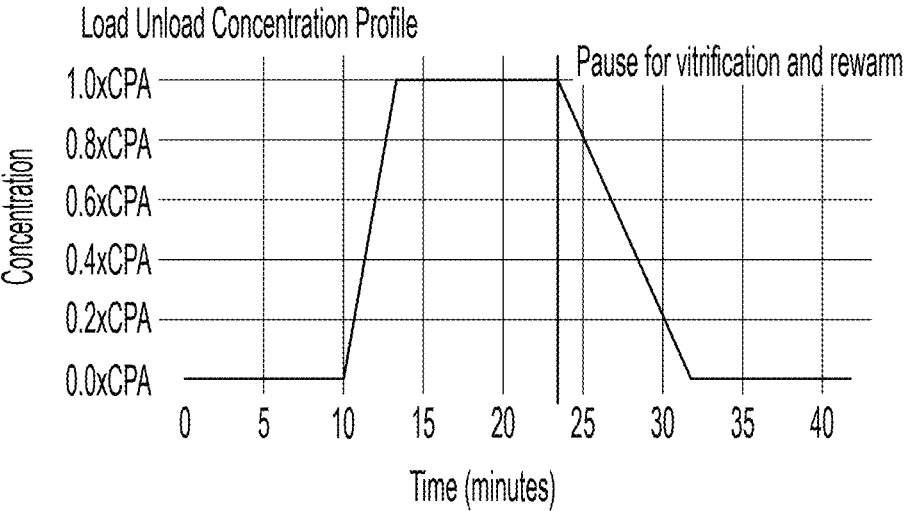
Figure 9C:
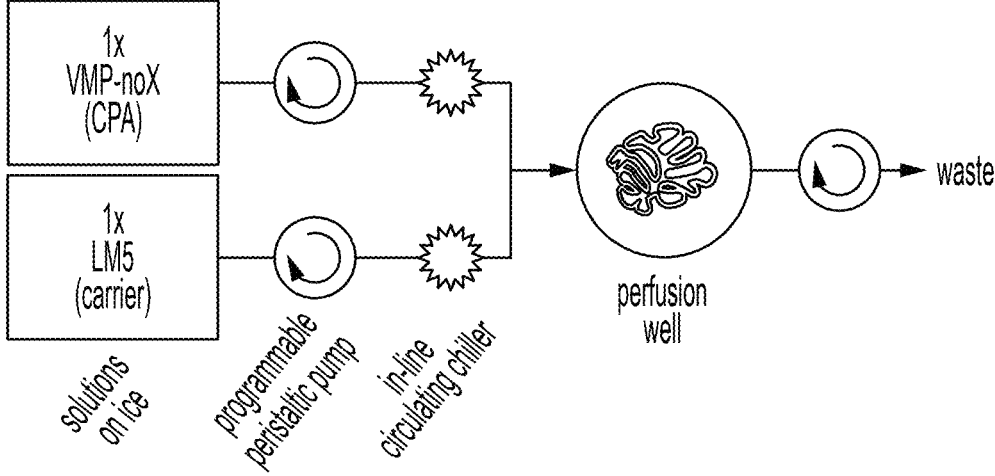
FIG. 9C illustrates a CPA perfusion system in accordance with some embodiments described herein.

FIGS. 9A-9B illustrates a representative concentration curve during a cryoprotection method as described herein. The concentration curve may be determined by a loading protocol. In one example of a loading protocol, the perfusion well may be placed onto the base plate and sealed. Cryoprotectant, such as VMP, may be pumped using the peristaltic pump until just before the cryoprotectant reaches the Y connector that merges the carrier and cryoprotectant tubes into one joined tube. A carrier solution, such as LM5, may then be pumped all the way through the tubing circuit, past the Y connector, and into the well until the carrier solution pools, thereby priming the system. The tissue may then be transferred into the well with a tool to move the tissue, such as a tissue pipette commonly used in electrophysiology, and the cryoprotectant loading/unloading protocol may be initiated on the pump using programmatic control from a microcontroller or computer. The loading protocol may be a ramp of concentration, several sections of ramps and holds in concentration, some other non-linear curve of concentration increase, or some similar loading protocol with a gradual and controlled increase in CPA concentration over time. This may serve to maintain osmotic balance between the CPA and the tissue so that the cells in the tissue are not adversely impacted by water inflow or outflow due to osmotic gradients. The steps of the loading protocol may be performed within a temperature-controlled chamber (e.g., a refrigerator). The chamber may be insulated to ensure temperature remains relatively constant. Cooling mechanisms (e.g., a compressive cooler, a thermoelectric cooler, or a cold gas like liquid nitrogen) may be used to maintain a set temperature in the temperature-controlled chamber. The temperature in the chamber may be monitored using one of the temperature sensors described elsewhere, and a temperature may be set at a temperature desirable for the loading procedure, such as a temperature between 2-20° C. FIG. 9C illustrates a CPA perfusion system in accordance with some variations described herein.

FIG. 10 illustrates a vitrification hat in accordance with some variations described herein. The vitrification hat 1000 of FIG. 10 comprises a liquid nitrogen inlet 1001 and a liquid nitrogen outlet 1002. The vitrification hat 1000 works in conjunction with a thermally conductive wafer 1003 and a spacer 1004 to form a seal with the base plate. In an example, the spacer 1004 may comprise a gap 1005 for a temperature probe. In an example, the temperature probe may be an Omega T Type 36 AWG thermocouple. In an example, the temperature probe can be integrated in the spacer.

FIG. 11 illustrates a tissue slice warming system 1100 in accordance with some variations described herein. In an example, the tissue slice warming system 1100 may include an AMF generator in communication with a magnetic field coil 1102 having an opening 1103 configured to receive or surround a portion of a tissue holding assembly with a vitrification hat 1104. The AMF generator and a magnetic field coil form an AMF circuit configured to generate AMF when current flows through the magnetic field coil. The magnetic field coil 1102 may be configured to induce uniform heating for tissue rewarming when the tissue holding assembly with a vitrification hat 1104 is surrounded by the magnetic field coil 1102.

In an example, the tissue holding assembly may be connected to a solenoid valve 1101 configured to control a flow of cryogenic fluid towards and away from the slice chamber.

In an aspect, the opening of the magnetic field coil may be shaped to closely match to the size and shape of the tissue holding assembly with a vitrification hat 1104 in order to concentrate the magnetic field/heat delivery of induction heating to the ferromagnetic metal piece that is heating the tissue slice.

FIG. 12 illustrates a perfusion circuit in accordance with some variations described herein. The perfusion circuit 1200 of FIG. 12 is operably attached to a cannulated biological specimen 1201 (e.g., an organ or organism), which may be placed inside a controlled temperature chamber 1202. The chamber 1202 may be water-jacketed and cooled with a circulating coolant chiller or placed in a refrigerator for the duration of the perfusion. The chamber 1202 may also be thermally insulated using thermal insulation like foam sheets to prevent heat loss to the environment. The controlled temperature chamber 1202 may comprise one or more temperature probes 1203 and pressure probes 1204. An environment temperature probe 1203 (e.g., a thermocouple, thermistor, or optical temperature sensor) may be placed inside the chamber for monitoring, and other temperature probes may be placed throughout the system to monitor the temperature at various points of interest. A temperature probe 1203 may be used to measure the inner temperature of the biological specimen, and several of these probes may be used to track the temperature at multiple locations in the biological specimen. Any of these temperature probes may be the input data for a software-based control system that controls the temperature of the biological specimen.

Pumps, such as peristaltic pumps 1205, may load the proper CPA concentration into the cannulated biological specimen 1201 by mixing CPA 1206 with a carrier solution 1207. The pumps may also be centrifugal pumps, syringe pumps, or other pumps. The carrier may be carbogenated or oxygenated beforehand or during the loading protocol. The perfusate may be cooled down using a heat exchanger 1208, down to a temperature necessary to achieve enough of a decrease in cell metabolic activity, in some cases the range of 2-20° C. The heat exchanger 1208 may make use of cooled circulating fluid, which may be cooled via a compressive cooling circuit, thermoelectric cooling, or a similar cooling method. Beakers containing the perfusate (e.g., CPA and carrier) may be refrigerated beforehand or put on ice so that less or no cooling is required inline from a heat exchanger. An inline filter 1209 may be used to eliminate impurities from the perfusate. A bubble trap 1210 may remove gas, such as air, from the perfusate to reduce the risk of embolism.

CPA enters the biological specimen through cannulated vasculature, such as arteries or veins, and exits either through open vasculature or cannulas placed in arteries or veins. Exhausted CPA and/or carrier may be drained into a bag where the exhausted CPA and/or carrier gets picked up by a drain line 1211 or gets recirculated back into the biological specimen after filtering. The biological specimen may reside in a container, such as a bag, that allows for pooling of liquid. The specimen container may be connected to a drain pump, such as a peristaltic pump 1205, running at rates which may be above the inflow rate of the loading flow, potentially around 5% or more faster than the CPA and carrier pumps.

At the end of the loading protocol, the biological specimen may be perfused at a maximum concentration for a fixed period of time (known as "hold") or until the concentration of the inlet and outlet equilibrates, indicating that the tissue cannot uptake more CPA and the biological specimen is fully loaded. A "hold" step may also be done at the beginning of the CPA loading protocol or at points in the middle of the CPA loading profile. Full loading may be determined by comparing measurements made by inline refractometers (concentration sensors 1212) placed at the inlet and/or the outlet of the biological specimen.

FIG. 13 illustrates a block diagram of a control system architecture for a CPA perfusion protocol in accordance with some variations described herein. The control system 1300 of FIG. 13 is a complex control system architecture where the current concentration is defined by the interpolated target concentrations in the protocol created beforehand. Every time interval, which may be a 1 second time interval, target concentration either gradually increases (during loading) or decreases (during unloading). The concentration may be maintained constant.

It may be important to maintain arterial pressure within the biological limits to avoid damaging the vascular paths. For that reason, a finite state machine (FSM) may be implemented to keep the pressure within a given range, such as a range from 0 mmHg to 600 mmHg. The user may define four pressure-related parameters: minimum and maximum pressure (soft_min_p and soft_max_p) and minimum and maximum flow rates (soft_min_f, soft_max_f, which may be determined by the capabilities of a chosen pump). One potential example of these parameters is: soft_min_p=30 mmHg, soft_max_p=140 mmHg, soft_min_f=0.2 mL/min, soft_max_f=10 mL/min.

As demonstrated in the block diagram, every cycle, measurements of the current arterial pressure are made.

Initially, the algorithm starts at state "const_min_p", where a controller, such as a PID controller, attempts to maintain a constant pressure at soft_min_p by outputting the flow rate needed to achieve that pressure. As CPA concentration increases, so does the perfusate viscosity. When maintaining constant pressure with increasing viscosity, the flow rate controller output needed to achieve the pressure is gradually decreasing. When the flow rate reaches soft_min_f, the current state switches to "const_min_flow". At state "const_min_flow", the flow constant would be kept at the value soft_min_f in an open loop. During that time, perfusate viscosity keeps rising, and that increases the pressure. When the pressure reaches soft_max_p, the current state switches to "const_max_p". At "const_max_p", the PID controller will maintain constant pressure at soft_max_p. If perfusate concentration decreases (during CPA unload), flow rate output will start to increase to maintain high pressure. When the flow rate reaches soft_max_f, the current state switches to "const_max_flow". At "const_max_flow", the flow rate is set to soft_max_f in an open loop until the pressure starts dropping below const_min_p. In which case, the current state switches back to "const_min_p". As CPA concentration changes during load and unload steps, the feedback loop described above is in place to maintain pressure within the biological sample within a biological range (e.g., within an arterial pressure range of vasculature of an isolated organ or organism).

FIG. 14 illustrates a uniform volumetric cooling system in accordance with some variations described herein. The uniform volumetric cooling system 1400 (also referred to as the system 1400) of FIG. 14 may use inert fluids. After the biological specimen 1401 is fully loaded with cryoprotective agents, the biological specimen may be moved to a controlled temperature environment 1402 (e.g., a controlled rate freezer) and connected with a system for perfusive volumetric cooling. The biological specimen 1401 may be placed in a controlled rate freezing chamber 1402 that operates by pumping a cryogen (e.g., liquid nitrogen) from a connected dewar 1403 into the chamber. An internal fan 1404 may spread the cold air throughout the chamber 1402 in which the biological specimen is placed to cool the biological specimen down from temperatures around room temperature to temperatures around −180° C. externally. This external cooling may be done in conjunction with perfusive volumetric cooling.

In some implementations, fluids used in perfusive volumetric cooling may include nanoparticles such as magnetic nanoparticles. In some implementations, the nanoparticles may be used to enhance perfusion into the tissue. In an example, steering of nanoparticles may be used to enhance perfusion into dense tissue. In an example, the steering may be image guided and the magnetic nanoparticles may be guided using magnets. In an example, the nanoparticles that may be used during rewarming as described elsewhere.

The biological specimen's internal temperature may match the external temperature to achieve uniform cooling and minimize thermal gradients. One or more heat exchangers 1405 may be placed inside the controlled temperature environment 1402, and this heat exchanger 1405 may be pre-filled with an inert fluid that will be used for perfusion. The pre-loaded inert fluid may then be cooled simultaneously with the controlled rate freezer temperature chamber 1402 as the pre-loaded fluid is inside the heat exchanger 1405 in the chamber.

An additional temperature modulation system, such as a system for blowing or suctioning cryogen to cool the fluid in the heat exchanger or hot gas to warm the fluid in the heat exchanger, may be used to more quickly cool or warm the inert fluid in or flowing through the heat exchanger 1405 relative to the controlled temperature environment. This may provide fine-tuned control of the temperature of the inert fluid flowing through the heat exchanger 1405. The inert fluid in the heat exchanger 1405 may be pumped out of the heat exchanger and into the biological specimen 1401 through a cannula connected to the vasculature to profusely cool the biological specimen 1401 as the fluid is pumped through. The heat exchanger 1405 may be sized such that the internal volume of the heat exchanger and the volume of the tubing connecting the heat exchanger to the biological specimen matches the amount of inert fluid necessary for the entire perfusion cooling. The perfusate may cool down at the same rate as the entire temperature-controlled chamber, or the fine-tuned control of temperature provided by the additional temperature modulation method for the inert fluid inside of the heat exchanger may be used to control the temperature of the perfusate entering the biological specimen. This temperature may be monitored using a temperature sensor 1406 (e.g., a type T thermocouple or optical probe) to determine the temperature of the fluid entering the biological specimen. Other temperature sensors 1406 may be placed throughout the system to monitor other areas of thermal interest.

Various components of the system, which may include the pump, the temperature sensor(s), the controlled rate freezer cooling rate, and the additional temperature modulation method for the heat exchanger, may be monitored and controlled programmatically using computer hardware and a software program running on the computer hardware. The flow of the perfusate may be controlled by a pump 1407 (e.g., a syringe pump or a peristaltic pump). The heat exchanger 1405 may be placed outside the chamber 1402, where the perfusate may also be cooled or heated using an additional temperature modulation system.

Additionally, an inline heater 1408 (e.g., an inline resistance heater) may be used to control the temperature of the inert fluid flowing through the line. In some variations, just one inert fluid is used to cool the biological specimen to temperatures around −180° C. A mix of inert fluids can be used. Alternatively, several inert fluids 1409 may be switched between throughout the cooling process. The inert fluid may be part of a perfusate which also comprises CPA and/or carrier fluid. Some variations use rapid, temperature-controlled perfusion with perfluoropentane (liquid at room temperature, freezing point of −115° C.), followed by liquid perfluoropentane perfusion (gas at room temperature, boiling point of −36.7° C., freezing point of −183° C.). These two inert fluids may be switched during the cooling, particularly at an annealing step that are necessary for equilibrating tissue temperature with the outside environment. For example, one may stop perfusing perfluoropentane right before reaching perfluoropentane's freezing point of −115° C. At that step, a temperature hold may be performed from 5-20 minutes. It may be preferred to perform annealing right before the glass transition, Tg, to equalize any thermal gradients in the biological specimen. In other variations, no annealing step may be needed or only a short step may be needed given the more volumetrically distributed cooling nature of the perfusive cooling system, particularly if just one inert fluid is used for the whole perfusive cooling process.

Because CPA has high viscosity, especially relative to the inert fluids described, it may be necessary to wash the CPA out of the vasculature with higher viscosity inert fluid before perfusing the biological specimen with lower viscosity inert fluid, which may have a low freezing/vitrification point. A controlled valve 1410 may be used throughout the system and may be used to switch between perfusates. A filter 1411 may be placed inline to remove impurities.

Close to the glass transition temperature of the biological specimen, if nanowarming approaches described herein are used to be used to rewarm the tissue, it may be necessary to perfuse magnetic nanoparticles (MNPs) 1412 into the perfusate so that they are flushed inside the vasculature and remain there until the rewarming step. These MNPs 1412 may be mixed with the inert fluid, and this mixture may be perfused through the biological specimen (e.g., through vasculature of an organ or organism). MNPs, especially MNPs in CPA and/or inert fluids, may also be placed around the tissue, such as in a bag that the biological specimen is placed inside of. During nanowarming of the biological specimen, the surrounding MNPs in the bag serve to rewarm the biological specimen externally while the MNPs inside the vascular warm the biological specimen internally, yielding rewarming that is close to volumetrically homogeneous in nature (desirable for similar reasons as volumetrically homogenous cooling). Pumps 1407 may be used for nanoparticle loading, such as a one or more syringe pumps 1413, peristaltic pumps, or similar pumps, and these pumps may be programmatically controlled by software running on computer hardware. The system may also comprise pressure sensors 1414.

Figure 15B:
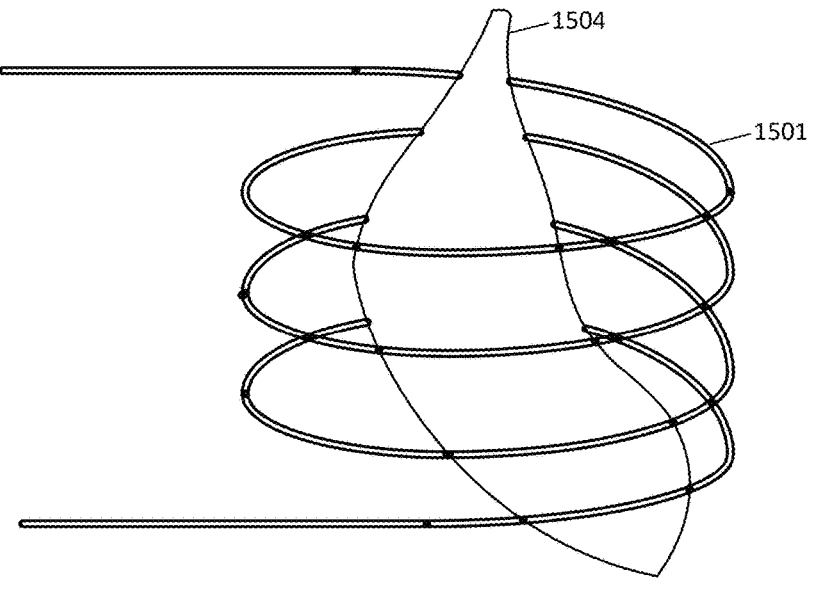
FIG. 15B illustrates a variation of an organ positioned with a reheating station.
Figure 15C:
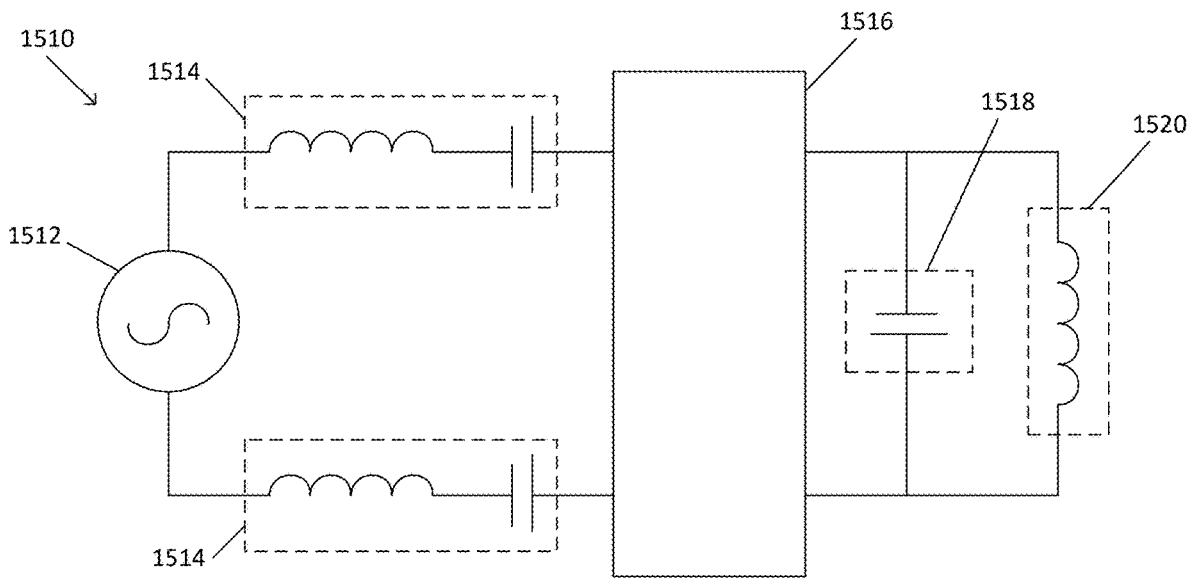
FIG. 15C illustrates a circuit diagram of a variation of an electromagnet system for reheating an organ.

FIGS. 15A-15C illustrate aspects of a rewarming station in accordance with some variations described herein. The rewarming station 1500 of FIG. 15A comprises a magnetic field coil 1501 and an AMF induction heater 1502. A biological specimen 1504 or holder assembly may be placed inside of the magnetic field coil 1501, as shown in FIG. 15B. The holder 1503 may comprise a biological specimen 1504, magnetic nanoparticles 1505, and a temperature probe 1506. The holder 1503 may comprise inlet and outlet ports 1508 which may connect to the biological specimen 1504 for perfusion. The biological specimen may be connected to the inlet and outlet ports 1508 using one or more connectors 1510. In an example, connectors 1510 may include cannulas configured to secure to a biological specimen's vasculature. In an aspect, the connectors 1510 may form a sealed connection to allow for pressurized circulation of CPAs throughout the vasculature and tissue of the biological specimen 1504. Examples of connectors 1510 may include standard ports such as luer locks, as well as tissue or organ specific cannulas configured to secure to different types of organ or organisms and vasculature. In an example, connectors 1510 for the brain cannula may include pre-made cannulas.

FIG. 15C illustrates a circuit diagram of a variation of an electromagnet system for reheating an organ. The warming system may include an AMF circuit 1510 and a magnetic field coil 1520 configured to generate AMF when current flows through the magnetic field coil (e.g., as shown in FIGS. 1 and 11). The size of the magnetic field coil may depend on the tissue, and the tissue may be placed inside the magnetic field coil (e.g., at the center of the magnetic field coil, as shown in FIG. 15B). AMF heater circuit 1510 which may drive the heating of the biological sample may comprise any or all of the following: a) a parallel inverter or parallel impedance output 1512, b) one or more series resonators 1514 including a capacitor and inductor in series, c) an impedance transformer 1516, d) a parallel LC tank circuit containing a capacitor bank 1518 in parallel with an inductor, where the inductor is the magnetic field coil 1520 used to warm the tissue slice.

EXPERIMENTAL EXAMPLES

Example 1—Effect of PVA on Cryopreservation

The commonly used ice blocker X-1000 contains PVA. To determine the effect of PVA on cryopreservation, experiments were conducted using cryoprotective solutions with and without X-1000. In these experiments, brain slices were treated with VMP containing X-1000 or VMP without X-1000 (VMP-noX). The cryoprotectant solution VMP comprised 16.8 wt % ethylene glycol, 22.3% DMSO, 12.9% formamide, 1% X-1000, 1% Z-1000. X-1000 and Z-1000 are synthetic ice blocker solutions composed of 20% w/w % polyvinyl alcohol and 40% w/w % polyglycerol, respectively. VMP-noX comprised 16.8 wt % ethylene glycol, 22.3% DMSO, 12.9% formamide, 1% Z-1000, made by simply removing X-1000 from the recipe for VMP and diluting in LM5 carrier solution (1 mM adenine hydrochloride, 1 mM calcium chloride, 90 mM glucose, 5 mM glutathione, 2 mM magnesium chloride, 28.5 mM potassium chloride, 7.2 mM potassium phosphate monobasic, 10 mM sodium bicarbonate, 45 mM lactose, 45 mM mannitol). Solutions were made within 24 hours before use.

Figure 16A:
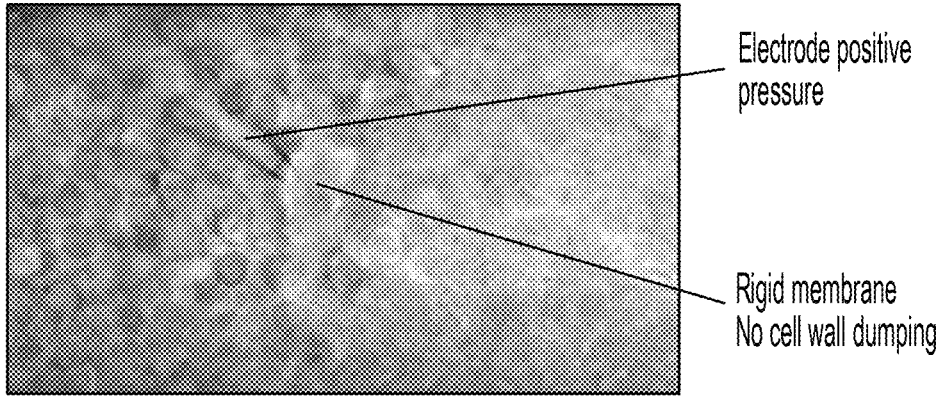
FIGS. 16A and 16B illustrates the results of an experiment conducted to test the toxicity of polyvinyl alcohol (PVA).
Figure 16B:
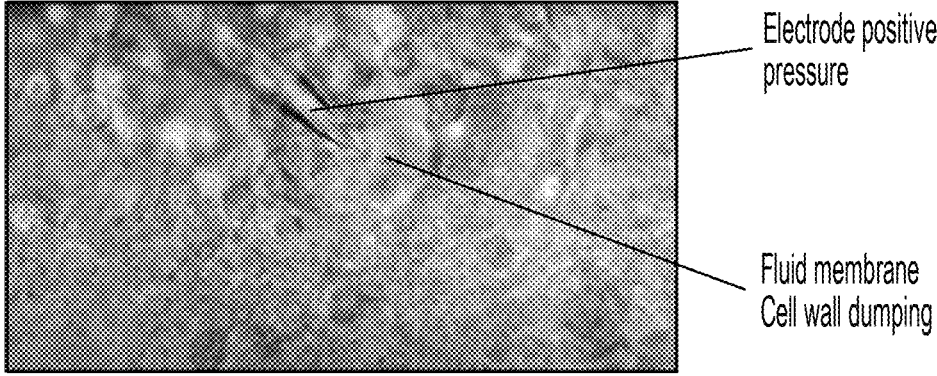

Following treatment, bright-field images were taken of neurons while local positive pressure was exerted on the neurons through a glass pipette. In healthy neurons, local positive pressure creates dimple shape shades on the soma membrane. Turning to FIG. 16A, the membrane surface near the glass electrode exhibited universal contrast. When brain slices were treated with VMP containing X-1000, no dimple shape shades were observed on the soma membrane. In contrast, when brain slices were treated with VMP-noX, dimple shape shades were observed on the soma membrane (FIG. 16B). As shown in FIG. 16B, the electrode points to a dark round spot surrounded by a bigger round shaped shadow. The effects of X-1000 may result in a rigid membrane post-treatment. Further, PVA may integrate into the cell membrane and not easily be washed out, potentially causing lasting membrane rigidity and damage to cell function. Therefore, cryoprotective solutions without PVA may result in higher viability after cryopreservation.

Figure 16C:
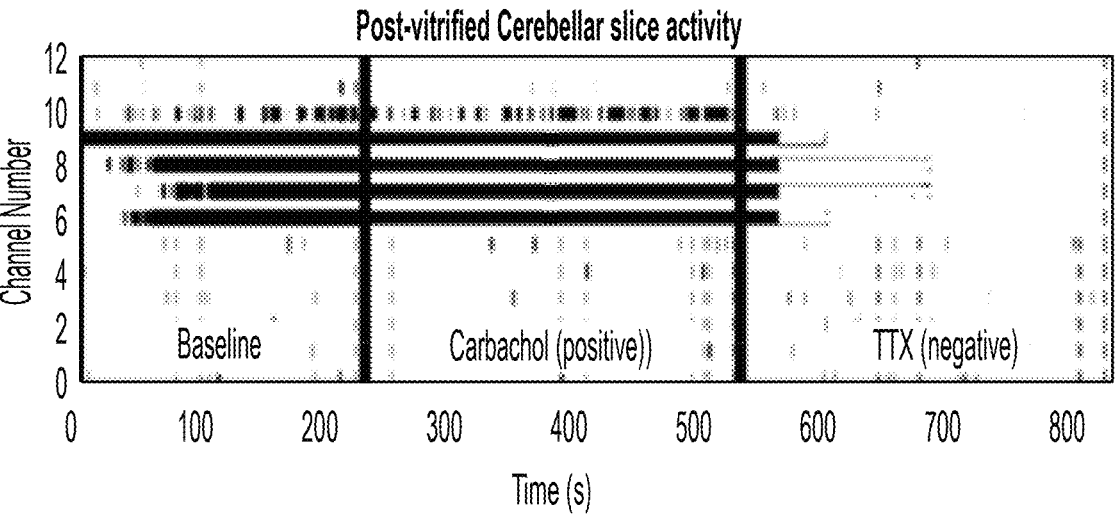
FIG. 16C illustrates the activity from cerebellum slice after cryopreservation with VMP-noX, rewarmed and measured with 3Brain MEA.
Figure 16D:
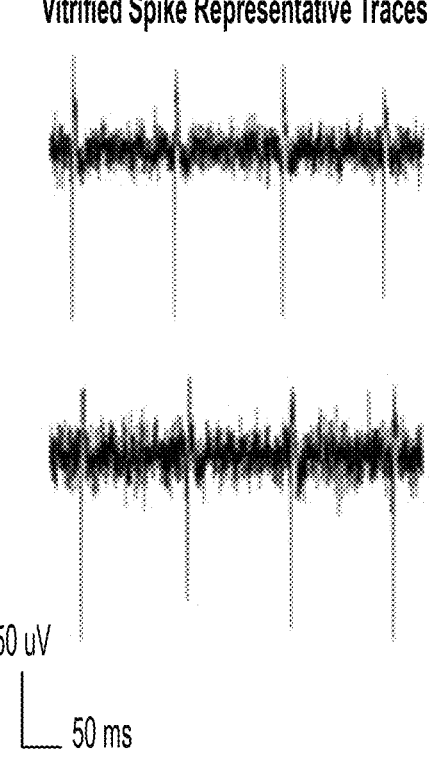
FIG. 16D shows vitrified spike representative traces showing the activity of neurons from 12 units.
Figure 16E:
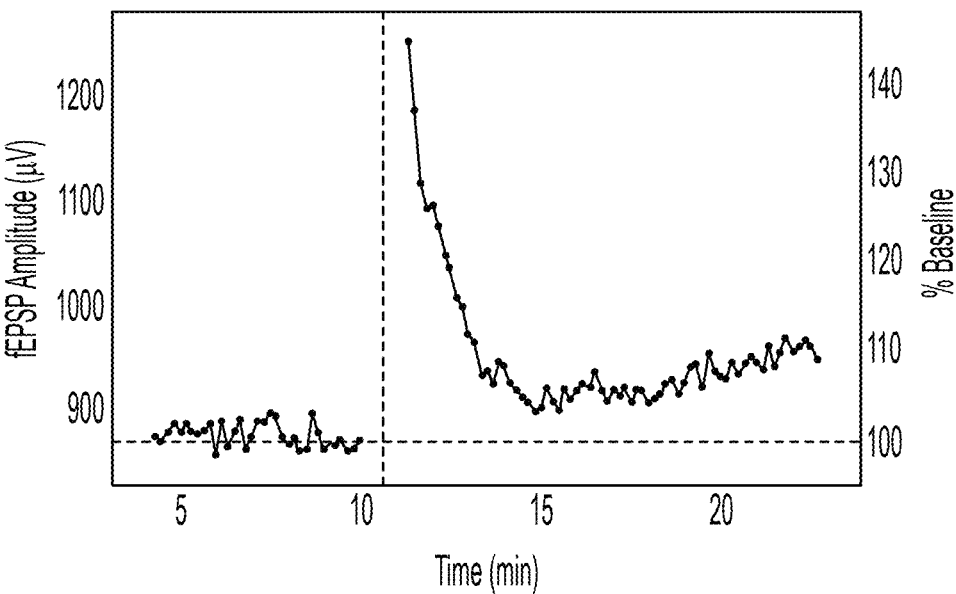
FIGS. 16E-16F illustrate the intact functional synaptic connectivity at schaffer collateral in the hippocampus.
Figure 16F:
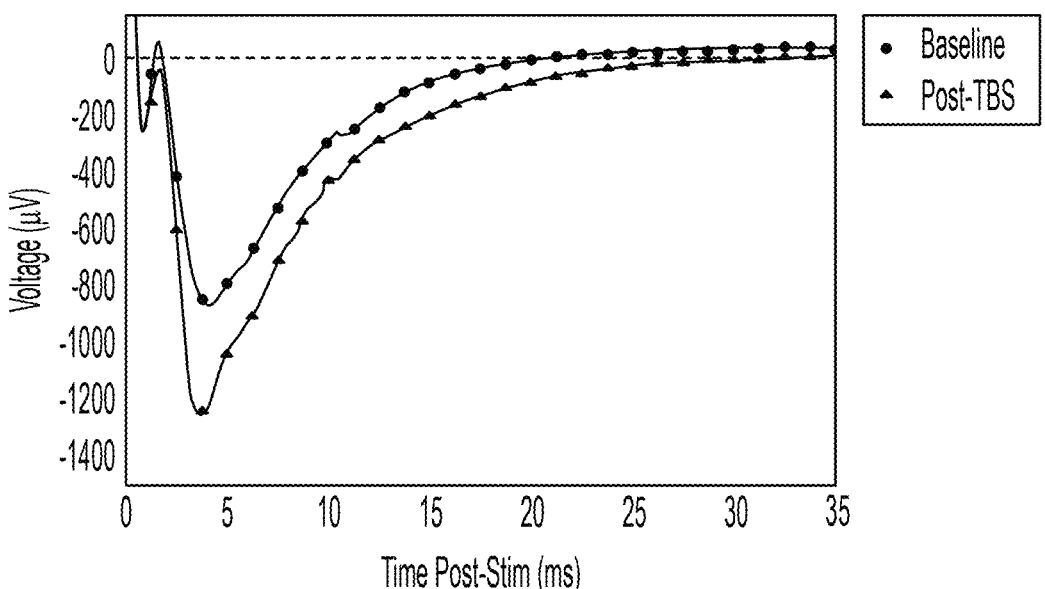
Figure 16G:
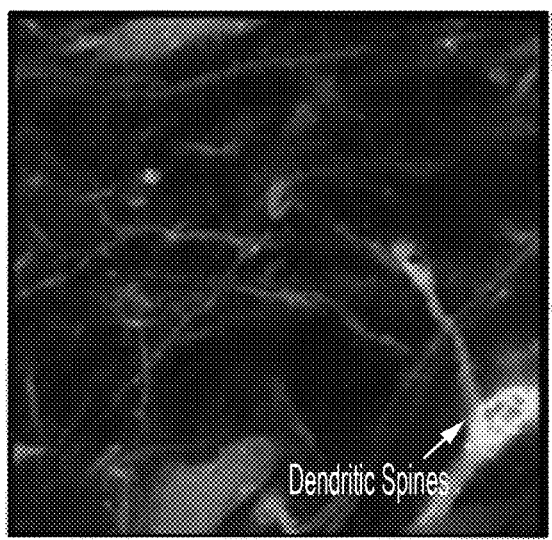
FIG. 16G illustrates the preservation of dendritic spines within a biological tissue sample following load-vitrification-unload utilizing a holder assembly.
Figure 16G:
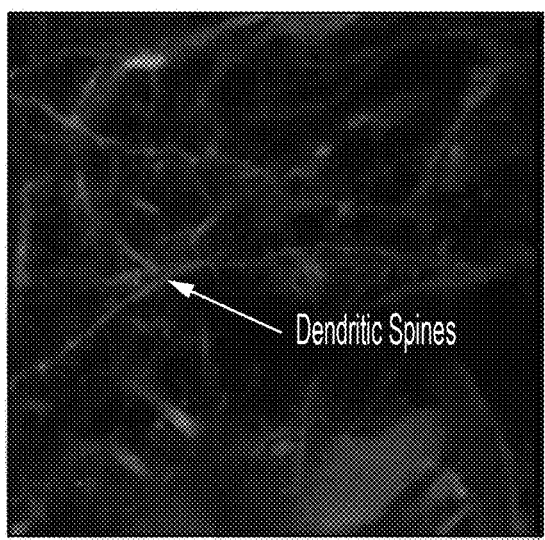

FIG. 16C illustrates the activity from cerebellum slice after cryopreservation with VMP-noX, rewarmed and measured with 3Brain MEA. FIG. 16D shows vitrified spike representative traces showing the activity of neurons from 12 units. FIGS. 16E-16F illustrate the intact functional synaptic connectivity at schaffer collateral in the hippocampus. In FIG. 16E, the synapse strength is measured as field potential (fEPSP). The field potential demonstrates a short potentiation after tetanus stimulation. Representatives of single field potential traces are shown in FIG. 16F. FIG. 16G illustrates the preservation of dendritic spines within a biological tissue sample following load-vitrification-unload utilizing the aforementioned holder assembly. Dendritic spine preservation is seen in excitatory pyramidal neurons within the CA1 region of the hippocampus in an acute rat hippocampal slice.

Example 2—Demonstration of Vitrification and Rewarming with High Viability

To demonstrate the ability to vitrify and rewarm a tissue sample while maintaining high viability using the systems and method disclosed herein, the following experimental procedure was conducted.

Animals

CD (Sprague Dawley) rats were obtained from Charles River and housed with food and water ad libitum. Male and female rats aged postnatal day P12 to P19 were used for experiments.

Acute Slice Preparation

Acute sagittal cerebellar slices were prepared in order to evaluate viability of neural tissue following cryopreservation. A modified aCSF cutting solution containing high sucrose and magnesium to reduce activity during slicing (87 mM sodium chloride, 25 mM sodium bicarbonate, 1.25 mM sodium phosphate monobasic, 0.5 mM calcium chloride, 2.5 mM potassium chloride, 25 mM D-glucose, 75 mM sucrose, 7 mM magnesium chloride; Wang et al. 2024) was prepared, osmolyzed, adjusted to 300-330 mOsm, and carbogenated with gas containing 95% oxygen and 5% carbon for at least 30 minutes prior to use. This solution was used for transcardiac perfusion, dissection, and vibratome slicing and was kept ice cold and carbogenated throughout. Following isoflurane anesthesia and transcardiac perfusion, the brain was dissected from the skull and glued onto the slicing platform against a block of 3% agarose for vibratome sectioning of sagittal cerebellar slices. 300 μm thick sections were sliced and incubated in carbogenated aCSF solution (125 mM sodium chloride, 25 mM sodium bicarbonate, 1.25 mM sodium phosphate monobasic, 2 mM calcium chloride, 3 mM potassium chloride, 25 mM D-glucose, 1 mM magnesium chloride, 3 mM sodium pyruvate) at 32° C. for 30 minutes then transferred to carbogenated aCSF solution at room temperature for at least 15 minutes prior to experimentation.

CPA Solutions

The cryoprotectant solution VMP (16.8 wt % ethylene glycol, 22.3% DMSO, 12.9% formamide, 1% X-1000, 1% Z-1000) has been used previously in organ cryopreservation experiments (Han et al. 2023). X-1000 and Z-1000 are synthetic ice blocker solutions obtained from 21st Century Medicine composed of 20% w/w % polyvinyl alcohol and 40% w/w % polyglycerol, respectively. In our experiments, we used a modification of VMP, here called VMP-noX (16.8 wt % ethylene glycol, 22.3% DMSO, 12.9% formamide, 1% Z-1000), made by simply removing X-1000 from the recipe for VMP and diluting in LM5 carrier solution (1 mM adenine hydrochloride, 1 mM calcium chloride, 90 mM glucose, 5 mM glutathione, 2 mM magnesium chloride, 28.5 mM potassium chloride, 7.2 mM potassium phosphate monobasic, 10 mM sodium bicarbonate, 45 mM lactose, 45 mM mannitol). Solutions were made within 24 hours before use. For gradual loading and unloading of cryoprotectant in slices, the concentration of VMP-noX was decreased by diluting with additional LM5 with programmatically controlled channels on an Ismatec Reglo ICC 4-channel peristaltic pump feeding into the perfusion well (see below).

CPA Loading

Turning to FIG. 9B, a loading protocol for CPA loading is shown. Prior to CPA loading, the slice loading system described above was prepared and the tubes were primed with LM5 carrier and VMP-noX CPA. Fresh cerebellar slices, prepared as described, were transferred to the perfusion well containing LM5 solution and the CPA loading protocol was initiated. The loading protocol included: 10 minutes of 0×CPA (LM5 carrier only), 200 second ramp from 0× to 1×CPA, and holding at 1×CPA for 10 minutes. The total flow rate into the inlet of the well was set to 2 mL/min and the flow rate at the outlet was set to 2.2 mL/min in order to maintain a steady fluid level within the well. The temperature setpoint throughout loading and unloading was 4° C. to 10° C. and was regulated by two inline glass heat exchangers. To improve temperature control, cryoprotectant loading was run in a refrigerator set to 4° C. with solution reservoirs on ice. To test toxicity of the cryoprotectant without contribution of damage associated with cryogenic cooling, a set of slices were run through the load unload protocol all the way through without pausing for vitrification and rewarming.

Vitrification

At the end of the CPA loading protocol, slices were prepared for rapid cooling to cryogenic temperatures. Fluid was removed from the perfusion well and the slice was gently centered on the sapphire disk at the bottom of the well. The perfusion hat was removed and replaced with the vitrification hat. The assembly was transferred to the vitrification and rewarming station, where the assembly was hooked up to a pre-cooled LN2 nozzle for vitrification and nestled within the coil of a 15 kW, 30-80 kHz induction heater for subsequent rewarming. LN2 was supplied from a 15-psi liquid nitrogen dewar. Once in place, a solenoid valve gating LN2 flow across the slice was opened to allow for rapid cooling. Temperature recording from the T-type thermocouple placed next to the slice was monitored, and LN2 flow was maintained for 30 seconds after minimum temperature (about −196° C.) had been reached. Cooling rates of 1140° C./min were reached (calculated as an average over the period t=0 to t=10), but this differed slightly from slice to slice.

AMF Rewarming

After 30 seconds at −196° C., LN2 flow was halted, and the AMF was quickly turned on to begin rewarming. Warming occurred via the magnetic heating of two thin carbon steel disk shims attached to both sapphire disks on the side not in contact with the brain slice. Rates of 1280° C./min (calculated as an average over the period t=0 to t=10) were reached, but this differed slightly from slice to slice. The temperature probe next to the slice monitored the temperature and when the slice reached 0° C. the AMF maintained the temperature at 0° C. (or 10° C. depending on experiment) with PID control.

CPA Unloading

After rewarming, the vitrification hat was removed from the assembly and the perfusion hat was re-installed. The CPA unloading protocol was initiated, which included a 500 second linear ramp from 1× to 0×CPA, followed by 10 minutes of 0×CPA (LM5 carrier only). At the end of the protocol, the slices were removed from the CPA perfusion device and placed in warm incubation in carbogenated aCSF for 30 minutes at 32° C., followed by at least 15 minutes in carbogenated aCSF at room temperature.

MEA Slice Electrophysiology

Viability in tissue slices was evaluated by multi-electrode array electrophysiology using the BioCAM X (3Brain). Healthy control slices were evaluated soon after post-slicing incubation. Experimental slices were evaluated soon after post-unload incubation.

An Acura 2D chip model was used with 4,096 electrodes in a working area of 3.84 mm×3.84 mm and an electrode size of 21 μm×21 μm. Recordings were acquired with 100 kHz sampling frequency. Slices were carefully placed on the multielectrode array chip and imaged under a stereoscope, secured with the slice holder insert, and plugged into the BioCAM X system for recording. The slice was perfused with carbogenated aCSF solution at ~2 mL/min, and the perfusion inlet and the chip base were held at 32° C.

A 3-minute baseline recording was taken. Then, after about 3 minutes of 50 uM carbachol perfusion, another 3-minute recording was taken during continued carbachol perfusion. Carbachol is an acetylcholine receptor agonist and increases spiking and activity in cerebellar slices by activating muscarinic receptors, enhancing neuronal excitability and synaptic transmission. Finally, after about 3 minutes of 10 μM tetrodotoxin perfusion, another 3-minute recording was taken during continued tetrodotoxin perfusion. Tetrodotoxin blocks neural activity by binding to and inhibiting voltage-gated sodium channels on neuronal membranes, preventing the initiation and propagation of action potentials.

Histology

After MEA electrophysiology, we roughly visualized the morphology of one of the vitrified slices with DAPI staining. The slice was fixed for 20 minutes in 10% neutral buffered formalin and permeabilized in 3% Triton X-100 in PBS for 18 hours at 4° C. The slice was then washed and stained with DAPI solution at 10 μg/mL for 30 minutes to stain the nuclei of all cells. The slice was mounted on a slide in PBS and dehydrated in ethanol (10 min at 30% EtOH, 10 min 50%, 15 min 70%, 15 min 80%, 20 min 95%, 40 min 100%), cleared in xylenes (40 min), and mounted with a Vectamount Express Mounting Medium (Vector Labs). The slice was imaged on an Olympus FV3000 confocal microscope. A Z-stack of the whole slice was acquired with a 10× magnification objective (UPLXAPO10X), 1.5× zoom, and 405 nm wavelength laser excitation.

Figure 17B:
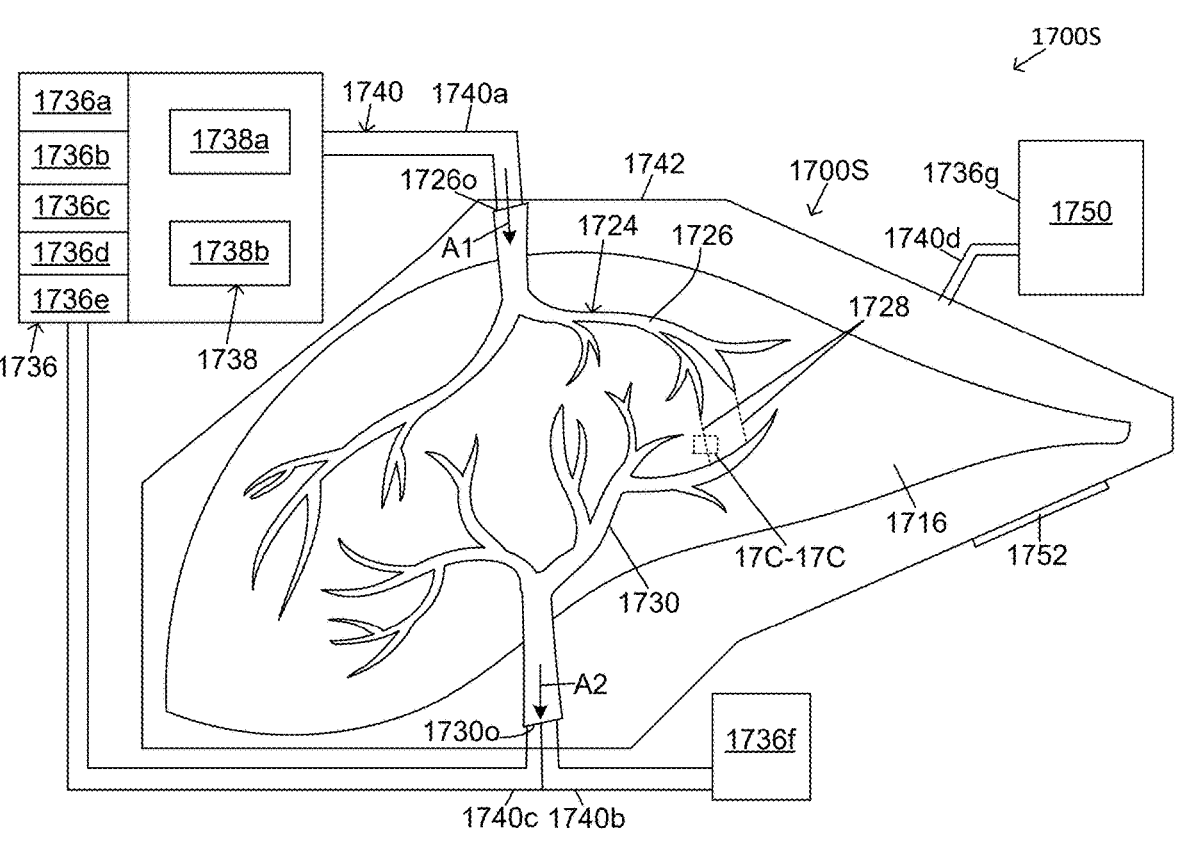
FIG. 17B illustrates a variation of an organ that can be cryopreserved using the method of FIG. 17A.

FIGS. 17A-17Z8 illustrate a variation of a method 1700M for cryopreserving a biological specimen 1716. FIGS. 17B-17Z8 illustrate a variation of a system 1700S for cryopreserving the specimen 1716. The system 1700S can perform and/or can be used to perform zero, one, some, or all of the steps of the method 1700M.

FIG. 17A illustrates that the method 1700M can involve, for example, step 1702, step 1704, step 1706, step 1708, step 1710, step 1712, and step 1714, or any combination thereof. The steps of the method 1700M can be executed in any order, for example, in the order shown in FIG. 17A. The steps of the method 1700M can be modified, omitted, combined, rearranged, or any combination thereof. For example, steps 1708 and 1710 can be combined (e.g., can be performed simultaneously). As another example, steps 1712 and 1714 can be combined (e.g., can be performed simultaneously). As yet another example, steps 1712 and 1714 can be omitted such that the method 1700M can have steps 1702, 1704, 1706, 1708, and 1710. As still yet another example, steps 1706, 1712, and 1714 can be omitted such that the method 1700M can have steps 1702, 1704, 1708, and 1710. As yet another example, the method 1700M can have all the steps as shown in FIG. 17A. Any process and/or step disclosed herein can be added to the method 1700M, and/or any process and/or step disclosed herein can be performed together with any of the steps of the method 1700M. For example, a coolant (e.g., the coolant 1750) can be perfused into, through, and/or out of a chamber (e.g., the chamber 1742) before, during, and/or after any of the steps shown in FIG. 17A.

The specimen 1716 can be perfused with one or multiple fluids 1718 (also referred to as the fluid 1718 and the fluids 1718), for example, 1-10 or more fluids, including every 1 fluid increment within this range (e.g., 1 fluid, 2 fluids, 3 fluids, 4 fluids, 10 fluids). For example, FIGS. 17A-17Z8 illustrate that the specimen 1716 can be perfused with a first fluid 1718a, a second fluid 1718b, a third fluid 1718c, and a fourth fluid 1718d, or any combination thereof. However, the specimen 1716 can be perfused with any number of fluids according to the method 1700M.

The fluids 1718 can be cryoprotective, can be baroprotective, can be inert, can be non-inert, can have one or multiple cryoprotectants 1720, can have a carrier solution, can have nanoparticles 1722, can have a biochemical mechanism of action (MoA), or any combination thereof. For example, FIGS. 17A-17Z8 illustrate that the first fluid 1718*a* can be a cryoprotective fluid, that the second fluid 1718*b* can be a first inert fluid, that the third fluid 1718*c* can be a second inert fluid, and that the fourth fluid 1718*d* can be a third inert fluid, or any combination thereof. FIGS. 17A-17Z8 illustrate, for example, that the first fluid 1718*a* can have one or multiple cryoprotectants 1720, that the third fluid 1718*c* can have nanoparticles 1722, and that the fourth fluid 1718*d* can have nanoparticles 1722, or any combination thereof. FIGS. 17A-17Z8 illustrate, for example, that the first fluid 1718*a* may not have nanoparticles 1722, that the second fluid 1718*b* may not have cryoprotectants 1720, that the third fluid 1718*c* may not have cryoprotectants 1720, and that the fourth fluid 1718*d* may not have cryoprotectants 1720, or any combination thereof. As another example, the first fluid 1718*a* can have nanoparticles 1722, the second fluid 1718*b* can have one or multiple cryoprotectants 1720, the third fluid 1718*c* can have one or multiple cryoprotectants 1720, and the fourth fluid 1718*d* can have one or multiple cryoprotectants 1720, or any combination thereof.

The fluids 1718 can have zero, one, or multiple cryoprotectants 1720 (also referred to as the cryoprotectant 1720, the cryoprotectants 1720, the cryoprotective agent 1720), for example, 0-10 or more cryoprotectants, including every 1 cryoprotectant within this range (e.g., 0 cryoprotectants, 1 cryoprotectant, 2 cryoprotectants, 10 cryoprotectants). The fluids 1718 can include a carrier solution (e.g., LM5) and/or a CPA solution (e.g., VMP, VM3). The fluids 1718 can include, for example, a carrier solution and/or a CPA solution comprising the cryoprotectant 1720. For example, each of the fluids 1718 can have none, some (e.g., any combination of 1 or more), or all of the following cryoprotectants 1720 (also referred to as CPAs): VPM, VMP, VM3, ethylene glycol, DMSO, formamide, Z-1000, polyglycerol, trimethylamine-N-oxide, and antifreeze proteins. FIGS. 17A-17Z8 illustrate, for example, that the first fluid 1718*a* can have a cryoprotectant 1720 (e.g., one or more of VMP, VM3, ethylene glycol, DMSO, formamide, Z-1000, polyglycerol, trimethylamine-N-oxide, antifreeze proteins), and that the second fluid 1718*b*, the third fluid 1718*c*, and/or the fourth fluid 1718*d* may not have a cryoprotectant 1720. As another example, the second fluid 1718*b*, the third fluid 1718*c*, and/or the fourth fluid 1718*d* can have any combination of cryoprotectants 1720 (e.g., VMP, VM3, ethylene glycol, DMSO, formamide, Z-1000, polyglycerol, trimethylamine-N-oxide, antifreeze proteins), including the same or different cryoprotectants 1720 as the first fluid 1718*a*. The cryoprotectants 1720 can be absorbed by (e.g., be diffused, actively or passively transported, or otherwise loaded into) the specimen 1716 (e.g., by the cells of the specimen 1716 and/or into interstitial spaces). As another example, the cryoprotectants 1720 may not be absorbed by the specimen 1716 (e.g., by the cells of the specimen 1716 and/or into interstitial spaces).

A carrier solution can be cryoprotective, may not be cryoprotective, can have molecules that can be cryoprotective, or any combination thereof. The molecules of the carrier solution can provide direct or indirect cryoprotection to the specimen 1716, for example, by pre-conditioning the specimen 1716 for cryostress and/or chemical toxicity. The fluids 1718 and/or the cryoprotectant 1720 can, for example, inhibit and/or prevent ice formation in and/or on the specimen 1716, pre-condition the specimen 1716 for cryostress, pre-condition the specimen 1716 for chemical toxicity, or any combination thereof.

The method 1700M can include a staggered perfusion (e.g., a temporarily staggered perfusion) of the fluids 1718 and/or the cryoprotectants 1720 such that the fluids 1718 and/or the cryoprotectant 1720 can be perfused at a first fluid pressure and at a second fluid pressure, whereby the first fluid pressure can be less than (e.g., producing a flow rate slower than) the second fluid pressure. In some variations, the first fluid pressure is greater than (e.g., producing a flow rate faster than) the second fluid pressure. The fluids 1718 and/or the cryoprotectant 1720 can be perfused at the first fluid pressure before the second fluid pressure or vice versa. For example, the first fluid 1718*a* can have a series of multiple different CPA formulations throughout the duration of CPA loading, and the concentration of the various CPAs may be varied during perfusion of the first fluid 1718*a*. In a further example, two or more of the fluids may be perfused in a staggered perfusion. For instance, the first fluid 1718*a* can be flowed at a first fluid pressure, and the second fluid 1718*b* can be concurrently flowed at a second fluid pressure. The first fluid pressure may be decreased while the second fluid pressure is increased in order to gradually (or stepwise, or according to any other desired scheme) perfuse less of the first fluid 1718*a* and more of the second fluid 1718*b*.

The fluids 1718 can have zero, one, or multiple surfactants, for example, 0-10 or more surfactants, including every 1 surfactant within this range (e.g., 0 surfactants, 1 surfactant, 2 surfactants, 10 surfactants). The surfactants may include one or more of Pluronic F-68, Pico-Surf® (e.g., 2% w/w in Novec 7500), or some other surfactant. The addition of surfactant can improve miscibility of inert fluids in the cryoprotectant 1720 to increase efficiency and completeness of fluidic exchange in the vasculature 1724, with the end goal being to exchange all or a majority (e.g., 90.0% or more, 95.0% or more, 99.0% or more, 99.9% or more) of the cryoprotectant 1720 from the vasculature 1724 and replace it with one or multiple inert fluids (e.g., the first fluid 1718*a*, the second fluid 1718*b*, and/or the third fluid 1718*c*) for subsequent perfusive cooling. For example, a surfactant can be added to the second fluid 1718*b*, which can be an inert fluid, so the fluidic interface between it and the first fluid 1718*a*, which can be and/or have the cryoprotectant 1720, is eliminated. If the surfactant is not included, the fluid interface between two immiscible fluids, such as an inert fluid and the cryoprotectant 1720, can cause streaming, droplet formation, and/or can block some vascular paths from being perfused by surface tension at the interface. FIGS. 17A-17Z8 illustrate, for example, that the first fluid 1718*a*, the second fluid 1718*b*, the third fluid 1718*c*, and/or the fourth fluid 1718*d* may not have a surfactant. As another example, the first fluid 1718*a*, the second fluid 1718*b*, the third fluid 1718*c*, and/or the fourth fluid 1718*d* can have a surfactant. The surfactants can be absorbed by the specimen 1716 (e.g., by the cells of the specimen 1716). As another example, the surfactants may not be absorbed by the specimen 1716 (e.g., by the cells of the specimen 1716). As yet another example, the fluids 1718 can have one or multiple surfactants in addition to and/or in lieu of the cryoprotectants 1720. The surfactant can be, for example, n-octyl-β-D-galactopyranoside, Pluronic F-68, Pico-Surf® (2% (w/w) in Novec™ 7500, or any combination thereof.

The first fluid 1718*a* can comprise one or more cryoprotective agents. The first fluid 1718*a* can comprise a carrying solution, for example, LM5. The first fluid 1718*a* can comprise a perfluorocycloether. The first fluid 1718*a* can comprise, for example, less than 0.5% w/v polyvinyl alcohol. The first fluid 1718a can be, for example, baroprotective. The first fluid 1718a can be, for example, a baroprotective fluid. The first fluid 1718a can be, for example, a cryoprotective fluid and/or a baroprotective fluid. The first fluid 1718a and/or the cryoprotectant 1720 can be absorbed by the specimen 1716 (e.g., by the cells of the specimen 1716). As another example, the first fluid 1718a and/or the cryoprotectant 1720 may not be absorbed by the specimen 1716 (e.g., by the cells of the specimen 1716). The first fluid 1718a can comprise a liquid and/or a gas. The first fluid 1718a can be a solution. The first fluid 1718a can be, for example, an aqueous solution. The first fluid 1718a can be, for example, an aqueous cryoprotectant. The first fluid 1718a can be, for example, an aqueous solution having the cryoprotectant 1720. The first fluid 1718a can be, for example, a carrier solution and/or a CPA solution. The first fluid 1718a can be, for example, a carrier solution and/or a CPA solution comprising the cryoprotectant 1720.

The fluids 1718 and/or components of the fluids 1718 (e.g., the cryoprotectant 1720 and/or the surfactants) can be absorbed by the specimen 1716, may not be absorbed by the specimen 1716, or both. For example, the fluids 1718 and/or components of the fluids 1718 can (1) be isolated to the vasculature 1724 (e.g., inert fluids which are not miscible with aqueous solution and do not contain sufficient surfactant to cause miscibility), (2) diffuse out of vasculature 1724 but isolated to the interstitial fluid (e.g., "non-permeating" cryoprotectant polymers that are too big to enter into cells but can pass between cells), (3) diffuse into cells by various mechanisms (for example, "penetrating" cryoprotectants), or any combination of these three categories (also referred to as types). For example, inert fluids (e.g., the second fluid 1718b, the third fluid 1718c, and/or the fourth fluid 1718d) can be in category (1), where if surfactant is added to inert fluids they can become and/or behave like category (2) or (3). Cryoprotectants 1720 can intentionally have a mixture of type (2) and (3) to keep a higher concentration of cryoprotectant outside the cells of the specimen 1716 and thus prevent ice formation in the interstitial/extracellular space. The fluids 1718 and/or components of the fluids 1718 can thereby diffuse out of the vasculature and/or be transported (e.g., via active and/or passive transport) into the cells of the tissue.

The second fluid 1718b can be an inert fluid. The second fluid 1718a can be a fluorous fluid. The second fluid 1718b can comprise a fluorous fluid. The second fluid 1718b can be and/or can comprise one or more perfluoroethers, one or more partially fluorinated ethers, one or more perfluoropolyethers, one or more partially fluorinated polyethers, and/or one or more perfluorocarbons. The second fluid 1718b can be and/or can comprise, for example, HT-270. The second fluid 1718b can be and/or can comprise, for example, a perfluorinated polyether such as HT-270. The second fluid 1718b can be and/or can comprise, for example, perfluoropentane, perfluorohexane, or perfluoropentane and perfluorohexane. The second fluid 1718b can be bio-orthogonal. The second fluid 1718b can be, for example, a bio-orthogonal fluorinated solvent. The second fluid 1718b may include one or more agents such as a perfluorocycloether (e.g. FC-77) to promote vitrification of the second fluid as the specimen is cooled beyond the freezing point of the second fluid. The second fluid 1718b may not be absorbed by the specimen 1716 (e.g., by the cells of the specimen 1716). As another example, the second fluid 1718b can be absorbed by the specimen 1716 (e.g., by the cells of the specimen 1716). The second fluid 1718b can comprise a liquid and/or a gas.

The second fluid 1718b can be a solution. The second fluid 1718b can also comprise nanoparticles, such as magnetic nanoparticles.

The third fluid 1718c can be an inert fluid. The third fluid 1718c can be a fluorous fluid. The third fluid 1718c can comprise a fluorous fluid. The third fluid 1718c can be and/or can comprise one or more perfluoroethers, one or more partially fluorinated ethers, one or more perfluoropolyethers, one or more partially fluorinated polyethers, and/or one or more perfluorocarbons. For example, the third fluid 1718c can be and/or can comprise perfluoropentane, perfluorohexane, or perfluoropentane and perfluorohexane. The third fluid 1718c can be and/or can comprise, for example, Novec 7000, Novec 7200, or Novec 7000 and Novec 7200. The third fluid 1718c can be bio-orthogonal. The third fluid 1718c can be, for example, a bio-orthogonal fluorinated solvent. The third fluid 1718c can flow down to significantly subzero temperatures, and can be and/or can comprise Novec 7000 and/or Novec 7200. The third fluid 1718c may include one or more agents such as a perfluorocycloether (e.g. FC-77) to promote vitrification of the third fluid as the specimen is cooled beyond the freezing point of the third fluid. The third fluid 1718c may not be absorbed by the specimen 1716 (e.g., by the cells of the specimen 1716). As another example, the third fluid 1718c can be absorbed by the specimen 1716 (e.g., by the cells of the specimen 1716). The third fluid 1718c can comprise a liquid and/or a gas. The third fluid 1718c can be a solution. The third fluid 1718c can also comprise nanoparticles, such as magnetic nanoparticles.

The fourth fluid 1718d can be a fluorous fluid. The fourth fluid 1718d can comprise a fluorous fluid. The fourth fluid 1718d can be and/or can comprise one or more perfluoroethers, one or more partially fluorinated ethers, one or more perfluoropolyethers, one or more partially fluorinated polyethers, and/or one or more perfluorocarbons. The fourth fluid 1718d can be and/or can comprise perfluoropentane, perfluoropropane, and/or perfluorohexane. The fourth fluid 1718d can be and/or can comprise, for example, Novec 7000, Novec 7200, or Novec 7000 and Novec 7200. The fourth fluid 1718d can be, for example, a bio-orthogonal fluorinated solvent. The fourth fluid 1718d can flow down to significantly subzero temperatures. The fourth fluid 1718d may include one or more agents such as a perfluorocycloether (e.g. FC-77) to promote vitrification of the fourth fluid as the specimen is cooled beyond the freezing point of the fourth fluid. The fourth fluid 1718d may not be absorbed by the specimen 1716 (e.g., by the cells of the specimen 1716). As another example, the fourth fluid 1718d can be absorbed by the specimen 1716 (e.g., by the cells of the specimen 1716). The fourth fluid 1718d can comprise a liquid and/or a gas. The fourth fluid 1718d can be a solution. The fourth fluid 1718d can also comprise nanoparticles, such as magnetic nanoparticles.

The first fluid 1718a can have a lower viscosity than the second fluid 1718b. The second fluid 1718b can have a higher viscosity than the first fluid 1718a. The second fluid 1718b can have a higher viscosity than the third fluid 1718c. The third fluid 1718c can have a lower viscosity than the second fluid 1718b. The viscosity of the third fluid 1718c can be less than, equal to, or greater than the viscosity of the fourth fluid 1718d. For example, the third fluid 1718c can have a higher viscosity than the fourth fluid 1718d or vice versa. For example, the fourth fluid 1718d can have a lower viscosity than the third fluid 1718c or vice versa.

The first fluid 1718a can be immiscible with the second fluid 1718b. The second fluid 1718b can be immiscible with the first fluid 1718a. The first fluid 1718a can be immiscible in the second fluid 1718b. The second fluid 1718b can be immiscible in the first fluid 1718a. The second fluid 1718b can be miscible with the third fluid 1718c and/or the fourth fluid 1718d. The third fluid 1718c can be miscible with the second fluid 1718b and/or the fourth fluid 1718d. The fourth fluid 1718d can be miscible with the second fluid 1718b and/or the third fluid 1718c. The second fluid 1718b can be miscible in the third fluid 1718c and/or the fourth fluid 1718d. The third fluid 1718c can be miscible in the second fluid 1718b and/or the fourth fluid 1718d. The fourth fluid 1718d can be miscible in the second fluid 1718b and/or the third fluid 1718c.

The second fluid 1718b can have a higher freezing point than the third fluid 1718c. The third fluid 1718c can have a lower freezing point than the second fluid 1718b. The third fluid 1718c can have a higher freezing point than the fourth fluid 1718d. The fourth fluid 1718d can have a lower freezing point than the third fluid 1718c.

The nanoparticles 1722 can be magnetic nanoparticles. The nanoparticles 1722 can be non-magnetic nanoparticles. The nanoparticles 1722 can comprise magnetic nanoparticles and/or non-magnetic nanoparticles. The nanoparticles 1722 can be core shell nanoparticles. The core shell nanoparticles can include a hard magnetic core (e.g., a CoFe core) and/or a soft shell (e.g., a Mn shell). The nanoparticles can comprise a surface coating, such as a fluorous or fluorophilic surface coating. The nanoparticles can have a diameter less than or equal to about 10 nm, about 15 nm, about 20 nm, about 25 nm, about 30 nm, about 40 nm, about 50 nm, about 60 nm, about 80 nm, about 100 nm, about 120 nm, about 150 nm, about 180 nm, about 200 nm, or about 500 nm. The nanoparticles can have a diameter greater than or equal to about 1 nm, about 2 nm, about 3 nm, about 4 nm, about 5 nm, about 6 nm, about 7 nm, about 8 nm, about 9 nm, about 10 nm, about 15 nm, about 25 nm, about 50 nm, about 100 nm, about 150 nm, about 200 nm, about 250 nm, or about 300 nm. In various examples, the diameter of the nanoparticles is about 10 nm to about 20 nm, about 20 nm to about 50 nm, about 50 nm to about 100 nm, or about 100 nm to about 200 nm. The diameter of the nanoparticles may be about 25 nm. The diameter of the nanoparticles may be about 10 nm to about 200 nm. The diameter may refer to a hydrodynamic diameter of the nanoparticles, a core diameter of the nanoparticles, and/or a cluster diameter of clustered nanoparticles. For example, the nanoparticles can have a hydrodynamic diameter between about 5 nm and about 150 nm. The nanoparticles can be single core nanoparticles (e.g., having a magnetic core) having a core diameter between about 5 nm and about 35 nm. The nanoparticles can be clustered nanoparticles having a cluster diameter from about 20 nm to about 80 nm.

The nanoparticles 1722 can be and/or can comprise the magnetic nanoparticles 1412 and/or the magnetic particles 1505. The nanoparticles 1722 can comprise superparamagnetic material, ferromagnetic material, ferrimagnetic material, paramagnetic material, and/or non-magnetic material. For example, the nanoparticles 1722 can be and/or can comprise metal oxides and/or metallic form nanoparticles. The nanoparticles 1722 can, for example, comprise iron, metal ferrites (e.g., Fe zero, FePt, CoFe), ceramic ferrites, and/or iron oxide nanoparticles. The nanoparticles 1722 may not be absorbed by the specimen 1716 (e.g., by the cells of the specimen 1716). As another example, the nanoparticles 1722 can be absorbed by the specimen 1716 (e.g., by the cells of the specimen 1716).

FIG. 17A illustrates, for example, that the method 1700M can include perfusing the specimen 1716 with the first fluid 1718a having one or more of the cryoprotectants 1720 in step 1702, perfusing the specimen 1716 with the second fluid 1718b such that the second fluid 1718b displaces the first fluid 1718a within vasculature 1724 of the specimen 1716 in step 1704, perfusing the specimen 1716 with the third fluid 1718c in step 1706, perfusing the specimen 1716 with the third fluid 1718c and the nanoparticles 1722 in step 1708, controlling a temperature of the third fluid 1718c while perfusing the specimen 1716 with the third fluid 1718c and the nanoparticles 1722 to cause the specimen 1716 to cool from a first temperature to a second temperature in step 1710, perfusing the specimen 1716 with the fourth fluid 1718d and the nanoparticles 1722 in step 1712, and controlling a temperature of the fourth fluid 1718d while perfusing the specimen 1716 with the fourth fluid 1718d and the nanoparticles 1722 to cause the specimen 1716 to cool from the second temperature to a third temperature in step 1714, or any combination thereof.

In some variations, the specimen may be perfused with two or more of the fluids 1718 concurrently. For example, the organ may be perfused with both the first fluid 1718a and the second fluid 1718b. When transitioning between step 1702 and step 1704, the relative amount of the first fluid 1718a and the second fluid 1718b may be controlled to gradually perfuse the specimen with less of the first fluid 1718a and more of the second fluid 1718b until the specimen is perfused exclusively with the second fluid 1718b. Likewise, when transitioning between step 1704 and 1706, the organ may be perfused with both the second fluid 1718b and the third fluid 1718c concurrently for a period of time, and the relative amounts of the second fluid 1718b and the third fluid 1718c can be controlled to gradually perfuse the specimen with less of the second fluid 1718b and more of the third fluid 1718c. A similar transition between the third fluid 1718c and the fourth fluid 1718d may occur when transitioning between step 1710 and 1712. The flow of the various fluids 1718 (and the fluid pressure, flow rate, amount, or proportion of each of the fluids) during perfusion may be controlled by controlling a pump rate of a multichannel pump or a pneumatic system having at least one channel drawing from each of the perfused fluids 1718.

FIGS. 17B-17Z8 illustrate that the fluids 1718, the cryoprotectant 1720, and/or the nanoparticles 1722 can be perfused through the specimen 1716, for example, by perfusing (e.g., flowing) the fluids 1718, the cryoprotectant 1720, and/or the nanoparticles 1722 through the vasculature 1724 of the specimen 1716. For example, FIGS. 17B-17Z8 illustrate that the fluids 1718, the cryoprotectant 1720, and/or the nanoparticles 1722 can flow into one or multiple arterial vessels 1726, through capillaries 1728, and/or out of one or multiple venous vessels 1730. FIGS. 17B-17Z8 illustrate, for example, that the fluids 1718, the cryoprotectant 1720, and/or the nanoparticles 1722 can flow through one or multiple arterial vessels 1726, through capillaries 1728, and/or through of one or multiple venous vessels 1730. The capillaries 1728 can connect the arterial vessels 1726 to the venous vessels 1730. FIGS. 17B-17Z8 illustrate, for example, two exemplary capillaries 1728 that extend between the arterial vessels 1726 and the venous vessels 1730, connecting the arterial vessels 1726 to the venous vessels 1730. The fluids 1718, the cryoprotectant 1720, and/or the nanoparticles 1722 can be perfused through the vasculature 1724, for example, by being pumped into an arterial opening 17260 of the arterial vessels 1726, along the lumens of the arterial vessels 1726, through the capillaries 1728, along the lumens of the venous vessels 1730, and out of a venous opening 17300 of the venous vessels 1730. The fluids 1718 can also be flowed through other internal structures of a specimen, such as tubules, bile ducts, ureters and/or the lymphatic system.

The system 1700S can have reservoirs 1736 for the fluids 1718 and/or the nanoparticles 1722. FIG. 17B illustrates, for example, that the system 1700S can have a reservoir 1736 for each of the fluids and/or for the nanoparticles 1722, including a first reservoir 1736*a* for the first fluid 1718*a*, a second reservoir 1736*b* for the second fluid 1718*b*, a third reservoir 1736*c* for the third fluid 1718*c*, a fourth reservoir 1736*d* for the fourth fluid 1718*d*, a fifth reservoir 1736*e* for the nanoparticles 1722, a sixth reservoir 1736*f* that the fluids 1718 and/or the nanoparticles 1722 can flow into and/or collect in after flowing out of the specimen 1716, and a seventh reservoir 1716*g* for a coolant (e.g., the coolant 1750), or any combination thereof. As another example, one of the reservoirs 1736 can hold the third fluid 1718*c* and the nanoparticles 1722, and/or one of the reservoirs 1736 can hold the fourth fluid 1718*d* and the nanoparticles 1722. The sixth reservoir 1736*f* can be, for example, a collection chamber, an outlet reservoir, an effluent reservoir, a tube, and/or a drain line that one or multiple of the fluids 1718 and/or the nanoparticles 1722 can flow into and/or collect in after flowing out of the specimen 1716. The seventh reservoir 1736*g* can be, for example, a coolant tank (e.g., the liquid nitrogen tank 1403).

The system 1700S can have one or multiple pumps 1738 (also referred to as the pumps 1738), for example, 1-10 or more pumps 1738, including every 1 pump increment within this range (e.g., 1 pump, 2 pumps, 3 pumps, 4 pumps, 10 pumps). Each one of the pumps 1738 can be, for example, an electric pump (e.g., a peristaltic pump), a manual pump (e.g., a syringe), or both. For example, for a system having two pumps, a first pump can be an electric pump (e.g., a peristaltic pump), and a second pump can be a manual pump (e.g., a syringe). FIG. 17B illustrates, for example, that the system 1700S can have a first pump 1738*a*, a second pump 1738*b*, and a third pump 1738*c*, or any combination thereof. In some variations, one or more of the pumps 1738 (e.g., 1 pump, 2 pumps, 3 pumps, 4 pumps, 10 pumps, or all pumps) is a pneumatic system.

In some variations, the pump 1738 is a multichannel pump or a multichannel pneumatic system. The pump 1738 (*s*) 1738 can be connected to two or more of the fluids 1718 (and/or reservoirs 1736 for holding the fluids) and can be used to pump two or more fluids concurrently. The pumps 1738 can be used to pump each of the two or more fluids 1718 in any desired proportion and/or at any desired fluid pressure. The pumps 1738 (e.g., a multichannel pump) can also be connected to a reservoir 1736 for holding the carrier fluid, various cryoprotective solutions and agents, and/or the nanoparticles 1722. The pump 1738 can be used to pump any of the fluids 1718, a carrier fluid, a cryoprotective solution or cryoprotective agent(s), and/or the nanoparticles concurrently in any desired proportion and/or at any desired fluid pressure. Accordingly, the pump 1738 may be used to control an amount or concentration of the carrier fluid, cryoprotective solution or agents, and/or nanoparticles 1722 in each of the fluids 1718. In some variations, the concentration, flow rate, proportion, or pressure of the fluids 1718, carrier fluid(s), cryoprotective solution or agents, and/or nanoparticles 1722 can be controlled by the pump 1738, e.g., by way of software.

The fluids 1718, the cryoprotectant 1720, and/or the nanoparticles 1722 can be perfused through the vasculature 1724 of the specimen 1716, for example, via the pumps 1738. The fluids 1718, the cryoprotectant 1720, and/or the nanoparticles 1722 can also be perfused through other structures within a specimen, for example, a ureter, a tubule, a lymphatic system, a bile duct, or some other structure. For example, FIG. 17B illustrates, for example, that the pumps 1738 can pump the fluids 1718, the cryoprotectant 1720, and/or the nanoparticles 1722 into the vasculature 1724 through the arterial opening 17260 as represented by first arrow A1, through the vasculature 1724, and out of the vasculature 1724 through the venous opening 17300 as represented by second arrow A2. The first arrow A1 and the second arrow A2 can represent, for example, the direction of flow of the fluids 1718 and/or the nanoparticles 1722. The first arrow A1 can represent, for example, the flow of the fluids 1718 and/or the nanoparticles 1722 into the specimen 1716, into a vessel (e.g., into an artery, a vein, and/or a capillary), and/or into a section of a vessel (e.g., into an artery, a vein, and/or a capillary). The second arrow A2 can represent, for example, the flow of the fluids 1718 and/or the nanoparticles 1722 out of the specimen 1716, out of a vessel (e.g., out of an artery, a vein, and/or a capillary), and/or out of a section of a vessel (e.g., out of an artery, a vein, and/or a capillary).

FIG. 17B illustrates that the system 1700S can have tubing 1740, including, for example, a first tubing 1740*a*, a second tubing 1740*b*, a third tubing 1740*c*, and a fourth tubing 1740*d*, or any combination thereof. The first tubing 1740*a* can be, for example, one or multiple inflow tubes that the fluids 1718 and/or the nanoparticles 1722 can flow into from the fluid reservoirs 1736. The second tubing 1740*b* can be, for example, one or multiple outflow tubes that the fluids 1718 and/or the nanoparticles 1722 can flow into from the venous opening 17300. The third tubing 1740*c* can be, for example, one or multiple recirculation tubes that the fluids 1718 and/or the nanoparticles 1722 can flow into from the venous opening 17300. The fourth tubing 1740*d* can be, for example, one or multiple tubes that can fluidically connect a coolant tank (e.g., the seventh reservoir 1736*g*) to a chamber that can hold the specimen 1716 (e.g., the chamber 1742). The fourth tubing 1740*d* can be, for example, one or multiple tubes that a coolant (e.g., the coolant 1750) can flow into and/or out of, for example, to enter and/or exit the chamber 1742, respectively. FIG. 17B illustrates that an arterial vessel 1726 can be cannulated with the first tubing 1740*a*, that a venous vessel 1730 can be cannulated with the second tubing 1740*b*, and/or that a venous vessel 1730 can be cannulated with the third tubing 1740*c*. The pumps 1738 can pump the fluids 1718, the cryoprotectant 1720, and/or the nanoparticles 1722 through the tubing 1740 (e.g., from the reservoirs 1736) through the vasculature 1724. For example, FIG. 17B illustrates that the pumps 1738 can pump the fluids 1718, the cryoprotectant 1720, and/or the nanoparticles 1722 through the first tubing 1740*a* (e.g., from the reservoirs 1736), into the vasculature 1724 (e.g., through the arterial opening 1726), through the vasculature 1724, out of the vasculature 1724 (e.g., through the venous opening 1730), through the second tubing 1740*b*, through the third tubing 1740*c*, and into a collection chamber, an outlet reservoir, an effluent reservoir, a tube, and/or a drain line (e.g., into the sixth reservoir 1736*f*), or any combination thereof.

The system 1700S can have a chamber 1742. The chamber 1742 can be, for example, a perfusive cooling chamber. FIG. 17B illustrates that the specimen 1716 can be placed in the chamber 1742 for cooling. The entire specimen 1716 or a portion of the specimen 1716 can be placed in the chamber 1742 for cooling. For example, FIG. 17B illustrates that the entire specimen 1716 can be placed in the chamber 1742 for cooling. The chamber 1742 can hold the entire specimen 1716 or a portion of the specimen 1716. For example, FIG. 17B illustrates that the chamber 1742 can hold the entire specimen 1716, for example, during cooling. The chamber 1742 can be rigid, flexible, elastic, inelastic, comprise plastic, comprise metal, or any combination thereof. The chamber 1742 can be, for example, a bag (e.g., a plastic bag), a container, or both. The chamber 1742 can be, for example, a chamber of a bag (e.g., a plastic bag), a container, or both. The chamber 1742 can be, for example, a temperature-controlled chamber. The chamber 1742 can be, for example, a chamber of a temperature-controlled bag (e.g., plastic bag), a temperature controlled container, or both. The bag may be suctioned around the organ to reduce the volume within the bag and/or the distance between the surface of the organ and the surface of the bag. The pumps 1738 can pump the fluids 1718, the cryoprotectant, and/or the nanoparticles 1722 into and/or out of the chamber 1742 for example, into the chamber 1742 via the first tubing 1740a and/or out of the chamber via the second tubing 1740b and/or the third tubing 1740c. For example, FIG. 17B illustrates that the pumps 1738 can pump the fluids 1718, the cryoprotectant, and/or the nanoparticles 1722 into and out of the chamber 1742 for example, into the chamber 1742 via the first tubing 1740a and out of the chamber via the second tubing 1740b and/or the third tubing 1740c.

FIGS. 17B-17Z8 illustrate that the system 1700S can have the coolant 1750. FIGS. 17B-17Z8 illustrate that the coolant 1750 can be perfused through the chamber 1742, for example, by perfusing (e.g., flowing) the coolant 1750 through the chamber 1742. FIGS. 17B-17Z8 illustrate, for example, that the coolant 1750 can be perfused into and/or out of the chamber 1742, for example, by perfusing (e.g., flowing) the coolant 1750 into and/or out of the chamber 1742.

FIGS. 17B-17Z8 illustrate that the method 1700M can include perfusing the coolant 1750 into, through, and/or out of the chamber 1742. The coolant 1750 can be, for example, a liquid and/or gas. The coolant 1750 can be, for example, a cryogen (e.g., liquid nitrogen and/or liquid nitrogen vapor). The coolant 1750 can be, for example, liquid nitrogen and/or liquid nitrogen vapor. The coolant 1750 can flow into and/or out of the chamber 1742. For example, the pumps 1738 (e.g., the third pump 1738c) can pump the coolant 1750 into and/or out of the chamber 1742 via the fourth tubing 1740d (e.g., via one or multiple inflow tubes and/or one or multiple outflow tubes). For example, FIG. 17B illustrates that the pumps 1738 (e.g., the third pump 1738c) can pump the coolant 1738c into and out of the chamber 1742 for example, into the chamber 1742 via the fourth tubing 1740a (e.g., via an inflow tube of the fourth tubing 1740d) and out of the chamber via the fourth tubing 1740d (e.g., via an outflow tube of the fourth tubing 1740d). As another example, the coolant 1750 can be pumped into the chamber 1742 through the fourth tubing 1740d, and the coolant 1750 can flow out of the chamber 1742, for example, through a vent 1752. The vent 1752 can be, for example, a one-way vent. The vent 1752 can be, for example, a one-way valve. FIG. 17B illustrates that the wall of the chamber 1742 can have the vent 1752.

The chamber 1742 can be, for example, the chamber illustrated in FIG. 17B and/or any other chamber disclosed herein, such as the controlled rate freezer 1402. The tubing 1740 can extend through one or multiple openings of one or multiple walls defining the chamber 1742 and/or can connect to one or multiple ports on one or multiple walls of the chamber 1742. For example, FIG. 17B illustrates that the tubing 1740 can extend through openings in one or multiple walls of the chamber 1742. The openings through the chamber wall(s) can have seals that can provide a fluid and/or pressure tight seal between the tubing 1740 and/or chamber 1742, for example, while the fluids 1718, the cryoprotectant, and/or the nanoparticles 1722 are perfused into and out of the chamber 1742 (e.g., into the chamber 1742 via the first tubing 1740a and out of the chamber 1742 via the second tubing 1740b and/or the third tubing 1740c), and/or while the coolant 1750 is perfused into and/or out of the chamber 1742 (e.g., into the chamber 1742 via the fourth tubing 1740d and/or out of the chamber 1742 via the fourth tubing 1740d and/or the vent 1752).

The first pump 1738a can, for example, perfuse the fluids 1718 into the specimen 1716 (e.g., into the vasculature 1724). The second pump 1738b can, for example, perfuse the fluids 1718 into the chamber 1742 and around the specimen 1716. The third pump 1738c can, for example, perfuse the coolant 1750 into the chamber 1742 and around the specimen 1716.

The system 1700S can have any feature or combination of features disclosed herein. For example, the system 1700S can have a liquid nitrogen tank (e.g., the liquid nitrogen tank 1403), can have a heat exchanger (e.g., the heat exchanger 1405) that can cool and/or warm the fluids 1718 and/or the nanoparticles 1722, or can have both. The seventh reservoir 1736g can be, for example, a liquid nitrogen tank (e.g., the liquid nitrogen tank 1403). The system 1700S can have any feature or combination of features disclosed herein, for example, in addition to and/or in lieu of any of the features shown in FIGS. 17B-17Z8. For example, the system 1700S can be, for example, the system 1400. As another example, the system 1700S can have a heat exchanger (e.g., the heat exchanger 1405).

Figure 17C:
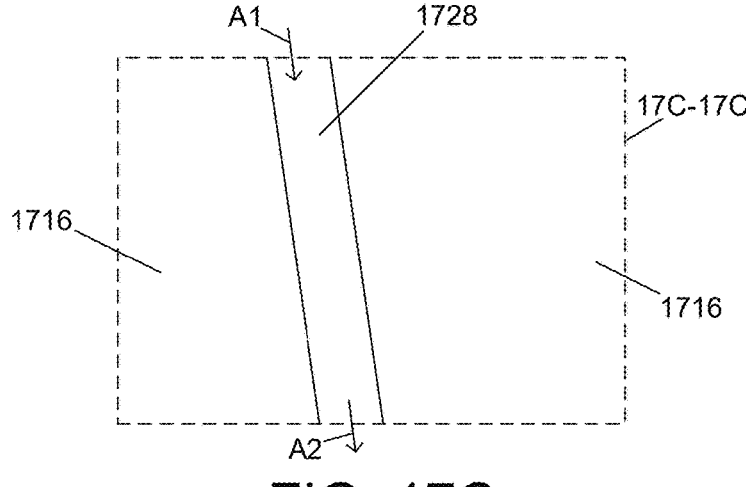
FIG. 17C illustrates a close-up view of the section 17C-17C of FIG. 17B.

The specimen 1716 can be, for example, human, non-human (e.g., animal), a whole organism (e.g., a whole human, a dog, a cat, a mouse), a portion of an organism (e.g., a portion of a human, a dog, a cat, a mouse), organ parts (e.g., heart valves, pancreatic islets), cartilage, tumor tissue, cell-clusters, organoids, spheroids, corneas, an entire organ, a portion of an organ, a biopsy tissue, naturally occurring and/or engineered stem cells (e.g. CAR-T), cell lines (e.g. HEK, CHO, N2A), oocytes, sperms, fertilized embryos, islet cells, cardiomyocytes, spinal chord neurons, umbilical chord blood cells, a genetically engineered animal-derived organ (e.g., a genetically engineered pig-derived organ), a lab-grown tissue or organ, a xenotransplant, a vascularized composite allograft (e.g., of the hand, arm, face, larynx, uterus, abdominal wall, lower limbs, or penis), or any combination thereof. The specimen 1716 can be, for example, a biological specimen, a biological sample, the tissue slice 404, the tissue sample 501, the cannulated organ or organism 1201, the organ or organism 1401, the organ or organism 1504, or any combination thereof. The specimen 1716 can be any organ. The specimen 1716 can be, for example, any organ having vasculature, including, for example, a brain, the liver, a lung, a kidney, a heart, intestines, skin, the face, ovaries, testes, digits, hands, limbs, and/or a pancreas. FIGS. 17B-17C illustrate that the specimen 1716 can be, for example, a liver. The specimen 1716 can be cryopreserved for any purpose. For example, for non-human, whole organism specimens, the specimen 1716 can be cryopreserved for medical hibernation, space travel, post-mortem R&D, forensic autopsy, pet cryonics, for species banking, or for any purpose. As another example, for organs and organ parts, the specimen 1716 can be cryopreserved for organ transplants, as a back-up for failed organ transplants, for R&D on organs, to bank organs for descendants, to preserve fertility in pre-pubescent girls and boys undergoing chemotherapy and/or radiation therapy, for adults to delay ageing of the organ, for mass casualty stockpiling and for trauma care. As another example, for tissue specimens, the specimen 1716 can be cryopreserved to allow R&D and/or drug screening and/or toxicological assessments of tissues at later points in time, to transplant naturally-derived and engineered tissue with therapeutic intent at later points in time (e.g. vascular tissue), for the storage of embryos for later IVF. As another example, for human and non-human cellular specimens, the specimen 1716 can be cryopreserved for cell-line banking, to store therapeutic naturally-derived and engineered cells for later use (e.g. CAR-T), for storage of sperm and oocytes, umbilical chord blood to later derive therapeutic stem cells, cardiomyocytes to treat myocardial injury.

The arterial opening 17260 can be an opening of any artery. FIG. 17B illustrates, for example, that the arterial opening 17260 can be an opening of a hepatic artery. The arterial opening 17260 can be created, for example, by cutting the artery.

The venous opening 17300 can be an opening of any vein. FIG. 17B illustrates, for example, that the venous opening 17300 can be an opening of a hepatic vein. The venous opening 17260 can be created, for example, by cutting the vein.

FIGS. 17B-17C illustrate a variation of the specimen 1716 and the vasculature 1724 before the fluids 1718, the cryoprotectant 1720, the nanoparticles 1722, and/or the coolant 1750 are perfused through vasculature 1724. FIG. 17C illustrates a close-up of the specimen 1716 and of a capillary vessel that extends between an arterial vessel 1726 and a venous vessel 1730.

Figure 17D:
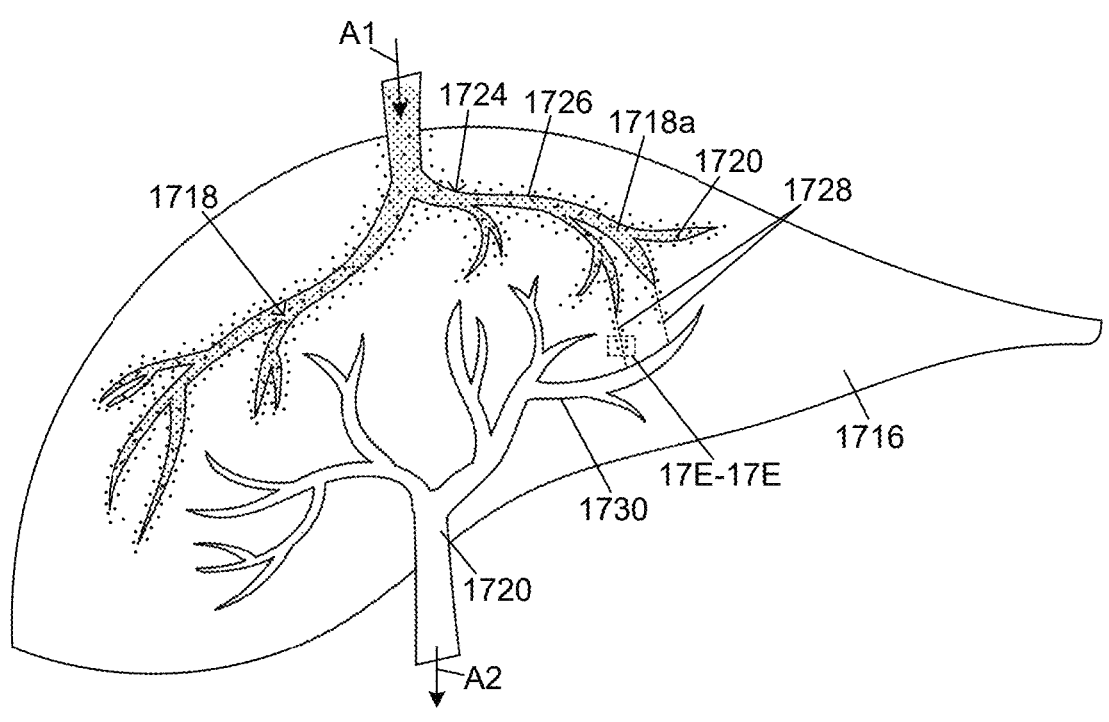
FIG. 17D illustrates a variation of perfusing a first fluid in the vasculature of the organ of FIG. 17B.

FIGS. 17D-17Z8 illustrate the features of the system 1700S shown in FIG. 17B transparent for illustrative purposes. FIGS. 17D-17Z8 illustrate that the system 1700S can have the fluids 1718, the cryoprotectant 1720, and the nanoparticles 1722, or any combination thereof, for example, in the configurations shown.

Figure 17E:
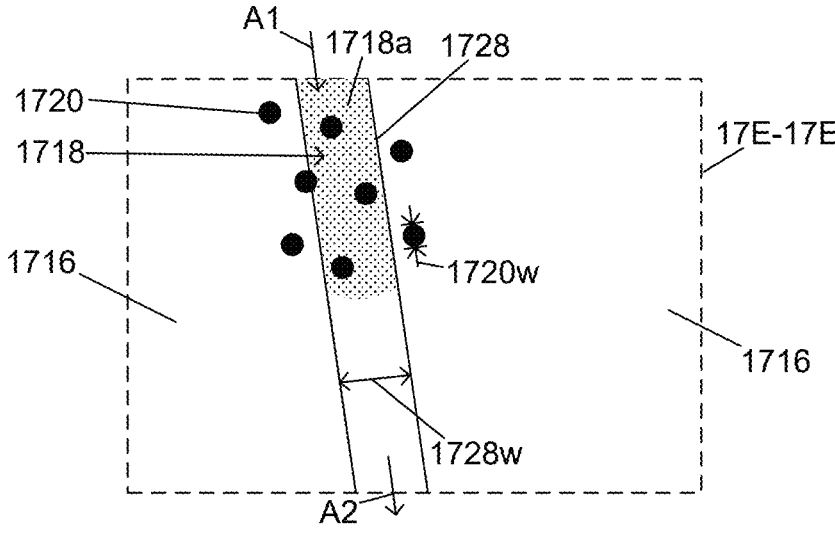
FIG. 17E illustrates a close-up view of the section 17E-17E of FIG. 17D.
Figure 17F:
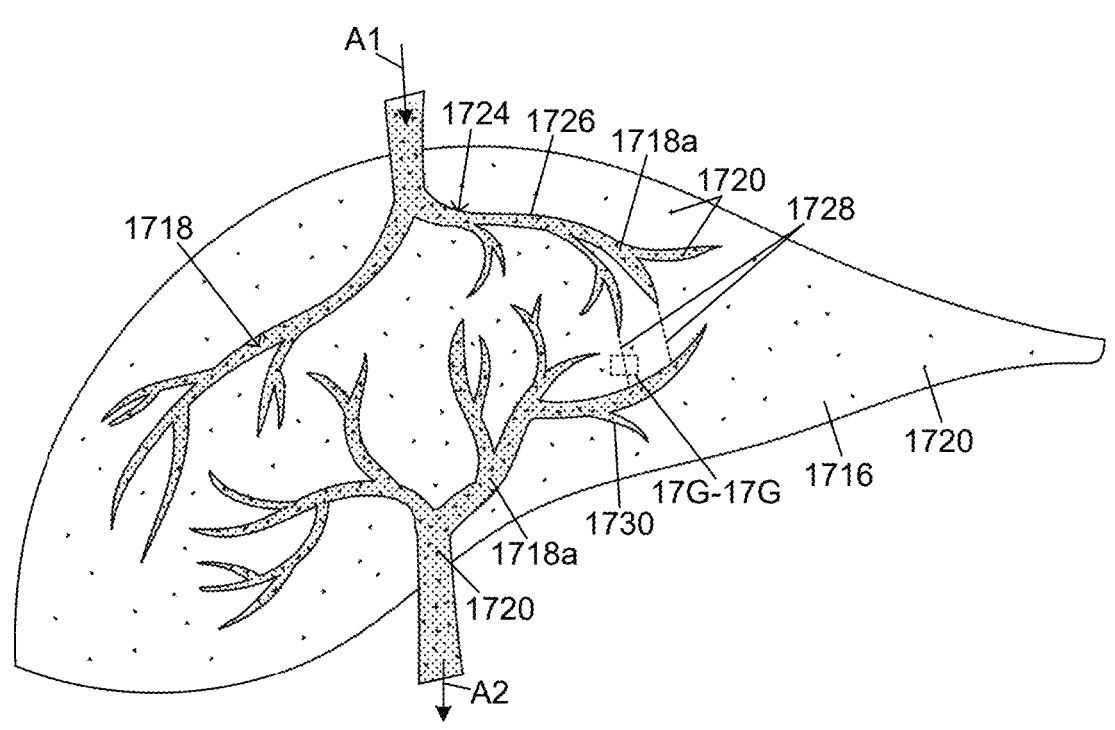
FIG. 17F illustrates a variation of perfusing a first fluid in the vasculature of the organ of FIG. 17B.
Figure 17G:
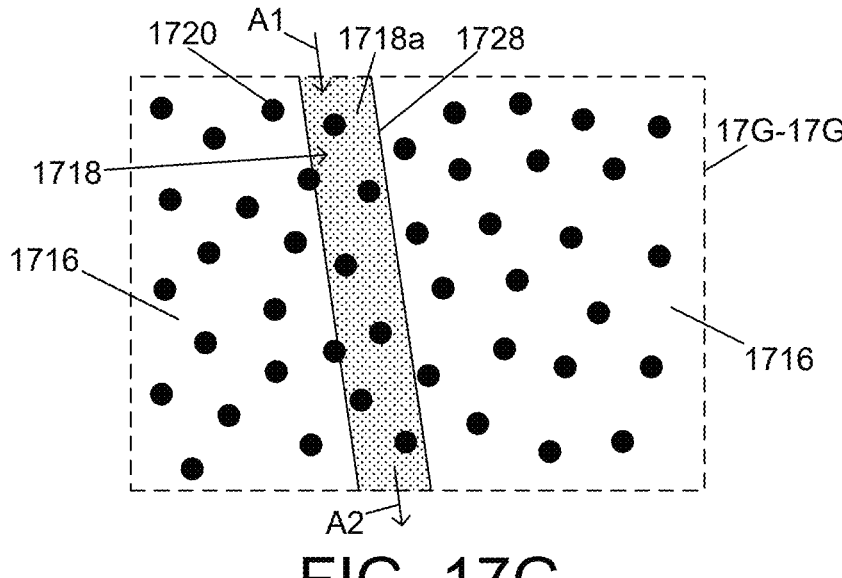
FIG. 17G illustrates a close-up view of the section 17G-17G of FIG. 17F.

FIGS. 17D-17G illustrate a variation of step 1702 of the method 1700M. FIGS. 17D-17G illustrate, for example, a variation of perfusing the first fluid 1718a in the vasculature 1724, where FIGS. 17D-17E illustrate the first fluid 1718a partially perfused in the vasculature 1724, and where FIGS. 17F-17G illustrate the first fluid 1718a fully perfused in the vasculature 1724. For example, FIGS. 17D-17E illustrate the first fluid 1718a perfused in the arterial vessels 1726 and the capillaries 1728, and FIGS. 17F-17G illustrate the first fluid 1718a perfused in the arterial vessels 1726, the capillaries 1728, and the venous vessels 1730.

FIGS. 17D-17G illustrate that as the first fluid 1718a and/or the cryoprotectant 1720 are perfused through the vasculature 1724, the first fluid 1718a and/or the cryoprotectant 1720 can perfuse into the tissue of the specimen 1716, for example, by passing through arterial, capillary, and/or venous blood vessel walls. FIGS. 17D-17G illustrate, for example, that as the first fluid 1718a and/or the cryoprotectant 1720a are perfused through the vasculature 1724, the first fluid 1718a and/or the cryoprotectant 1720 can perfuse into the tissue of the specimen 1716, for example, by diffusing into the tissue of the specimen 1716 through the arterial vessels 1726, the capillaries 1728, and/or the venous blood vessels 1730. FIG. 17E shows, for example, one of the illustrated cryoprotectants 1720 passing through a wall of a capillary vessel 1728. FIGS. 17D-17E illustrate, for example, the cryoprotectant 1720 in a partially perfused and/or partially diffused state in the specimen tissue after having passed through arterial and capillary blood vessel walls. FIGS. 17F-17G illustrate, for example, the cryoprotectant 1720 in a fully perfused and/or fully diffused state in the specimen tissue after having passed through arterial, capillary, and venous blood vessel walls. The fully perfused and/or fully diffused state can correspond to a desired concentration (e.g. about 7 to 12 molar) of the cryoprotectant 1720 in the specimen tissue. This concentration may be determined by evaluating tissue or tissue biopsies on a differential scanning calorimeter (DSC) using control data coming from tissues loaded with known concentrations of cryoprotectant. This concentration may be determined by evaluating the refractive index of solution exiting a perfused tissue, for example coming out of the vein of an organ.

FIG. 17E illustrates that the cryoprotectant 1720 can have a cryoprotectant width 1720w, and that the capillaries can have a capillary vessel width 1728w. FIG. 17E illustrates that the cryoprotectant width 1720w can be less than the capillary vessel width 1728w. The cryoprotectant width 1720w can be, for example, a diameter of the cryoprotectant 1720 and/or a maximum dimension (e.g., maximum width) of the cryoprotectant 1720. The capillary vessel width 1728w can be, for example, a diameter of the capillary vessel 1728 and/or a maximum dimension (e.g., maximum width) of the capillary vessel 1728.

FIGS. 17D-17G illustrate that while the first fluid 1718a is being perfused through the vasculature 1724, the first fluid 1718a can have a first fluid temperature of −10.0° C. to 10.0° C., including every 0.1° C. increment within this range (e.g., −10.0° C., −5.0° C., 0.0° C., 5.0° C., 10.0° C.). The first fluid 1718a can be perfused though the vasculature 1724 at the first fluid temperature. For example, the first fluid 1718a can be perfused though the vasculature 1724 at one or multiple first fluid temperatures (e.g., at one or multiple temperatures within −10.0° C. to 10.0° C.).

FIGS. 17D-17G illustrate that the first fluid 1718a can be pumped through the vasculature 1724 at a first fluid pressure of 100 mmHg to 300 mmHg, including every 1 mmHg increment within this range (e.g., 100 mmHg, 200 mmHg, 300 mmHg).

FIGS. 17D-17G illustrate that the first fluid 1718a can be perfused into a cannulized vasculature of the specimen 1716. For example, FIGS. 17D-17G illustrate that the vasculature 1724 can be cannulized with the tubing 1740, and that the first fluid 1718a can be perfused into and out of the specimen 1716 through the tubing 1740.

FIGS. 17D-17G illustrate a variation of a first configuration that the system 1700S can have (also referred to as a system first configuration).

FIGS. 17D-17G illustrate that when the system 1700S is in the first configuration, the first fluid 1718a and/or the cryoprotectant 1720 can be perfused into the specimen 1716 and/or the chamber 1742. For example, FIGS. 17D-17G illustrate that when the system 1700S is in the first configuration, the one or multiple pumps 1738 can perfuse the first fluid 1718a having the cryoprotectant 1720 into the specimen 1716 and/or the chamber 1742. When the system 1700S is in the first configuration, the first fluid 1718a can have the first fluid temperature.

In some variations, step 1702 can be performed in multiple stages. One or more cryoprotective agent(s) 1720 can be perfused into the vasculature in multiple phases. For example, the cryoprotectant 1720 can comprise two or more cryoprotectants that are perfused into the vasculature at different times, at different fluid pressure, at different concentrations, at different temperatures and/or for different durations of time, which may be varied in different phases of step 1702. The paragraphs below describe a first, second, third, and fourth phase of an exemplary loading protocol of step 1702. However, step 1702 can include any number of phases, wherein the phases may differ in the identity of the cryoprotective agents, the fluid pressure, the concentration, temperatures, and durations of time.

Each phase of the loading protocol may be performed for a period of time, for example, a period of time sufficient for the one or more of the cryoprotective agents perfused during the phase to be loaded within the biological specimen at a desired concentration. For example, in a first phase, a first one or more cryoprotective agents can be perfused into the biological specimen for a first duration of time. In a second phase, a second one or more cryoprotective agents can be perfused into the biological specimen for a second duration of time. In a third phase, a third one or more cryoprotective agents can be perfused into the biological specimen for a second duration of time. In a fourth phase, a second one or more cryoprotective agents can be perfused into the biological specimen for a second duration of time.

The type and concentration of the cryoprotective agents may be varied during the stages of step 1702. For example, a first phase can include perfusing a first one or more cryoprotective agents at a first concentration. The first cryoprotective agent may be a cryoprotective agent that is loaded more slowly into the biological specimen. A second phase can include perfusing a second one or more cryoprotective agents at a second concentration. The second one or more cryoprotective agents can be the same or can be different than the first one or more cryoprotective agents. The second concentration may be greater than or equal to the first concentration. A third phase can include perfusing a third one or more cryoprotective agents at a third concentration. The third one or more cryoprotective agents can be the same or can be different than the second one or more cryoprotective agents. The third concentration may be greater than or equal to the second concentration. A fourth phase can include perfusing a fourth one or more cryoprotective agents at a fourth concentration. The fourth one or more cryoprotective agents can be the same or can be different than the third one or more cryoprotective agents. The fourth concentration may be greater than or equal to the third concentration. In each phase, the concentration of perfused cryoprotective agent(s) can be constant or can be ramped (e.g., increased or decreased linearly or non-linearly during the phase). In some variations, each phase of cryoprotectant loading can start or end at a particular CPA concentration. The concentration of each cryoprotective agent may further be varied (e.g. such that a first phase may include perfusing a first cryoprotective agent at a first concentration and a second cryoprotective agent at a second concentration).

Each phase of step 1702 can be conducted at a particular temperature. For example, the temperature in the first phase can be between 0 C and 10 C (e.g., about 4 C). During the first phase, the temperature can be decreased from a first temperature to a second temperature (e.g., from about 4 C to about −5 C). The temperature in the second phase can be different from the first temperature. For example, the temperature is the second phase can be about −5 C. During the second phase, the temperature can be decreased from the second temperature to a third temperature (e.g., a temperature below −5 C). The temperature in the third phase can be different than the second temperature. The temperatures in each phase may be selected to promote uptake of one or more of the cryoprotective agents, reduce toxicity of the one or more cryoprotective agents, reduce metabolism of the one or more cryoprotective agents, and/or modulate the flow rate of the perfused fluid to increase or decrease the exposure time of the cryoprotective agents within the biological specimen. The temperature profile (i.e., the control of temperature between and across various phases of the loading) can be optimized and controlled by, e.g., software. Each phase of the loading protocol may occur at any desired temperature, such as temperatures of −25.0° C. to 10.0° C., including every 0.1° C. increment within this range (e.g., −25.0° C., 20.0° C., −15.0° C., −10.0° C., −5.0° C., 0.0° C., 5.0° C., 10.0° C.), and may be ramped between any temperatures within this range.

Each phase of step 1702 can include perfusing the one or more cryoprotective agents and/or carrier fluid (e.g., the first fluid 1718*a*) at a particular fluid pressure. The fluid pressure may be controlled by adjusting a pressure output of a pump 1738, which may be in fluid communication with at least a carrier fluid and the one or more cryoprotective agents.

In a particular example, the first phase can include perfusing the biological specimen with carrier solution alone (e.g., a carrier solution including OM cryoprotective agents) or a carrier solution including a concentration of one or more cryoprotective agents. The first phase may continue until a concentration of the one or more cryoprotective agents within the biological specimen is at a first desired concentration. In some examples, the first phase can be between 10 minutes and 60 minutes. The first phase can be about 30 minutes. The first phase can be performed at a first fluid pressure, for instance, a fluid pressure between 20 mmHg to 200 mmHg. The first fluid pressure can be about 60 mmHg.

The second phase can include perfusing the carrier solution and one or more cryoprotective agents at a concentration that is ramped between OM and 5M. The second phase may continue until a concentration of the one or more cryoprotective agents within the biological specimen is at a second desired concentration. The second phase can include perfusing the carrier solution and one or more cryoprotective agents for between 30 minutes and 200 minutes. The second phase can be about 100 minutes. The second phase can be performed at a second fluid pressure, for instance, a fluid pressure between 20 mmHg and 200 mmHg. The second fluid pressure can be about 60 mmHg.

A third phase can include perfusing the carrier fluid and one or more cryoprotective agents at a concentration of about 5M. The third phase may continue until a concentration of the one or more cryoprotective agents within the biological specimen is at a third desired concentration. The third phase can be between 10 minutes and 200 minutes. The third phase can be about 30 minutes. The third phase can be performed at a third fluid pressure, for instance, a fluid pressure e between 20 mmHg and 200 mmHg. The third fluid pressure can be about 60 mmHg.

A fourth phase can include perfusing the carrier fluid and one or more cryoprotective agents at a concentration of about 8.4M. The fourth phase may continue until a concentration of the one or more cryoprotective agents within the biological specimen is at a fourth desired concentration. The fourth phase can be between 10 minutes and 200 minutes. The fourth phase can be about 45 minutes. The fourth phase can be performed at a fourth fluid pressure, for instance, a fluid pressure between 20 mmHg and 200 mmHg. The fourth fluid pressure can be about 80 mmHg.

A fifth phase can include perfusing the carrier fluid and one or more cryoprotective agents at a concentration of about 10.08M. The fifth phase may continue until a concentration of the one or more cryoprotective agents within the biological specimen is at a fifth desired concentration (e.g., a concentration of about 8M, 8.4M, 9M, 9.4M, or any 0.1 increment between OM and 100M). The fifth phase can be between 1 hour and 10 hours. The fifth phase can be about 7 hours. The fifth phase can be performed at a fifth fluid pressure, for instance, a fluid pressure between 20 mmHg and 200 mmHg. The fifth fluid pressure can be about 80 mmHg. FIGS. 17H-17M illustrate a variation of step 1704 of the method 1700M.

Figure 17H:
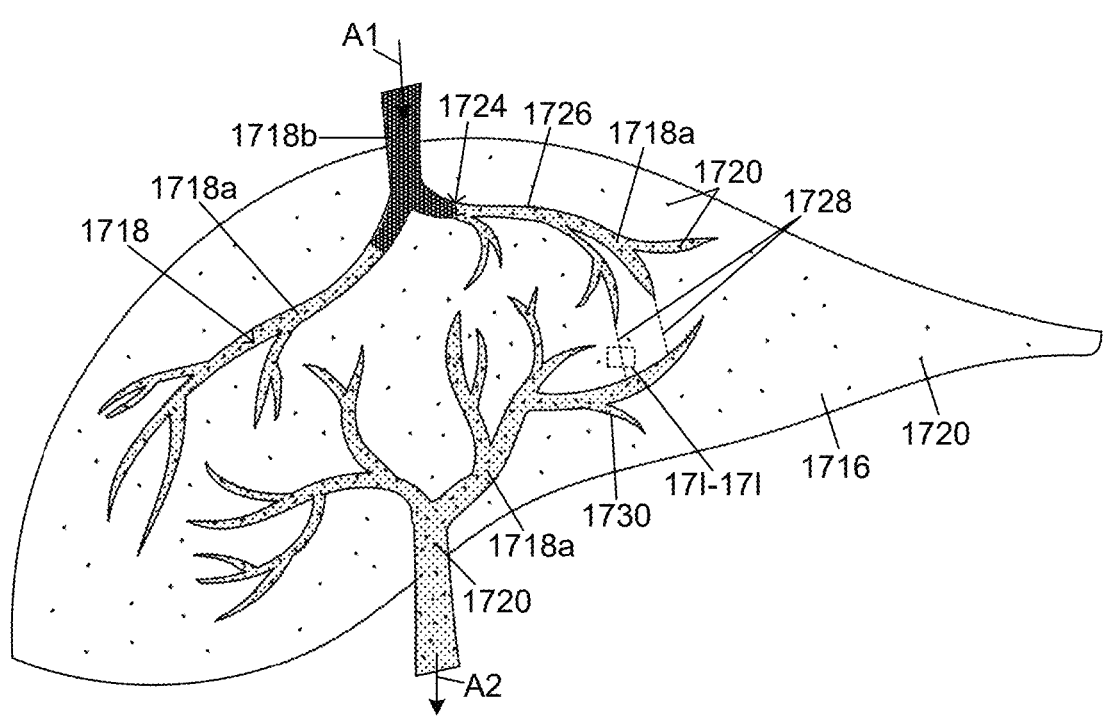
FIG. 17H illustrates a variation of perfusing a second fluid in the vasculature of the organ of FIG. 17B.
Figure 17I:
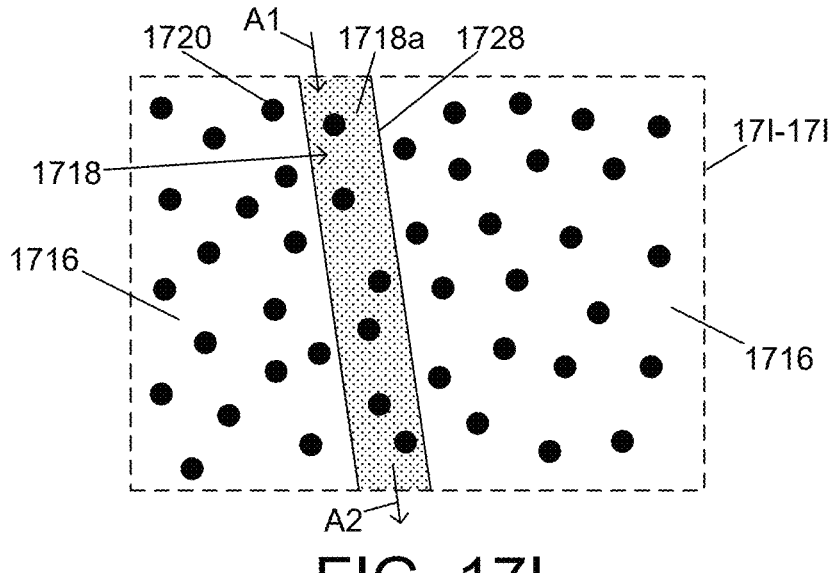
FIG. 17I illustrates a close-up view of the section 17I-17I of FIG. 17H.
Figure 17J:
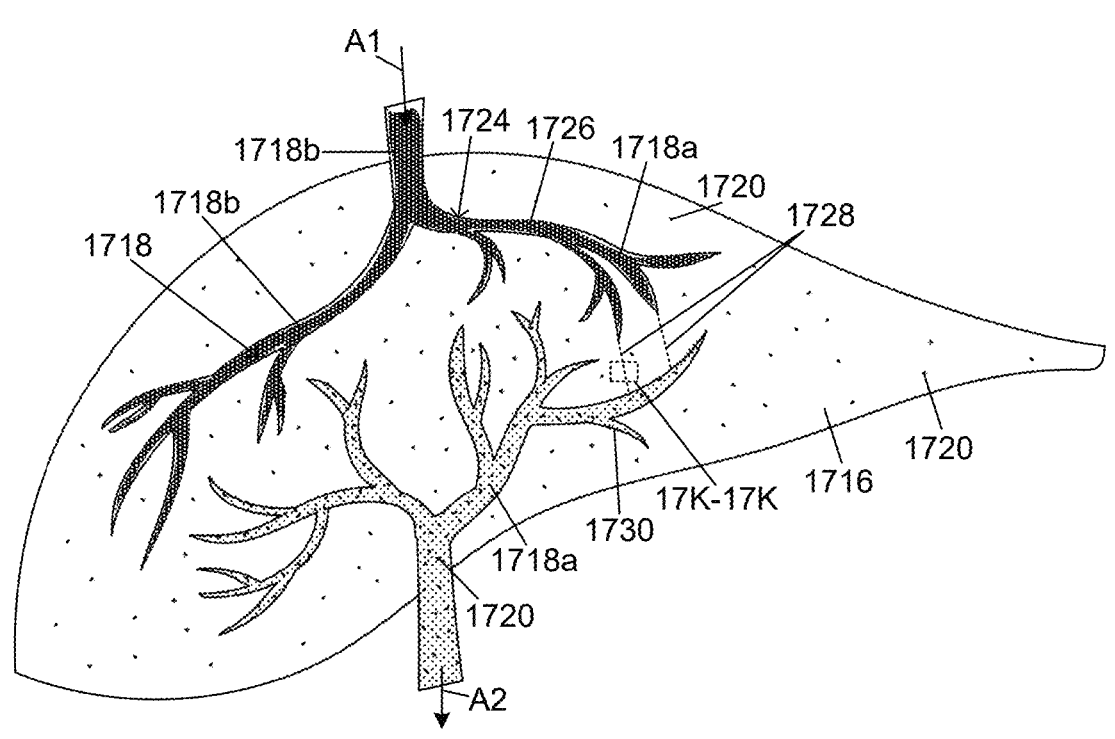
FIG. 17J illustrates a variation of perfusing a second fluid in the vasculature of the organ of FIG. 17B.
Figure 17K:
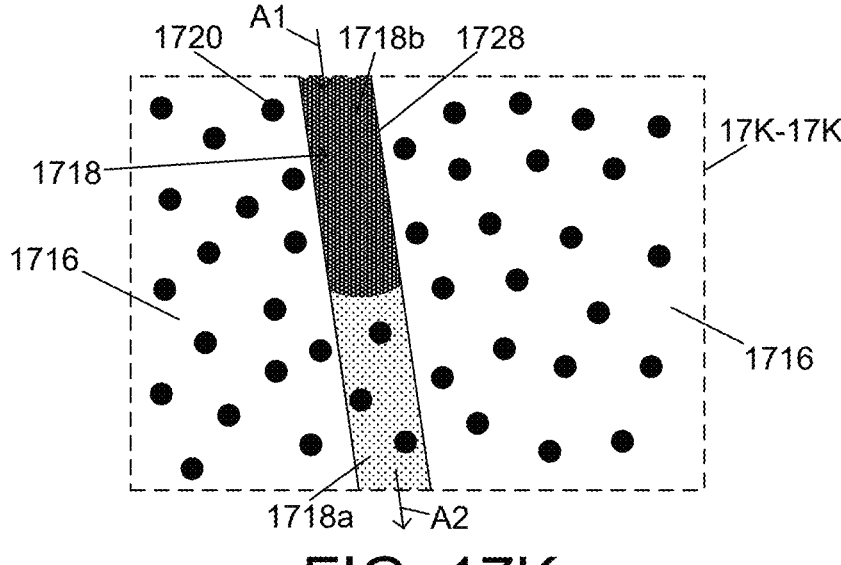
FIG. 17K illustrates a close-up view of the section 17K-17K of FIG. 17J.
Figure 17L:
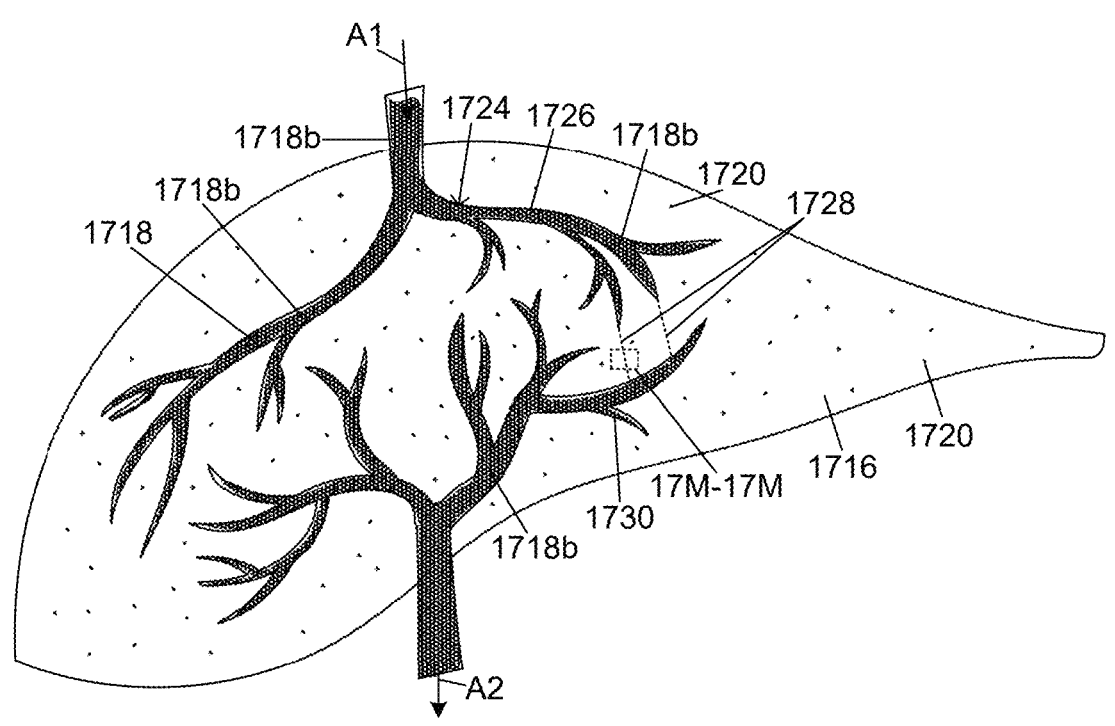
FIG. 17L illustrates a variation of perfusing a second fluid in the vasculature of the organ of FIG. 17B.
Figure 17M:
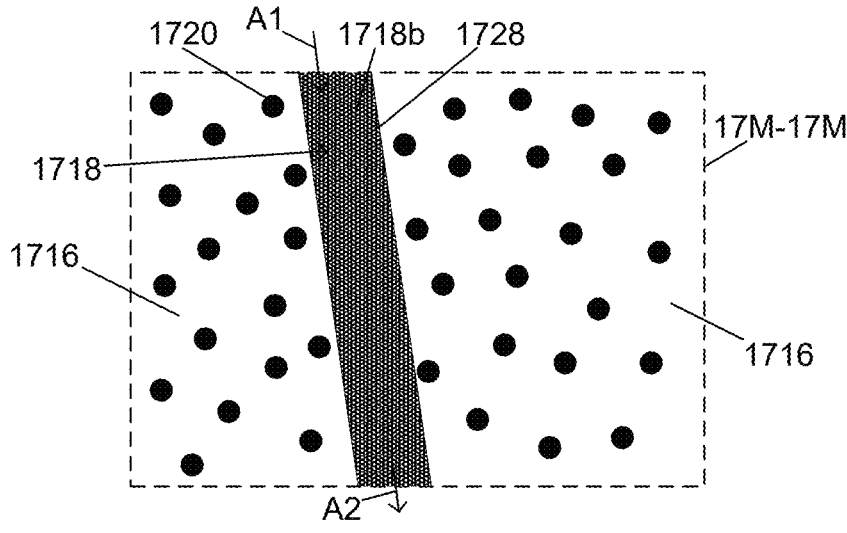
FIG. 17M illustrates a close-up view of the section 17M-17M of FIG. 17L.

FIGS. 17H-17M illustrate, for example, a variation of perfusing the second fluid 1718*b* in the vasculature 1724, where FIGS. 17H-17I illustrate the second fluid 1718*b* partially perfused in the vasculature 1724, where FIGS. 17J-17K illustrate the second fluid 1718*b* partially perfused in the vasculature 1724, and where FIGS. 17L-17M illustrate the second fluid 1718*b* fully perfused in the vasculature 1724. For example, FIGS. 17H-17I illustrate the second fluid 1718*b* perfused in the arterial vessels 1726, FIGS. 17J-17K illustrate the second fluid 1718*b* perfused in the arterial vessels 1726 and the capillaries 1728, and FIGS. 17L-17M illustrate the second fluid 1718*b* perfused in the arterial vessels 1726, the capillaries 1728, and the venous vessels 1730.

The second fluid 1718*b* can displace, mix with, and/or replace the first fluid 1718*a* in the vasculature 1724. FIGS. 17H-17M illustrate, for example, that the second fluid 1718*b* can displace and replace the first fluid 1718*a* in the vasculature 1724 as the second fluid 1718*b* is perfused into the vasculature 1724. For example, as the second fluid 1718*b* is pumped into the vasculature 1724, the second fluid 1718*b* can displace (e.g., push) the first fluid 1718*a* along the blood vessels of the vasculature 1724 and out of the vasculature 1724, for example, through an opening (e.g., a cannulized opening) of a venous vessel 1730 (e.g., the venous opening 17300) as the second fluid 1718*b* is perfused into the vasculature 1724. FIGS. 17L-17M illustrate, for example, a configuration in which the second fluid 1718*b* has completely replaced the first fluid 1718*a* in the vasculature 1724. Perfusing the specimen 1716 with the second fluid 1718*b* can cause, for example, the second fluid 1718*b* to replace the first fluid 1718*a* in vasculature 1724 of the specimen 1716. FIGS. 17H-17M illustrate, for example, that the first fluid 1718*a* and the second fluid 1718*b* can be immiscible with each other. As another example, the first fluid 1718*a* and the second fluid 1718*b* can be miscible with each other (e.g., as shown in FIGS. 18A-18F).

FIGS. 17H-17M illustrate that the second fluid 1718*b* may not perfuse and/or diffuse into the specimen tissue. For example, FIGS. 17H-17M illustrate that the second fluid 1718*b* may not pass through arterial, capillary, and/or venous blood vessel walls. As another example, the second fluid 1718*b* can perfuse and/or diffuse into the specimen tissue.

FIGS. 17H-17M illustrate that while the second fluid 1718*b* is being perfused through the vasculature 1724, the second fluid 1718*b* can have a second fluid temperature of −10.0° C. to 10.0° C., including every 0.1° C. increment within this range (e.g., −10.0° C., −5.0° C., 0.0° C., 5.0° C., 10.0° C.). The second fluid 1718*b* can be perfused though the vasculature 1724 at the second fluid temperature. For example, the second fluid 1718*b* can be perfused though the vasculature 1724 at one or multiple second fluid temperatures (e.g., at one or multiple temperatures within −10.0° C. to 10.0° C.).

FIGS. 17H-17M illustrate that the second fluid 1718*b* can be pumped through the vasculature 1724 at a second fluid pressure of 100 mmHg to 300 mmHg, including every 1 mmHg increment within this range (e.g., 100 mmHg, 200 mmHg, 300 mmHg). The fluid pressure of the second fluid 1718*b* may be caried during step 1704. For example, the second fluid 1718*b* may initially be flowed at a first fluid pressure to prevent streaming of the second fluid 1718*b* into the first fluid 1718*a* and promote the formation of a fluid interface between the first fluid 1718*a* and the second fluid 1718*b*. In a particular example, the second fluid 1718*b* can be initially pumped at a fluid pressure between 20 mmHg and 60 mmHg to produce a slow flow of the second fluid 1718*b* (e.g., a flow rate of between 0.05 mL/min to 0.5 mL/min). The fluid pressure of the second fluid 1718*b* may then be increased at a rate. The rate of increase can be about 1-2 mmHg/minute. The fluid pressure of the second fluid 1718*b* may be increased until the fluid pressure is between 80 mmHg and 200 mmHg to produce a faster flow rate of the second fluid 1718*b* (e.g., a flow rate between 2 mL/min to 10 mL/min, or a flow rate of approximately 5 mL/min). For example, the fluid pressure of the second fluid 1718*b* can be increased to about 100 mmHg.

FIGS. 17H-17M illustrate that the second fluid 1718*b* can be perfused into a cannulized vasculature of the specimen 1716. For example, FIGS. 17H-17M illustrate that the vasculature 1724 can be cannulized with the tubing 1740, and that the second fluid 1718*b* can be perfused into and out of the specimen 1716 through the tubing 1740.

FIGS. 17H-17M illustrate a variation of a second configuration that the system 1700S can have (also referred to as a system second configuration).

FIGS. 17H-17M illustrate that when the system 1700S is in the second configuration, the second fluid 1718*b* can be perfused into the specimen 1716 and/or the chamber 1742. For example, FIGS. 17H-17M illustrate that when the system 1700S is in the second configuration, the one or multiple pumps 1738 can perfuse the second fluid 1718*b* into the specimen 1716 and/or the chamber 1742. When the system 1700S is in the second configuration, the second fluid 1718*b* can have the second fluid temperature.

FIGS. 17N-17S illustrate a variation of step 1706 of the method 1700M.

Figure 17N:
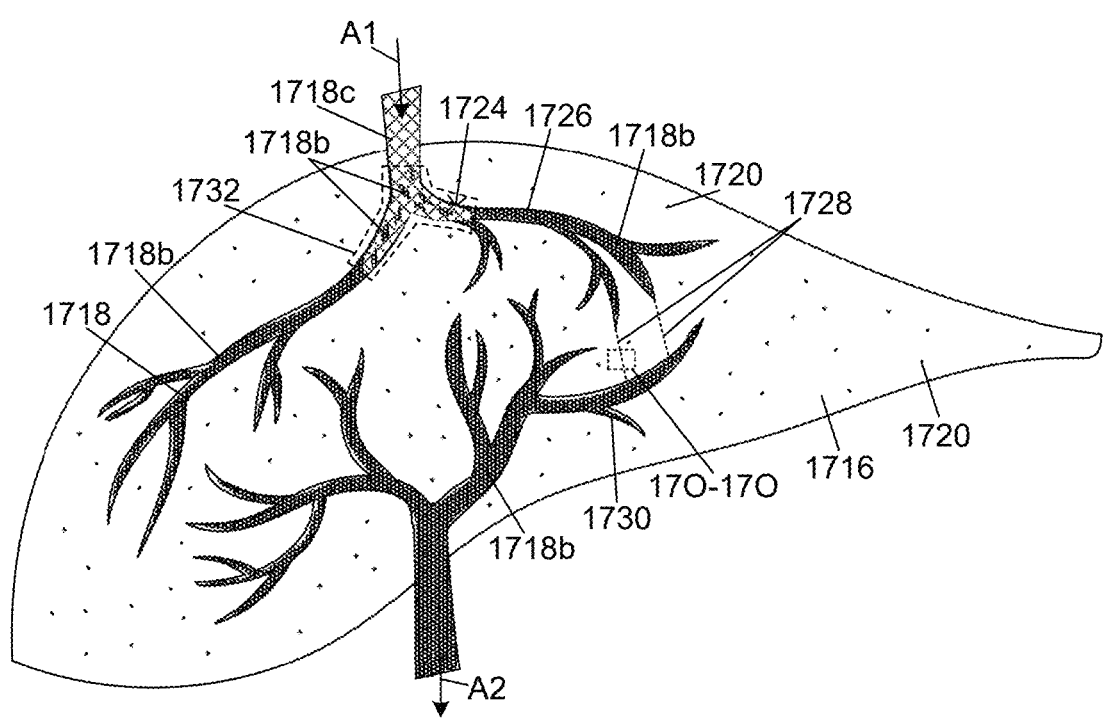
FIG. 17N illustrates a variation of perfusing a third fluid in the vasculature of the organ of FIG. 17B.
Figure 17O:
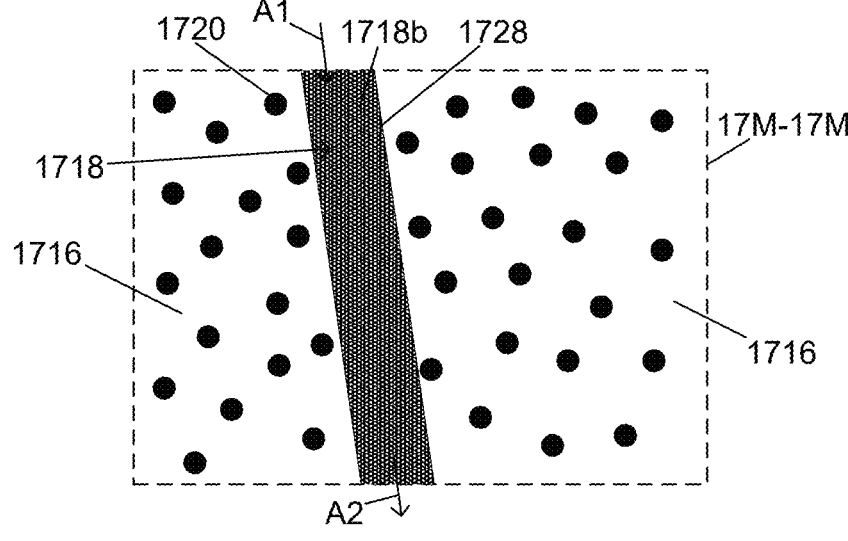
FIG. 17O illustrates a close-up view of the section 17O-17O of FIG. 17N.
Figure 17P:
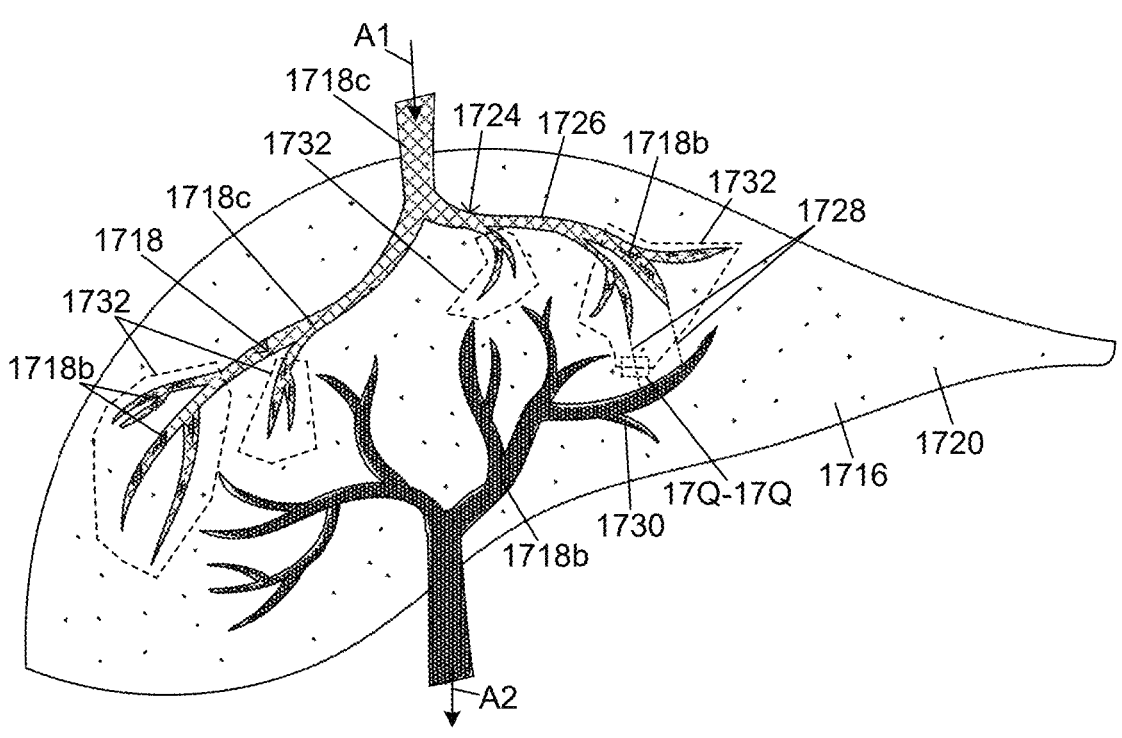
FIG. 17P illustrates a variation of perfusing a third fluid in the vasculature of the organ of FIG. 17B.
Figure 17Q:
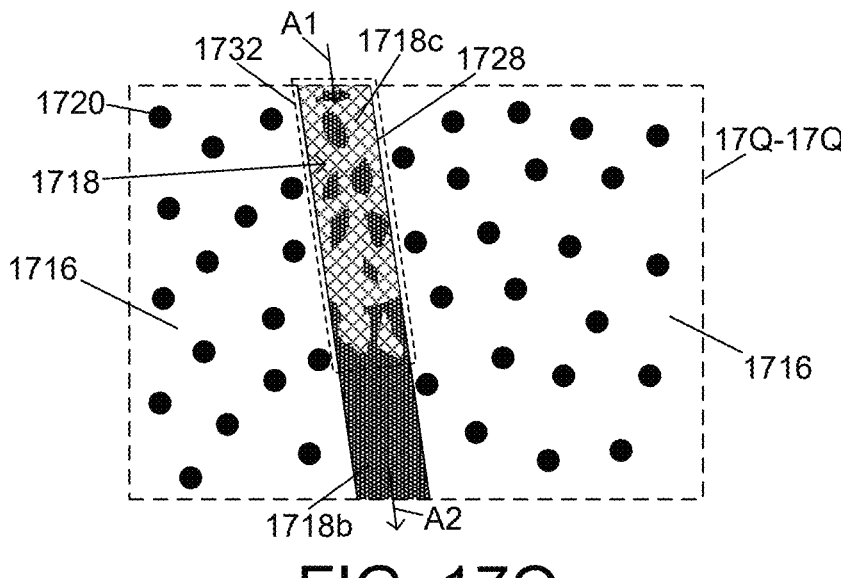
FIG. 17Q illustrates a close-up view of the section 17Q-17Q of FIG. 17P.
Figure 17R:
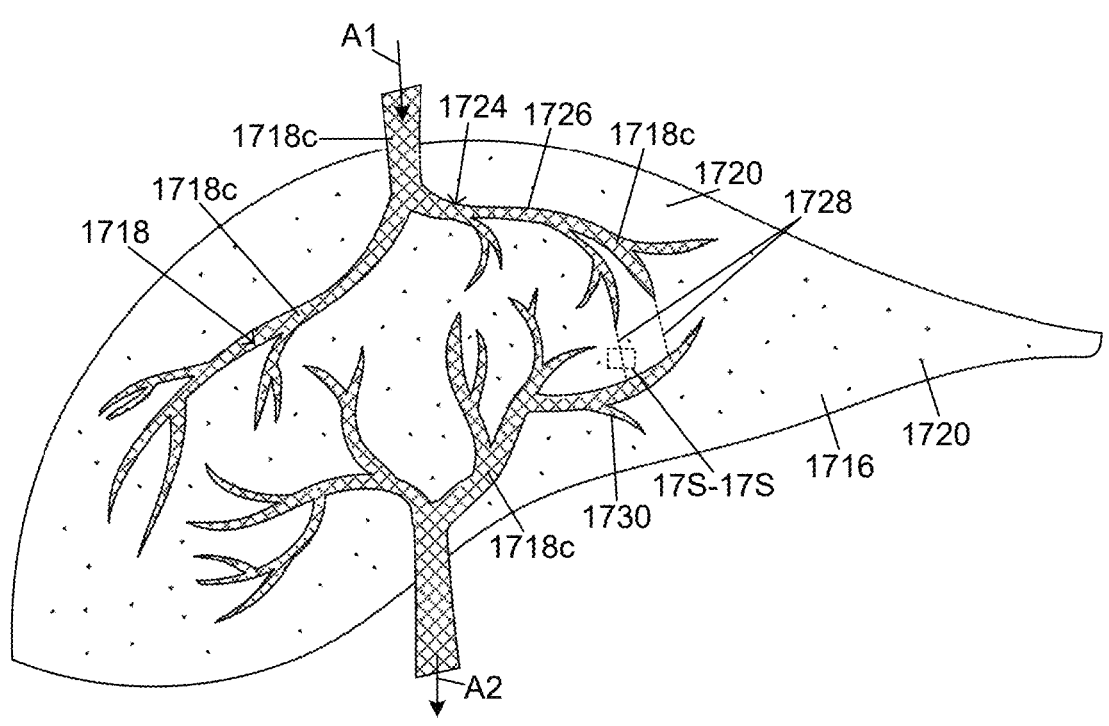
FIG. 17R illustrates a variation of perfusing a third fluid in the vasculature of the organ of FIG. 17B.
Figure 17S:
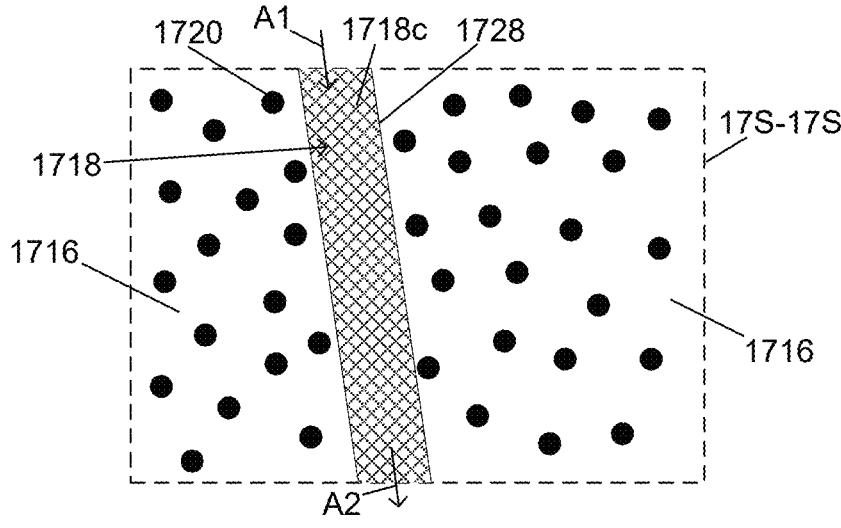
FIG. 17S illustrates a close-up view of the section 17S-17S of FIG. 17R.

FIGS. 17N-17S illustrate, for example, a variation of perfusing the third fluid 1718*c* without the nanoparticles 1722 in the vasculature 1724, where FIGS. 17N-17O illustrate the third fluid 1718*c* partially perfused in the vasculature 1724, where FIGS. 17P-17Q illustrate the third fluid 1718*c* partially perfused in the vasculature 1724, and where FIGS. 17R-17S illustrate the third fluid 1718*c* fully perfused in the vasculature 1724. For example, FIGS. 17N-17O illustrate the third fluid 1718*c* perfused in the arterial vessels 1726, FIGS. 17P-17Q illustrate the third fluid 1718*c* perfused in the arterial vessels 1726 and the capillaries 1728, and FIGS. 17R-17S illustrate the third fluid 1718*c* perfused in the arterial vessels 1726, the capillaries 1728, and the venous vessels 1730.

The third fluid 1718*c* can mix with, displace, and/or replace the second fluid 1718*b* in the vasculature 1724. FIGS. 17N-17S illustrate, for example, that the third fluid 1718*c* can mix with and replace the second fluid 1718*b* in the vasculature 1724 as the third fluid 1718*c* is perfused into the vasculature 1724. For example, as the third fluid 1718*c* is pumped into the vasculature 1724, the third fluid 1718*c* can mix with the second fluid 1718*b*, whereby the second fluid 1718*b* can be forced out of the vasculature 1724 as the third fluid 1718*c* displaces (e.g., pushes) the second fluid 1718*b* along the blood vessels of the vasculature 1724 and out of the vasculature 1724 and/or as the mixture of the second fluid 1718*b* and the third fluid 1718*c* flows along the blood vessels of the vasculature 1724 and is forced out of the out of the vasculature 1724. The second fluid 1718*b* and/or the mixture of the second fluid 1718*b* and the third fluid 1718*c* can flow out of the specimen 1716, for example, through an opening (e.g., a cannulized opening) of a venous vessel 1730 (e.g., the venous opening 17300) as the third fluid 1718*c* is perfused into the vasculature 1724. FIGS. 17R-17S illustrate, for example, a configuration in which the third fluid 1718*c* has completely replaced the second fluid 1718*b* in the vasculature 1724. Perfusing the specimen 1716 with the third fluid 1718*c* can cause, for example, the third fluid 1718*c* to replace the second fluid 1718*b* within vasculature 1724 of the specimen 1716. FIGS. 17N-17S illustrate, for example, that the second fluid 1718*b* and the third fluid 1718*c* can be miscible with each other. As another example, the second fluid 1718*b* and the third fluid 1718*c* can be immiscible with each other (e.g., as shown in FIGS. 18G-18L).

For example, FIG. 17N illustrates that as the third fluid 1718*c* is perfused into the vasculature 1724, the third fluid 1718*c* can displace (e.g., push) the second fluid 1718*b* along the blood vessels of the vasculature 1724 and/or mix with the second fluid 1718*b* in the vasculature 1724. FIG. 17N illustrates that when the second fluid 1718*b* and the third fluid 1718*c* are miscible with each other, the second fluid 1718*b* and the third fluid 1718*c* can be mixed with each other in one or multiple mixing zones 1732 (also referred to as the mixing zone 1732). FIG. 17N illustrates that the mixing zone 1732 can be one or multiple regions inside the vasculature 1724 in which the first fluid and the third fluid 1718*c* are mixed with each other and/or form a mixture with each other. The second fluid 1718*b* and the third fluid 1718*c* can form a non-homogeneous mixture or a homogeneous mixture with each other, for example, in the mixing zone 1732. For example, FIG. 17N illustrates that the second fluid 1718*b* and the third fluid 1718*c* can form a homogeneous mixture in the mixing zone 1732. The size and shape of the mixing zone 1732 can vary, for example, based on the size and shape of the vasculature, the perfusion rate of the third fluid 1718*c*, the viscosity of the second fluid 1718*b*, the viscosity of the third fluid 1718*c*, the temperature of the second fluid 1718*b*, the temperature of the third fluid 1718*c*, and the temperature of the specimen 1716, or any combination thereof. FIG. 17N illustrates that the second fluid 1718*b* and the third fluid 1718*c* may be separate from each other proximal the mixing zone 1732, and that the second fluid 1718*b* and the third fluid 1718*c* may be separate from each other distal the mixing zone 1732. Proximal the mixing zone 1732 can be, for example, toward an arterial opening in the vasculature 1724 (e.g., toward the arterial opening 17260), and distal the mixing zone 1732 can be, for example, toward the venous opening of the vasculature 1724 (e.g., toward the venous opening 17300). For example, FIG. 17N illustrates that there may not be the third fluid 1718*c* distal the mixing zone 1732, and that there may not be the second fluid 1718*b* proximal the mixing zone 1732. The size of the mixing zone 1732 can increase, remain constant, and/or decrease as the third fluid 1718*c* is perfused through the vasculature 1724, for example, while the third fluid 1718*c* is perfusing through the vasculature 1724. The size of the mixing zone 1732 can increase as the third fluid 1718*c* is perfused through the vasculature 1724, for example, as the third fluid 1718*c* initially flows into the vasculature 1724 and the second fluid 1718*b* and the third fluid 1718*c* begin to mix. The size of the mixing zone 1732 can decrease as the third fluid 1718*c* is perfused through the vasculature 1724, for example, as the second fluid 1718*b* and the mixture of the second fluid 1718*b* and the third fluid 1718*c* are forced out of the vasculature 1724, for example, through an opening (e.g., a cannulized opening) of a venous vessel 1730. The mixing zone 1732 can move along the vasculature 1724, for example, as the third fluid 1718*c* and the mixture of the second fluid 1718*b* and the third fluid 1718*c* flow in the vasculature 1724 and are mixed with and/or displace the second fluid 1718*b* in the vasculature 1724.

FIGS. 17P-17Q illustrate that that the second fluid 1718*b* and the third fluid 1718*c* can be mixed with each other in multiple mixing zones 1732. For example, FIGS. 17P-17Q illustrate that the mixing zones 1732 can be in branches of the arterial vessels 1726 and in the capillaries 1728.

The second fluid 1718*b* and the third fluid 1718*c* can mix with each other (e.g., form a homogeneous mixture) in the arterial vessels 1726, the capillaries 1728, and/or the venous vessels 1730. FIGS. 17N-17O illustrate that the second fluid 1718*b* and the third fluid 1718*c* can mix with each other (e.g., form a homogeneous mixture) in the arterial vessels 1726. FIGS. 17P-17Q illustrate that the second fluid 1718*b* and the third fluid 1718*c* can mix with each other (e.g., form a homogeneous mixture) in the arterial vessels 1726 and the capillaries 1728.

FIGS. 17N-17S illustrate that the third fluid 1718*c* may not perfuse and/or diffuse into the specimen tissue. For example, FIGS. 17N-17S illustrate that the third fluid 1718*c* may not pass through arterial, capillary, and/or venous blood vessel walls. As another example, the third fluid 1718*c* can perfuse and/or diffuse into the specimen tissue.

FIGS. 17N-17S illustrate that while the third fluid 1718*c* is being perfused through the vasculature 1724, the third fluid 1718*c* can have a third fluid temperature of $-10°$ C. to $10°$ C., or more broadly, $-122°$ C. to $34°$ C., or more broadly still, $-196°$ C. to $34°$ C., including every $1°$ C. increment within these ranges (e.g., $-196°$ C., $-122°$ C., $-100°$ C., $-10°$ C., $-5°$ C., $0°$ C., $5°$ C., $10°$ C., $30°$ C., $34°$ C.). The third fluid 1718*c* can be perfused though the vasculature 1724 at the third fluid temperature. The nanoparticles 1722 can be perfused though the vasculature 1724 when the third fluid 1718*c* is at the third fluid temperature. The third fluid 1718*c* can be perfused though the vasculature 1724 at the third fluid temperature. For example, the third fluid 1718*c* can be perfused though the vasculature 1724 at one or multiple third fluid temperatures (e.g., at one or multiple temperatures within $-196°$ C. to $34°$ C.).

The kinematic velocity of the third fluid 1718*c* can depend on the third fluid temperature. For example, when the third fluid temperature is $-80°$ C., the third fluid 1718*c* can have a kinematic velocity of at least 2.0 cSt. The third fluid 1718*c* can have a kinematic velocity of at least 2.0 cSt at $-80$ C. As another example, when the third fluid temperature is $-120°$ C., the third fluid 1718*c* can have a kinematic velocity of at least 17 cSt. The third fluid 1718*c* can have a kinematic velocity of at least 17 cSt at $-120$ C.

FIGS. 17N-17S illustrate that the third fluid 1718*c*—with and/or without the nanoparticles 1722—can be pumped through the vasculature 1724 at a third fluid pressure of 50 mmHg to 300 mmHg, including every 1 mmHg increment within this range (e.g., 100 mmHg, 200 mmHg, 300 mmHg). FIGS. 17N-17S illustrate that the third fluid 1718*c* can be pumped through the vasculature 1724 at the third fluid pressure while the third fluid 1718*c* does not have the nanoparticles 1722. The first fluid pressure can be the same as or different than the second fluid pressure. The first fluid pressure can be the same as or different than the third fluid pressure. The second fluid pressure can be the same as or different than the third fluid pressure.

The third fluid 1718c and/or the nanoparticles 1722 can be perfused into a cannulized vasculature of the specimen 1716. For example, FIGS. 17N-17S illustrate that the third fluid 1718c can be perfused into a cannulized vasculature of the specimen 1716. FIGS. 17N-17S illustrate, for example, that the vasculature 1724 can be cannulized with the tubing 1740, and that the third fluid 1718c having the nanoparticles 1722 can be perfused into and out of the specimen 1716 through the tubing 1740.

FIGS. 17N-17S illustrate a variation of a third configuration that the system 1700S can have (also referred to as a system third configuration).

When the system 1700S is in the third configuration, the third fluid 1718c and/or the nanoparticles 1722 can be perfused into the specimen 1716 and/or the chamber 1742. For example, FIGS. 17N-17S illustrate that when the system 1700S is in the third configuration, the third fluid 1718c can be perfused into the specimen 1716 and/or the chamber 1742. FIGS. 17N-17S illustrate, for example, that when the system 1700S is in the third configuration, the one or multiple pumps 1738 can perfuse the third fluid 1718c into the specimen 1716 and/or the chamber 1742. When the system 1700S is in the third configuration, the third fluid 1718c can have the third fluid temperature.

In some variations, step 1706 of method 1700M includes perfusing the third fluid 1718c and the second fluid 1718b concurrently. For instance, the third fluid 1718c can be perfused at a third fluid pressure, and the second fluid 1718b can be perfused at a second fluid pressure. The second fluid pressure and the third fluid pressure can be controlled during step 1706. For example, the fluid pressures can be controlled in a stepwise, linear, or non-linear manner in order to change the relative proportion and flow rate of the second fluid 1718b relative to the third fluid 1718c during step 1706. In a particular example, the fluid pressure of the second fluid 1718b will be decreased during step 1706, while the fluid pressure of the third fluid 1718c is increased during step 1706 to cause the relative flow rate of the third fluid 1718c to increase relative to the flow rate of the second fluid 1718b.

In a particular example, the second fluid 1718b may be initially perfused at a fluid pressure between 40 mmHg and 200 mmHg until the vasculature is cleared of the first fluid 1718a (as described above with respect to step 1704). During step 1706, the relative amount of the third fluid 1718c can be gradually increased (e.g., by adjusting the fluid pressure of the third fluid 1718c and the second fluid 1718b) until the third fluid 1718c replaces the second fluid 1718b in the vasculature. For example, in a first phase of step 1706, the third fluid 1718c can be approximately 20% of the volume relative to the second fluid 1718b. In a second phase of step 1706, the third fluid 1718c can be approximately 40% of the volume relative to the second fluid 1718b. In a third phase of step 1706, the third fluid 1718c can be approximately 60% of the volume relative to the second fluid 1718b. In a fourth phase of step 1706, the third fluid 1718c can be approximately 80% of the volume relative to the second fluid 1718b. In a fourth phase of step 1706, the third fluid 1718c can be approximately 100% of the volume relative to the second fluid 1718b. Each of the first, second, third, and fourth phases may proceed until a volume of the combined second 1718b and third 1718c fluids has perfused through the biological specimen. For instance, each of the first, second, third, and fourth phases may include perfusing between 50 mL and 300 mL of fluid 1718 through the biological specimen. In a particular example, each of the first, second, third, and fourth phases may include perfusing about 100 mL of fluid 1718 through the biological specimen.

FIGS. 17T-17Y illustrate a variation of steps 1708 and 1710 of the method 1700M.

Figure 17T:
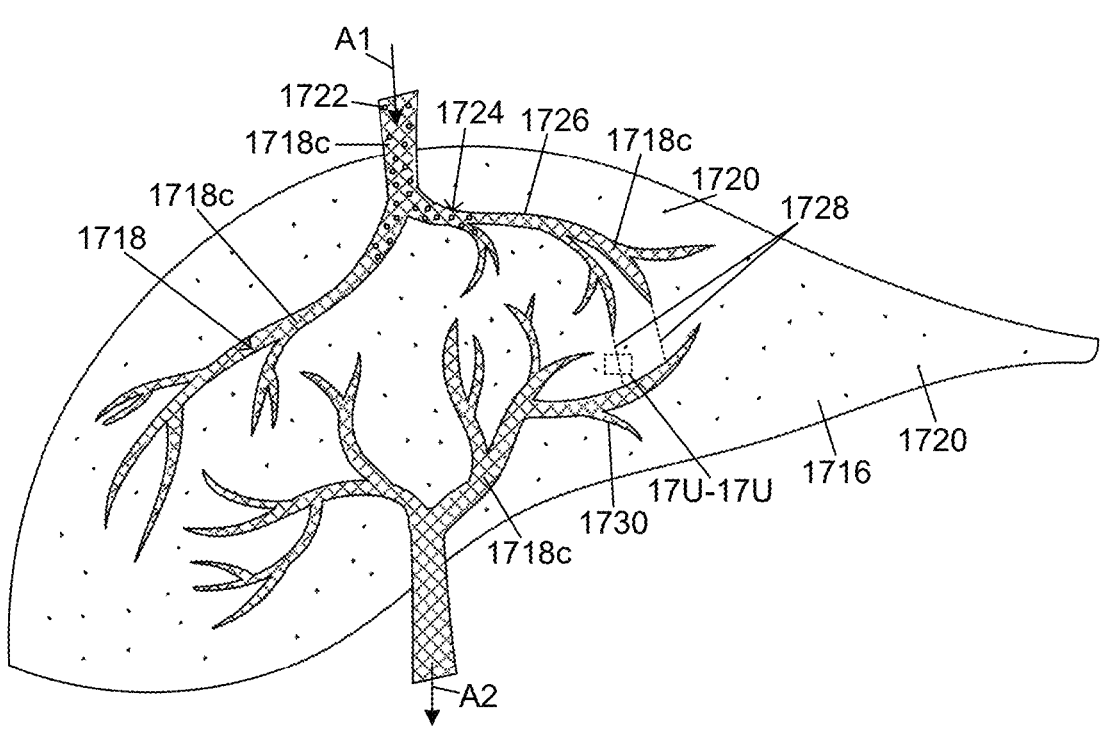
FIG. 17T illustrates a variation of perfusing a second fluid and magnetic nanoparticles in the vasculature of the organ of FIG. 17B.
Figure 17U:
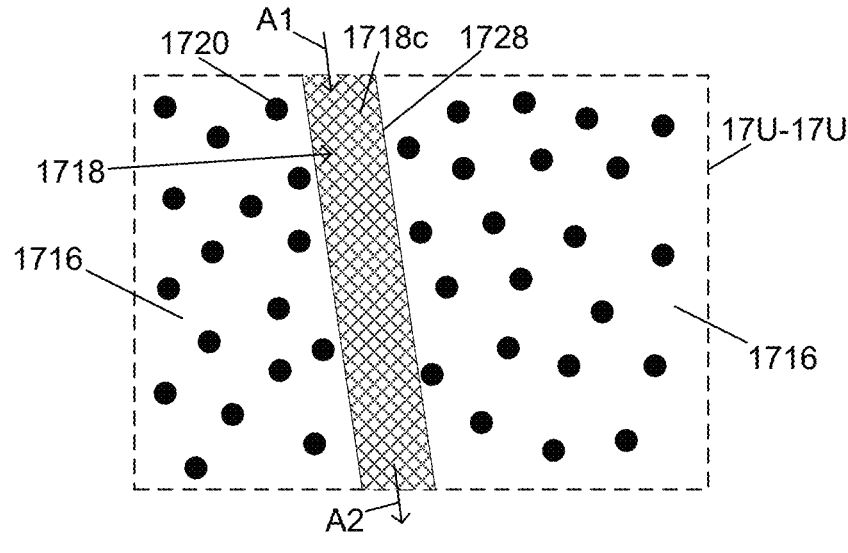
FIG. 17U illustrates a close-up view of the section 17U-17U of FIG. 17T.
Figure 17V:
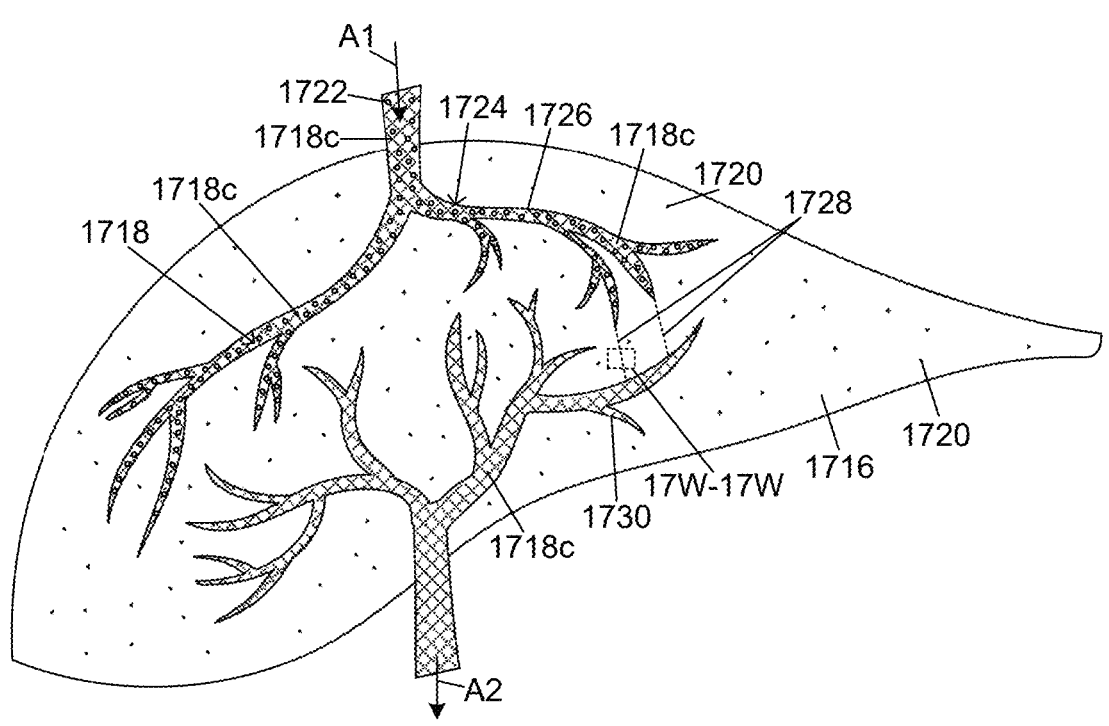
FIG. 17V illustrates a variation of perfusing a second fluid and magnetic nanoparticles in the vasculature of the organ of FIG. 17B.
Figure 17W:
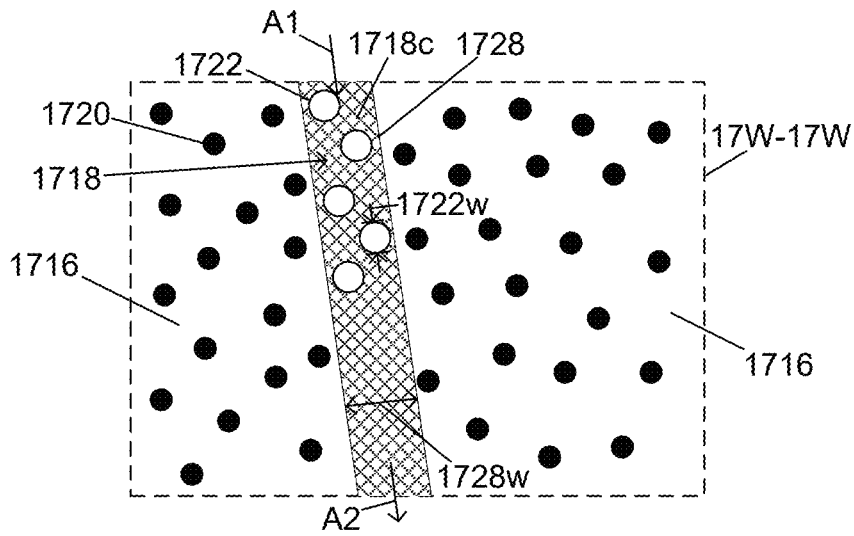
FIG. 17W illustrates a close-up view of the section 17W-17W of FIG. 17V.
Figure 17X:
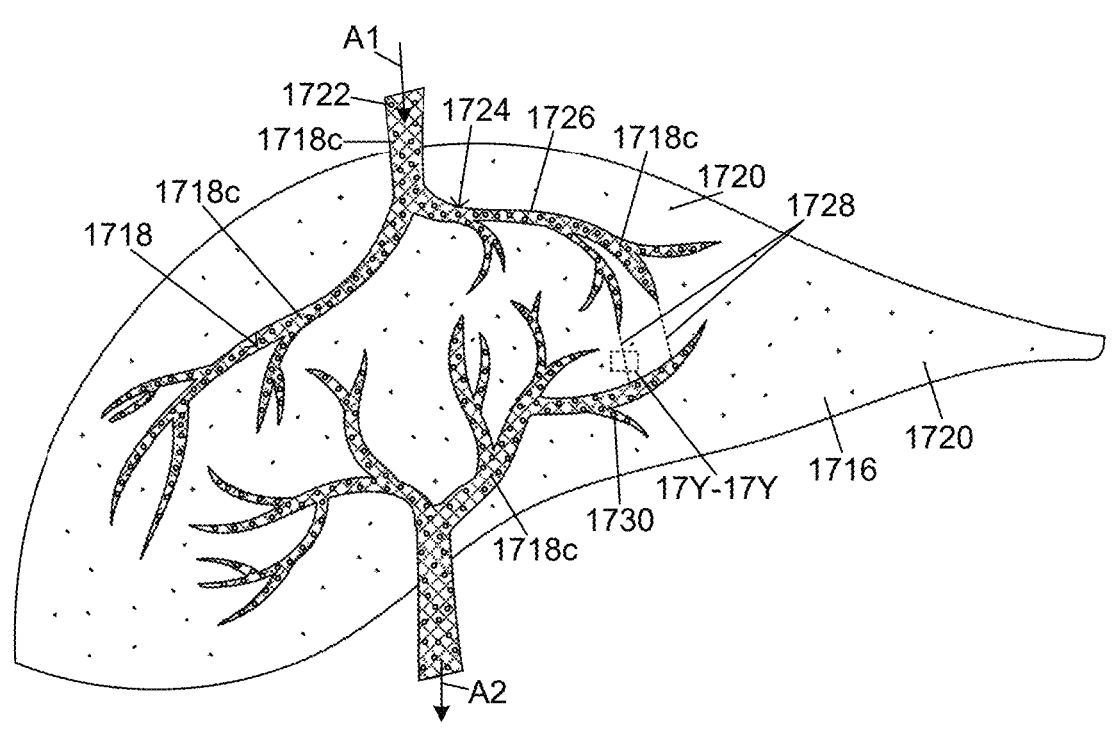
FIG. 17X illustrates a variation of perfusing a second fluid and magnetic nanoparticles in the vasculature of the organ of FIG. 17B.
Figure 17Y:
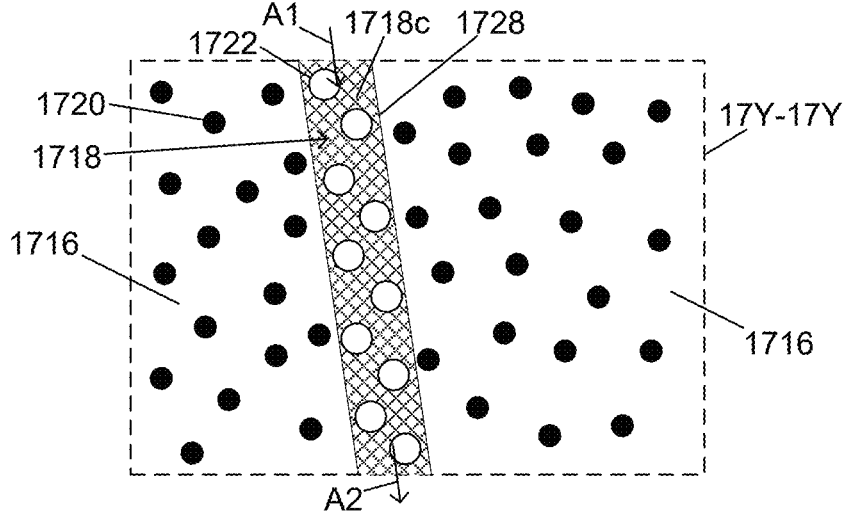
FIG. 17Y illustrates a close-up view of the section 17Y-17Y of FIG. 17X.

FIGS. 17T-17Y illustrate a variation of perfusing the nanoparticles 1722 in the vasculature 1724. The nanoparticles 1722 can be perfused in the vasculature 1724, for example, by perfusing one or more of the fluids 1718 (e.g., the third fluid 1718c and/or the fourth fluid 1718d) having the nanoparticles 1722 in the vasculature 1724. FIGS. 17T-17Y illustrate, for example, a variation in which the third fluid 1718c can have the nanoparticles 1722 and/or in which the nanoparticles 1722 can be added to the third fluid 1718c, whereby the third fluid 1718c having the nanoparticles 1722 can be perfused in the vasculature 1724. For example, FIGS. 17T-17U illustrate the nanoparticles 1722 partially perfused in the vasculature 1724, FIGS. 17V-17W illustrate the nanoparticles 1722 partially perfused in the vasculature 1724, and FIGS. 17X-17Y illustrate the nanoparticles 1722 fully perfused in the vasculature 1724. For example, FIGS. 17T-17U illustrate the nanoparticles 1722 perfused in the arterial vessels 1726, FIGS. 17V-17W illustrate the nanoparticles 1722 perfused in the arterial vessels 1726 and the capillaries 1728, and FIGS. 17X-17Y illustrate the nanoparticles 1722 perfused in the arterial vessels 1726, the capillaries 1728, and the venous vessels 1730. The third fluid 1718c and the nanoparticles 1722 can be perfused in the vasculature until the concentration of nanoparticles in the vasculature is between 5 mgFe/mL and 100 mgFe/mL. The third fluid 1718c and the nanoparticles 1722 can be perfused in the vasculature until the concentration of nanoparticles in the vasculature is approximately 10 mgFe/mL.

FIGS. 17T-17Y illustrate that the nanoparticles 1722 may not perfuse and/or diffuse into the specimen tissue. For example, FIGS. 17T-17Y illustrate that the nanoparticles 1722 may not pass through arterial, capillary, and/or venous blood vessel walls. As another example, the nanoparticles 1722 can perfuse and/or diffuse into the specimen tissue.

FIG. 17W illustrates that the nanoparticles 1722 can have a nanoparticle width 1722w. FIG. 17W illustrates that the nanoparticle width 1722w can be less than the capillary vessel width 1728w. The nanoparticle width 1722w can be, for example, a diameter of the nanoparticles 1722 and/or a maximum dimension (e.g., maximum width) of the nanoparticle 1722.

FIGS. 17T-17Y illustrate that the third fluid 1718c can be pumped through the vasculature 1724 at the third fluid pressure while the third fluid 1718c comprises the nanoparticles 1722. The third fluid pressure can be, for example, 80 mmHg to 300 mmHg, including every 1 mmHg increment within these ranges. The third fluid pressure can be about 120 mmHg.

FIGS. 17T-17Y illustrate that the third fluid 1718c and the nanoparticles 1722 can be perfused into a cannulized vasculature of the specimen 1716. FIGS. 17T-17Y illustrate, for example, that the vasculature 1724 can be cannulized with the tubing 1740, and that the third fluid 1718c and the nanoparticles 1722 can be perfused into and out of the specimen 1716 through the tubing 1740.

FIGS. 17T-17Y illustrate a variation of a fourth configuration that the system 1700S can have (also referred to as a system fourth configuration).

When the system 1700S is in the fourth configuration, the third fluid 1718c and/or the nanoparticles 1722 can be perfused into the specimen 1716 and/or the chamber 1742. For example, FIGS. 17T-17Y illustrate that when the system 1700S is in the fourth configuration, the third fluid 1718c and the nanoparticles 1722 can be perfused into the specimen 1716 and/or the chamber 1742. FIGS. 17T-17Y illustrate, for example, that when the system 1700S is in the fourth configuration, the one or multiple pumps 1738 can perfuse the third fluid 1718c and the nanoparticles 1722 into the specimen 1716 and/or the chamber 1742.

When the system 1700S is in the third configuration and/or the fourth configuration, the temperature of the third fluid 1718c can be controlled to cause the specimen 1716 to cool from a specimen first temperature to a specimen second temperature. The method 1700M can include controlling the temperature of the third fluid 1718c with and/or without the nanoparticles 1722. For example, when the third fluid 1718c does not comprise the nanoparticles 1722 (e.g., when the system 1700S is in in the third configuration), the temperature of the third fluid 1718c can be controlled to cause the specimen 1716 to cool from the specimen first temperature to the specimen second temperature. As another example, when the third fluid 1718c comprises the nanoparticles 1722 (e.g., when the system 1700S is in in the fourth configuration), the temperature of the third fluid 1718c can be controlled to cause the specimen 1716 to cool from the specimen first temperature to the specimen second temperature.

The specimen first temperature can be the initial temperature of the specimen 1716 (also referred to as the specimen initial temperature). The initial temperature of the specimen 1716 can be, for example, the temperature of the specimen 1716 before the method 1700M is executed (e.g., before and/or at the start of step 1702) and/or the temperature of the specimen 1716 at the beginning and/or end of any step of the method 1700M, including, for example, the temperature of the specimen 1716 at beginning and/or end of any step in which the specimen 1716 is cooled with the first fluid 1718a, the second fluid 1718b, the third fluid 1718c, the fourth fluid 1718d, and/or the coolant 1750. The specimen first temperature can be, for example, −10° C. to the environmental temperature (e.g., 10° C., 20° C., 30° C., 38° C., 40° C.), including every 1° C. increment within this range (e.g., −10° C., −5° C., 0° C., 5° C., 10° C., environmental temperature such as 40° C.). The specimen first temperature can be, for example −4° C.

The specimen second temperature can be, for example, −196° C. to 9° C., or more narrowly, −150° C. to 9° C., or more narrowly still, −138° C. to 10° C. including every 1° C. increment within these ranges (e.g., −196° C., −150° C., −122° C., −100° C., 9° C.).

The specimen first temperature can be, for example, greater than a vitrification temperature (e.g., −150° C.). The specimen second temperature can be, for example, less than, equal to, or greater than the vitrification temperature (e.g., −150° C.). For example, the specimen first temperature can be greater than the vitrification temperature, and the specimen second temperature can be less than or equal to the vitrification temperature. As another example, the specimen first temperature and the specimen second temperature can both be greater than the vitrification temperature.

The specimen second temperature can be less than the specimen first temperature. For example, the specimen first temperature can be greater than the vitrification temperature, and the specimen second temperature can be less than or equal to the vitrification temperature. As another example, the specimen first temperature and the specimen second temperature can both be greater than the vitrification temperature, whereby the specimen second temperature can be closer to the vitrification temperature than the specimen first temperature.

FIGS. 17T-17Y illustrate that the third fluid temperature can be controlled to cause the specimen 1716 to cool from the specimen first temperature to the specimen second temperature. Controlling the third fluid temperature can include, for example, decreasing the third fluid temperature from a third fluid first temperature to a third fluid second temperature while perfusing the third fluid 1718c through the vasculature 1724, and/or maintaining the third fluid 1718c at one or multiple third fluid temperatures while perfusing the third fluid 1718c through the vasculature 1724. The third fluid first temperature can be, for example, the initial temperature of the third fluid 1718c when the third fluid 1718c starts to perfuse through the vasculature 1724. The third fluid second temperature can be, for example, the final temperature of the fourth fluid 1718d when perfusion of the third fluid 1718c through the vasculature 1724 is terminated and/or the coldest temperature that the third fluid 1718c reached while perfusing through the vasculature 1724. The third fluid second temperature can be a colder temperature than the third fluid first temperature. The third fluid first temperature can be, for example, the maximum temperature (e.g., the warmest temperature) of the third fluid 1718c while perfusing through the vasculature 1724. The third fluid second temperature can be, for example, the minimum temperature (e.g., the coldest temperature) of the third fluid 1718c while perfusing through the vasculature 1724.

The third fluid 1718c can be perfused through the vasculature 1724 at a constant temperature and/or at a variable temperature. For example, the third fluid temperature can be perfused through the vasculature 1724 at a constant third fluid temperature (e.g., −42° C. −70° C. −122° C., −150° C., −138° C., −196° C.). The constant third fluid temperature can be, for example, the desired specimen second temperature. The constant third fluid temperature can be less than, equal to, or greater than the vitrification temperature (e.g., −150° C.). The constant third fluid temperature can be, for example, the third fluid first temperature, the third fluid second temperature, and/or any third fluid temperature between the third fluid first temperature and the third fluid second temperature. As another example, the third fluid temperature can be variable during perfusion of the third fluid 1718c through the vasculature 1724, whereby the third temperature can be decreased from the third fluid first temperature to the third fluid second temperature in discrete steps (e.g., in 1° C.-30° C. steps from 4° C. to −122° C.) and/or continuously (e.g., from 4° C. to −122° C.) during perfusion of the third fluid 1718c through the vasculature 1724. The third fluid second temperature can be, for example, the desired specimen second temperature.

The third fluid first temperature can be, for example, −120° C. to 34° C., including every 1° C. increment within this range (e.g., −120° C., −100° C., −90° C. −70° C., −50° C., −5° C., 0° C., 5° C., 10° C., 34° C.). The third fluid first temperature can be between −60° C. and −120° C. The third fluid first temperature can be approximately −90° C.

The third fluid second temperature can be, for example, −196° C. to −10° C., including every 1° C. increment within this range (e.g., −196° C., −150° C., −122° C., −100° C., −70° C., −42° C., −10° C.).

The third fluid 1718c can be perfused through the vasculature 1724 at a constant fluid pressure and/or a variable fluid pressure. For example, the third fluid can be perfused through the vasculature 1724 at a constant third fluid pressure (e.g., between 80 mmHg and 600 mmHg, or approximately 120 mmHg). As another example, the third fluid pressure can be variable during perfusion of the third fluid 1718c through the vasculature 1724, whereby the third fluid pressure can be increased from a third fluid first fluid pressure to the third fluid second fluid pressure in discrete steps (e.g., in 10 mmHg-100 mmHg steps from 120 mmHg to 300 mmHg) and/or continuously (e.g., from 120 mmHg to 300 mmHg) during perfusion of the third fluid 1718$c$ through the vasculature 1724.

In a particular variation, the fluid pressure of the third fluid 1718$c$ is controlled during cooling to maintain an optimal rate of perfusion of the third fluid as the temperature of biological specimen decreases and the biological specimen can withstand increased pressures. For example, at the third fluid first temperature (e.g., −90° C.), a fluid pressure of the third fluid 1718$c$ (e.g., the third fluid first fluid pressure) can be between 80 mmHg to 300 mmHg. At the third fluid first temperature, the fluid pressure of the third fluid can be about 120 mmHg. As the temperature of the biological specimen decreases (e.g., decreases to about −40° C., between −10° C. and −80° C., or any 1° C. increment in between), the fluid pressure of the third fluid 1718$c$ can be increased to about 200 mmHg (or to a pressure value between 150 mmHg and 600 mmHg and any 1 mmHg increment in between). The temperature of the third fluid 1718$c$ may be controlled to be approximately −110° C. (or to a temperature between −90° C. and −130° C., including any 1° C. increment in between). As the temperature of the biological specimen continues to decrease (e.g., decreases to about −90° C., between −10° C. and −110° C., or any 1° C. temperature increment in between), the fluid pressure of the third fluid 1718$c$ can be increased to about 300 mmHg (or to a pressure value between 150 mmHg and 600 mmHg, including any 1 mmHg value in between). The temperature of the third fluid 1718$c$ may be controlled to approximately −120° C. (or to a temperature between −110° C. and −120° C., including any 1° C. increment in between).

A cooling rate of the specimen 1716 from the specimen first temperature to the specimen second temperature can be, for example, between 4° C./min and 60° C./min, including every 1° C./min increment within this range (e.g., 4° C./min, 15° C./min, 60° C./min).

A cooling rate of the specimen 1716 between the specimen first temperature and the specimen second temperature can be, for example, between 4° C./min and 60° C./min, including every 1° C./min increment within this range (e.g., 4° C./min, 15° C./min, 60° C./min).

The cooling rate of the specimen 1716 from the specimen first temperature to the specimen second temperature can inhibit and/or prevent ice formation within the specimen 1716.

The cooling rate of the specimen 1716 between the specimen first temperature and the specimen second temperature can inhibit and/or prevent ice formation within the specimen 1716.

The coolant 1750 can flow out of a coolant tank (e.g., the seventh reservoir 1736$g$) in a liquid state and/or a gaseous state (e.g., a vapor state). For example, the coolant 1750 can flow into the chamber 1742 from a liquid nitrogen tank (e.g., the liquid nitrogen tank 1403) as a liquid and/or a gas (e.g., a vapor). The coolant 1750 can flow into the chamber 1742 when the system 1700S is in any configuration. For example, FIGS. 17B-17Z8 illustrate that the coolant 1750 (e.g., liquid nitrogen vapor) can be perfused into the chamber 1742 from the seventh reservoir 1736$g$ (e.g., a liquid nitrogen tank) when the system 1700S is in any configuration.

The fourth fluid 1718$d$ and/or the coolant 1750 can cool the specimen 1716 from the specimen second temperature to a specimen third temperature. The fourth fluid 1718$d$ and/or the coolant 1750 can cool the specimen 1716 from the specimen second temperature to a specimen third temperature, for example, in variations in which the specimen second temperature is greater than the vitrification temperature (e.g., −150° C.), the third fluid second temperature is greater than the vitrification temperature (e.g., −150° C.), the third fluid minimum temperature is greater than the vitrification temperature (e.g., −150° C.), the third fluid 1718$c$ is not used (e.g., in which steps 1706, 1708, and 1710 can be omitted from the method 1700M), or an combination thereof. The specimen third temperature can be less than the specimen second temperature. The specimen third temperature can be, for example, less than or equal to the vitrification temperature (e.g., −150° C.). The specimen third temperature can be, for example, −196° C. to −150° C., including every 1° C. increment within this range (e.g., −196° C., −180° C., −150° C.).

For example, the fourth fluid 1718$d$ can be perfused through the vasculature 1724 and/or the coolant 1750 can be perfused into the chamber 1742 (e.g., from the liquid nitrogen tank 1403) to decrease the temperature of the specimen 1716 from the specimen second temperature to the specimen third temperature. For example, the fourth fluid 1718$d$ can be perfused through the vasculature 1724 and/or the coolant 1750 can be perfused into the chamber 1742 (e.g., from the seventh reservoir 1736$g$, from the liquid nitrogen tank 1403) to decrease the temperature of the specimen 1716 to the specimen third temperature to vitrify the specimen 1716 by decreasing the temperature of the specimen 1716 from the specimen second temperature to a temperature less than or equal to the vitrification temperature (e.g., 150° C.).

A cooling rate of the specimen 1716 from the specimen second temperature to the specimen third temperature can be, for example, between 4° C./min and 60° C./min, including every 1° C./min increment within this range (e.g., 4° C./min, 15° C./min, 60° C./min).

A cooling rate of the specimen 1716 between the specimen second temperature and the specimen third temperature can be, for example, between 4° C./min and 60° C./min, including every 1° C./min increment within this range (e.g., 4° C./min, 15° C./min, 60° C./min).

FIGS. 17Z1-17Z2 illustrate a variation of steps 1712 and 1714 of the method 1700M.

FIGS. 17Z1-17Z2 illustrate a variation of perfusing the fourth fluid 1718$d$ and/or the nanoparticles 1722 in the vasculature 1724. FIGS. 17Z1-17Z2 illustrate, for example, a variation in which the fourth fluid 1718$d$ can have the nanoparticles 1722 and/or in which the nanoparticles 1722 can be added to the fourth fluid 1718$d$, whereby the fourth fluid 1718$d$ having the nanoparticles 1722 can be perfused in the vasculature 1724. For example, FIGS. 17Z1-17Z2 illustrate the fourth fluid 1718$d$ and the nanoparticles 1722 fully perfused in the vasculature 1724. For example, FIGS. 17Z1-17Z2 illustrate the fourth fluid and the nanoparticles 1722 perfused in the arterial vessels 1726, the capillaries 1728, and the venous vessels 1730. The fourth fluid 1718$d$ and the nanoparticles 1722 can be perfused in the vasculature until the concentration of nanoparticles in the vasculature is between 5 mgFe/mL and 100 mgFe/mL. The fourth fluid 1718$d$ and the nanoparticles 1722 can be perfused in the vasculature until the concentration of nanoparticles in the vasculature is approximately 10 mgFe/mL, The fourth fluid 1718$d$ can mix with, displace, and/or replace the third fluid 1718$c$ in the vasculature 1724. FIGS. 17Z1-17Z2 illustrate, for example, that the fourth fluid 1718$d$ can mix with and replace the third fluid 1718$c$ in the vasculature 1724 as the fourth fluid 1718$d$ is perfused into the vasculature 1724. For example, as the fourth fluid 1718$d$ is pumped into the vasculature 1724, the fourth fluid 1718*d* can mix with the third fluid 1718*c*, whereby the third fluid 1718*c* can be forced out of the vasculature 1724 as the fourth fluid 1718*d* displaces (e.g., pushes) the third fluid 1718*c* along the blood vessels of the vasculature 1724 and out of the vasculature 1724 and/or as the mixture of the third fluid 1718*c* and the fourth fluid 1718*d* flows along the blood vessels of the vasculature 1724 and is forced out of the out of the vasculature 1724. The third fluid 1718*c* and/or the mixture of the third fluid 1718*c* and the fourth fluid 1718*d* can flow out of the specimen 1716, for example, through an opening (e.g., a cannulized opening) of a venous vessel 1730 (e.g., the venous opening 17300) as the fourth fluid 1718*d* is perfused into the vasculature 1724. FIGS. 17Z1-17Z2 illustrate, for example, a configuration in which the fourth fluid 1718*d* has completely replaced the third fluid 1718*c* in the vasculature 1724. Perfusing the specimen 1716 with the fourth fluid 1718*d* can cause, for example, the fourth fluid 1718*d* to replace the third fluid 1718*c* within vasculature 1724 of the specimen 1716. FIGS. 17Z1-17Z2 illustrate, for example, that the third fluid 1718*c* and the fourth fluid 1718*d* can be miscible with each other. The third fluid 1718*c* and the fourth fluid 1718*d* can mix with each other (e.g., form a homogeneous mixture) in the arterial vessels 1726, the capillaries 1728, and/or the venous vessels 1730. As another example, the third fluid 1718*c* and the fourth fluid 1718*d* can be immiscible with each other.

FIGS. 17Z1-17Z2 illustrate that the fourth fluid 1718*d* may not perfuse and/or diffuse into the specimen tissue. For example, FIGS. 17Z1-17Z2 illustrate that the fourth fluid 1718*d* may not pass through arterial, capillary, and/or venous blood vessel walls. As another example, the fourth fluid 1718*d* can perfuse and/or diffuse into the specimen tissue.

FIGS. 17Z1-17Z2 illustrate that while the fourth fluid 1718*d* is being perfused through the vasculature 1724, the fourth fluid 1718*d* can have a fourth fluid temperature of −196° C. to 10° C., or more narrowly, −196° C. to −42° C., or more narrowly still, −196° C. to −70° C., including every 1° C. increment within these ranges (e.g., −196° C., −122° C., −70° C., −42° C., −5° C., 0° C., 5° C., 10° C.). The fourth fluid 1718*d* can be perfused though the vasculature 1724 at the fourth fluid temperature. The nanoparticles 1722 can be perfused though the vasculature 1724 when the fourth fluid 1718*d* is at the fourth fluid temperature. The fourth fluid 1718*d* can be perfused though the vasculature 1724 at the fourth fluid temperature. For example, the fourth fluid 1718*d* can be perfused though the vasculature 1724 at one or multiple fourth fluid temperatures (e.g., at one or multiple temperatures within −196° C. to 10° C.).

The kinematic velocity of the fourth fluid 1718*d* can depend on the fourth fluid temperature. For example, when the fourth fluid temperature is −80° C., the fourth fluid 1718*d* can have a kinematic velocity of at least 2.0 cSt. The fourth fluid 1718*d* can have a kinematic velocity of at least 2.0 cSt at −80 C. As another example, when the fourth fluid temperature is −120° C., the fourth fluid 1718*d* can have a kinematic velocity of at least 17 cSt. The fourth fluid 1718*d* can have a kinematic velocity of at least 17 cSt at −120 C.

FIGS. 17Z1-17Z2 illustrate that the fourth fluid 1718*d* can be pumped through the vasculature 1724 at a fourth fluid pressure of 100 mmHg to 300 mmHg, including every 1 mmHg increment within this range (e.g., 100 mmHg, 200 mmHg, 300 mmHg). FIGS. 17Z1-17Z2 illustrate that the fourth fluid 1718*d* can be pumped through the vasculature 1724 at the fourth fluid pressure while the fourth fluid 1718*d* comprises the nanoparticles 1722. The first fluid pressure can be the same as or different than the fourth fluid pressure. The third fluid pressure can be the same as or different than the fourth fluid pressure.

The fourth fluid 1718*d* and/or the nanoparticles 1722 can be perfused into a cannulized vasculature of the specimen 1716. For example, FIGS. 17Z1-17Z2 illustrate that the fourth fluid 1718*d* can be perfused into a cannulized vasculature of the specimen 1716. FIGS. 17Z1-17Z2 illustrate, for example, that the vasculature 1724 can be cannulized with the tubing 1740, and that the fourth fluid 1718*d* having the nanoparticles 1722 can be perfused into and out of the specimen 1716 through the tubing 1740.

FIGS. 17Z1-17Z2 illustrate that the nanoparticles 1722 may not perfuse and/or diffuse into the specimen tissue. For example, FIGS. 17Z1-17Z2 illustrate that the nanoparticles 1722 may not pass through arterial, capillary, and/or venous blood vessel walls. As another example, the nanoparticles 1722 can perfuse and/or diffuse into the specimen tissue.

FIGS. 17Z1-17Z2 illustrate a variation of a fifth configuration that the system 1700S can have (also referred to as a system fifth configuration).

When the system 1700S is in the fifth configuration, the fourth fluid 1718*d* and/or the nanoparticles 1722 can be perfused into the specimen 1716 and/or the chamber 1742. For example, FIGS. 17Z1-17Z2 illustrate that when the system 1700S is in the fifth configuration, the fourth fluid 1718*d* and the nanoparticles 1722 can be perfused into the specimen 1716 and/or the chamber 1742. FIGS. 17Z1-17Z2 illustrate, for example, that when the system 1700S is in the fifth configuration, the one or multiple pumps 1738 can perfuse the fourth fluid 1718*d* and the nanoparticles 1722 into the specimen 1716 and/or the chamber 1742. When the system 1700S is in the fourth configuration, the fourth fluid 1718*d* can have the fourth fluid temperature.

When the system 1700S is in the fifth configuration, the temperature of the fourth fluid 1718*d* can be controlled to cause the specimen 1716 to cool from the specimen first temperature to the specimen second temperature, from the specimen second temperature to the specimen third temperature, and/or from the specimen second temperature to the specimen third temperature. The method 1700M can include controlling the temperature of the fourth fluid 1718*d* with and/or without the nanoparticles 1722. For example, when the fourth fluid 1718*d* comprises the nanoparticles 1722 (e.g., when the system 1700S is in in the fifth configuration), the temperature of the fourth fluid 1718*d* can be controlled to cause the specimen 1716 to cool from the specimen first temperature to the specimen second temperature, from the specimen second temperature to the specimen third temperature, and/or from the specimen second temperature to the specimen third temperature. As another example, when the fourth fluid 1718*d* does not comprise the nanoparticles 1722, the temperature of the fourth fluid 1718*d* can be controlled to cause the specimen 1716 to cool from the specimen first temperature to the specimen second temperature, from the specimen second temperature to the specimen third temperature, and/or from the specimen second temperature to the specimen third temperature.

FIGS. 17Z1-17Z2 illustrate that the fourth fluid temperature can be controlled to cause the specimen 1716 to cool from the specimen first temperature to the specimen second temperature, from the specimen second temperature to the specimen third temperature, and/or from the specimen second temperature to the specimen third temperature. Controlling the fourth fluid temperature can include, for example, decreasing the fourth fluid temperature from a fourth fluid first temperature to a fourth fluid second temperature while perfusing the fourth fluid 1718d through the vasculature 1724, and/or maintaining the fourth fluid 1718d at one or multiple fourth fluid temperatures while perfusing the fourth fluid 1718d through the vasculature 1724. The fourth fluid first temperature can be, for example, the initial temperature of the fourth fluid 1718d when the fourth fluid 1718d starts to perfuse through the vasculature 1724. The fourth fluid second temperature can be, for example, the final temperature of the fourth fluid 1718d when perfusion of the fourth fluid 1718c through the vasculature 1724 is terminated and/or the coldest temperature that the fourth fluid 1718d reached while perfusing through the vasculature 1724. The fourth fluid second temperature can be a colder temperature than the fourth fluid first temperature. The fourth fluid first temperature can be, for example, the maximum temperature (e.g., the warmest temperature) of the fourth fluid 1718d while perfusing through the vasculature 1724. The fourth fluid second temperature can be, for example, the minimum temperature (e.g., the coldest temperature) of the fourth fluid 1718d while perfusing through the vasculature 1724.

The fourth fluid 1718d can be perfused through the vasculature 1724 at a constant temperature and/or at a variable temperature. For example, the fourth fluid temperature can be perfused through the vasculature 1724 at a constant fourth fluid temperature (e.g., −42° C.-70° C.-122° C., −150° C., −138° C., −196° C.). The constant fourth fluid temperature can be, for example, the desired specimen third temperature. The constant fourth fluid temperature can be less than, equal to, or greater than the vitrification temperature (e.g., −150° C.). The constant fourth fluid temperature can be, for example, the fourth fluid first temperature, the fourth fluid second temperature, and/or any fourth fluid temperature between the fourth fluid first temperature and the fourth fluid second temperature. As another example, the fourth fluid temperature can be variable during perfusion of the fourth fluid 1718d through the vasculature 1724, whereby the fourth temperature can be decreased from the fourth fluid first temperature to the fourth fluid second temperature in discrete steps (e.g., in 1° C.-30° C. steps from 4° C. to −122° C.) and/or continuously (e.g., from 4° C. to −122° C.) during perfusion of the fourth fluid 1718d through the vasculature 1724. The fourth fluid second temperature can be, for example, the desired specimen third temperature.

The fourth fluid first temperature can be, for example, −196° C. to 10° C., or more narrowly, −196° C. to −42° C., or more narrowly still, −196° C. to −70° C., including every 1° C. increment within these ranges (e.g., −196° C., −122° C., −70° C., −42° C., −5° C., 0° C., 5° C., 10° C.).

The fourth fluid second temperature can be, for example, −196° C. to 10° C., or more narrowly, −196° C. to −42° C., or more narrowly still, −196° C. to −70° C., including every 1° C. increment within these ranges (e.g., −196° C., −122° C., −70° C., −42° C., −5° C., 0° C., 5° C., 10° C.). The fourth fluid first temperature can be, for example, the third fluid second temperature.

FIGS. 17Z3-17Z8 illustrate the specimen 1716 in a vitrified state, for example, prior to heating it (e.g., warming it) during a later heating phase. FIGS. 17Z3-17Z8 illustrate that the method 1700M can vitrify the specimen 1716. FIGS. 17Z3-17Z8 illustrate that when the specimen 1716 is in a vitrified state, the specimen 1716 can be a cryopreserved specimen 1716c. FIGS. 17B-17Z2 illustrate that the specimen 1716 can be a whole organ, and FIGS. 17Z3-17Z8 illustrate that the cryopreserved specimen 1716c can be a whole cryopreserved organ.

FIGS. 17Z3-17Z8 illustrate that the specimen 1716 can be vitrified by perfusing the third fluid 1718c through the vasculature 1724 at one or multiple third fluid temperatures, by perfusing the fourth fluid 1718d through the vasculature 1724 at one or multiple fourth fluid temperatures, and/or by perfusing the coolant 1750 into and/or through the chamber 1742 at one or multiple coolant temperatures.

FIGS. 17Z3-17Z8 illustrate that the specimen 1716 can be vitrified by decreasing the temperature of the specimen to a specimen temperature (e.g., the specimen second temperature and/or the specimen third temperature) less than or equal to the vitrification temperature.

FIGS. 17Z3-17Z8 illustrate that the temperature of the specimen can be decreased to less than or equal to the vitrification temperature (e.g., to the specimen second temperature and/or to the specimen third temperature) by perfusing the third fluid 1718c through the vasculature 1724 at one or multiple third fluid temperatures, by perfusing the fourth fluid 1718d through the vasculature 1724 at one or multiple fourth fluid temperatures, and/or by perfusing the coolant 1750 into and/or through the chamber 1742 at one or multiple coolant temperatures.

FIGS. 17Z3-17Z5 illustrate, for example, that the specimen 1716 can be vitrified by perfusing the third fluid 1718c through the vasculature 1724 at a third fluid temperature greater than the vitrification temperature, by perfusing the fourth fluid 1718d through the vasculature 1724 at a fourth fluid temperature less than or equal to the vitrification temperature, and by perfusing the coolant 1750 into and/or through the chamber 1742 at a coolant temperatures less than or equal to the vitrification temperature before, during, and/or after perfusing the third fluid 1718c and/or the fourth fluid 1718d through the vasculature 1724, or any combination thereof. As another example, FIGS. 17Z3-17Z5 illustrate that the specimen 1716 can be vitrified by perfusing the third fluid 1718c through the vasculature 1724 at a third fluid temperature greater than the vitrification temperature, by perfusing the fourth fluid 1718d through the vasculature 1724 at a fourth fluid temperature greater than the vitrification temperature, and by perfusing the coolant 1750 into and/or through the chamber 1742 at a coolant temperatures less than or equal to the vitrification temperature before, during, and/or after perfusing the third fluid 1718c and/or the fourth fluid 1718d through the vasculature 1724, or any combination thereof.

FIGS. 17Z3-17Z5 illustrate, for example, that the specimen 1716 can be vitrified by perfusing the third fluid 1718c through the vasculature 1724 at one or multiple third fluid temperatures greater than the vitrification temperature, by perfusing the fourth fluid 1718d through the vasculature 1724 at one or multiple fourth fluid temperatures less than or equal to the vitrification temperature, and/or by perfusing the coolant 1750 into and/or through the chamber 1742 at one or multiple coolant temperatures less than or equal to the vitrification temperature before, during, and/or after perfusing the third fluid 1718c and/or the fourth fluid 1718d through the vasculature 1724, or any combination thereof. As another example, FIGS. 17Z3-17Z5 illustrate that the specimen 1716 can be vitrified by perfusing the third fluid 1718c through the vasculature 1724 at one or multiple third fluid temperatures greater than the vitrification temperature, by perfusing the fourth fluid 1718d through the vasculature 1724 at one or multiple fourth fluid temperatures greater than the vitrification temperature, and/or by perfusing the coolant 1750 into and/or through the chamber 1742 at one or multiple coolant temperatures less than or equal to the vitrification temperature before, during, and/or after perfusing the third fluid 1718c and/or the fourth fluid 1718d through the vasculature 1724, or any combination thereof.

FIGS. 17Z6-17Z8 illustrate, for example, that the specimen 1716 can be vitrified by perfusing the third fluid 1718*c* through the vasculature 1724 at a third fluid temperature greater than the vitrification temperature and/or by perfusing the coolant 1750 into and through the chamber 1742 at a coolant temperatures less than or equal to the vitrification temperature before, during, and/or after perfusing the third fluid 1718*c* through the vasculature 1724, or any combination thereof. As another example, FIGS. 17Z6-17Z8 illustrate that the specimen 1716 can be vitrified by perfusing the third fluid 1718*c* through the vasculature 1724 at a third fluid temperature less than or equal to the vitrification temperature and by perfusing the coolant 1750 into and/or through the chamber 1742 at a coolant temperatures less than or equal to the vitrification temperature before, during, and/or after perfusing the third fluid 1718*c* through the vasculature 1724, or any combination thereof.

FIGS. 17Z6-17Z8 illustrate, for example, that the specimen 1716 can be vitrified by perfusing the third fluid 1718*c* through the vasculature 1724 at one or multiple third fluid temperatures greater than the vitrification temperature and by perfusing the coolant 1750 into and/or through the chamber 1742 at one or multiple coolant temperatures less than or equal to the vitrification temperature, or any combination thereof. As another example, FIGS. 17Z6-17Z8 illustrate that the specimen 1716 can be vitrified by perfusing the third fluid 1718*c* through the vasculature 1724 at one or multiple third fluid temperatures less than or equal to the vitrification temperature and by perfusing the coolant 1750 into and/or through the chamber 1742 at one or multiple coolant temperatures less than or equal to the vitrification temperature.

The coolant temperature can be less than, equal to, or greater than the first fluid temperature, the second fluid temperature, the third fluid temperature, and/or the fourth fluid temperature. For example, FIGS. 17D-17Z8 illustrate that the coolant temperature can be less than the first fluid temperature, less than the second fluid temperature, less than or equal to the third fluid temperature, and less than or equal to the fourth fluid temperature.

FIGS. 17Z3-17Z5 illustrate that when the specimen 1716 is in a vitrified state, the cryoprotectant 1720 can be in the specimen tissue, the fourth fluid 1718*d* can be in the vasculature 1724, and the nanoparticles 1722 can be in the vasculature 1724, or any combination thereof. For example, FIGS. 17Z3-17Z5 illustrate that the specimen 1716 can reach a vitrified state during step 1712 or step 1714 of the method 1700M and/or while the coolant 1750 is perfused into the chamber 1742. In FIGS. 17Z3-17Z5, the first arrow A1 and the second arrow A2 that indicate fluid flow and/or flow direction in FIGS. 17B-17Z2 are absent, which can indicate, for example, that the specimen 1716 has reached a vitrified state during step 1712 or step 1714 of the method 1700M and/or during the perfusion of the coolant 1750 into the chamber 1742. The coolant 1750 can be perfused into the chamber 1742 before, during, and/or after any step of the method 1700M. For example, the coolant 1750 can be perfused into the chamber 1742 before, during, and/or after step 1712 and/or step 1714.

FIGS. 17Z6-17Z8 illustrate that when the specimen 1716 is in a vitrified state, the cryoprotectant 1720 can be in the specimen tissue, the third fluid 1718*c* can be in the vasculature 1724, and the nanoparticles 1722 can be in the vasculature 1724, or any combination thereof. For example, FIGS. 17Z6-17Z8 illustrate that the specimen 1716 can reach a vitrified state during step 1706, step 1708, and/or step 1710 of the method 1700M and/or while the coolant

1750 is perfused into the chamber 1742. In FIGS. 17Z6-17Z8, the first arrow A1 and the second arrow A2 that indicate fluid flow and/or flow direction in FIGS. 17B-17Z2 are absent, which can indicate, for example, that the specimen 1716 has reached a vitrified state during step 1706, step 1708, and/or step 1710 of the method 1700M and/or during the perfusion of the coolant 1750 into the chamber 1742. The coolant 1750 can be perfused into the chamber 1742 before, during, and/or after any step of the method 1700M. For example, the coolant 1750 can be perfused into the chamber 1742 before, during, and/or after step 1706, step 1708, and/or step 1710.

FIGS. 17Z3-17Z8 illustrate that the specimen 1716 can be vitrified with or without step 1712 and/or step 1714 of the method 1700M. For example, FIGS. 17Z3-17Z5 illustrate that the method 1700M can include step 1712 and/or step 1714, whereby the specimen 1716 can be vitrified, for example, in step 1712 or step 1714. As another example, FIGS. 17Z6-17Z8 illustrate that the method 1700M may not include step 1712 and step 1714, whereby the specimen 1716 can be vitrified, for example, in step 1706, step 1708, or step 1710.

For example, FIGS. 17Z3-17Z5 illustrate that vitrifying the specimen 1716 can include steps 1712 and 1714. FIGS. 17Z3-17Z5 illustrate, for example, that the specimen 1716 can include perfusing a fourth fluid (e.g., the fourth fluid 1718*d*) through the vasculature 1724. FIGS. 17Z3-17Z5 illustrate, for example, that the temperature of the specimen 1716 can be decreased from the specimen first temperature to the specimen second temperature and/or to the specimen third temperature by perfusing the third fluid 1718*c* through the vasculature 1724, by perfusing the fourth fluid 1718*d* through the vasculature 1724, and by perfusing the coolant 1750 into and/or through the chamber 1742, or any combination thereof.

As another example, FIGS. 17Z6-17Z8 illustrate that vitrifying the specimen 1716 may not include steps 1712 and 1714. FIGS. 17Z6-17Z8 illustrate, for example, that the specimen 1716 can be vitrified without perfusing a fourth fluid (e.g., the fourth fluid 1718*d*) through the vasculature 1724. FIGS. 17Z6-17Z8 illustrate, for example, that the temperature of the specimen 1716 can be decreased from the specimen first temperature to the specimen second temperature and/or to the specimen third temperature by perfusing the third fluid 1718*c* through the vasculature 1724 and by perfusing the coolant 1750 into and/or through the chamber 1742, or any combination thereof.

FIGS. 17A-17Z8 illustrate that the temperature of the third fluid 1718*c* can be decreased while the third fluid 1718*c* is being perfused through the specimen 1716 (e.g., through the vasculature 1724), that the temperature of the third fluid 1718*c* can be held constant while the third fluid 1718*c* is being perfused through the specimen 1716 (e.g., through the vasculature 1724), that the temperature of the third fourth fluid 1718*d* can be decreased while the fourth fluid 1718*d* is being perfused through the specimen 1716 (e.g., through the vasculature 1724), that the temperature of the third fourth fluid 1718*d* can be held constant while the fourth fluid 1718*d* is being perfused through the specimen 1716 (e.g., through the vasculature 1724), that the temperature of the coolant 1750 can be decreased while the coolant 1750 is being perfused into and/or through the chamber 1742, that the temperature of the coolant 1750 can be held constant while the coolant 1750 is being perfused into and/or through the chamber 1742, that the coolant 1750 can be perfused into the chamber 1742 before, during, and/or after perfusing the third fluid 1718*c* through the specimen 1716

(e.g., through the vasculature 1724), and that the coolant 1750 can be perfused into the chamber 1742 before, during, and/or after perfusing the fourth fluid 1718*d* through the specimen 1716 (e.g., through the vasculature 1724), or any combination thereof.

FIGS. 17A-17Z8 illustrate that the first fluid 1718*a* and/or the cryoprotectant 1720 can be absorbed by the specimen 1716 (e.g., by cells of the specimen 1716), that the second fluid 1718*b* may not be absorbed by the specimen 1716 (e.g., by cells of the specimen 1716), that the third fluid 1718*c* may not be absorbed by the specimen 1716 (e.g., by cells of the specimen 1716), that the fourth fluid 1718*d* may not be absorbed by the specimen 1716 (e.g., by cells of the specimen 1716), and that that the nanoparticles 1722 may not be absorbed by the specimen 1716 (e.g., by cells of the specimen 1716), or any combination thereof.

FIGS. 17A-17Z8 illustrate that the first fluid 1718*a* and/or the cryoprotectant 1720 can be absorbed by the specimen 1716 (e.g., by cells of the specimen 1716) while perfusing the first fluid 1718*a* through the vasculature 1724, that the second fluid 1718*b* may not be absorbed by the specimen 1716 (e.g., by cells of the specimen 1716) while perfusing the second fluid 1718*b* through the vasculature 1724, that the third fluid 1718*c* may not be absorbed by the specimen 1716 (e.g., by cells of the specimen 1716) while perfusing the third fluid 1718*c* through the vasculature 1724, that the fourth fluid 1718*d* may not be absorbed by the specimen 1716 (e.g., by cells of the specimen 1716) while perfusing the fourth fluid 1718*d* through the vasculature 1724, and that that the nanoparticles 1722 may not be absorbed by the specimen 1716 (e.g., by cells of the specimen 1716) while perfusing the nanoparticles 1722 through the vasculature 1724, or any combination thereof.

FIGS. 17A-17Z8 illustrate that the specimen 1716 (e.g., cells of the specimen 1716) can absorb the first fluid 1718*a* and/or the cryoprotectant 1720 from the vasculature 1724 while the first fluid 1718*a* is perfused through the vasculature 1724, that the specimen 1716 (e.g., cells of the specimen 1716) may not absorb the second fluid 1718*b* from the vasculature 1724 while the second fluid 1718*b* is perfused through the vasculature 1724, that the specimen 1716 (e.g., cells of the specimen 1716) may not absorb the third fluid 1718*c* from the vasculature 1724 while the third fluid 1718*c* is perfused through the vasculature 1724, that the specimen 1716 (e.g., cells of the specimen 1716) may not absorb the fourth fluid 1718*d* from the vasculature 1724 while the fourth fluid 1718*d* is perfused through the vasculature 1724, and that the specimen 1716 (e.g., cells of the specimen 1716) may not absorb the nanoparticles 1722 from the vasculature 1724 while the nanoparticles 1722 are perfused through the vasculature 1724, or any combination thereof.

FIGS. 17A-17Z8 illustrate that the method 1700M can rapidly and evenly cool specimens (e.g., the specimen 1716) from a non-vitreous state at a low temperature (e.g., approximately 4° C. to −10° C.) to a vitreous state at a vitreous temperature (e.g., approximately −150° C.) while inhibiting and/or preventing the formation of ice crystals in the specimen 1716.

FIGS. 17A-17Z8 illustrate that the method 1700M can take advantage of the vascular network inside the specimen 1716.

FIGS. 17A-17Z8 illustrate that temperature can be distributed (e.g., evenly distributed) in the specimen 1716 by flowing the fluids 1718 through the vasculature 1724.

FIGS. 17A-17Z8 illustrate that during the method 1700M, the pressure of the fluids 1718 can held below 300 mmHg using an inline pressure sensor (e.g., pressure sensor 1414)

for controlling a pump 1738 (e.g., a peristaltic pump) that can be used to control the flow of the fluids 1718 into, through, and out of the specimen 1716.

FIGS. 17A-17Z8 illustrate that the specimen 1716 can be placed in the chamber 1742 and that the first fluid 1718*a* can be pumped into the chamber 1742 at the first fluid temperature (e.g., approximately to 4° C.). The first fluid 1718*a* can be perfused through the vasculature 1724, for example, until it is well distributed in the vasculature 1724 and the specimen 1716 has equilibrated with a concentration (e.g., a high concentration) of the cryoprotectant 1720 (e.g., as shown in FIGS. 17D-17G).

FIGS. 17A-17Z8 illustrate that the second fluid 1718*b* can be flowed through the chamber 1742 at the second fluid temperature (e.g., approximately 4° C.) and can replace the first fluid 1718*a* within the vasculature 1724 (e.g., as shown in FIGS. 17H-17M). The second fluid 1718*b* can have a high viscosity. The high viscosity of the second fluid 1718*b* can allow the second fluid 1718*b* to push the first fluid 1718*a* out of the vasculature 1724 before the vitrification phase (e.g., steps 1706, 1708, 1710, 1712, and/or 1714). In variations in which step 1706 comprises the vitrification step, the vitrification process can begin, for example, while the third fluid 1718*c* displaces and replaces the second fluid 1718*b* in the vasculature 1724 or after the third fluid 1718*c* completely displaces and replaces the second fluid 1718*b* in the vasculature 1724. The second fluid 1718*b* can be immiscible with the first fluid 1718*a* and can have a low freezing point and/or a low vitrification point. The low freezing point and/or the low vitrification point can allow the second fluid 1718*b* to flow at low temperatures. The second fluid 1718*b* can be miscible with low-viscosity fluids used during the later vitrification process (e.g., the method 1700M), such as with the third fluid 1718*c* and/or the fourth fluid 1718*d*.

FIGS. 17A-17Z8 illustrate that the specimen 1716 can be perfused with the third fluid 1718*c* (e.g., perfluorohexane, or a hydrofluoroether solution such as Novec 7000 or Novec 7200), which can have a lower viscosity than the second fluid 1718*b*. As the third fluid 1718*c* is perfused through the specimen 1716, the third fluid 1718*c* can mix with the second fluid 1718*b* and replace the second fluid 1718*b* in the vasculature 1724 (e.g., as shown in FIGS. 17N-17S). The third fluid 1718*c* can have a low pour point and a low freezing point (e.g., approximately −138° C. freezing), for example, so that it can remain a liquid at the low temperature for vitrification. The third fluid 1718*c* (e.g., Novec 7000) can have a boiling point about 34° C., can have a freeze/pour point of about −122° C., can have a kinematic viscosity at −80° C. of about 2.0 cSt, and can have a kinematic viscosity at −120° C. of 17 cSt, or any combination thereof.

FIGS. 17A-17Z8 illustrate that to lower (e.g., rapidly lower) the temperature of the specimen 1716 to a vitrification temperature (approximately −150° C.), the coolant 1750 can be flowed into the chamber 1742, the third fluid 1718*c* can be chilled by a heat exchanger and flowed through the vasculature 1742 (e.g., as shown in FIGS. 17N-17Y), the fourth fluid 1718*d* can be chilled by a heat exchanger and flowed through the vasculature 1742 (e.g., as shown in FIGS. 17Z1-17Z2), or any combination thereof. The temperature of the third fluid 1718*c* can be ramped and dynamically controlled, for example, to maximize the rate of heat transfer from the specimen 1716 to the third fluid 1718*c*, to balance undercooling, and/or to maintain low viscosity for fast flow. The third fluid 1718*c* can be used during the vitrification phase and can be mixed with the nanoparticles 1722. The temperature of the fourth fluid 1718*d* can be ramped and dynamically controlled, for example, to maximize the rate of heat transfer from the specimen 1716 to the fourth fluid 1718*d*, to balance undercooling, and/or to maintain low viscosity for fast flow. The fourth fluid 1718*d* can be used during the vitrification phase and can be mixed with the nanoparticles 1722. The nanoparticles 1722 can be flushed inside the vasculature 1724 and can remain within the specimen 1716 while the specimen 1716 is in a cryopreserved state (e.g., as shown in FIGS. 17Z3-17Z8), for example, so that the nanoparticles 1722 can be used for future rewarming of the specimen 1716. For example, the third fluid 1718*c* (e.g., perfluorohexane) can be used to chill the specimen 1716 to −70° C., and then the fourth fluid 1718*d* (e.g., perfluoropentane) can be used to chill the specimen 1716 to about its minimum flow temperature (e.g. for perfluoropentane, to about −120° C.), or to a vitrification temperature (e.g. −150° C.) that is below the Tg of the CPA loaded tissue. As another example, the third fluid 1718*c* can be used to chill the specimen 1716 to −120° C., and the coolant 1750 can be used to chill the specimen 1716 to a vitrification temperature (e.g. −150° C.) that is below the Tg of the CPA loaded tissue. As yet another example, the third fluid 1718*c* and/or the coolant 1750 can be used to chill the specimen 1716 to −70° C., and then the fourth fluid 1718*d* (e.g., perfluoropropane or perfluoropentane) and/or the coolant 1750 can be used to chill the specimen 1716 to a holding temperature (e.g. −150° C.) that is below the Tg of the CPA loaded tissue. As still yet another example, the third fluid 1718*c* and/or the coolant 1750 can be used to chill the specimen 1716 to −120° C., and the coolant 1750 can be used to chill the specimen 1716 to a vitrification temperature (e.g. −150° C.) that is below the Tg of the CPA loaded tissue.

While nanowarming can be an effective method for distributing heating power throughout the cryopreserved specimen 1716*c* during reheating of the cryopreserved specimen 1716*c* as disclosed herein, there is no known effective equivalent for distributed cooling throughout a specimen (e.g., the specimen 1716) during a cooling phase. FIGS. 17A-17Z8 illustrate a solution to this problem. FIGS. 17A-17Z8 illustrate, for example, that a cooled fluid (e.g., the third fluid 1718*c* and/or the fourth fluid 1718*d*) can be flowed (e.g., perfused) through the vasculature 1724 that can maintain a low enough viscosity to maintain a high flow rate in the specimen 1716 at a tolerable arterial pressure (e.g., between 100 mmHG to 300 mmHG) to achieve distributed cooling throughout the specimen 1716. FIGS. 17A-17Z8 illustrate that the cooled fluid (e.g., the third fluid 1718*c* and/or the fourth fluid 1718*d*) can be, for example, one or multiple inert fluorous fluids (e.g., the third fluid 1718*c* and/or the fourth fluid 1718*d*), which can be ideal for distributed cooling of the specimen 1716, for example, due to the low viscosity and bio-orthoginality of the cooled fluid in the specimen 1716 (e.g., in the vasculature 1724).

FIGS. 17A-17Z8 illustrate, for example, that the specimen 1716 can be cooled (e.g., vitrified) by perfusing the first fluid 1718*a* through the vasculature 1724, by perfusing the second fluid 1718*b* through the vasculature 1724, by perfusing the third fluid 1718*c* through the vasculature 1724, by perfusing the fourth fluid 1718*d* through the vasculature 1724, and by perfusing the coolant 1750 into and/or through the chamber 1742 having the specimen 1716, or any combination thereof. The coolant 1750 can be perfused into the chamber 1742 before, during, and/or after any step of the method 1700M. For example, the coolant 1750 can be perfused into the chamber 1742 before, during, and/or after perfusing the first fluid 1718*a*, the second fluid 1718*b*, the third fluid 1718*c*, and/or the fourth fluid 1718*d* through the vasculature 1724.

FIGS. 17A-17Z8 illustrate that the method 1700M can be, for example, a cooling process having one or multiple cooling phases (also referred to as the cooling phase) that can vitrify the specimen 1716. For example, the method 1700M can have 1-10 or more cooling phases, including every 1 cooling phase increment within this range (e.g., 1 cooling phase, 2 cooling phases, 10 cooling phases). A cooling phase can be, for example, any step(s) of the method 1700M that decrease and/or maintain the temperature of the specimen at a temperature, for example, below the surrounding environmental temperature and/or below 38° C. Any step or steps of the method 1700M can be and/or can have a cooling phase. For example, the combination of steps used from the method 1700 can comprise a single cooling phase. The method 1700M can be, for example, single cooling phase in which one or multiple steps of the method 1700 can be part of a single cooling phase. As another example, the different steps method 1700M can each be a separate cooling phase of the method 1700 and/or a different stage of a single cooling phase of the method 1700M.

The cooling phase can include, for example, perfusing the fluids 1718 through the vasculature 1724, the nanoparticles 1722 through the vasculature 1724, and/or the coolant 1750 into and/or through the chamber 1742. For example, perfusing the first fluid 1718*a* through the vasculature 1724 can be a first cooling phase of the method 1700M, perfusing the second fluid 1718*b* through the vasculature 1724 can be a second cooling phase of the method 1700M, perfusing the third fluid 1718*c* through the vasculature 1724 can be a third cooling phase of the method 1700M, perfusing the third fluid 1718*c* through the vasculature 1724 and the coolant 1750 into the chamber 1742 can be a fourth cooling phase of the method 1700M, perfusing the fourth fluid 1718*d* through the vasculature 1724 can be a fifth cooling phase of the method 1700M, and perfusing the fourth fluid 1718*d* through the vasculature 1724 and the coolant 1750 into the chamber 1742 can be a sixth cooling phase of the method 1700M, or any combination thereof.

The cooling phase can include any combination of steps of the method 1700M. For example, the cooling phase can include step 1710 of the method 1700M, together and/or separately from step 1706 and/or step 1708.

The cooling phase can have one or multiple pre-vitrification phases, and/or one or multiple vitrification phases.

The pre-vitrification phase can be, for example, the steps of the method 1700M that prepare the specimen 1716 for vitrification, that prepare the vasculature 1724 for the fluid 1718 that can be used to vitrify the specimen 1716 (e.g., the third fluid 1718*c* and/or the fourth fluid 1718*d*), or both. The pre-vitrification phase may not decrease the temperature of the specimen 1716 to the vitrification temperature. The pre-vitrification phase can include, for example, step 1702, step 1704, and step 1706, or any combination thereof. For example, the pre-vitrification phase can load (e.g., perfuse) the specimen 1716 with the cryoprotectant 1720 by perfusing the first fluid 1718*a* through the vasculature 1724. The pre-vitrification phase can be a gradual cooling phase of the method 1700M and/or a temperature maintenance phase of the method 1700M in which the temperature of the specimen 1716 is maintained at a temperature below the environmental temperature and/or below 38° C.

The vitrification phase (e.g., a rapid cooling phase) can be, for example, the step(s) of the method 1700M during which the temperature of the specimen 1716 can be decreased (e.g., rapidly decreased) to a specimen temperature greater than, equal to, and/or less than the vitrification temperature (e.g., −150° C.). The vitrification phase can be a rapid cooling phase of the method 1700M. The vitrification phase can include, for example, perfusing the third fluid 1718*c* and/or the nanoparticles 1722 through the chamber 1742 and/or through the vasculature 1724 at one or multiple cooling temperatures, perfusing the fourth fluid 1718*d* and/ or the nanoparticles 1722 through the chamber 1742 and/or through the vasculature 1724 at one or multiple cooling temperatures, perfusing the coolant 1750 into and/or through the chamber 1742 having the specimen 1716 at one or multiple cooling temperatures, or any combination thereof. The one or multiple cooling temperatures can comprise temperatures less than, equal to, and/or greater than the vitrification temperature. For example, the temperatures of the third fluid 1718*c* and/or the fourth fluid 1718*d* can be temperatures less than or equal to the vitrification temperature such that the specimen 1716 can be vitrified by perfusing the third fluid 1718*c* and/or the fourth fluid 1718*d* through vasculature 1724, with and/or without perfusing the coolant 1750 through the chamber 1742. As another example, the temperatures of the third fluid 1718*c* and/or the fourth fluid 1718*d* can be temperatures equal to or greater than the vitrification temperature such that the specimen 1716 can be vitrified by perfusing the third fluid 1718*c* and/or the fourth fluid 1718*d* at one or multiple temperatures greater than the vitrification temperature and subsequently and/or simultaneously perfusing the coolant 1750 having a temperature less than or equal to the vitrification temperature into and/or through the chamber 1742. The vitrification phase can include, for example, step 1706, step 1708, step 1710, 1712, and/or step 1714.

To decrease the temperature of the specimen 1716, FIGS. 17A-17Z8 illustrate that a heat transfer gradient can be created by perfusing the fluids 1718 through the specimen 1716 (e.g., through the vasculature 1724). For example, FIGS. 17A-17Z8 illustrate that perfusing the nanoparticles 1722 and/or the fluids 1718 (e.g., the first fluid 1718*a*, the second fluid 1718*b*, the third fluid 1718*c*, and/or the fourth fluid 1718*d*) through the specimen 1716 (e.g., through the vasculature 1724) can, for example, create a heat transfer gradient between the specimen 1716 and the fluids 1718 and/or the nanoparticles 1722 in the vasculature 1724 such that thermal energy can transfer from a higher temperature region (e.g., from the specimen 1716) to a lower temperature region (e.g., to the third fluids 1718 and/or the nanoparticles 1722). Perfusing the fluids 1718 and/or the nanoparticles 1722 through the specimen 1716 can, for example, create a heat transfer gradient between the specimen 1716 and the fluids 1718 and/or the nanoparticles 1722 in the vasculature 1724, which can facilitate (e.g., cause) thermal energy to transfer from the higher-temperature region (e.g., from the specimen 1716) to the lower-temperature region (e.g., to the fluids 1718 and/or the nanoparticles 1722). The heat transfer gradient can be, for example, a specimen-to-fluid heat transfer gradient and/or a specimen-to-nanoparticle heat transfer gradient. The heat transfer from the specimen 1716 to the fluids 1718 and/or the nanoparticles 1722 can decrease the temperature of the specimen 1716, for example, to a temperature less than, equal to, and/or greater than the vitrification temperature (e.g., −150° C.).

To decrease the temperature of the specimen 1716, FIGS. 17A-17Z8 illustrate that a temperature gradient can be created by perfusing the fluids 1718 through the specimen 1716 (e.g., through the vasculature 1724). For example, FIGS. 17A-17Z8 illustrate that perfusing the nanoparticles 1722 and/or the fluids 1718 (e.g., the first fluid 1718*a*, the second fluid 1718*b*, the third fluid 1718*c*, and/or the fourth fluid 1718*d*) through the specimen 1716 (e.g., through the vasculature 1724) can, for example, create a temperature gradient between the specimen 1716 and the fluids 1718 and/or the nanoparticles 1722 in the vasculature 1724 such that heat can flow from the higher temperature region (e.g., from the specimen 1716) to the lower temperature region (e.g., to the fluids 1718 and/or the nanoparticles 1722). Perfusing the fluids 1718 and/or the nanoparticles 1722 through the specimen 1716 can, for example, create a temperature gradient between the specimen 1716 and the fluids 1718 and/or the nanoparticles 1722 in the vasculature 1724, which can facilitate (e.g., cause) thermal energy to transfer from the higher-temperature region (e.g., from the specimen 1716) to the lower-temperature region (e.g., to the fluids 1718 and/or the nanoparticles 1722). The temperature gradient can be, for example, a specimen-to-fluid temperature gradient and/or a specimen-to-nanoparticle temperature gradient. The heat transfer from the specimen 1716 to the fluids 1718 and/or the nanoparticles 1722 can decrease the temperature of the specimen 1716, for example, to a temperature less than, equal to, and/or greater than the vitrification temperature (e.g., −150° C.).

To decrease the temperature of the specimen 1716, FIGS. 17A-17Z8 illustrate that a heat transfer gradient can be created by perfusing the coolant 1750 into and/or through the chamber 1742. Perfusing the coolant 1750 into and/or through the chamber 1742 can, for example, create a heat transfer gradient between the coolant 1750 and the specimen 1716 and/or the fluids 1718 inside the specimen 1716 (e.g., the first fluid 1718*a*, the second fluid 1718*b*, the third fluid 1718*c*, and/or the fourth fluid 1718*d*) such that thermal energy can transfer from a higher temperature region (e.g., from the specimen 1716 and/or the fluids 1718) to a lower temperature region (e.g., to the coolant 1750 and/or the environment the coolant 1750 is in). Perfusing the coolant 1750 through the chamber 1742 can, for example, create a heat transfer gradient between the coolant 1750 and the specimen 1716 and/or the fluids 1718 inside the specimen 1716, which can facilitate (e.g., cause) thermal energy to transfer from the higher-temperature region (e.g., from the specimen 1716 and/or the fluids 1718) to the lower-temperature region (e.g., to the coolant 1750 and/or the environment the coolant 1750 is in). The heat transfer gradient can be, for example, a specimen-to-coolant heat transfer gradient and/or a fluid-to-coolant heat transfer gradient. The heat transfer from the specimen 1716 and/or the fluids 1718 to the coolant 1750 can decrease the temperature of the specimen 1716, for example, to a temperature less than, equal to, and/or greater than the vitrification temperature (e.g., −150° C.).

To decrease the temperature of the specimen 1716, FIGS. 17A-17Z8 illustrate that a temperature gradient can be created by perfusing the coolant 1750 into and/or through the chamber 1742. Perfusing the coolant 1750 into and/or through the chamber 1742 can, for example, create a temperature gradient between the coolant 1750 and the specimen 1716 and/or the fluids 1718 inside the specimen 1716 (e.g., the first fluid 1718*a*, the second fluid 1718*b*, the third fluid 1718*c*, and/or the fourth fluid 1718*d*) such that thermal energy can transfer from a higher temperature region (e.g., from the specimen 1716 and/or the fluids 1718) to a lower temperature region (e.g., to the coolant 1750 and/or the environment the coolant 1750 is in). Perfusing the coolant 1750 through the chamber 1742 can, for example, create a temperature gradient between the coolant 1750 and the specimen 1716 and/or the fluids 1718 inside the specimen 1716, which can facilitate (e.g., cause) thermal energy to transfer from the higher-temperature region (e.g., from the specimen 1716 and/or the fluids 1718) to the lower-temperature region (e.g., to the coolant 1750 and/or the environment the coolant 1750 is in). The temperature gradient can be, for example, a specimen-to-coolant temperature gradient and/or a fluid-to-coolant temperature gradient. The heat transfer from the specimen 1716 and/or the fluids 1718 to the coolant 1750 can decrease the temperature of the specimen 1716, for example, to a temperature less than, equal to, and/or greater than the vitrification temperature (e.g., −150° C.).

FIGS. 17A-17Z8 illustrate, for example, that the method 1700M can include cooling the specimen 1716 to 4° C. and loading (e.g., perfusing) the specimen 1716 with the cryoprotectant 1720 (e.g., via the first fluid 1718*a*). For example, the method 1700M can include cooling the specimen 1716 to 4° C. and then loading (e.g., perfusing) the specimen 1716 with the cryoprotectant 1720. FIGS. 17D-17G illustrate, for example, that the specimen 1716 can be loaded (e.g., perfused) with the cryoprotectant 1720, for example, by perfusing the first fluid 1718*a* having the cryoprotectant 1720 through the vasculature 1724. The specimen 1716 can be cooled to 4° C., for example, by perfusing the first fluid 1718*a* through the vasculature 1724 at a temperature of 4° C. or less and/or by cooling the chamber 1742 to a temperature of 4° C. or less (e.g., via the coolant 1750).

The method 1700M can include perfusing the first fluid 1718*a* and/or the cryoprotectant 1720 through the vasculature 1724, for example, to distribute the first fluid 1718*a* and/or the cryoprotectant 1720 in the tissue of the specimen 1716, to cool the specimen 1716 (e.g., to 4° C.), or both. The first fluid 1718*a* and/or the cryoprotectant 1720 can become distributed in the tissue of the specimen 1716, for example, via diffusion through the vessel walls of the vasculature 1724 while the first fluid 1718*a* is in the vasculature 1724. Perfusing the first fluid 1718*a* through the vasculature 1724 can distribute the first fluid 1718*a* and/or the cryoprotectant 1720 in the tissue of the specimen 1716, for example, via diffusion of the first fluid 1718*a* and/or the cryoprotectant 1720 into the tissue of the specimen 1716 through the vessel walls of the vasculature 1724 (e.g., through the arterial vessels 1726, the capillaries 1728, and/or the venous vessels 1730). The method 1700M can include perfusing the first fluid 1718*a* through the vasculature 1724, for example, before perfusing the second fluid 1718*b* through the vasculature 1724, before perfusing the third fluid 1718*c* through the vasculature 1724, before perfusing the fourth fluid 1718*d* through the vasculature 1724, and before perfusing the nanoparticles 1722 through the vasculature 1724, or any combination thereof.

The method 1700M can include perfusing the second fluid 1718*b* through the vasculature 1724, for example, after perfusing the vasculature 1724 with the first fluid 1718*a*, after distributing the cryoprotectant 1720 in the vasculature 1724, and after distributing the cryoprotectant 1720 in the tissue of the specimen 1716 (e.g., via diffusion), or any combination thereof. For example, FIGS. 17H-17M illustrate that after the cryoprotectant 1720 is distributed (e.g., well distributed) in the specimen 1716 (e.g., in the specimen tissue and/or in the vasculature 1724), the first fluid 1718*a* in the vasculature 1724 can be replaced with the second fluid 1718*b* (e.g., HT-270, a highly viscous fluorous fluid) in the vasculature 1724 by perfusing the second fluid 1718*b* through the vasculature 1724 at a flow rate (e.g., a slow flow rate). The flow rate of the second fluid 1718*b* can be selected, for example, to inhibit and/or prevent streaming and/or fingering that can otherwise cause droplets of the first fluid 1718*a* (e.g., aqueous droplets of an aqueous cryoprotectant) to form inside of the second fluid 1718*b*. For example, the flow rate of the second fluid 1718*b* can inhibit and/or prevent streaming and/or fingering that can otherwise cause droplets of the first fluid 1718*a* (e.g., aqueous droplets of an aqueous cryoprotectant) to form inside of the second fluid 1718*b*.

The method 1700M can include perfusing the second fluid 1718*b* through the vasculature 1724, for example, to remove the first fluid 1718*a* and/or the cryoprotectant 1720 from the vasculature 1724 and/or to cool the specimen 1716. Perfusing the second fluid 1718*b* (e.g., before the third fluid 1718*c* and/or the fourth fluid 1718*d*) can remove the first fluid 1718*a* (e.g., an aqueous solution) and/or the cryoprotectant 1720 from the vasculature 1724 and/or can leave the first fluid 1718*a* and/or the cryoprotectant 1720 in the tissue of the specimen 1716. Perfusing the second fluid 1718*b* through the vasculature 1724 may not, for example, affect the first fluid 1718*a* and/or the cryoprotectant 1720 in the specimen tissue. The first fluid 1718*a* and/or the cryoprotectant 1720 in the specimen tissue can be, for example, the first fluid 1718*a* and/or the cryoprotectant 1720 that diffused into the specimen tissue while the first fluid 1718 and/or the cryoprotectant 1720 were perfused through the vasculature 1724. For example, FIGS. 17H-17M illustrate that the first fluid 1718*a* and/or the cryoprotectant 1720 may not diffuse into the vasculature 1724 and/or into the second fluid 1718*b* while the second fluid 1718*b* is in the vasculature 1724 and/or while the second fluid 1718*b* is being perfused through the vasculature 1724. FIGS. 17H-17M illustrate, for example, that the second fluid 1718*b* may not have the cryoprotectant 1720. As another example, the second fluid 1718*b* can have the cryoprotectant 1720.

The method 1700M can include perfusing the third fluid 1718*c* through the vasculature 1724, for example, after the perfusing the vasculature 1724 with the first fluid 1718*a* and/or the cryoprotectant 1720, after distributing the cryoprotectant 1720 in the tissue of the specimen 1716 (e.g., via diffusion), after perfusing the second fluid 1718*b* through the vasculature 1724, and after removing the first fluid 1718*a* from the vasculature 1724 (e.g., by perfusing the second fluid 1718*b* through the vasculature 1724), or any combination thereof. For example, FIGS. 17D-17S illustrate that after the first fluid 1718*a* is removed from the vasculature 1724 (e.g., via the second fluid 1718*b*), the third fluid 1718*c*—with and/or without the nanoparticles 1722—can be perfused through the vasculature 1724.

The method 1700M can include perfusing the third fluid 1718*c* through the vasculature 1724, for example, to remove the second fluid 1718*b* from the vasculature 1724 and/or to cool the specimen 1716. Perfusing the third fluid 1718*c* (e.g., before the fourth fluid 1718*d*) can remove the second fluid 1718*b* from the vasculature 1724 and/or can leave the first fluid 1718*a* and/or the cryoprotectant 1720 in the tissue of the specimen 1716. Perfusing the third fluid 1718*c* through the vasculature 1724 may not, for example, affect the first fluid 1718*a* and/or the cryoprotectant 1720 in the specimen tissue. The first fluid 1718*a* and/or the cryoprotectant 1720 in the specimen tissue can be, for example, the first fluid 1718*a* and/or the cryoprotectant 1720 that diffused into the specimen tissue while the first fluid 1718 and/or the cryoprotectant 1720 were perfused through the vasculature 1724. For example, FIGS. 17N-17S illustrate that the first fluid 1718*a* and/or the cryoprotectant 1720 may not diffuse into the vasculature 1724 and/or into the third fluid 1718*c* while the third fluid 1718*c* is in the vasculature 1724 and/or while the third fluid 1718*c* is being perfused through the vasculature 1724. FIGS. 17N-17S illustrate, for example, that the third fluid 1718c may not have the cryoprotectant 1720. As another example, the third fluid 1718c can have the cryoprotectant 1720.

FIGS. 17D-17S illustrate that perfusing the vasculature 1724 with the second fluid 1718b before introducing the third fluid 1718c (e.g., Novec 7000 and/or Novec 7200) can be important, for example, to inhibit and/or prevent the third fluid 1718c from following only the path of least resistance through the vasculature 1724. Perfusing the vasculature 1724 with the second fluid 1718b before introducing the third fluid 1718c (e.g., Novec 7000 and/or Novec 7200) into the vasculature 1724 can, for example, inhibit and/or prevent the third fluid 1718c from following only the path of least resistance through the vasculature 1724. Whereas the second fluid 1718b can displace the first fluid 1718a and push the first fluid out of the vasculature 1724, the third fluid 1718c may only follow the path of least resistance through the first fluid 1718a in the vasculature 1724.

FIGS. 17D-17S illustrate, for example, that by perfusing the vasculature 1724 with the second fluid 1718b before the third fluid 1718c, the first fluid 1718a (e.g., an aqueous solution) can be removed from the vasculature 1724 before the third fluid 1718c is introduced, which can facilitate distributing (e.g., perfusing) the third fluid 1718c more uniformly through the vasculature 1724 rather than only along the path or paths of least resistance. For example, because of the third fluid 1718c can have a low viscosity and can be immiscible with the first fluid 1718a, the third fluid 1718c may not mix with the first fluid 1718a and/or may not reach some of the smaller vessels and/or capillaries 1728. Thus, if the third fluid 1718c is introduced before the second fluid 1718b into the vasculature 1724, the third fluid 1718c may only clear out the easiest flow paths through the vasculature 1724. As a result, the second fluid 1718b can be perfused through the vasculature 1724 before the third fluid 1718c, for example, to clear (e.g., to flush) the first fluid 1718a from the vasculature 1724.

Since the temperature of the third fluid 1718c can be controlled to cool the specimen 1716, perfusing the second fluid 1718b before the third fluid 1718c through the vasculature 1724, for example, to remove the first fluid 1718a from the vasculature 1724, can help maximize the distribution of the third fluid 1718c in the vasculature 1724 and/or the flow of the third fluid 1718c through the vasculature 1724, which can help maximize the heat transfer between the specimen 1716 and the third fluid 1718c as the third fluid 1718c is perfused through the vasculature 1724, for example, to decrease the temperature of the specimen 1716.

As another example, the method 1700M may not include perfusing the second fluid 1718b through the vasculature 1724, for example, jumping from step 1702 (e.g., FIGS. 17D-17G) to step 1706 (e.g., FIGS. 17N-17S) or step 1708 (e.g., FIGS. 17T-17Y). Even through the third fluid 1718c may only follow the path or paths of least resistance in such a variation, this can be acceptable, for example, in situations in which maximizing the perfusion of the third fluid 1718c may not be needed and/or in situations in which the path or paths of least resistance are sufficient to cool the specimen 1716.

FIGS. 17N-17S illustrate that after the vasculature 1724 is filled with the second fluid 1718b (e.g., HT-270), the vasculature 1724 can be perfused with the third fluid 1718c (e.g., Novec 7000 and/or Novec 7200), which can mix with the second fluid 1718b (e.g., HT-270) in the vasculature 1724 and replace the second fluid 1718b in the vasculature 1724. Because the third fluid 1718c can be miscible in the second fluid 1718b, the third fluid 1718c can mix with the second fluid 1718b as it is perfused through the vasculature 1724, which can allow the third fluid 1718c to flow throughout the vasculature 1724, including through the capillaries 1718, rather than only clearing out the path(s) of least resistance through the vasculature 1724. The miscibility of the third fluid 1718c in the second fluid 1718b can, for example, allow the third fluid 1718c to completely replace the second fluid 1718b in the vasculature 1724, which can help maximize and/or maximize the flow of the third fluid 1718c through the vasculature 1724.

The method 1700M can include perfusing the nanoparticles 1722 through the vasculature 1724, for example, after the perfusing the vasculature 1724 with the first fluid 1718a and/or the cryoprotectant 1720, after distributing the cryoprotectant 1720 in the tissue of the specimen 1716 (e.g., via diffusion), after perfusing the second fluid 1718b through the vasculature 1724, after removing the first fluid 1718a from the vasculature 1724 (e.g., by perfusing the second fluid 1718b through the vasculature 1724), and after removing the second fluid from the vasculature 1724 (e.g., by perfusing the third fluid 1718c through the vasculature), or any combination thereof. For example, FIGS. 17T-17Y illustrate that after the second fluid 1718b is removed from the vasculature 1724, the nanoparticles 1722 can be perfused through the vasculature 1724 together with the third fluid 1718c and/or the fourth 1718d.

The method 1700M can include perfusing the nanoparticles 1722 through the vasculature 1724, for example, to distribute the nanoparticles 1722 throughout the vasculature 1724 for a later reheating step. Perfusing the nanoparticles 1722 through the vasculature 1724 can leave the first fluid 1718a and/or the cryoprotectant 1720 in the tissue of the specimen 1716. Perfusing the nanoparticles 1722 through the vasculature 1724 may not, for example, affect the first fluid 1718a and/or the cryoprotectant 1720 in the specimen tissue. The first fluid 1718a and/or the cryoprotectant 1720 in the specimen tissue can be, for example, the first fluid 1718a and/or the cryoprotectant 1720 that diffused into the specimen tissue while the first fluid 1718 and/or the cryoprotectant 1720 were perfused through the vasculature 1724. For example, FIGS. 17T-17Y illustrate that the first fluid 1718a and/or the cryoprotectant 1720 may not diffuse into the vasculature 1724 and/or into the third fluid 1718c while the third fluid 1718c and the nanoparticles 1722 are in the vasculature 1724 and/or while the third fluid 1718c and the nanoparticles 1722 are being perfused through the vasculature 1724.

FIGS. 17N-17Y illustrate that the specimen 1716 can be cooled with the third fluid 1718c with and/or without the nanoparticles 1722.

FIGS. 17N-17Y illustrate that during cooling of the specimen 1716 with the third fluid 1718c, the third fluid 1718c can be perfused through the vasculature at one or multiple third fluid temperatures. The one or multiple third fluid temperatures can be, for example, less than, equal to, and/or greater than the vitrification temperature. The one or multiple third fluid temperatures can be less than, equal to, and/or greater than the specimen temperature during the cooling process. When the third fluid temperature is less than the specimen temperature, heat can transfer from the specimen 1716 to the third fluid 1718c and/or the nanoparticles 1722 as the third fluid 1718c and/or the nanoparticles 1722 flow through the vasculature 1724. When the third fluid temperature is equal to the specimen temperature, the third fluid 1718c and/or the nanoparticles 1722 can maintain and/or help maintain the specimen 1716 at the third fluid temperature as the third fluid 1718c and/or the nanoparticles

1722 flow through the vasculature 1724. When the third fluid temperature is greater than the specimen temperature, the third fluid 1718*c* and/or the nanoparticles 1722 can inhibit and/or prevent the specimen temperature from rising above the third fluid temperature. The one or multiple cooling temperatures of the third fluid 1718*c* can be, for example, −122° C. to 34° C., or more broadly, −196° C. to 34° C., including every 1° C. increment within these ranges (e.g., −196, −122° C., −100° C., −10° C., −5° C., 0° C., 5° C., 10° C., 30° C., 34° C.). The one or multiple third fluid temperatures can be, for example, a single temperature within the ranges of temperatures that the third fluid temperature can be, or one or multiple temperatures (e.g., one or multiple progressively lower temperatures) within the ranges of temperatures that the third fluid temperature can be. The third fluid temperature can be a constant temperature and/or a variable temperature. For example, the third fluid temperature can be perfused at a constant third fluid temperature (e.g., −70° C., −122° C.) during the cooling phase (e.g., until the specimen 1716 reaches a vitrified state). As another example, the third fluid temperature can be reduced in discrete steps (e.g., in 1° C.-30° C. steps from 4° C. to −70° C. or −122° C.) and/or continuously (e.g., from 4° C. to −70° C. or −122° C.) during the cooling phase (e.g., until the specimen 1716 reaches a vitrified state).

FIGS. 17R-17S and 17X-17Y illustrate, for example, that once the second fluid 1718*b* is removed from the vasculature 1724 (e.g., via perfusing the third fluid 1718*c* with and/or without the nanoparticles 1722 through the vasculature 1724), the specimen 1716 can be cooled (e.g., rapidly cooled), for example, by flowing the third fluid 1718*c* with and/or without the nanoparticles 1722 into the chamber 1742 (e.g., into a bag) and through the vasculature 1724 at one or multiple cooling temperatures. As another example, FIGS. 17R-17S and 17X-17Y illustrate that the cooling phase (e.g., the vitrification phase) can begin and/or continue from a previous step (e.g., from step 1702) once the vasculature 1724 is filled with the third fluid 1718*c* and/or the nanoparticles 1722. FIGS. 17X-17Y illustrate, for example, that the specimen 1716 can be cooled (e.g., rapidly cooled), for example, by flowing the third fluid 1718*c* having the nanoparticles 1722 into the chamber 1742 (e.g., into a bag) having the specimen 1716 and through the vasculature 1724 at one or multiple cooling temperatures after the second fluid 1718*b* is removed from the vasculature 1724 (e.g., by perfusing the third fluid 1718*c* with and/or without the nanoparticles 1722 through the vasculature 1724).

FIGS. 17T-17Y illustrate that during the vitrification phase (e.g., the rapid cooling phase) of the method 1700M, the third fluid 1718*c* can have the nanoparticles 1722 such that the third fluid 1718*c* and the nanoparticles 1722 can be simultaneously perfused through the vasculature 1724 as the specimen 1716 is vitrified. The nanoparticles 1722 can have a surface coating (e.g., the surface coating 1746 shown in FIG. 19) that can make them miscible in the third fluid 1718*c*.

The temperature of the specimen 1716 (also referred to as the specimen temperature) can be decreased from the specimen first temperature to one or multiple subsequent specimen temperatures. For example, the specimen temperature can be decreased from the specimen first temperature to the specimen second temperature. As another example, the specimen temperature can be decreased from the specimen first temperature to the specimen second temperature, and/or can be decreased from the specimen second temperature to the specimen third temperature. The specimen second temperature can be less than, equal to, or greater than the vitrification temperature. The specimen third temperature can be less than, equal to, or greater than the vitrification temperature.

FIGS. 17T-17Z8 illustrate that the specimen 1716 can be vitrified by perfusing the third fluid 1718*c* through the vasculature 1724, by cooling the specimen 1716 with the coolant 1750 in and/or through the chamber 1742, and/or by perfusing the fourth fluid 1718*d* through the vasculature 1724. FIGS. 17T-17Z8 illustrate, for example, that the specimen 1716 can be vitrified by decreasing the temperature of the specimen 1716 to a temperature less than or equal to the vitrification temperature by perfusing the third fluid 1718*c* through the vasculature 1724, by cooling the specimen 1716 with the coolant 1750 in and/or through the chamber 1742, and/or by perfusing the fourth fluid 1718*d* through the vasculature 1724. To decrease the temperature of the specimen 1716 by perfusing the third fluid 1718*c* through the vasculature 1724, by cooling the specimen 1716 with the coolant 1750 in and/or through the chamber 1742, and/or by perfusing the fourth fluid 1718*d* through the vasculature 1724, the third fluid temperature, the coolant temperature, and/or the fourth fluid temperature can be less than the temperature of the specimen 1716, less than the specimen initial temperature, less than or equal to the vitrification temperature, or any combination thereof.

The method 1700M can include perfusing the third fluid 1718*c*—with and/or without the nanoparticles 1722—through the vasculature 1724 at a third fluid temperature less than, equal to, and/or greater than the vitrification temperature (150° C.), with and/or without perfusing the coolant 1750 into and/or through the chamber 1742.

For example, FIGS. 17N-17Y and 17Z6-17Z8 illustrate that when the third fluid 1718*c* is perfused through the vasculature 1724 at a temperature less than or equal to the vitrification temperature, perfusing the third fluid 1718*c* through the specimen 1716 can vitrify the specimen 1716 without cooling the specimen 1716 with the coolant 1750 in the chamber 1742, and/or without perfusing the fourth fluid 1718*d* through the vasculature 1724. For example, FIGS. 17N-17Y and 17Z6-17Z8 illustrate that the third fluid temperature can be and/or can be decreased to −196° C. to −150° C., including every 1° C. increment within this range (e.g., −196° C., −180° C., −150° C.) during perfusion of the third fluid 1718*c* through the vasculature 1724, which can cause the specimen 1716 to vitrify by decreasing the temperature of the specimen 1716 to a temperature less than or equal to the vitrification temperature. For example, FIGS. 17N-17Y and 17Z6-17Z8 illustrate that perfusing the third fluid 1718*c* through the vasculature 1724 can decrease the temperature of the specimen 1716 from the specimen first temperature to the specimen second temperature. The second specimen temperature can be, for example, a temperature less than or equal to the vitrification temperature (−196° C. to −150° C., including every 1° C. increment within this range (e.g., −196° C., −180° C., −150° C.). The second specimen temperature can be, for example, the same as the third fluid temperature being perfused through the vasculature 1724 (−196° C. to −150° C., including every 1° C. increment within this range (e.g., −196° C., −180° C., −150° C.).

As another example, FIGS. 17N-17Y and 17Z6-17Z8 illustrate that the method 1700M can include perfusing the third fluid 1718*c* through the vasculature 1724 at a third fluid temperature less than or equal to the vitrification temperature (150° C.) and perfusing the coolant 1750 through the chamber 1742 at a coolant temperature less than or equal to the vitrification temperature (150° C.). The coolant temperature can be and/or can be decreased to −196° C. to −150° C., including every 1° C. increment within this range (e.g., −196° C., −180° C., −150° C.) while perfusing the coolant 1750 into and/or through the chamber 1742 and/or while perfusing the third fluid 1718c through the vasculature 1724. The coolant 1750 can be perfused through the chamber 1742 before, during, and/or after the perfusion of the third fluid 1718c through the vasculature 1724. The coolant 1750 can also be perfused in a space around the chamber 1742 (e.g., in a controlled-rate freezer that surrounds the chamber). For example, FIGS. 17N-17Y and 17Z6-17Z8 illustrate that the coolant 1750 and the third fluid 1718c can be perfused through the system 1700S simultaneously, for example, to decrease the temperature of the specimen 1716 from the specimen first temperature to the specimen second temperature. Perfusing the coolant 1750 through the chamber 1742 or in a space around the chamber can increase the cooling rate of the specimen 1716.

As yet another example, FIGS. 17N-17Y and 17Z6-17Z8 illustrate that the method 1700M can include perfusing the third fluid 1718c through the vasculature 1724 at a third fluid temperature greater than the vitrification temperature (150° C.) and perfusing the coolant 1750 through the chamber 1742 at a coolant temperature less than or equal to the vitrification temperature (150° C.). The third fluid temperature can be and/or can be decreased to −149° C. to −100° C., or more narrowly, to −138° C. to −110° C., including every 1° C. increment within these ranges (e.g., −149° C., −138° C., −122° C., −120° C., −110° C., −100° C.), during perfusion of the third fluid 1718c through the vasculature 1724, which can decrease the temperature of the specimen 1716 to the specimen second temperature. The coolant temperature can be and/or can be decreased to −196° C. to −150° C., including every 1° C. increment within this range (e.g., −196° C., −180° C., −150° C.) while perfusing the coolant 1750 through the chamber 1742 and/or while perfusing the third fluid 1718c through the vasculature 1724, which can decrease the temperature of the specimen 1716 to the specimen second temperature and/or to the specimen third temperature. The specimen second temperature can be, for example, a temperature greater than the vitrification temperature, a temperature between the specimen first temperature and the specimen third temperature, or both. The specimen first temperature and the specimen second temperature can be, for example, greater than the vitrification temperature. The specimen third temperature can less than or equal to the vitrification temperature. Perfusing the third fluid 1718c through the vasculature 1724 and/or perfusing the coolant 1750 through the chamber 1742 can decrease the temperature of the specimen 1716 to the specimen second temperature, for example, from the specimen first temperature. Perfusing the coolant 1750 through the chamber 1742 can decrease the temperature of the specimen 1716 to the specimen third temperature, for example, from the specimen second temperature.

The third fluid 1718c can have a low pour point and a low freezing point (e.g., approximately −138° C. freezing) so that it can remain a liquid at the low temperature that can be required for vitrification.

FIGS. 17N-17Y and 17Z6-17Z8 illustrate that to lower (e.g., rapidly lower) the temperature of the specimen 1716 to a vitrification temperature (approximately −150° C.), the coolant 1750 can be flowed into the chamber 1742 and/or a fourth fluid 1718d can be chilled by a heat exchanger and flowed through the vasculature 1742 (e.g., as shown in FIGS. 17Z1-17Z5).

The method 1700M can include, for example, perfusing the third fluid 1718c through the vasculature 1724 to cool the specimen 1716 to −70° C., and then perfusing the vasculature 1724 with the fourth fluid 1718d. The fourth fluid 1718d can be, for example, perfluoropropane, which can be a gas until −36.7° C., and which can flow down to −183° C. Perfusing the fourth fluid 1718d through the vasculature 1724 can include, for example, flowing the fourth fluid 1718d from a pre-chilled reservoir of the fourth fluid 1718d (e.g., the fourth reservoir 1736d) mixed with the nanoparticles 1722.

The method 1700M can include perfusing the fourth fluid 1718d through the vasculature 1724, for example, after the perfusing the vasculature 1724 with the first fluid 1718a and/or the cryoprotectant 1720, after distributing the cryoprotectant 1720 in the tissue of the specimen 1716 (e.g., via diffusion), after perfusing the second fluid 1718b through the vasculature 1724, after removing the first fluid 1718a from the vasculature 1724 (e.g., by perfusing the second fluid 1718b through the vasculature 1724), after removing the second fluid 1718b from the vasculature 1724 (e.g., by perfusing the third fluid 1718c through the vasculature 1724), and after cooling the specimen 1716 with the third fluid 1718c, or any combination thereof. For example, FIGS. 17Z1-17Z2 illustrate that after perfusing the third fluid 1718c through the vasculature 1724 and/or after decreasing the temperature of the specimen 1716 to the specimen second temperature by perfusing the third fluid 1718c through the vasculature 1724 and/or by perfusing the coolant 1750 through the chamber 1742, the fourth fluid 1718d—with and/or without the nanoparticles 1722—can be perfused through the vasculature 1724.

The method 1700M can include perfusing the fourth fluid 1718d through the vasculature 1724, for example, to remove the third fluid 1718c from the vasculature 1724 and/or to cool the specimen 1716. Perfusing the fourth fluid 1718d can remove the third fluid 1718c from the vasculature 1724 and/or can leave the first fluid 1718a and/or the cryoprotectant 1720 in the tissue of the specimen 1716. Perfusing the fourth fluid 1718d through the vasculature 1724 may not, for example, affect the first fluid 1718a and/or the cryoprotectant 1720 in the specimen tissue. The first fluid 1718a and/or the cryoprotectant 1720 in the specimen tissue can be, for example, the first fluid 1718a and/or the cryoprotectant 1720 that diffused into the specimen tissue while the first fluid 1718 and/or the cryoprotectant 1720 were perfused through the vasculature 1724. For example, FIGS. 17Z1-17Z2 illustrate that the first fluid 1718a and/or the cryoprotectant 1720 may not diffuse into the vasculature 1724 and/or into the fourth fluid 1718d while the fourth fluid 1718d is in the vasculature 1724 and/or while the fourth fluid 1718d is being perfused through the vasculature 1724. FIGS. 17Z1-17Z2 illustrate, for example, that the fourth fluid 1718d may not have the cryoprotectant 1720. As another example, the fourth fluid 1718d can have the cryoprotectant 1720.

The method 1700M can include perfusing the fourth fluid 1718d—with and/or without the nanoparticles 1722—through the vasculature 1724 at a fourth fluid temperature less than, equal to, and/or greater than the vitrification temperature (150° C.), with and/or without perfusing the coolant 1750 into and/or through the chamber 1742.

For example, FIGS. 17N-17Z5 illustrate that the method 1700M can include perfusing the third fluid 1718c through the vasculature 1724 at a third fluid temperature greater than the vitrification temperature (150° C.) and perfusing the fourth fluid 1718d through vasculature 1724 at a fourth fluid temperature less than or equal to the vitrification temperature (150° C.), with and/or without cooling the specimen

1716 with the coolant 1750 in the chamber 1742. The third fluid 1718*c* and/or the fourth fluid 1718*d* can be perfused through the vasculature 1724 with and/or without perfusing the coolant 1750 through the chamber 1742. The third fluid temperature can be and/or can be decreased to −149° C. to −100° C., or more narrowly, to −138° C. to −110° C., including every 1° C. increment within these ranges (e.g., −149° C., −138° C., −122° C., −120° C., −110° C., −100° C.), during perfusion of the third fluid 1718*c* through the vasculature 1724, which can decrease the temperature of the specimen 1716 to the specimen second temperature. The fourth fluid temperature can be and/or can be decreased to −196° C. to −150° C., including every 1° C. increment within this range (e.g., −196° C., −180° C., −150° C.) while perfusing the fourth fluid 1718*d* through the vasculature 1724, which can decrease the temperature of the specimen 1716 to the specimen third temperature. The specimen second temperature can be, for example, a temperature greater than the vitrification temperature, a temperature between the specimen first temperature and the specimen third temperature, or both. The specimen first temperature and the specimen second temperature can be, for example, greater than the vitrification temperature. The specimen third temperature can less than or equal to the vitrification temperature. Perfusing the third fluid 1718*c* through the vasculature 1724 and/or perfusing the coolant 1750 through the chamber 1742 can decrease the temperature of the specimen 1716 to the specimen second temperature, for example, from the specimen first temperature. Perfusing the fourth fluid 1718*d* through the vasculature 1724 and/or perfusing the coolant 1750 through the chamber 1742 can decrease the temperature of the specimen 1716 to the specimen third temperature, for example, from the specimen second temperature.

FIGS. 17N-17Y and 17Z6-17Z8 illustrate that perfusing the third fluid 1718*c* and/or the nanoparticles 1722 through the specimen 1716 (e.g., through the vasculature 1724) can, for example, create a heat transfer gradient between the specimen 1716 and the third fluid 1718*c* and/or the nanoparticles 1722 in the vasculature 1724 such that thermal energy can transfer from a higher temperature region (e.g., from the specimen 1716) to a lower temperature region (e.g., to the third fluid 1718*c* and/or the nanoparticles 1722). Perfusing the third fluid 1718*c* and/or the nanoparticles 1722 through the specimen 1716 can, for example, create a heat transfer gradient between the specimen 1716 and the third fluid 1718*c* and/or the nanoparticles 1722 in the vasculature 1724, which can facilitate (e.g., cause) thermal energy to transfer from the higher-temperature region (e.g., from the specimen 1716) to the lower-temperature region (e.g., to the third fluid 1718*c* and/or the nanoparticles 1722). The heat transfer gradient can be, for example, a specimen-to-fluid heat transfer gradient and/or a specimen-to-nanoparticle heat transfer gradient. The heat transfer from the specimen 1716 to the third fluid 1718*c* and/or the nanoparticles 1722 can decrease the temperature of the specimen 1716, for example, to a temperature less than, equal to, and/or greater than the vitrification temperature (e.g., −150° C.).

FIGS. 17N-17Y and 17Z6-17Z8 illustrate that perfusing the third fluid 1718*c* and/or the nanoparticles 1722 through the specimen 1716 (e.g., through the vasculature 1724) can, for example, create a temperature gradient between the specimen 1716 and the third fluid 1718*c* and/or the nanoparticles 1722 in the vasculature 1724 such that heat can flow from the higher temperature region (e.g., from the specimen 1716) to the lower temperature region (e.g., to the third fluid 1718*c* and/or the nanoparticles 1722). Perfusing the third fluid 1718*c* and/or the nanoparticles 1722 through the specimen 1716 can, for example, create a temperature gradient between the specimen 1716 and the third fluid 1718*c* and/or the nanoparticles 1722 in the vasculature 1724, which can facilitate (e.g., cause) thermal energy to transfer from the higher-temperature region (e.g., from the specimen 1716) to the lower-temperature region (e.g., to the third fluid 1718*c* and/or the nanoparticles 1722). The temperature gradient can be, for example, a specimen-to-fluid temperature gradient and/or a specimen-to-nanoparticle temperature gradient. The heat transfer from the specimen 1716 to the third fluid 1718*c* and/or the nanoparticles 1722 can decrease the temperature of the specimen 1716, for example, to a temperature less than, equal to, and/or greater than the vitrification temperature (e.g., −150° C.).

FIGS. 17Z1-17Z5 illustrate that perfusing the fourth fluid 1718*d* and/or the nanoparticles 1722 through the specimen 1716 (e.g., through the vasculature 1724) can, for example, create a heat transfer gradient between the specimen 1716 and the fourth fluid 1718*d* and/or the nanoparticles 1722 in the vasculature 1724 such that thermal energy can transfer from a higher temperature region (e.g., from the specimen 1716) to a lower temperature region (e.g., to the fourth fluid 1718*d* and/or the nanoparticles 1722). Perfusing the fourth fluid 1718*d* and/or the nanoparticles 1722 through the specimen 1716 can, for example, create a heat transfer gradient between the specimen 1716 and the fourth fluid 1718*d* and/or the nanoparticles 1722 in the vasculature 1724, which can facilitate (e.g., cause) thermal energy to transfer from the higher-temperature region (e.g., from the specimen 1716) to the lower-temperature region (e.g., to the fourth fluid 1718*d* and/or the nanoparticles 1722). The heat transfer gradient can be, for example, a specimen-to-fluid heat transfer gradient and/or a specimen-to-nanoparticle heat transfer gradient. The heat transfer from the specimen 1716 to the fourth fluid 1718*d* and/or the nanoparticles 1722 can decrease the temperature of the specimen 1716, for example, to a temperature less than, equal to, and/or greater than the vitrification temperature (e.g., −150° C.).

FIGS. 17Z1-17Z5 illustrate that perfusing the fourth fluid 1718*d* and/or the nanoparticles 1722 through the specimen 1716 (e.g., through the vasculature 1724) can, for example, create a temperature gradient between the specimen 1716 and the fourth fluid 1718*d* and/or the nanoparticles 1722 in the vasculature 1724 such that heat can flow from the higher temperature region (e.g., from the specimen 1716) to the lower temperature region (e.g., to the fourth fluid 1718*d* and/or the nanoparticles 1722). Perfusing the fourth fluid 1718*d* and/or the nanoparticles 1722 through the specimen 1716 can, for example, create a temperature gradient between the specimen 1716 and the fourth fluid 1718*d* and/or the nanoparticles 1722 in the vasculature 1724, which can facilitate (e.g., cause) thermal energy to transfer from the higher-temperature region (e.g., from the specimen 1716) to the lower-temperature region (e.g., to the fourth fluid 1718*d* and/or the nanoparticles 1722). The temperature gradient can be, for example, a specimen-to-fluid temperature gradient and/or a specimen-to-nanoparticle temperature gradient. The heat transfer from the specimen 1716 to the fourth fluid 1718*d* and/or the nanoparticles 1722 can decrease the temperature of the specimen 1716, for example, to a temperature less than, equal to, and/or greater than the vitrification temperature (e.g., −150° C.).

The system 1700S can have a reheating configuration. The reheating configuration of the system 1700S can be, for example, a fifth configuration of the system 1700S (e.g., if steps 1712 and 1714 of the method 1700M are not used) or a sixth configuration of the system 1700S (e.g., if steps 1712 and 1714 of the method 1700M are used). The fifth configuration of the system 1700S can also be referred to as the system fifth configuration, and the sixth configuration of the system 1700S can also be referred to as the system sixth configuration. When the system 1700S is in the reheating configuration, an alternating magnetic field can be applied to the nanoparticles 1722 to heat the specimen 1716 from a heating phase specimen first temperature to a heating phase specimen second temperature. The heating phase specimen first temperature can be, for example, the temperature of the cryopreserved specimen 1716c. The heating phase specimen second temperature can be, for example, the final temperature of the specimen 1716 at the end of the reheating step. The heating phase specimen first temperature can be, for example, −196° C. to −150° C., including every 1° C. increment within this range (e.g., −196° C., −180° C., −150° C.). The heating phase specimen second temperature can be, for example, −4° C. to 38° C., or more narrowly, 1° C. to 38° C., including every 1° C. increment within these ranges (e.g., −4° C., 0° C., 1° C., 10° C., 38° C.). Applying the alternating magnetic field to the nanoparticles 1722 can, for example, increase the temperature of the specimen 1716 from the heating phase specimen first temperature to the heating phase specimen second temperature.

FIGS. 18A-18F illustrate that the first fluid 1718a and the second fluid 1718b can be miscible with each other. The arrangement in FIGS. 18A-18F is identical to the arrangement in FIGS. 17H-17M, except that FIGS. 18A-18F illustrate that the first fluid 1718a and the second fluid 1718b can be miscible with each other, whereas FIGS. 17H-17M illustrate that can be immiscible with each other. For example, while FIGS. 17H-17M illustrate a variation of step 1704 of the method 1700M in which the first fluid 1718a and the second fluid 1718b may not be miscible with each other, FIGS. 18A-18F illustrate a variation of step 1704 of the method 1700M in which the first fluid 1718a and the second fluid 1718b can be miscible with each other.

FIGS. 18A-18F illustrate, for example, that the second fluid 1718b can mix with and replace the first fluid 1718a in the vasculature 1724 as the second fluid 1718b is perfused into the vasculature 1724. For example, as the second fluid 1718b is pumped into the vasculature 1724, the second fluid 1718b can mix with the first fluid 1718a, whereby the first fluid 1718a can be forced out of the vasculature 1724 as the second fluid 1718b displaces (e.g., pushes) the first fluid 1718a along the blood vessels of the vasculature 1724 and out of the vasculature 1724 and/or as the mixture of the first fluid 1718a and the second fluid 1718b flows along the blood vessels of the vasculature 1724 and is forced out of the out of the vasculature 1724. The first fluid 1718a and/or the mixture of the first fluid 1718a and the second fluid 1718b can flow out of the specimen 1716, for example, through an opening (e.g., a cannulized opening) of a venous vessel 1730 (e.g., the venous opening 17300) as the second fluid 1718b is perfused into the vasculature 1724.

Figure 18A:
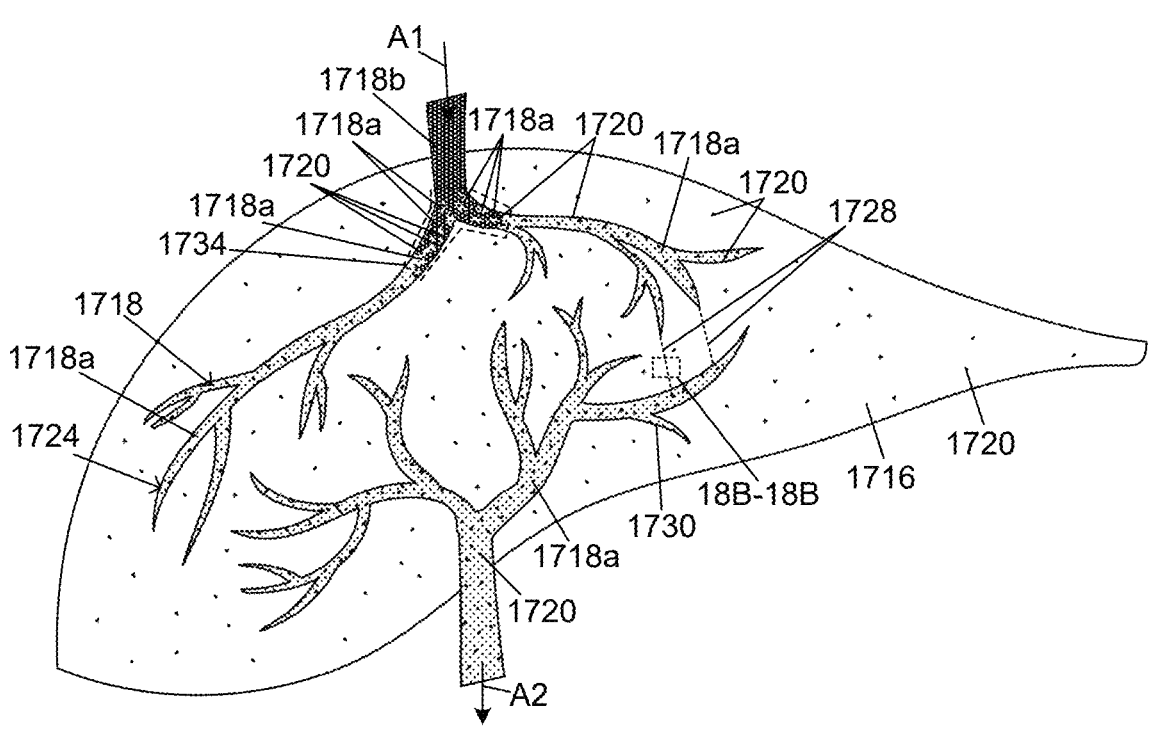
FIG. 18A illustrates a variation of perfusing a second fluid in the vasculature of the organ of FIG. 17B.

For example, FIG. 18A illustrates that as the second fluid 1718b is perfused into the vasculature 1724, the second fluid 1718b can displace (e.g., push) the first fluid 1718a along the blood vessels of the vasculature 1724 and/or mix with the first fluid 1718a in the vasculature 1724. FIG. 18A illustrates that when the first fluid 1718a and the second fluid 1718b are miscible with each other, the first fluid 1718a and the second fluid 1718b can be mixed with each other in a mixing zone 1734. FIG. 18A illustrates that the mixing zone 1734 can be the region inside the vasculature 1724 in which the first fluid and the second fluid 1718b are mixed and/or form a mixture.

The first fluid 1718a and the second fluid 1718b can form a non-homogeneous mixture or a homogeneous mixture with each other, for example, in the mixing zone 1734. For example, FIG. 18A illustrates that the first fluid 1718a and the second fluid 1718b can form a homogeneous mixture in the mixing zone 1734. The size and shape of the mixing zone 1734 can vary, for example, based on the size and shape of the vasculature, the perfusion rate of the second fluid 1718b, the viscosity of the first fluid 1718a, the viscosity of the second fluid 1718b, the temperature of the first fluid 1718a, the temperature of the second fluid 1718b, and the temperature of the specimen 1716, or any combination thereof. FIG. 18A illustrates that the first fluid 1718a and the second fluid 1718b may be separate from each other proximal to the mixing zone 1734, and that the first fluid 1718a and the second fluid 1718b may be separate from each other distal the mixing zone 1734. Proximal the mixing zone 1734 can be, for example, toward an arterial opening in the vasculature 1724 (e.g., the arterial opening 17260), and distal the mixing zone 1734 can be, for example, toward the venous opening of the vasculature 1724 (e.g., the venous opening 17300). For example, FIG. 18A illustrates that there may not be the second fluid 1718b distal the mixing zone 1734, and that there may not be the first fluid 1718a proximal the mixing zone 1734. The size of the mixing zone 1734 can increase, remain constant, and/or decrease as the second fluid 1718b is perfused through the vasculature 1724, for example, while the second fluid 1718b is perfusing through the vasculature 1724. The size of the mixing zone 1734 can increase as the second fluid 1718b is perfused through the vasculature 1724, for example, as the second fluid 1718b initially flows into the vasculature 1724 and the first fluid 1718a and the second fluid 1718b begin to mix. The size of the mixing zone 1734 can decrease as the second fluid 1718b is perfused through the vasculature 1724, for example, as the second fluid 1718b and the mixture of the first fluid 1718a and the second fluid 1718b are forced out of the vasculature 1724, for example, through an opening (e.g., a cannulized opening) of a venous vessel 1730. The mixing zone 1734 can move along the vasculature 1724, for example, as the second fluid 1718b and the mixture of the first fluid 1718a and the second fluid 1718b flow in the vasculature 1724 and are mixed with and/or displace the first fluid 1718a in the vasculature 1724.

Figure 18B:
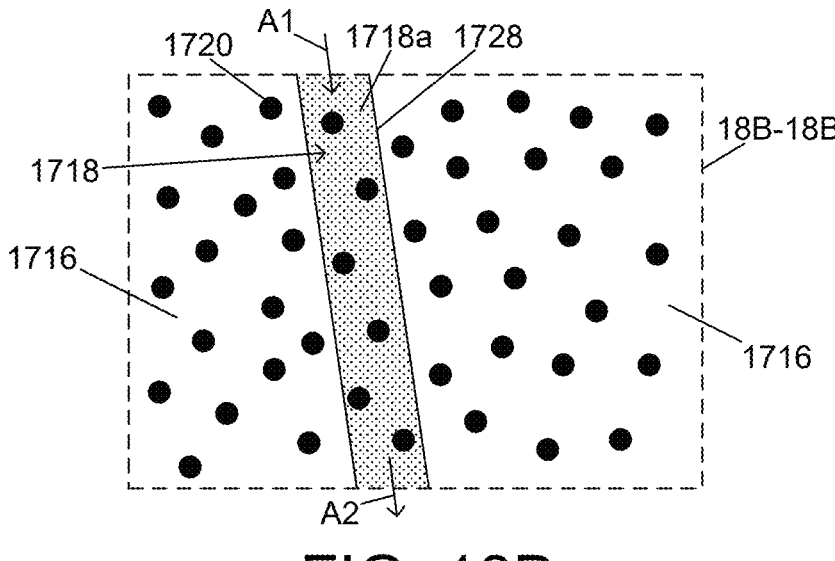
FIG. 18B illustrates a close-up view of the section 18B-18B of FIG. 18A.
Figure 18C:
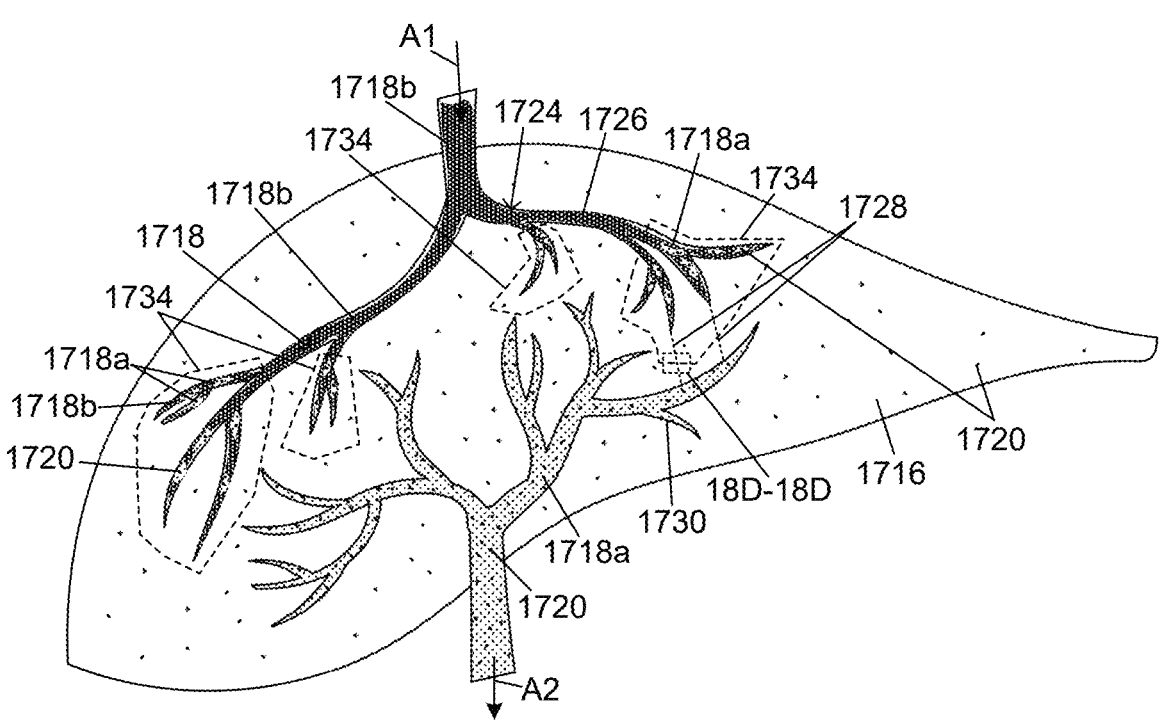
FIG. 18C illustrates a variation of perfusing a second fluid in the vasculature of the organ of FIG. 17B.
Figure 18D:
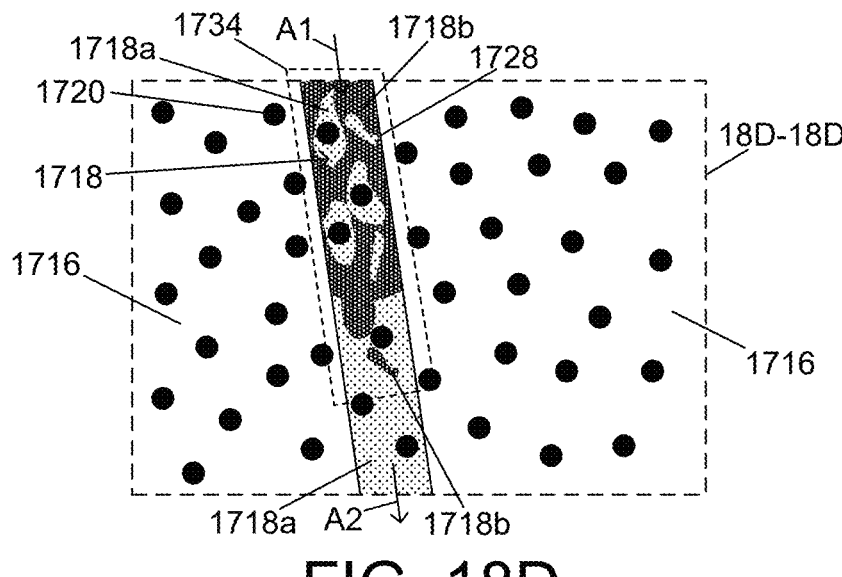
FIG. 18D illustrates a close-up view of the section 18D-18D of FIG. 18C.

FIGS. 18C-18D illustrate that that the first fluid 1718a and the second fluid 1718b can be mixed with each other in multiple mixing zones 1734. For example, FIGS. 18C-18D illustrate that the mixing zones 1734 can be in branches of the arterial vessels 1726 and in the capillaries 1728.

The first fluid 1718a and the second fluid 1718b can mix with each other (e.g., form a homogeneous mixture) in the arterial vessels 1726, the capillaries 1728, and/or the venous vessels 1730. FIGS. 18A-18B illustrate that the first fluid 1718a and the second fluid 1718b can mix with each other (e.g., form a homogeneous mixture) in the arterial vessels 1726. FIGS. 18C-18D illustrate that the first fluid 1718a and the second fluid 1718b can mix with each other (e.g., form a homogeneous mixture) in the arterial vessels 1726 and the capillaries 1728.

Figure 18E:
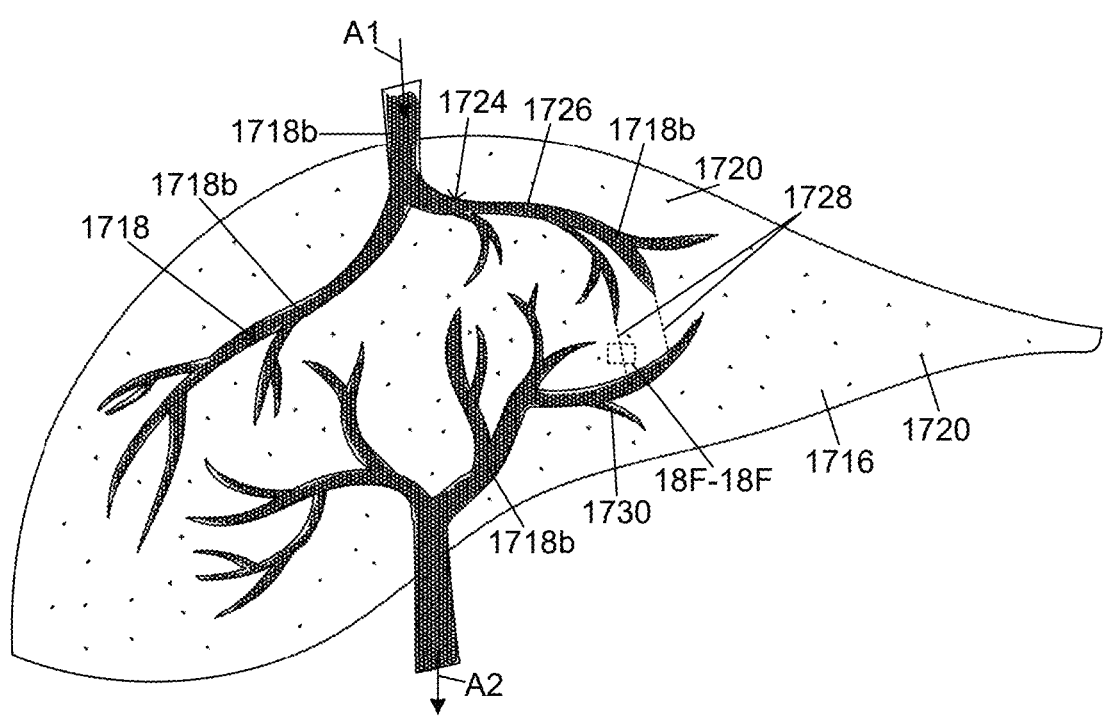
FIG. 18E illustrates a variation of perfusing a second fluid in the vasculature of the organ of FIG. 17B.
Figure 18F:
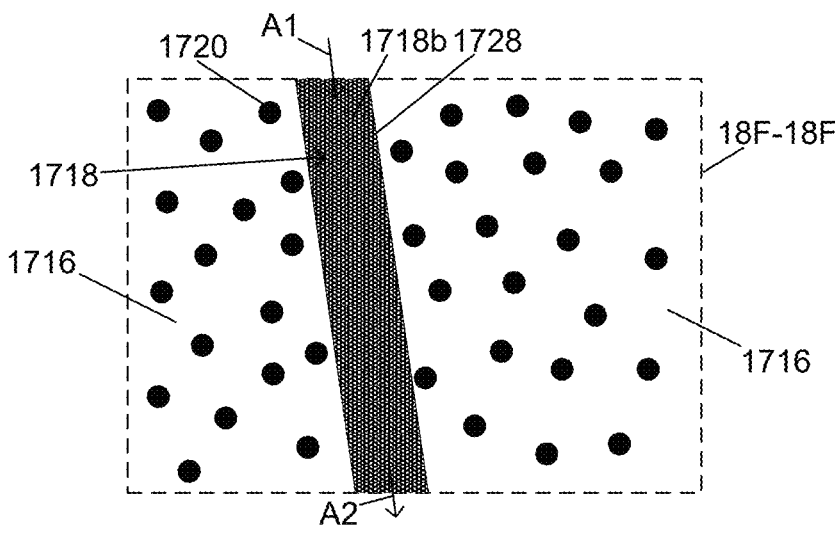
FIG. 18F illustrates a close-up view of the section 18F-18F of FIG. 18E.
Figure 18G:
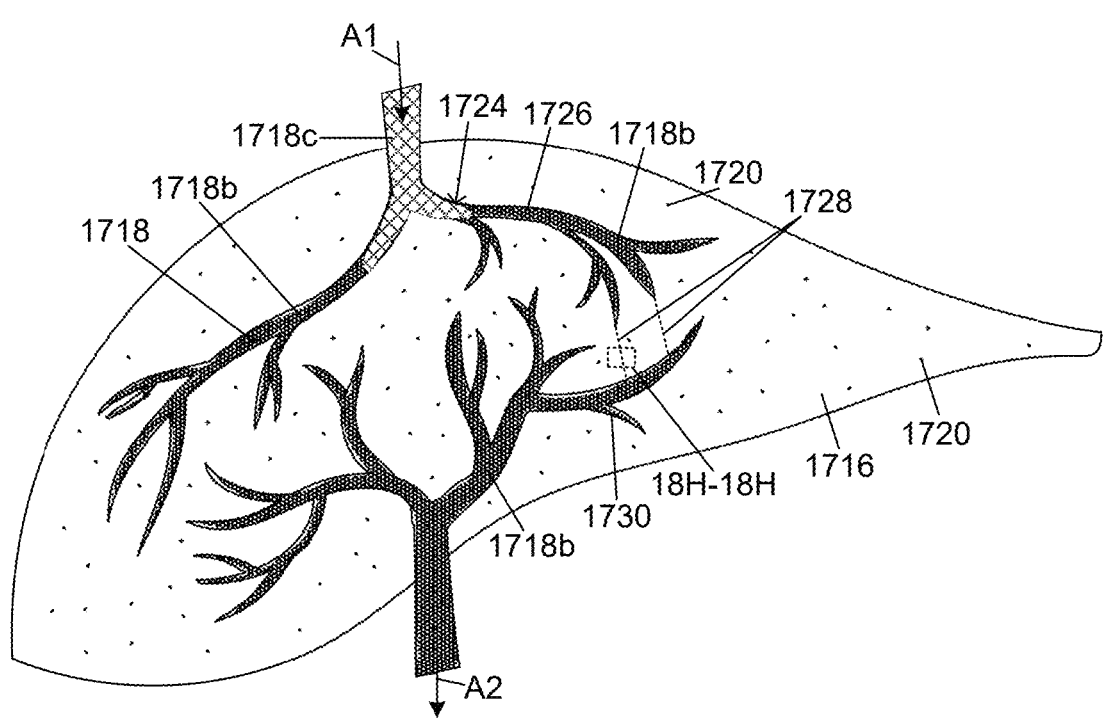
FIG. 18G illustrates a variation of perfusing a third fluid in the vasculature of the organ of FIG. 17B.
Figure 18H:
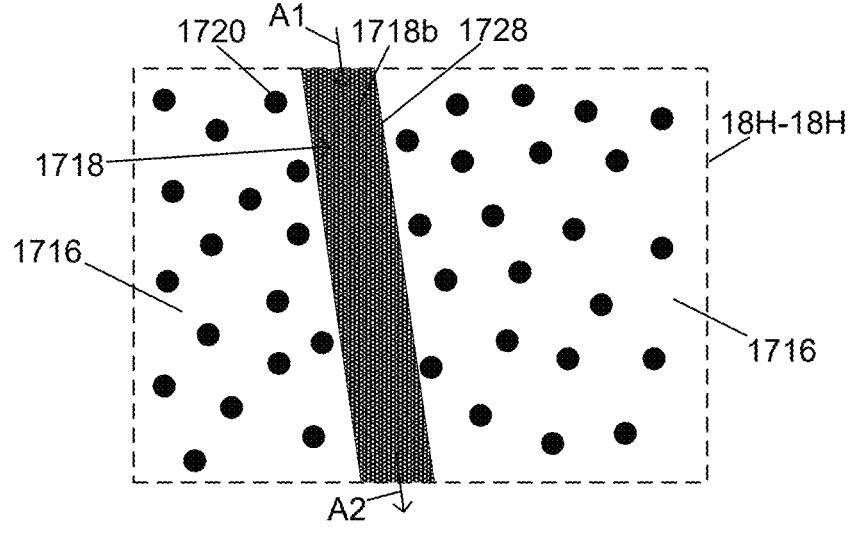
FIG. 18H illustrates a close-up view of the section 18H-18H of FIG. 18G.
Figure 18I:
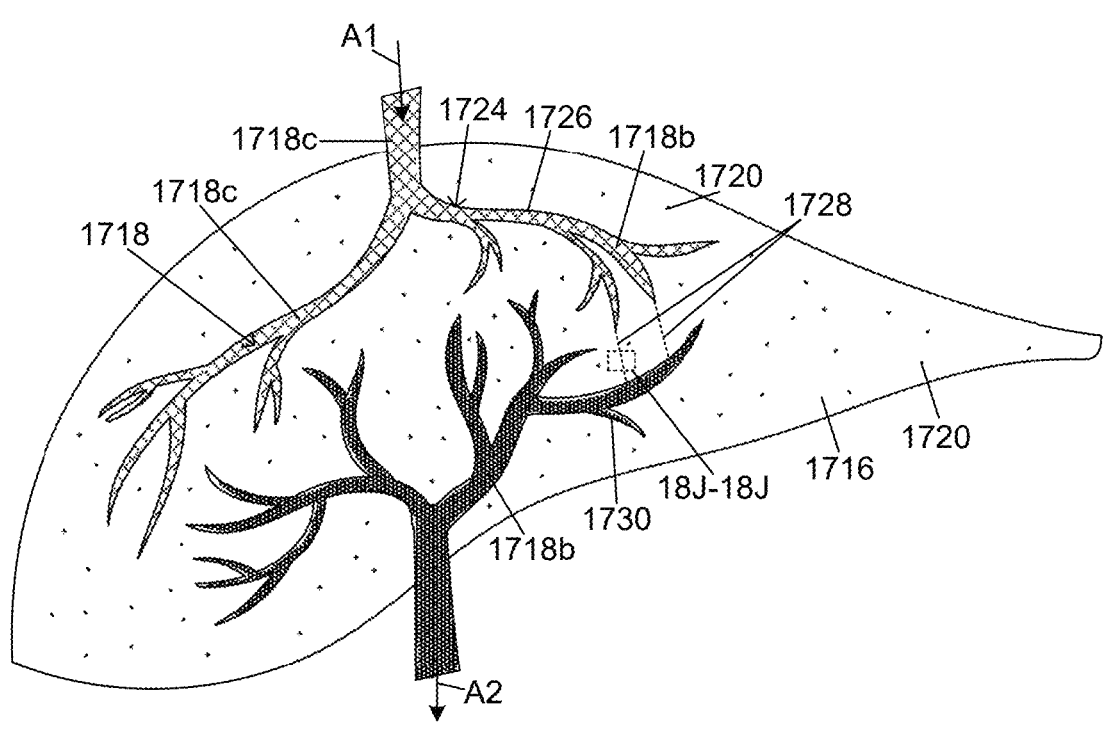
FIG. 18I illustrates a variation of perfusing a third fluid in the vasculature of the organ of FIG. 17B.
Figure 18J:
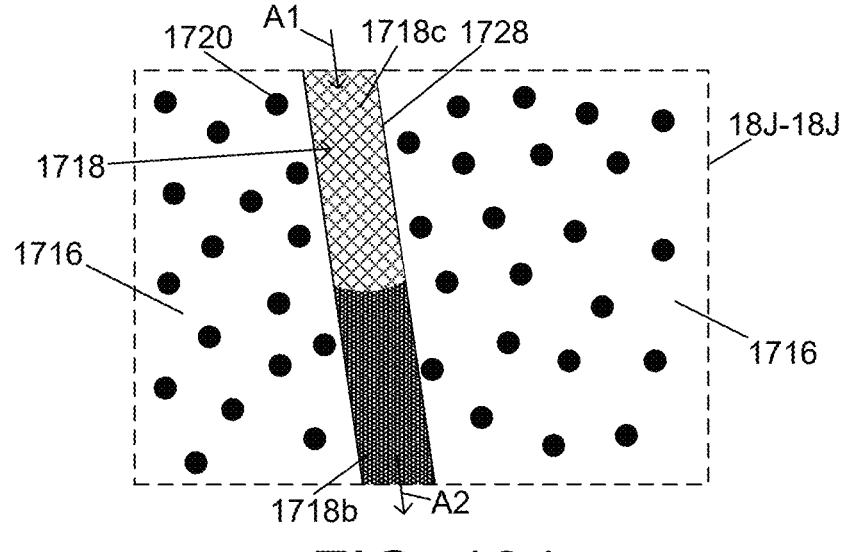
FIG. 18J illustrates a close-up view of the section 18J-18J of FIG. 18I.

FIGS. 18E-18F illustrate that the second fluid 1718b can displace and replace the first fluid 1718a in the vasculature 1724 when the first fluid 1718a and the second fluid 1718b are miscible with each other. FIGS. 18E-18F illustrate, for example, a configuration in which the second fluid 1718b has completely replaced the first fluid 1718a in the vasculature 1724.

FIGS. 18G-18L illustrate that the second fluid 1718*b* and the third fluid 1718*c* can be immiscible with each other. The arrangement in FIGS. 18G-18L is identical to the arrangement in FIGS. 17N-17S, except that FIGS. 18G-18L illustrate that the second fluid 1718*b* and the third fluid 1718*c* can be immiscible with each other, whereas FIGS. 17N-17S illustrate that they can be miscible with each other. For example, while FIGS. 17N-17S illustrate a variation of step 1706 of the method 1700M in which the second fluid 1718*b* and the third fluid 1718*c* can be miscible with each other, FIGS. 18G-18L illustrate a variation of step 1704 of the method 1700M in which the second fluid 1718*b* and the third fluid 1718*c* may not be miscible with each other.

FIGS. 18G-18L illustrate, for example, that the third fluid 1718*c* can displace and replace the second fluid 1718*b* in the vasculature 1724 as the third fluid 1718*c* is perfused into the vasculature 1724. For example, as the third fluid 1718*c* is pumped into the vasculature 1724, the third fluid 1718*c* can displace (e.g., push) the second fluid 1718*b* along the blood vessels of the vasculature 1724 and out of the vasculature 1724, for example, through an opening (e.g., a cannulized opening) of a venous vessel 1730.

Figure 18K:
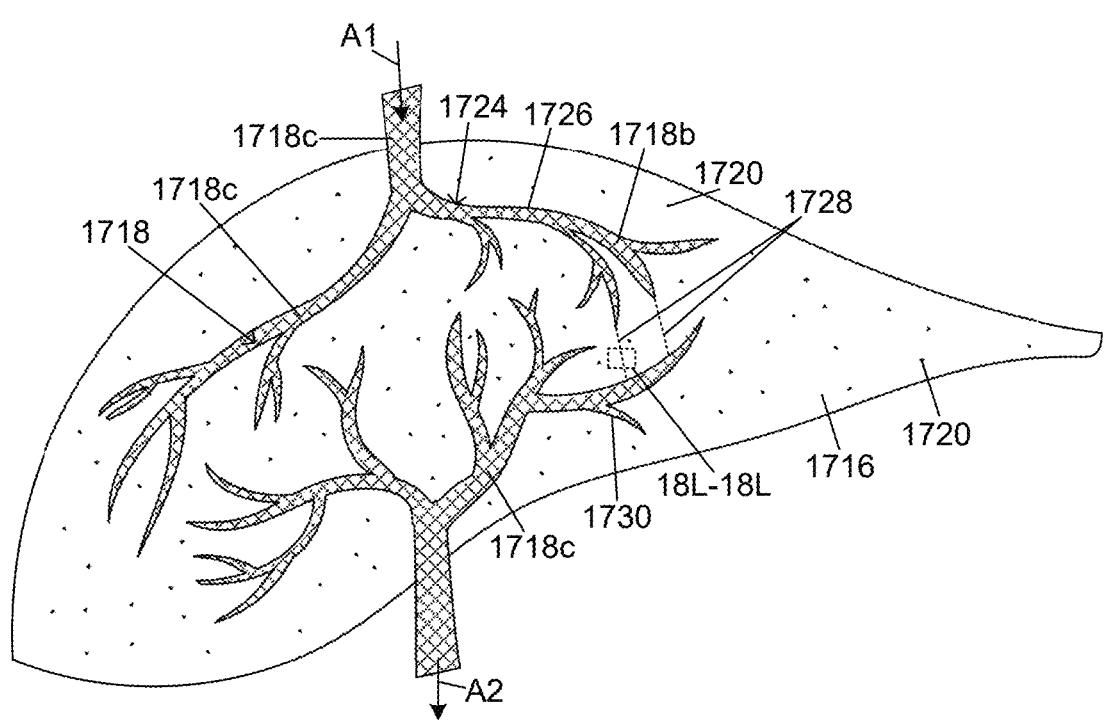
FIG. 18K illustrates a variation of perfusing a third fluid in the vasculature of the organ of FIG. 17B.
Figure 18L:
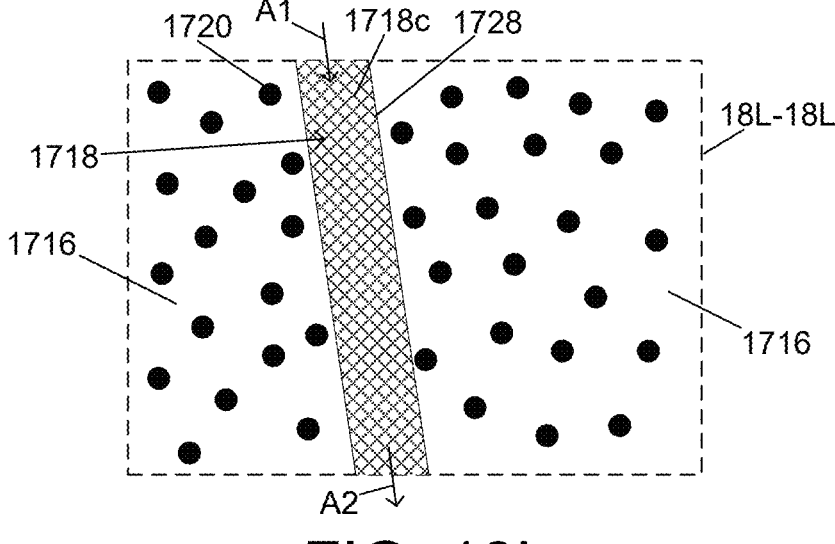
FIG. 18L illustrates a close-up view of the section 18L-18L of FIG. 18K.

FIGS. 18K-18L illustrate that the third fluid 1718*c* can displace and replace the second fluid 1718*b* in the vasculature 1724 when the second fluid 1718*b* and the third fluid 1718*c* are immiscible with each other. FIGS. 18K-18L illustrate, for example, a configuration in which the third fluid 1718*c* has completely replaced the second fluid 1718*b* in the vasculature 1724.

Figure 19:
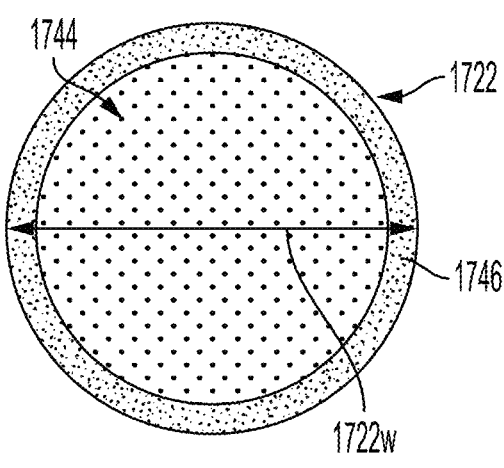
FIG. 19 illustrates a cross-section through the geometric center of a variation of a nanoparticle.
Figure 20A:
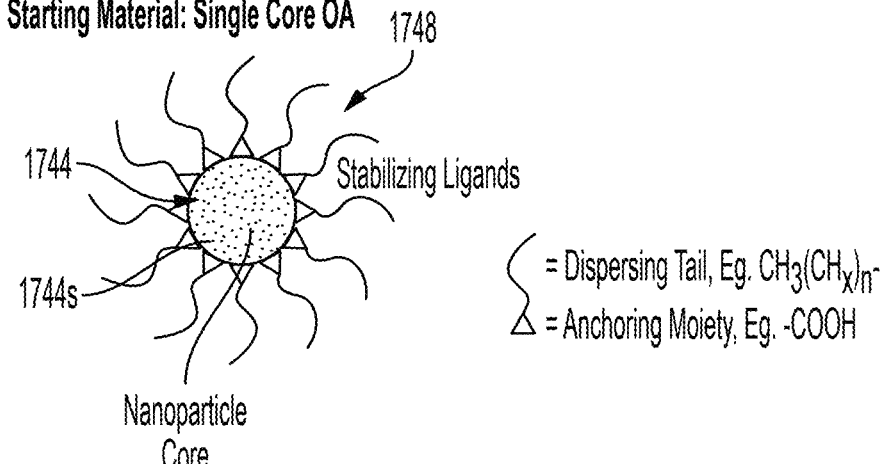
FIG. 20A illustrates a variation of a starting material of a nanoparticle.
Figure 20B:
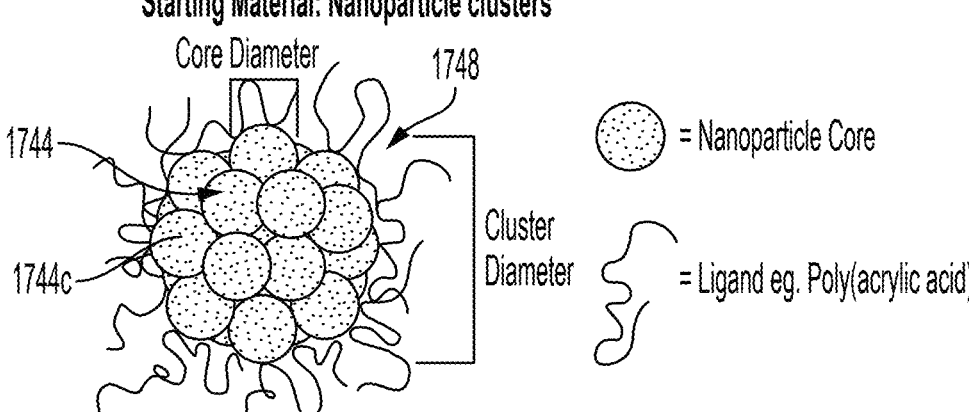
FIG. 20B illustrates a variation of a starting material.

The nanoparticles 1722 can have one or multiple layers, one or multiple cores, and/or a surface coating. For example, FIG. 19 illustrates that the nanoparticles 1722 can have a core 1744 and/or a surface coating 1746. The core 1744 of the nanoparticles can be for example, a single core 1744*s* (e.g., one core as shown in FIG. 20A), a cluster of cores 1744*c* (e.g., two or more cores as shown in FIG. 20B), or both (e.g., the core 1744 of some of the nanoparticles 1722 can be a single core 1744*s*, and the core 1744 of some of the nanoparticles 1722 can be a cluster of cores 1744*c*). The core 1744 can have the surface coating 1746. For example, FIG. 19 illustrates that the core 1744 can be coated with the surface coating 1746. As another example, the nanoparticles 1722 may not have a surface coating. The surface coating 1746 can comprise, for example, a fluorous surface coating (e.g., fluorous acid), PVP, oleic acid, silica, and/or PEG. The surface coating 1746 can be, for example, a fluorous acid surface coating. The nanoparticles 1722 can have, for example, a fluorous acid surface coating. The surface coating 1746 can, for example, provide colloidal stability of the particles in the fluids 1718, for example, in the third fluid 1718*c* and/or in the fourth fluid 1718*d*. For example, the nanoparticles 1722 can have a fluorophilic coating for colloidal stability in the fluids 1718, for example, in the third fluid 1718*c* and/or in the fourth fluid 1718*d*. For example, the nanoparticles 1722 can have a fluorophilic coating for colloidal stability in inert fluids.

The nanoparticles 1722 can comprise magnetic material (e.g., ferromagnetic material, ferrimagnetic material, paramagnetic material) and/or non-magnetic material. For example, the core 1744 can have a magnetic material and the surface coating 1746 can have a non-magnetic material. FIG. 19 illustrate, for example, that the core 1744 can comprise and/or be a magnetic material (e.g., iron oxide) and that the surface coating 1746 can comprise and/or be a non-magnetic material (e.g., fluorous acid). The nanoparticles 1722 can be and/or can comprise iron oxide nanoparticles. The nanoparticles 1722 can be and/or can comprise core-shell magnetic nanoparticles. As another example, the surface coating 1746 can comprise magnetic material.

The nanoparticles 1722 can have any shape. The nanoparticles 1722 can have a regular and/or an irregular shape. For example, FIG. 19 illustrates that the nanoparticles 1722 can be spheres having a circular cross section through their center.

The core 1744 of the nanoparticles 1722 can have any shape. For example, FIG. 19 illustrates that the core 1744 of the nanoparticles 1722 can be a sphere having a circular cross section.

The surface coating 1746 of the nanoparticles 1722 can have any shape. For example, FIG. 19 illustrates that the surface coating 1746 can define a spherical external surface that can have a circular cross section. The external surface of the surface coating 1746 can be smooth and/or rough.

The nanoparticles 1722 can be created, for example, from scratch and/or from a starting material 1748 (also referred to as the starting nanoparticles 1748). The starting nanoparticles 1748 can be magnetic nanoparticles and/or non-magnetic nanoparticles. The nanoparticles 1722 can be created from magnetic nanoparticles and/or from non-magnetic nanoparticles. The starting nanoparticles 1748 can be modified, for example, to create the nanoparticles 1722. For example, the surface and/or surface coating of the starting nanoparticles 1748 (e.g., magnetic nanoparticles and/or non-magnetic nanoparticles) can be modified to create the nanoparticles 1722. The surface and/or surface coating of starting nanoparticles 1748 can be modified, for example, so that the resulting nanoparticles (e.g., the nanoparticles 1722) can be dispersed in fluorous fluids. The surface and/or surface coating of the starting nanoparticles 1748 can be modified, for example, so that the resulting nanoparticles (e.g., the nanoparticles 1722) can be dispersed in the fluids 1718 (e.g., in the third fluid 1718*c* and/or in the fourth fluid 1718*d*).

The nanoparticles 1722 can be created, for example, by adding the surface coating 1746 to starting nanoparticles 1748 that do not have a surface coating, by adding the surface coating 1746 to the surface coating of starting nanoparticles 1748, by modifying the surface coating of starting nanoparticles 1748, and/or by replacing the surface coating of starting nanoparticles 1748.

FIGS. 20A-20B illustrate two variations of starting material 1748 that the nanoparticles 1722 can be created from. FIG. 20A illustrates that the starting material 1748 can be nanoparticles that have a single core 1744S, and FIG. 20B illustrates that the starting material 1748 can be nanoparticles that have a cluster of cores 1744*c*. The single core nanoparticles can have a core diameter of about 5 nm to about 35 nm. The nanoparticles with a clustered core 1744*c* can have a cluster diameter of about 20 nm to about 80 nm.

FIGS. 20A-20B illustrate that the starting material 1748 can have the materials shown, for example, in the arrangements shown. In FIG. 20A, single core OA can mean, for example, a nanoparticle having a single core 1744*s*. The nanoparticles can have an oleic acid surface coating. FIG. 20A illustrates that the starting material 1748 can be, for example, fatty acid or alkylamine coated/capped particles dried or dispersed in an organic solvent (e.g., Chloroform, Hexanes, Toluene). FIG. 20B illustrates that the starting material 1748 can be, for example, carboxylic acid/carboxylate functional nanoparticles dried or dispersed in polar solvents (e.g., water, ethanol, DMF).

Figure 20F:
FIG. 20F illustrates a variation of direct modification of a capping agent/ligand.
Figure 20F:
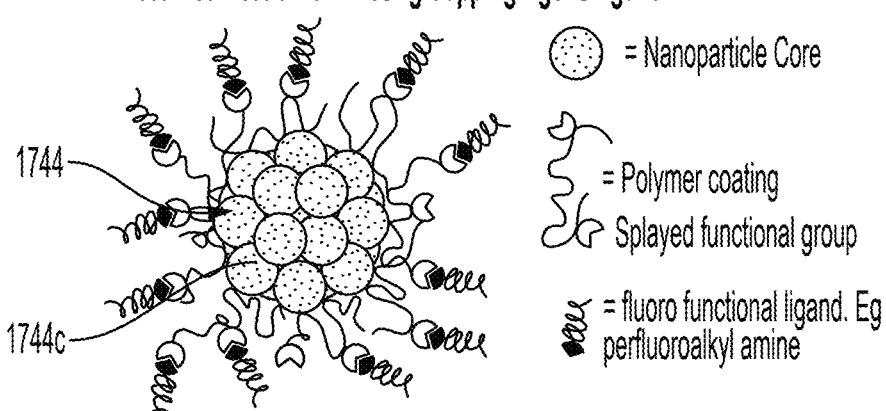

The nanoparticles 1722 can be created (e.g., can be coated with the surface coating 1746), for example, via ligand exchange (e.g., as shown in FIG. 20C), via silica coating (e.g., as shown in FIG. 20D), via intercalation (e.g., as shown in FIG. 20E), via direct modification of an existing capping agent/ligand (e.g., as shown in FIG. 20F), via direct synthesis, or any combination thereof (e.g., some or all of the nanoparticles 1722 can be made via ligand exchange, silica coating, intercalation, direct modification, and/or direct synthesis).

FIG. 20C illustrates that the nanoparticles 1722 can be created (e.g., can be coated with the surface coating 1746) via a ligand exchange process. In this method, the ligand initially bound to the starting nanoparticles 1748 can be physically exchanged with a separate and distinct ligand added after initial particle synthesis. The exchanges can involve applying some form of external energy (e.g., sonication, heat, light) to force desorption of the initially bound ligand. The introduced ligand can have properties different from the original stabilizing ligand and can modify the dispersibility, reactivity, and/or chemistry of the starting material. The ligand can be designed with a reactive head group with high affinity for the surface of the material in question. The increased affinity and along with introduction in high concentrations can drive the adsorption of the new ligand over the readsorption of the old ligand. For the case of ferrites and metal comprising ferrites, these can take the form and/or can be, for example, of carboxylic acids, carboxylates, phosphonic acids, phosphonates, and/or catechols. For dispersion in fluorous fluids, perfluoroalkyl and/or perfluoropolyether tails can be used. The tail length and composition coupled with the grafting density to the nanoparticle core can define the stability in a given medium. An example is the exchange of the surface bound oleic acid molecules present after a thermal decomposition synthesis with a perfluoropoly ether with a terminal carboxylate/phosphonate/catechol. Ligands can be multifunctional (polymers) with multiple anchor points which may increase stability and reactivity.

FIG. 20D illustrates that the nanoparticles 1722 can be created (e.g., can be coated with the surface coating 1746) via a silica coating process. In this method, the core 1744 of the starting nanoparticles 1748 can be secondarily coated by silica, for example, through the condensation of organic silanols. The thickness, porosity, and functionality of the deposited silica layer can depend on the reaction conditions including the amount of water, catalyst, silane solubility, and functionality. The resulting silica shell can be functionalized by virtue of dosing the desired functional silane sequentially in with silica gel precursors such as tetraethyl orthosilicate (TEOS) and/or Tetramethylorthosilicate (TMOS). An example to get fluorous functional nanoparticles (e.g., to get the nanoparticles 1722) can be to use TEOS to grow the initial silica shell on the starting nanoparticles 1748, then dosing the reaction with a perfluoro-functional silane to effectively cap the nanoparticle with outwardly facing fluorous ligands. The fluorinated silane can have perfluoroalkyl and/or perfluoroether tails. The silica coating can be reacted with silanes that have other functional groups including, for example, amines, carboxylic acids, azides, alkynes, and/or thiols. This can then be further functionalized through the modification of the surface bound reactive moieties with fluorous compounds (e.g., see the section below involving the modification of existing capping agent/ligand).

FIG. 20E illustrates that the nanoparticles 1722 can be created (e.g., can be coated with the surface coating 1746) via an intercalation process. In this method, the hydrophobicity and van der walls interaction potential of the bound ligand can drive interdigitation of a similar chemical group leaving outwardly splayed functionality. To achieve this, the molecule/surfactant being interdigitated can have a hydrophobic portion on top of the desired functionality. The hydrophobic portion can be sequestered inside of the already existing coating, while the functional portion can be splayed out, which can render the nanoparticle function/dispersible in solvents/mediums compatible with the outwardly extended block of the surfactant/molecule. The incorporation of the chosen molecule/surfactant into the existing coating, especially as it relates to the coating of discrete particles, can require large amounts of energy such as sonication, heat, or light. An example of this can be, for example, the intercalation of perfluorohexyloctane or other alkyl-perfluoroalkyl surfactants into the splayed aliphatic tails of oleic acid coated nanoparticles.

FIG. 20F illustrates that the nanoparticles 1722 can be created (e.g., can be coated with the surface coating 1746) by directly modifying an existing capping agent/ligand. In this method, the bound ligand can have a reactive moiety which can be exploited and further functionalized with a choice molecule. The original ligand/coating of the starting nanoparticles 1748 can retained and can contribute to the overall hydrodynamic diameter of the resulting nanoparticles 1722. This can be important, for example, when considering the stabilization of the nanoparticles 1722 against the magnetic moment given that the magnetic field can fall off cubically away from the surface of the core 1744. The functionality of the ligand can be virtually all functional groups, including, for example, carboxylic acids, amines, alcohols, thiols, azides, and/or alkynes.

An example of direct surface modification of a functional ligand can be the amidization of surface carboxylates with perfluoroalkyl amines using carbodiimide, triazine, or other amide coupling agents. The solvent choice for coupling can be of high importance, as dispersibility and solubility of both the starting nanoparticles 1748 and reagents can change as the reaction proceeds. Because of the high solubility of perfluoroalkyl amines and the dispersibility of poly(acrylic acid) functional nanoparticles in alcohols, triazine coupling reagents can excel at coupling in alcohol solvents such as ethanol and methanol. The dispersibility of the nanoparticles, both pre-modification and post-modification, can be maintained throughout the reaction as instability can cause agglomeration, or irreversible aggregation and larger microscopic cluster formation.

Stability of the resultant nanoparticles 1722 can be enhanced, for example, by using long chain perfluoropolyethers i.e. 1-10 kda polymer chains. One possibility can be to drive the esterification of these molecules on the surface of a PAA coated particle using carbodiimide coupling reagents and a mole percent of an organic catalyst such as dimethyl aminopyridine (DMAP). This reaction is also known as the Steiglich esterification.

As another example, the nanoparticles 1722 can be created via direct synthesis. In this method, capping agents/ligands used in current synthesis protocols can be replaced with ones that can confer stability in fluorous fluids directly without further modification. For example, the capping agent poly(acrylic acid) can be replaced with a fluorous acid such as perfluorotetradecanoic acid. The replacement of the original capping ligand can have a drastic effect on the resulting nanoparticles 1722. This can include major changes to both the size and morphology, due differences in the ligand solubility, binding kinetics, and preferential binding schemes and location. There may be a redox effect, depending on the tendency of the ligand to take part in in situ redox reactions or its interaction with varying valencies of iron or other metals that may be present in the reaction. The changes in these parameters can be controlled or mitigated, for example, so that the final surface coating of the nanoparticles 1722 can be fluorinated such that no further surface modification may be needed if direct synthesis is used to create the nanoparticles 1722.

FIGS. 20C-20F illustrate that the processes can have the materials shown, for example, in the arrangements shown.

FIG. 19 illustrates a variation of the nanoparticles 1722 that can result from their synthesis via ligand exchange, silica coating, intercalation, direct modification, and/or direct synthesis. The nanoparticles 1722 can be coated with the surface coating 1746 (e.g., with a fluorophilic coating), for example, by directly substituting an oleic acid cap on magnetic nanoparticles with a fluorous acid, and/or by replacing an oleic acid cap on magnetic nanoparticles with PVP and then coating the PVP with silica before aminating the silica and doing a DCC crosslinking reaction to bind the carboxylic acid on the fluorous acid to the silica on the surface of the nanoparticles 1722.

Figure 21:
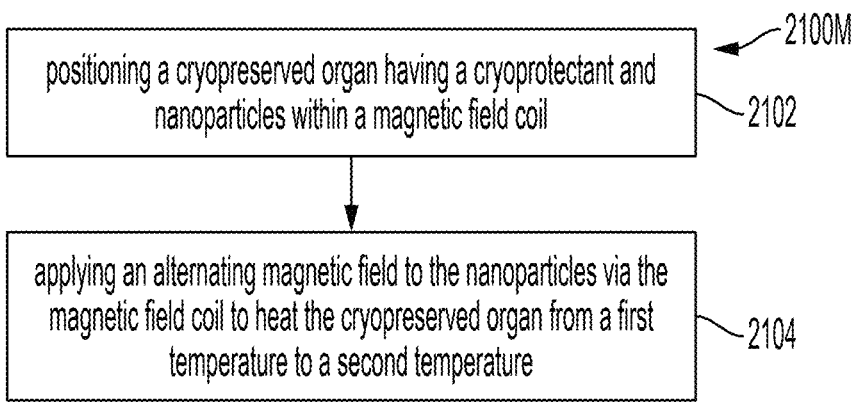
FIG. 21 illustrates a variation of a method for reheating an organ.

FIG. 21 illustrate a variation of a method 2100M for heating (e.g., warming) a cryopreserved specimen 1716. FIG. 21 illustrates that the method 2100M can involve, for example, step 2102 and/or step 2104. Any process and/or step disclosed herein can be added to the method 2100M, and/or any process and/or step disclosed herein can be performed together with one of the steps of the method 2100M. Any of the devices and/or systems disclosed herein having a magnetic field coil can perform and/or can be used to perform the method 2100M.

FIG. 21 illustrates, for example, that the method 2100M can include positioning a cryopreserved specimen (e.g., the cryopreserved specimen 1716c) having cryoprotectant (e.g., the cryoprotectant 1720) and nanoparticles (e.g., the nanoparticles 1722) within a magnetic field coil (e.g., the magnetic field coil 105, the magnetic field coil 1102, the magnetic field coil 1501) in step 2102, and/or applying an alternating magnetic field to the nanoparticles via the magnetic field coil to heat the cryopreserved specimen 1716c from a first temperature (e.g., the heating phase specimen first temperature) to a second temperature (e.g., the heating phase specimen second temperature) in step 2104. Applying the alternating magnetic field to the nanoparticles 1722 can, for example, cause the nanoparticles 1722 to heat the specimen 1716 from hysteretic losses. Applying the alternating magnetic field to the nanoparticles 1722 can, for example, cause the nanoparticles 1722 to heat the specimen 1716 from the first temperature to the second temperature due to hysteretic losses of the nanoparticles 1722. The first temperature can be, for example, −196° C. to −150° C., including every 1° C. increment within this range (e.g., −196° C., −180° C., −150° C.). The second temperature can be, for example, −4° C. to 38° C., or more narrowly, 1° C. to 38° C., including every 1° C. increment within these ranges (e.g., −4° C., 0° C., 1° C., 10° C., 38° C.).

The method 2100M can include unloading the cryoprotectant 1720 from the cryopreserved specimen 1716c.

The method 2100M can include positioning the cryopreserved specimen 1716c in the magnetic field coil. The method 2100M can include, for example, positioning the cryopreserved specimen 1716c in a center of the magnetic field coil.

The method 2100M can include applying the alternating magnetic field across the cryopreserved specimen 1716c. The method 2100M can include applying the alternating magnetic field uniformly across the cryopreserved specimen 1716c.

The method 2100M can include increasing the temperature of the specimen 1716 from the first temperature to the second temperature at a warming rate. The warming rate can be, for example, between 60° C./min and 2,000° C./min, including every 1° C./min increment within this range (e.g., 60° C./min, 500° C./min and 1,000° C./min, 2,000° C./min). The warming rate can inhibit and/or prevent ice formation in the specimen 1716 while reheating the specimen 1716 (e.g., during the method 2100M).

The method 2100M can include applying an alternating magnetic field to the specimen 1716, the first fluid 1718a in the specimen tissue, the cryoprotectant 1720 in the specimen tissue, the nanoparticles 1722 in the vasculature 1724, the third fluid 1718c in the vasculature 1724, and/or the fourth fluid 1718d in the vasculature 1724.

The method 2100M can include applying an alternating magnetic field to the specimen 1716, the first fluid 1718a in the specimen tissue, the cryoprotectant 1720 in the specimen tissue, the nanoparticles 1722 in the vasculature 1724, the third fluid 1718c in the vasculature 1724, and/or the fourth fluid 1718d in the vasculature 1724 at an alternating magnetic field strength. The alternating magnetic field strength can be, for example, between 5 kA/m and 60 kA/m, including every 1 kA/m increment within this range (e.g., 5 kA/m, 35 kA/m, 60 kA/m). As another example, the alternating magnetic field strength can be, for example, greater than 10 kA/m.

The strength of the alternating magnetic field can be, for example, between 5 kA/m and 60 kA/m, including every 1 kA/m increment within this range (e.g., 5 kA/m, 35 kA/m, 60 kA/m). As another example, the strength of the alternating magnetic field can be, for example, greater than 10 kA/m.

The method 2100M can include applying an alternating magnetic field to the specimen 1716, the first fluid 1718a in the specimen tissue, the cryoprotectant 1720 in the specimen tissue, the nanoparticles 1722 in the vasculature 1724, the third fluid 1718c in the vasculature 1724, and/or the fourth fluid 1718d in the vasculature 1724 at an alternating magnetic field frequency. The alternating magnetic field frequency can be, for example, between 100 kHz-10 MHz, including every 1 Hz increment within this range (e.g., 100 kHz, 1 MHz, 10 MHz).

The frequency of the alternating magnetic field can be, for example, between 100 kHz-10 MHz, including every 1 Hz increment within this range (e.g., 100 kHz, 1 MHz, 10 MHz).

The method 2100M can include flowing a chilled liquid through a hollow tubing of the magnetic field coil, for example, to cool the magnetic field coil.

The magnetic field coil can be, for example, an alternating magnetic field coil.

The magnetic field coil can have a hollow tubing. A chilled liquid can be flowed (e.g., perfused) through the hollow tubing, for example, to cool the magnetic field coil.

The magnetic field coil can have a copper tubing. The copper tubing can be hollow. A chilled liquid can be flowed through the copper tubing, for example, to cool the magnetic field coil.

The wires of the magnetic field coil can be insulated. The wires of the magnetic field coil can be individually insulated.

The magnetic field coil can have litz wires. The litz wires can have a strand gauge, for example, between 46 AWG and 60 AWG, including every 1 AWG increment within this range (e.g., 46 AWG, 50 AWG, 60 AWG).

FIG. 21 illustrates that the method 2100M can reheat the specimen 1716 after vitrifying the specimen 1716, for example, via the method 1700M. FIG. 21 illustrates that the method 2100M can reheat the specimen 1716 after it was vitrified, for example, via the method 1700M.

The method 2100M can include placing the cryopreserved specimen 1716c in a rewarming station. The rewarming station can include, for example, a magnetic field coil and an alternating magnetic field induction heater that can reheat the cryopreserved specimen 1716c. The cryopreserved specimen 1716c can be placed inside the magnetic field coil, for example, so that the magnetic field coil can generate a field at a high amplitude and frequency through a full volume of the specimen 1716.

The magnetic field coil can have parallel-wound litz wire (e.g., 10,000 strand of 46-50 AWG strand gauge). The litz wire can have an optimized turn density and parallelism of the current path, for example, to reduce the resistance of the magnetic field coil. The individual litz wires in the magnetic field coil can be insulated (e.g., with a polyurethane coating).

The parallel LC tank can have high voltage (40 kV+) vacuum capacitors, for example, to allow the tank to resonate and present a high impedance load to the inverters.

Parallel inverters with series LC resonators before a step-up transformer or general impedance transformer can provide a modular and extensible power RF system capable of driving field strengths up to 45 kA/m with less than 10 kW of input power.

Series resonators can choke off high frequency components from the resonator that can otherwise move through the system with relatively low impedance while providing a low impedance path for the resonant frequency components. The series resonators can, for example, enable the drive electronics to be relatively simple inverters instead of class A or AB linear amplifiers.

The magnetic field coil can be cooled using liquid flow, for example, to reduce heating from resistive losses in the windings.

The magnetic field coil can be, for example, a high quality factor (Q) electromagnet for large specimen (e.g., a whole organ) nanowarming via the nanoparticles 1722. For example, the magnetic field coil can be a high Q electromagnet for nanowarming the specimen 1716 via hysteric losses from the nanoparticles 1722.

The magnetic field coil can, for example, have a high quality factor (Q) and function as an electromagnet for large specimen (e.g., large organ) nanowarming via the nanoparticles 1722. For example, the magnetic field coil can have a high quality factor (Q-factor) and function as an electromagnet for nanowarming the specimen 1716 via hysteric losses from the nanoparticles.

Nanowarming the specimen 1716 can include, for example, warming the cryopreserved specimen 1716c by applying an alternating magnetic field to the nanoparticles 1722 in the vasculature 1724 of the cryopreserved specimen 1716c.

To efficiently heat the nanoparticles 1722, the magnetic field coil can generate a magnetic field at a high amplitude and frequency over the full volume of the sample of interest (e.g., over the full volume of the specimen 1716). Traditional nanowarming magnets can achieve this using an LC tank resonator with hollow copper tubing that can serve as the conductor for the magnetic field coil. On resonance, such a circuit can generate a large circulating current through the magnetic field coil, increasing the magnetic field. Such traditional designs are based off of induction furnaces, which can heat large volumes of metal for metallurgy and smelting. This large amount of metal can significantly reduce the Q of the resonator and dissipate the majority of the energy. As a result, little attention is normally given to the series resistance of the magnetic field coil itself. However, copper tubing has a rather high resistivity at 100s of kHz and above compared to DC currents due to the skin effect. In situations like large specimen nanowarming (e.g., organ nanowarming such as full organ nanowarming) where the loss into the specimen 1716 can be relatively modest, the loss into the magnetic field coil can dominate, which can lead to very inefficient heating of the specimen 1716 compared to the magnetic field coil. Thus, dropping the resistance in the magnetic field coil can be a strong candidate for improving the performance of the magnetic field coil system.

In high frequency applications (e.g. 100 kHz to 3 MHz applications), litz wire can be used to reduce this resistance. The magnetic field coil that can reheat the specimen 1716 can have, for example, a parallel winding of litz wire that can optimize the turn density and parallelism of the current path, which can reduce (e.g., dramatically reduce) the series resistance of the magnetic field coil.

The magnetic field coil system can have, for example, parallel inverters with series LC resonators before a step-up transformer, for example, to provide a modular and extensible power RF system capable of driving magnetic field strengths up to 60 kA/m or more with less than 10 kW of input power. The series resonators can choke off high frequency components from the resonator that can otherwise move through the system with relatively low impedance while providing a low impedance path for the resonant frequency components. The series resonators can, for example, enable the drive electronics to be relatively simple inverters instead of class A or AB linear amplifiers.

Figure 22A:
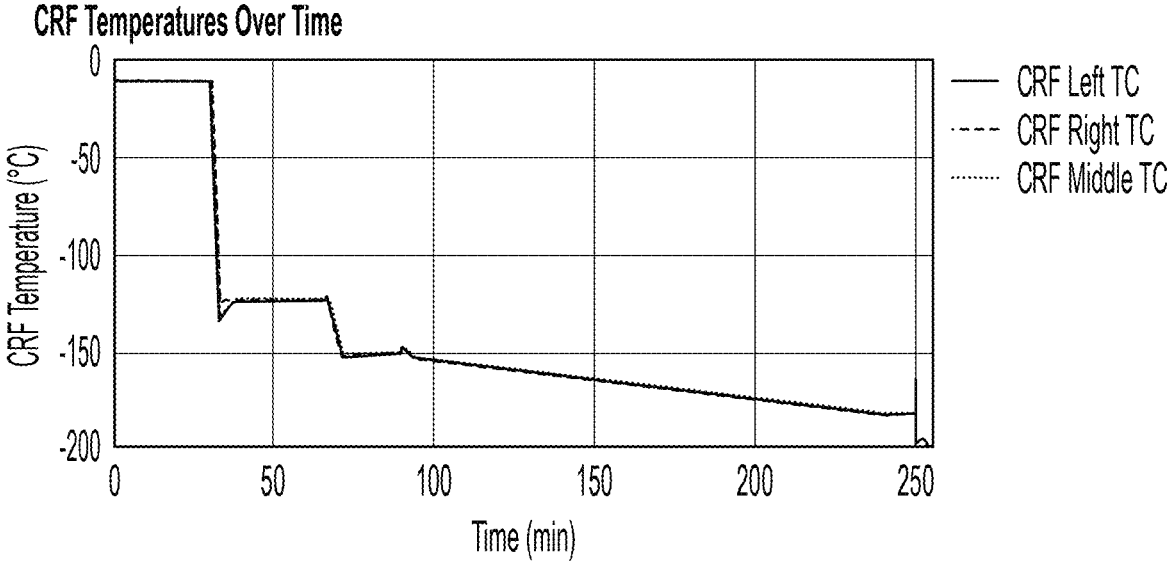
FIGS. 22A-22E illustrate plots of data obtained from experiments in which a pig kidney was cooled and checked for ice formation.
Figure 22B:
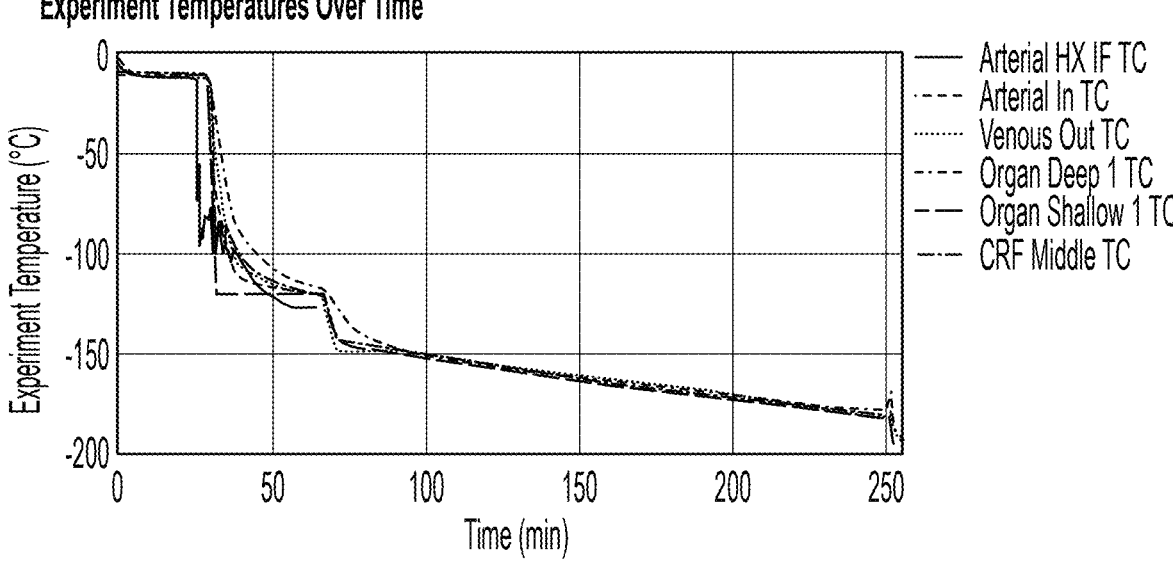
Figure 22C:
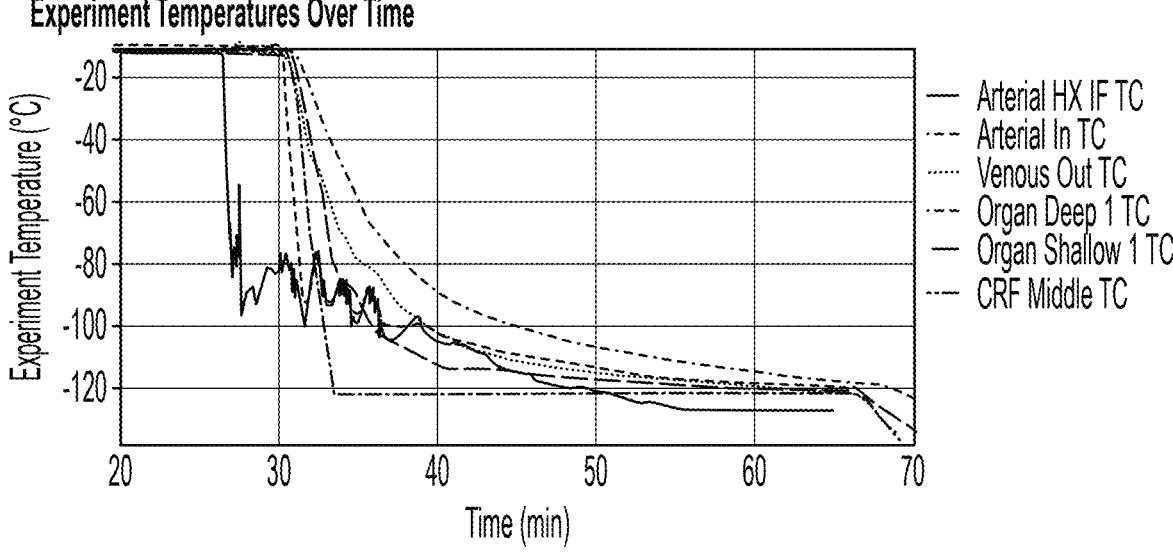
Figure 22D:
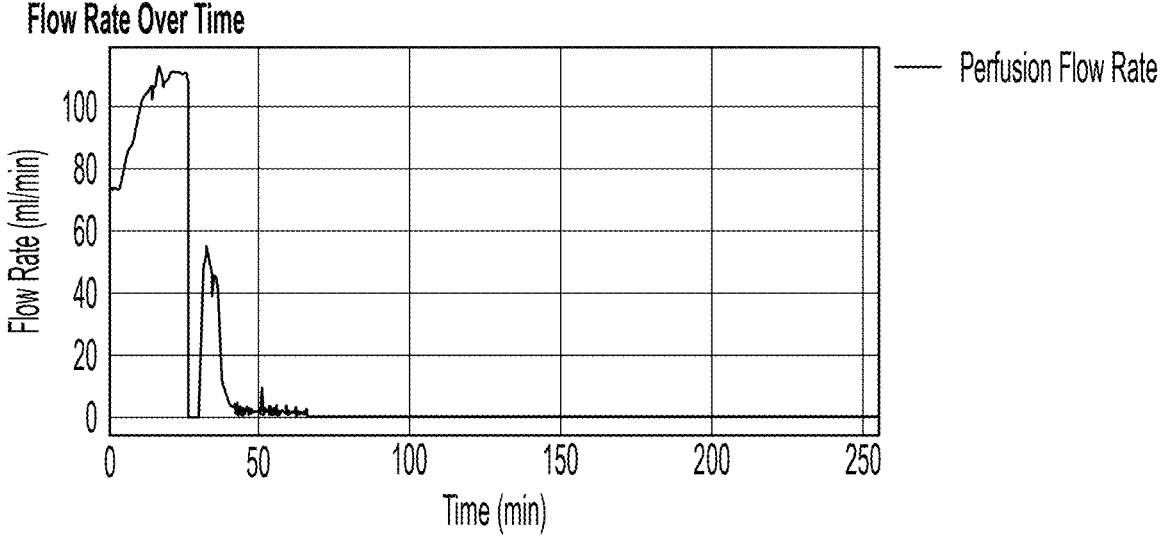
Figure 22E:
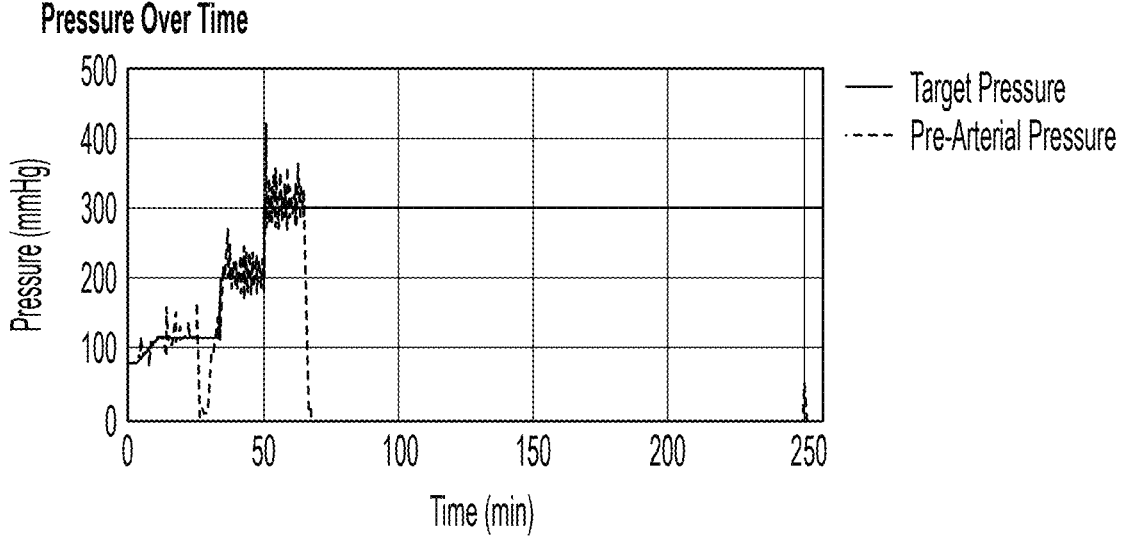
Figure 23:
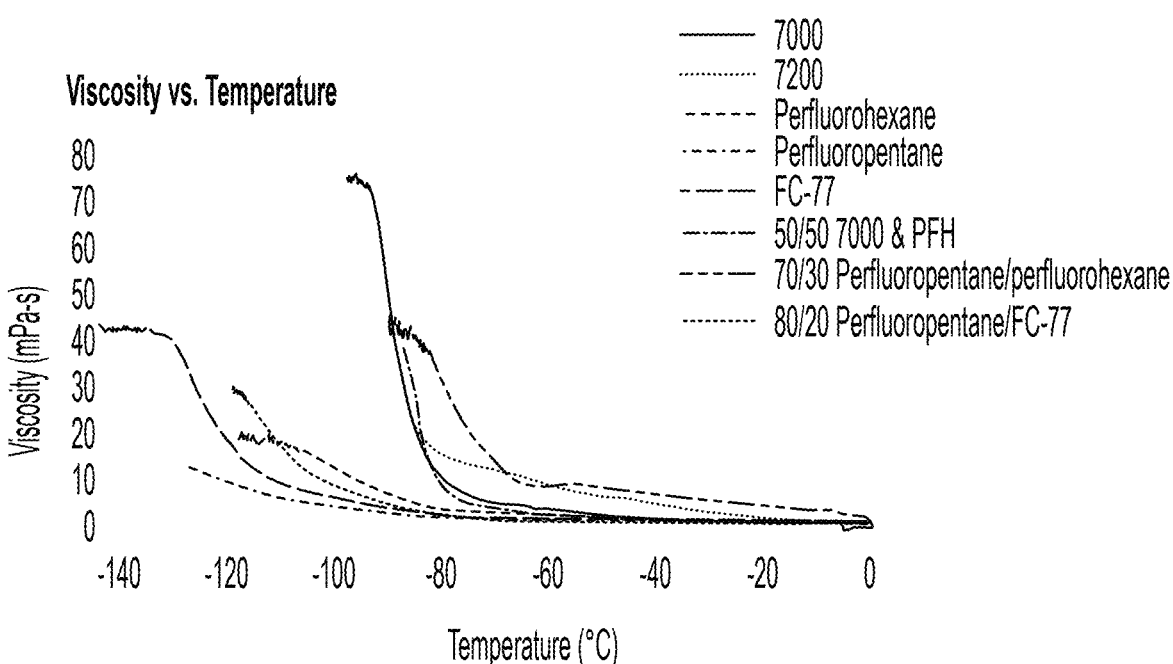
FIG. 23 illustrates a graph of viscosity vs. temperature.

FIGS. 22A-22D illustrate graphs showing a demonstration of the technique shown and described with reference to FIGS. 17A-17Z8 (e.g., the method 1700M), in which a pig kidney was cooled down to −150° C. and checked for ice formation. No large scale ice was visible on the surface of the pig kidney, compared to significant ice which was visible on a pig kidney that was cooled without perfusive cooling. FIG. 22A illustrates a plot of CRF temperature (° C.) vs time (min). FIG. 22A illustrates a plot of the CRF temperature in different locations throughout the experiment (C) vs time (min), showing the homogeneity of the CRF. FIG. 22B illustrates characteristic temperatures of the experiment (° C.) vs. time (min). These include the temperature of the perfusive cooling fluid right after leaving the heat exchanger, the temperature of the fluid coming in and out of the pig kidney, the temperature inside and on the surface of the kidney, and the temperature of the CRF to serve as baseline protocol reference. FIG. 22C is a zoom on FIG. 22B of the perfusive cooling part of the protocol, which stops approximately at min 65 in favour of convective cooling. FIG. 22D illustrates the perfusion flow rate of the cooling fluid (mL/min) vs time (min). FIG. 22E illustrates the target and pre-arterial pressures (mmHg) vs. time (min). FIG. 23 illustrates a graph of viscosity vs. temperature for IKA Rotavisc for the fluids identified in the legend.

Figure 24:
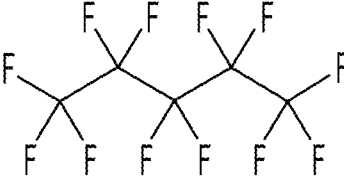
FIG. 24 illustrates the chemical structure for perfluoropentane (Perflenapent).

FIG. 24 illustrates the chemical structure for perfluoropentane (Perflenapent).

Figure 25:
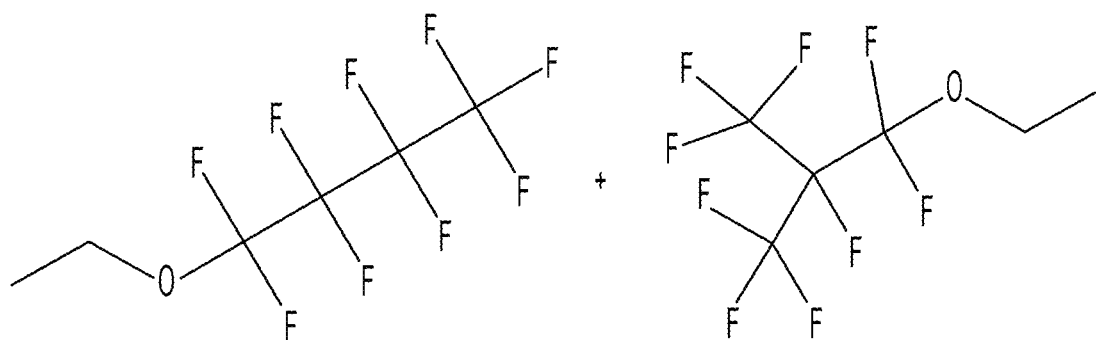
FIG. 25 illustrates the chemical structure for ethyl perfluorobutyl ether (Novec 7200).

FIG. 25 illustrates the chemical structure for ethyl perfluorobutyl ether (Novec 7200).

Figure 26:
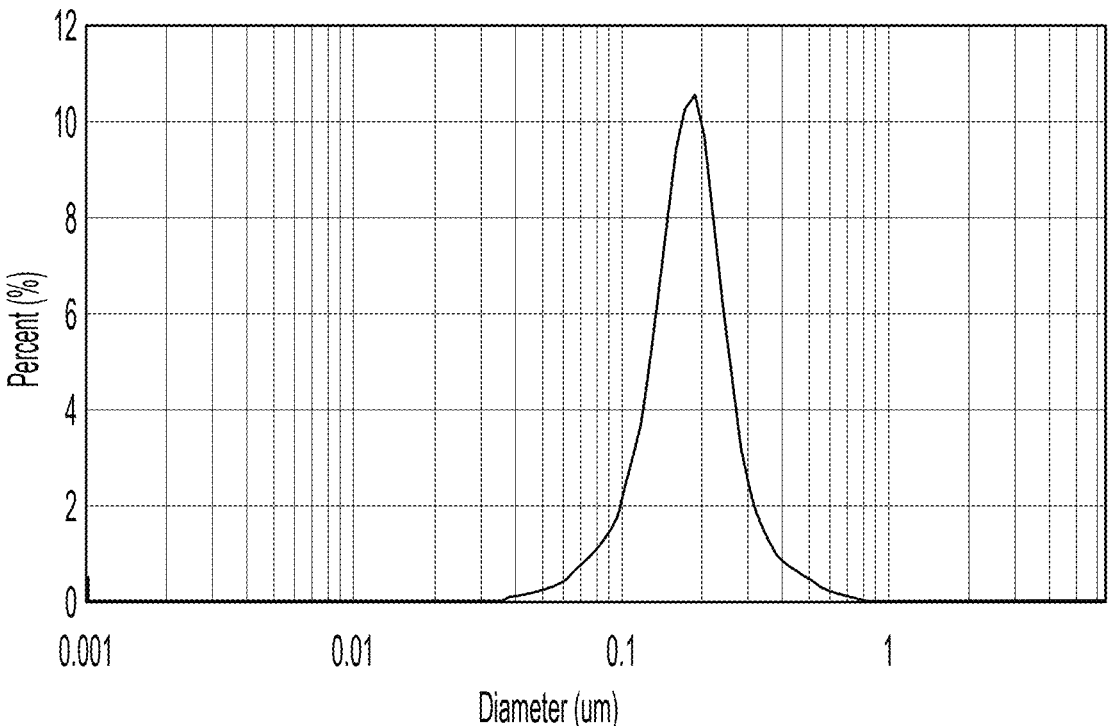
FIG. 26 illustrates a dynamic light scattering plot of ligant exchanged nanoclusters suspended in a fluorous fluid.

FIG. 26 illustrates a dynamic light scattering plot of ligant exchanged nanoclusters suspended in a fluorous fluid, demonstrating an intensity weighted average diameter of approximately 170 nm.

The features in FIGS. 1-26 and/or the features described herein can be combined with each other in any combination.

The features in the FIGS. can have the relative positions shown, the relative sizes shown, and/or the relative positions and relative sizes shown. As another example, the features in the FIGS. may not have the relative positions shown, the relative sizes shown, and/or the relative positions and relative sizes shown. For example, the drawings can be drawn to scale. As another example, the drawings may not be drawn to scale.

Changes and modifications can be made to this disclosure, and equivalents employed, or combinations of any of the disclosed elements, characteristics, features, devices, tools, steps, or methods without departing from the spirit and scope of the disclosure. Any of the disclosed elements, characteristics, features, devices, tools, steps, or methods can be present as a singular or as a plurality regardless of whether the elements, characteristics, features, devices, steps, or methods are explicitly disclosed herein as being singular or as a plurality. Elements shown with any variation are exemplary for the specific variation and can be used on other variations within this disclosure. The terms about and approximately can include the exact values following such terms and can include, for example, a tolerance of plus or minus 1% of any such values, a tolerance of plus or minus 5%, or any other tolerance that one of ordinary skill in the art would understand. Any phrase involving an "A and/or B" construction or similar construction can mean (1) A alone, (2) B alone, (3) A and B together. Any range disclosed can include any subrange of the range disclosed, for example, a range of 1-10 units can include 2-10 units, 8-10 units, or any other subrange. The words "may" and "can" are interchangeable (e.g., "may" can be replaced with "can" and "can" can be replaced with "may"). All systems, devices, and methods described herein can be used for medical (e.g., diagnostic, therapeutic, or rehabilitative) or non-medical purposes. The above-described configurations, elements or complete assemblies and methods and their elements can be combined and modified with each other in any combination.

What is claimed is:

1. A system for cryopreserving a biological tissue, the system comprising:
    a perfusive cooling chamber for holding the biological tissue;
    one or more pumps configured to perfuse a plurality of fluids and a plurality of magnetic nanoparticles into the perfusive cooling chamber and into the biological tissue, the plurality of fluids comprising:
        a cryoprotective fluid comprising one or more cryoprotective agents,
        a first inert fluid, wherein the first inert fluid has a higher viscosity than the cryoprotective fluid, and
        a second inert fluid,
    wherein:
        in a first configuration, the one or more pumps perfuse the cryoprotective fluid into the perfusive cooling chamber and into the biological tissue,
        in a second configuration, the one or more pumps perfuse the first inert fluid into the perfusive cooling chamber and into the biological tissue,
        in a third configuration, the one or more pumps perfuse the second inert fluid into the perfusive cooling chamber and into the biological tissue, and
        in a fourth configuration, the one or more pumps perfuse the second inert fluid and the plurality of magnetic nanoparticles into the perfusive cooling chamber and into the biological tissue.

2. The system of claim 1, wherein the cryoprotective fluid, the first inert fluid, and the second inert fluid are perfused into cannulized vasculature of the biological tissue.

3. The system of claim 1, wherein the first inert fluid is perfused into the biological tissue such that it displaces the cryoprotective fluid within the biological tissue.

4. The system of claim 1, wherein the first inert fluid is immiscible with the cryoprotective fluid.

5. The system of claim 1, wherein the second inert fluid is perfused into the biological tissue such that it replaces the first inert fluid within the biological tissue.

6. The system of claim 1, wherein the second inert fluid is miscible with the first inert fluid.

7. The system of claim 1, wherein the second inert fluid has a lower viscosity than the first inert fluid.

8. The system of claim 1, wherein at least one of the first inert fluid and the second inert fluid is a fluorous fluid.

9. The system of claim 1, wherein the one or more cryoprotective agents comprise trimethylamine-N-oxide.

10. The system of claim 1, wherein the one or more cryoprotective agents comprise antifreeze proteins.

11. The system of claim 10, wherein the one or more antifreeze proteins are produced intracellularly via transient transfection, gene editing, or viral infection.

12. The system of claim 1, wherein, in the fourth configuration, a temperature of the second inert fluid is controlled to cause the biological tissue to cool from a first temperature to a second temperature.

13. The system of claim 12, wherein the first temperature is between 10° C. and −20° C.

14. The system of claim 12, wherein the second temperature is between −42° C. and −196° C.

15. The system of claim 12, wherein the plurality of fluids further comprises a third inert fluid having a lower viscosity than the second inert fluid, and wherein, in a fifth configuration:
    the one or more pumps perfuse the third inert fluid and the plurality of magnetic nanoparticles into the perfusive cooling chamber and into the biological tissue, and
    a temperature of the third inert fluid is controlled to cause the biological tissue to cool from the second temperature to a third temperature.

16. The system of claim 1, wherein the plurality of magnetic nanoparticles comprise a fluorous surface coating.

17. The system of claim 1, wherein the plurality of magnetic nanoparticles comprise core shell nanoparticles, the core shell nanoparticles comprising a CoFe core and a Mn shell.

18. The system of claim 1, wherein each of the plurality of magnetic nanoparticles has a diameter greater than or equal to 20 nm.

19. A method of cryopreserving a biological tissue, the method comprising:
    perfusing the biological tissue with a cryoprotective fluid comprising one or more cryoprotective agents;
    perfusing the biological tissue with a first inert fluid such that the first inert fluid displaces the cryoprotective fluid within vasculature of the biological tissue;
    perfusing the biological tissue with a second inert fluid;
    perfusing the biological tissue with the second inert fluid and a plurality of magnetic nanoparticles; and
    controlling a temperature of the second inert fluid while perfusing the biological tissue with the second inert fluid and the plurality of magnetic nanoparticles to cause the biological tissue to cool from a first temperature to a second temperature.

20. The method of claim 19, further comprising:

perfusing the biological tissue with a third inert fluid and the plurality of magnetic nanoparticles; and controlling a temperature of the third inert fluid while perfusing the biological tissue with the third inert fluid and the plurality of magnetic nanoparticles to cause the biological tissue to cool from the second temperature to a third temperature.

\* \* \* \* \*